US010336848B2

(12) United States Patent
Huang et al.

(10) Patent No.: US 10,336,848 B2
(45) Date of Patent: Jul. 2, 2019

(54) SURFACTANT-COMPATIBLE STAR MACROMOLECULES

(71) Applicant: Pilot Polymer Technologies, Inc., Pittsburgh, PA (US)

(72) Inventors: Liang Huang, Pittsburgh, PA (US); Yuanxi Liao, Pittsburgh, PA (US); Patrick McCarthy, Pittsburgh, PA (US)

(73) Assignee: Pilot Polymer Technologies, Inc., Pittsburgh, PA (US)

( * ) Notice: Subject to any disclaimer, the term of this patent is extended or adjusted under 35 U.S.C. 154(b) by 0 days.

(21) Appl. No.: 15/322,967

(22) PCT Filed: Jul. 2, 2015

(86) PCT No.: PCT/US2015/039066
§ 371 (c)(1),
(2) Date: Dec. 29, 2016

(87) PCT Pub. No.: WO2016/004357
PCT Pub. Date: Jan. 7, 2016

(65) Prior Publication Data
US 2018/0072832 A1    Mar. 15, 2018

Related U.S. Application Data

(60) Provisional application No. 62/020,736, filed on Jul. 3, 2014.

(51) Int. Cl.
*C08F 220/06* (2006.01)
*C08F 20/18* (2006.01)
*C08G 83/00* (2006.01)
*C08L 33/02* (2006.01)
*C08F 293/00* (2006.01)

(52) U.S. Cl.
CPC ............ *C08F 220/06* (2013.01); *C08F 20/18* (2013.01); *C08F 293/005* (2013.01); *C08G 83/003* (2013.01); *C08L 33/02* (2013.01); *C08F 2438/01* (2013.01); *C08L 2201/54* (2013.01)

(58) Field of Classification Search
CPC ..... C08F 220/06; C08G 83/003; C08L 33/02; C08L 2201/54
USPC ......................................................... 524/58
See application file for complete search history.

(56) References Cited

U.S. PATENT DOCUMENTS

| | | |
|---|---|---|
| 4,386,135 A | 5/1983 | Campbell et al. |
| 4,409,120 A | 10/1983 | Martin |
| 4,847,328 A | 7/1989 | Hutchins et al. |
| 5,100,953 A | 3/1992 | Valint et al. |
| 5,240,963 A | 8/1993 | Domb et al. |
| 5,310,807 A | 5/1994 | Antonelli et al. |
| 5,362,813 A | 11/1994 | Antonelli et al. |
| 5,486,563 A | 1/1996 | Sutherland |
| 5,545,342 A | 8/1996 | Beagle et al. |
| 5,545,504 A | 8/1996 | Keoshkerian et al. |
| 5,594,072 A | 1/1997 | Handlin, Jr. et al. |
| 5,612,107 A | 3/1997 | Sangani et al. |
| 5,631,015 A | 5/1997 | Bezwada et al. |
| 5,639,831 A | 6/1997 | Himes et al. |
| 5,653,992 A | 8/1997 | Bezwada et al. |
| 5,728,469 A | 3/1998 | Mann et al. |
| 5,756,585 A * | 5/1998 | Teyssie ............... C08F 297/026 525/299 |
| 5,763,548 A | 6/1998 | Matyjaszewski et al. |
| 5,789,487 A | 8/1998 | Matyjaszewski et al. |
| 5,807,937 A | 9/1998 | Matyjaszewski et al. |
| 5,933,695 A | 8/1999 | Henry et al. |
| 5,945,491 A | 8/1999 | Matyjaszewski et al. |
| 5,994,457 A | 11/1999 | Stanger et al. |
| 6,103,361 A | 8/2000 | Batzar et al. |
| 6,111,022 A | 8/2000 | Matyjaszewski et al. |
| 6,111,055 A | 8/2000 | Berger et al. |
| 6,121,371 A | 9/2000 | Matyjaszewski et al. |
| 6,124,411 A | 9/2000 | Matyjaszewski et al. |
| 6,127,445 A | 10/2000 | Kutal et al. |
| 6,162,882 A | 12/2000 | Matyjaszewski et al. |
| 6,210,524 B1 | 4/2001 | Josephy |
| 6,221,399 B1 | 4/2001 | Rolfes et al. |
| 6,252,014 B1 | 6/2001 | Knauss |
| 6,336,966 B1 | 1/2002 | Coca et al. |
| 6,407,187 B1 | 6/2002 | Matyjaszewski et al. |

(Continued)

FOREIGN PATENT DOCUMENTS

| | | |
|---|---|---|
| CA | 2399690 A1 | 8/2001 |
| CN | 101575402 A | 11/2009 |

(Continued)

OTHER PUBLICATIONS

Adkins, Chinessa T. et al. "Synthesis of Star Polymer Architectures with Site-Isolated Chromophore Cores," Macromolecules 41 (2008) 3472-3480.
Ali, Monzur et al. "Synthetic Approaches to Uniform Polymers" Advanced Drug Delivery Reviews 58 (2006) 1671-1687.
Allen, Barry J. "Clinical Trials of Targeted Alpha Therapy for Cancer" Rev.Recent Clin.Trials 3:3 (2008) 185-191.
Baek, Kyung-Youl et al. "Core-Functionalized Star Polymers by Transition Metal-Catalyzed Living Radical Polymerization. 1. Synthesis and Characterization of Star Polymers with PMMA Arms and Amide Cores," Macromolecules 34 (2001) 7629-7635.

(Continued)

*Primary Examiner* — Hui H Chin
(74) *Attorney, Agent, or Firm* — Ulmer & Berne LLP

(57) ABSTRACT

The present invention relates to multi-arm surfactant-system thickening star macromolecules, and methods of preparing and using the same. In one aspect of the invention, a surfactant-system thickening star macromolecule is capable of providing surfactant-compatibility, increase the viscosity of a surfactant-containing system, and/or temperature-stability to an aqueous composition.

26 Claims, 18 Drawing Sheets

(56) References Cited

U.S. PATENT DOCUMENTS

| Patent/Pub No. | Date | Inventor |
|---|---|---|
| 6,410,666 B1 | 6/2002 | Grubbs et al. |
| 6,455,623 B1 | 9/2002 | Howard |
| 6,461,631 B1 | 10/2002 | Dunn et al. |
| 6,465,091 B1 | 10/2002 | Ou-Yang |
| 6,476,079 B1 | 11/2002 | Jukarainen et al. |
| 6,512,060 B1 | 1/2003 | Matyjaszewski et al. |
| 6,528,080 B2 | 3/2003 | Dunn et al. |
| 6,538,091 B1 | 3/2003 | Matyjaszewski et al. |
| 6,541,580 B1 | 4/2003 | Matyjaszewski et al. |
| 6,555,237 B1 | 4/2003 | Chen et al. |
| 6,558,805 B2 | 5/2003 | Khadir et al. |
| 6,624,262 B2 | 9/2003 | Matyjaszewski et al. |
| 6,624,263 B2 | 9/2003 | Matyjaszewski et al. |
| 6,626,950 B2 | 9/2003 | Brown et al. |
| 6,627,314 B2 | 9/2003 | Matyjaszewski et al. |
| 6,685,957 B1 | 2/2004 | Bezemer et al. |
| 6,692,770 B2 | 2/2004 | Gustavsson et al. |
| 6,706,288 B2 | 3/2004 | Gustavsson et al. |
| 6,759,491 B2 | 7/2004 | Matyjaszewski et al. |
| 6,764,731 B2 | 7/2004 | Savoca et al. |
| 6,784,397 B2 | 8/2004 | Li et al. |
| 6,790,919 B2 | 9/2004 | Matyjaszewski et al. |
| 6,887,962 B2 | 5/2005 | Matyjaszewski et al. |
| 6,919,405 B2 | 7/2005 | Kinning et al. |
| 6,939,505 B2 | 9/2005 | Musso et al. |
| 7,019,082 B2 | 3/2006 | Matyjaszewski et al. |
| 7,049,373 B2 | 5/2006 | Matyjaszewski et al. |
| 7,056,455 B2 | 6/2006 | Matyjaszewski et al. |
| 7,064,166 B2 | 6/2006 | Matyjaszewski et al. |
| 7,081,486 B2 | 7/2006 | Imai et al. |
| 7,105,175 B2 | 9/2006 | Schwarz |
| 7,105,181 B2 | 9/2006 | Gustavsson et al. |
| 7,125,938 B2 | 10/2006 | Matyjaszewski et al. |
| 7,153,821 B2 | 12/2006 | Blokzijl et al. |
| 7,157,530 B2 | 1/2007 | Matyjaszewski et al. |
| 7,163,697 B2 | 1/2007 | Hanes et al. |
| 7,186,759 B2 | 3/2007 | Seppl et al. |
| 7,229,687 B2 | 6/2007 | Kinning et al. |
| 7,235,261 B2 | 6/2007 | Smith et al. |
| 7,241,455 B2 | 7/2007 | Richard |
| 7,316,811 B2 | 1/2008 | Zhao et al. |
| 7,341,720 B2 | 3/2008 | Stefano |
| 7,381,418 B2 | 6/2008 | Richard |
| 7,517,914 B2 | 4/2009 | Richard |
| 7,537,781 B2 | 5/2009 | Richard |
| 7,592,021 B2 | 9/2009 | Shankar et al. |
| 7,612,029 B2 | 11/2009 | Foland et al. |
| 7,713,539 B2 | 5/2010 | Strickler et al. |
| 7,985,424 B2 | 7/2011 | Tomalia et al. |
| 8,173,750 B2 | 5/2012 | Jakubowski et al. |
| 8,445,577 B2 | 5/2013 | Lin et al. |
| 8,604,132 B2 | 12/2013 | Jakubowski et al. |
| 9,587,064 B2 | 3/2017 | Huang et al. |
| 2002/0039596 A1 | 4/2002 | Hartounian et al. |
| 2002/0044976 A1 | 4/2002 | Gustaysson et al. |
| 2002/0082543 A1 | 6/2002 | Park et al. |
| 2002/0090398 A1 | 7/2002 | Dunn et al. |
| 2002/0155309 A1 | 10/2002 | Li et al. |
| 2002/0155310 A1 | 10/2002 | Li et al. |
| 2003/0003127 A1 | 1/2003 | Brown |
| 2003/0004578 A1 | 1/2003 | Brown |
| 2003/0018154 A1 | 1/2003 | Khadir et al. |
| 2003/0054185 A1 | 3/2003 | Ottersbach et al. |
| 2003/0086895 A1 | 5/2003 | Hanes et al. |
| 2003/0091630 A1 | 5/2003 | Louie-Helm et al. |
| 2003/0104052 A1 | 6/2003 | Berner et al. |
| 2003/0133985 A1 | 7/2003 | Louie-Helm et al. |
| 2003/0138579 A1 | 7/2003 | Savoca et al. |
| 2003/0152622 A1 | 8/2003 | Louie-Helm et al. |
| 2003/0153457 A1 | 8/2003 | Nemoto et al. |
| 2003/0158076 A1 | 8/2003 | Rodrigues |
| 2003/0158344 A1 | 8/2003 | Rodrigues et al. |
| 2003/0173720 A1 | 9/2003 | Musso et al. |
| 2003/0203000 A1 | 10/2003 | Schwarz et al. |
| 2003/0211167 A1 | 11/2003 | Gustaysson et al. |
| 2003/0220254 A1 | 11/2003 | Khan et al. |
| 2003/0235602 A1 | 12/2003 | Schwarz |
| 2003/0235603 A1 | 12/2003 | Schwarz et al. |
| 2003/0236513 A1 | 12/2003 | Schwarz et al. |
| 2003/0236514 A1 | 12/2003 | Schwarz |
| 2004/0001891 A1 | 1/2004 | Smith et al. |
| 2004/0006153 A1 | 1/2004 | Seppala et al. |
| 2004/0023987 A1 | 2/2004 | Hata et al. |
| 2004/0068078 A1 | 4/2004 | Milbocker |
| 2004/0086544 A1 | 5/2004 | Bezemer et al. |
| 2004/0115281 A1 | 6/2004 | Gustaysson et al. |
| 2004/0126576 A1 | 7/2004 | Kinning et al. |
| 2004/0156899 A1 | 8/2004 | Louie-Helm et al. |
| 2004/0161403 A1 | 8/2004 | Zhao et al. |
| 2004/0171513 A1 | 9/2004 | Blokzijl et al. |
| 2004/0175406 A1 | 9/2004 | Schwarz |
| 2004/0185105 A1 | 9/2004 | Berner et al. |
| 2004/0202691 A1 | 10/2004 | Richard |
| 2004/0234571 A1 | 11/2004 | Jang |
| 2005/0025800 A1 | 2/2005 | Tan |
| 2005/0025801 A1 | 2/2005 | Richard et al. |
| 2005/0064011 A1 | 3/2005 | Song et al. |
| 2005/0113515 A1 | 5/2005 | Sutton et al. |
| 2005/0181014 A1 | 8/2005 | Richard |
| 2005/0181015 A1 | 8/2005 | Zhong |
| 2005/0214531 A1 | 9/2005 | Kinning et al. |
| 2005/0233062 A1 | 10/2005 | Hossainy et al. |
| 2005/0238594 A1 | 10/2005 | Mougin |
| 2005/0244640 A1 | 11/2005 | Riswick et al. |
| 2006/0013849 A1 | 1/2006 | Strickler et al. |
| 2006/0014902 A1 | 1/2006 | Mays et al. |
| 2006/0018951 A1 | 1/2006 | Maniar et al. |
| 2006/0024357 A1 | 2/2006 | Carpenter et al. |
| 2006/0051390 A1 | 3/2006 | Schwarz |
| 2006/0068378 A1 | 3/2006 | Mirkin et al. |
| 2006/0089474 A1 | 4/2006 | Yamazaki et al. |
| 2006/0121076 A1 | 6/2006 | Ranade et al. |
| 2006/0121085 A1 | 6/2006 | Warren et al. |
| 2006/0122339 A1 | 6/2006 | Meulenbrugge et al. |
| 2006/0147490 A1 | 7/2006 | Bowden et al. |
| 2006/0159619 A1 | 7/2006 | Becker et al. |
| 2006/0165753 A1 | 7/2006 | Richard |
| 2006/0188486 A1 | 8/2006 | Carpenter et al. |
| 2006/0210604 A1 | 9/2006 | Dadey et al. |
| 2006/0222681 A1 | 10/2006 | Richard |
| 2006/0228348 A1 | 10/2006 | Stefano |
| 2007/0003599 A1 | 1/2007 | Schwarz |
| 2007/0020307 A1 | 1/2007 | Zhong et al. |
| 2007/0135532 A1 | 6/2007 | Seppala et al. |
| 2007/0160561 A1 | 7/2007 | Duali et al. |
| 2007/0212418 A1 | 9/2007 | Ahlheim |
| 2007/0219330 A1 | 9/2007 | Haddleton et al. |
| 2007/0238634 A1 | 10/2007 | Foland et al. |
| 2007/0244018 A1 | 10/2007 | Visger et al. |
| 2007/0254010 A1 | 11/2007 | Richard |
| 2007/0260015 A1 | 11/2007 | Stork et al. |
| 2007/0275027 A1 | 11/2007 | Wen et al. |
| 2007/0275080 A1 | 11/2007 | Laulicht et al. |
| 2007/0275082 A1 | 11/2007 | Lee et al. |
| 2007/0276101 A1 | 11/2007 | Matyjaszewski et al. |
| 2007/0280992 A1 | 12/2007 | Margaron et al. |
| 2007/0281031 A1 | 12/2007 | Yang |
| 2007/0299227 A1 | 12/2007 | Gopferich et al. |
| 2007/0299238 A1 | 12/2007 | Gopferich et al. |
| 2007/0299240 A1 | 12/2007 | Gopferich et al. |
| 2008/0112898 A1 | 5/2008 | Schiemann et al. |
| 2008/0114128 A1 | 5/2008 | Destarac et al. |
| 2008/0131395 A1 | 6/2008 | Wellinghoff et al. |
| 2008/0132580 A1 | 6/2008 | Mandavilli et al. |
| 2008/0149348 A1 | 6/2008 | DiFoggio et al. |
| 2008/0226658 A1 | 9/2008 | Stefano |
| 2008/0269093 A1 | 10/2008 | Price |
| 2008/0280037 A1 | 11/2008 | Sheridan et al. |
| 2008/0280086 A1 | 11/2008 | Sheridan et al. |
| 2008/0286333 A1 | 11/2008 | Kangas et al. |
| 2008/0299168 A1 | 12/2008 | Dadey et al. |
| 2008/0311173 A1 | 12/2008 | Schwarz et al. |
| 2009/0087493 A1 | 4/2009 | Dai et al. |
| 2009/0092650 A1 | 4/2009 | Warren et al. |

(56) References Cited

U.S. PATENT DOCUMENTS

| | | | |
|---|---|---|---|
| 2009/0098079 A1 | 4/2009 | Schiemann et al. | |
| 2009/0098183 A1 | 4/2009 | Detamore et al. | |
| 2009/0099151 A1 | 4/2009 | Jain et al. | |
| 2009/0130172 A1 | 5/2009 | Dankers et al. | |
| 2009/0142313 A1 | 6/2009 | Talling et al. | |
| 2009/0171024 A1 | 7/2009 | Jakubowski et al. | |
| 2009/0176951 A1 | 7/2009 | Matyjaszewski et al. | |
| 2009/0181094 A1 | 7/2009 | Sheu | |
| 2009/0291106 A1 | 11/2009 | Gpferich et al. | |
| 2009/0298729 A1 | 12/2009 | Schober et al. | |
| 2009/0306295 A1 | 12/2009 | Mays et al. | |
| 2009/0312505 A1 | 12/2009 | Matyjaszewski et al. | |
| 2009/0326645 A1 | 12/2009 | Pacetti et al. | |
| 2010/0004152 A1 | 1/2010 | Karagianni et al. | |
| 2010/0086597 A1 | 4/2010 | Woo et al. | |
| 2010/0092535 A1 | 4/2010 | Cook et al. | |
| 2010/0120637 A1 | 5/2010 | Bendejacq et al. | |
| 2010/0120970 A1 | 5/2010 | Biggs et al. | |
| 2010/0204418 A1 | 8/2010 | Marc et al. | |
| 2010/0273949 A1 | 10/2010 | Jakubowski et al. | |
| 2011/0082230 A1 | 4/2011 | Jakubowski et al. | |
| 2011/0213105 A1 | 9/2011 | Jakubowski et al. | |
| 2011/0263722 A1* | 10/2011 | Jakubowski | A61K 47/32 514/772.6 |
| 2012/0172531 A1 | 7/2012 | Jakubowski et al. | |
| 2013/0197175 A1 | 8/2013 | Kato et al. | |
| 2013/0296495 A1 | 11/2013 | Jakubowski et al. | |
| 2013/0324443 A1 | 12/2013 | Wang et al. | |
| 2018/0127531 A1 | 5/2018 | McCarthy et al. | |

FOREIGN PATENT DOCUMENTS

| | | |
|---|---|---|
| CN | 102604011 A | 7/2012 |
| CN | 102702453 A | 10/2012 |
| DE | 102005041528 A1 | 3/2007 |
| EP | 408420 A1 | 1/1991 |
| EP | 422805 A2 | 4/1991 |
| EP | 1197498 A1 | 4/2002 |
| GB | 1043748 A | 9/1966 |
| JP | 2005113086 A | 4/2005 |
| JP | 2006002032 A | 1/2006 |
| WO | 2005087819 A1 | 9/2005 |
| WO | 2005113031 A2 | 12/2005 |
| WO | 2009155303 A2 | 12/2009 |
| WO | 2010111708 A1 | 9/2010 |
| WO | WO 2011/163635 | 12/2011 |
| WO | WO 2012/020545 | 2/2012 |
| WO | 2012061147 A1 | 5/2012 |
| WO | WO 2012/071462 | 5/2012 |
| WO | 2014036498 A2 | 3/2014 |
| WO | WO 2014/121188 | 8/2014 |

OTHER PUBLICATIONS

Baek, Kyung-Youl et al. "Star Poly(methyl methacrylate) with End-Functionalized Arm Chains by Ruthenium-Catalyzed Living Radical Polymerization," J. Polm. Sci. Part A: Polym. Chem. 40 (2002) 1972-1982.

Baek, Kyung-Youl et al. "Star-Shaped Polymers by Metal-Catalyzed Living Radical Polymerization. 1. Design of Ru(II)-Based Systems and Divinyl Linking Agents," Macromolecules 34 (2001) 215-221.

Baek, Kyung-Youl et al. "Star-Shaped Polymers by Ru(II)-Catalyzed Living Radical Polymerization. II. Effective Reaction Conditions and Characterization by Multi-Angle Laser Light Scattering/Size Exclusion Chromatography and Small-Angle X-Ray Scattering," J. Polm. Sci. Part A: Polym. Chem. 40 (2002) 2245-2255.

Baek, Kyung-Youl et al. "Synthesis of Star-Shaped Copolymers with Methyl Methacrylate and n-Butyl Methacrylate by Metal-Catalyzed Living Radical Polymerization: Block and Random Copolymer Arms and Microgel Cores," J. Polm. Sci. Part A: Polym. Chem. 40 (2002) 633-641.

Beers, Kathryn L. et al. "Atom Transfer Radical Polymerization of 2-Hydroxyethyl Methacrylate" Macromolecules 32 :18 (1999) 5772-5776.

Beers, Kathryn L. et al. "The Synthesis of Densely Grafted Copolymers by Atom Transfer Radical Polymerization" Macromolecules 31:26 (1998) 9413-9415.

Bencherif, Sidi A. et al. "Cell-Adhesive Star Polymers Prepared by ATRP," Biomacromolecules 10 (2010) 1795-1803.

Bi, Le-Khac et al. "Synthesis and Properties of Block Copolymers. 3. Polystyrene-Polythene Star Block Copolymers," Macromolecules 9:5 (Sep.-Oct. 1976) 732-742.

Blainey, J. D. "The Renal Excretion of Higher Molecular Weight Substances" Enzymes in Urine and Kidney Proceedings: Curr. Probl. Clin. Biochem. 2 (1968) 85-100.

Blencowe, Anton et al. "Synthesis of Buckminsterfullerene C60 Functionalised Core Cross-Linked Star Polymers," Polymer 49 (2008) 825-830.

Bontempo, Debora et al. "Cysteine-Reactive Polymers Synthesized by Atom Transfer Radical Polymerization for Conjugation to Proteins" J. Am. Chem. Soc. 126 :47 (2004) 15372-15373.

Bosman, Anton W. et al. "A Modular Approach Toward Functionalized Three-Dimensional Macromolecules: From Synthetic Concepts to Practical Applications," J. Am. Chem. Soc. 125 (2003) 715-728.

Bosman, Anton W. et al. "High-Throughput Synthesis of Nanoscale Materials: Structural Optimization of Functionalized One-Step Star Polymers," J. Am. Chem. Soc. 123 (2001) 6461-6462.

Bouilhac, Cécile et al. "Benzophenone-Functionalized, Starlike Polystyrenes as Organic Supports for a Tridentate Bis(imino)pyridinyliron/Trimethylaluminum Catalytic System for Ethylene Polymerization," J. Polm. Sci. Part A: Polym. Chem. 44 (2006) 6997-7007.

Bouilhac, Cécile et al. "Functionalized Star-Like Polystyrenes as Organic Supports of a Tridentate Bis(imino)pyridinyliron/Aluminic Derivative Catalytic System for Ethylene Polymerization," Macromol. Rapid Commun. 26 (2005) 1619-1625.

Braunecker, W. A. et al., "Erratum to: 'Controlled/living radical polymerization: features, developments and perspectives' [Prog. Polym. Sci. 32 (2007) 93-146", Progress in Polymer Science 33 (2008) 165.

Burke, Sandra E. et al. "Zotarolimus (ABT-578) Eluting Stents" Advanced Drug Delivery Reviews 58 (2006) 437-446.

Chari, Ravi V. J. "Targeted Cancer Therapy : Conferring Specificity to Cytotoxic Drugs" Acc. Chem. Res. 41:1 (2008) 98-107.

Chong, Y. K et al. "Thiocarbonylthio End Group Removal from RAFT-Synthesized Polymers by Radical-Induced Reduction," Macromolecules 40:13 (May 22, 2007) 4446-4455.

Connal, Luke A. et al. "Synthesis of Dendron Functionalized Core Cross-Linked Star Polymers," Macromolecules 40 (2007) 7855-7863.

Daugherty, Ann L. et al. "Formulation and Delivery Issues for Monoclonal Antibody Therapeutics" Adv. Drug Deliv Rev. 58 (2006) 686-706.

Du, Jianzhong et al. "PCL Star Polymer, PCL-PS. Heteroarm Star Polymer by ATRP, and Core-Carboxylated PS Star Polymer Thereof," Macromolecules 37 (2004) 3588-3594.

Du, Jianzhong et al. "Preparation of Poly(ethylene oxide) Star Polymers and Poly(ethylene oxide)-Polystyrene Heteroarm Star Polymers by Atom Transfer Radical Polymerization," J. Polm. Sci. Part A: Polym. Chem. 42 (2004) 2263-2271.

Ferrari, Mauro, "Cancer Nanotechnology : Opportunities and Challenges" Nature Reviews Cancer 5 (2005) 161-171.

Froidevaux, Sylvie et al. "A Gallium-Labeled DOTA-α-Melanocyte-Stimulating Hormone Analog for PET Imaging of Melanoma Metastases" J Nucl Med. 45:1 (2004) 116-123.

Fukukawa, Ken-ichi et al. "Synthesis and Characterization of Core-Shell Star Copolymers for in Vivo PET Imaging Applications," Biomacromolecules 9 (2008) 1329-1339.

Furukawa, Taiichi et al. "Synthesis and Characterization of Poly(ethylene oxide) Star Polymers Possessing a Tertiary Amino Group at Each Arm End by Organized Polymerization Using Macromonomers," Journal of Colloid and Interface Science 253 (2002) 465-469.

(56) References Cited

OTHER PUBLICATIONS

Furukawa, Taiichi et al. "Synthesis and Viscoelastic Behavior of Multiarm Star Polyelectrolytes," Macromolecules 38 (2005) 2911-2917.
Gao, Haifeng et al. "Arm-First Method as a Simple and General Method for Synthesis of Miktoarm Star Copolymers," J. Am. Chem. Soc. 129:38 (2007) 11828-11834.
Gao, Haifeng et al. "Characterization of Linear and 3-Arm Star Block Copolymers by Liquid Chromatography at Critical Conditions," Macromol. Chem. Phys. 207 (2006) 1709-1717.
Gao, Haifeng et al. "Low Polydispersity Star Polymers via Cross-Linking Macromonomers by ATRP," J. Am. Chem. Soc. 128 (2006) 15111-15113.
Gao, Haifeng et al. "Low-Polydispersity Star Polymers with Core Functionality by Cross-Linking Macromonomers Using Functional ATRP Initiators," Macromolecules 40 (2007) 399-401.
Gao, Haifeng et al. "Modular Approaches to Star and Miktoarm Star Polymers by ATRP of Cross-Linkers," Macromol. Symp. 291-292 (2010) 12-16.
Gao, Haifeng et al. "Structural Control in ATRP Synthesis of Star Polymers Using the Arm-First Method," Macromolecules 39:9 (2006) 3154-3160.
Gao, Haifeng et al. "Synthesis of Degradable Miktoarm Star Copolymers via Atom Transfer Radical Polymerization," Macromolecules 38:14 (2005) 5995-6004.
Gao, Haifeng et al. "Synthesis of Functional Polymers with Controlled Architecture by CRP of Monomers in the Presence of Cross-Linkers: From Stars to Gels," Progress in Polymer Science 34:4 (2009) 317-350.
Gao, Haifeng et al. "Synthesis of Low-Polydispersity Miktoarm Star Copolymers Via a Simple 'Arm-First' Method: Macromonomers as Arm Precursors," Macromolecules 41:12 (2008) 4250-4257.
Goh, Tor Kit et al. "Highly Efficient Synthesis of Low Polydispersity Corss Cross-Linked Star Polymers by Ru-Catalyzed Living Radical Polymerization," Macromol. Rapid Commun. 32 (2011) 456-461.
Gromada et al. "Simultaneous Reverse and Normal Initiation in Atom Transfer Radical Polymerization", Macromolecules 34 (2001) 7664-7671.
Hadjichristidis, Nikos "Synthesis of Miktoarm Star (μ-Star) Polymers," J. Polym. Sci, Part A: Polym. Chem. 37 (1999) 857-871.
Hadjichristidis, Nikos et al. "Macromolecular Architectures by Living and Controlled/Living Polymerizations," Prog. Polym. Sci. 31 (2006) 1068-1132.
Hamann, Philip R. et al. "A Calicheamicin Conjugate with a Fully Humanized Anti-MUC1 Antibody Shows Potent Antitumor Effects in Breast and Ovarian Tumor Xenografts" Bioconjugate Chem. 16 (2005) 354-360.
Held, Daniela et al. "Synthesis and Solution Properties of Star-Shaped Poly(tert-butyl acrylate)," Macromol. Symp. 157 (2000) 225-237.
Hietala, Sami et al. "Rheological Properties of Associative Star Polymers in Aqueous Solutions: Effect of Hydrophone Length and Polymer Topology," Macromolecules 42 (2009) 1726-1732.
Hietala, Sami et al. "Synthesis and Rheological Properties of an Associative Star Polymer in Aqueous Solutions," Polymer 48 (2007) 4087-4096.
Huang, Jinyu et al. "Synthesis and Characterization of Copolymers of 5,6-benzo-2-methylene-1,3-dioxepane and n-butyl acrylate" Polymer 46 (2005) 11698-11706.
Iatridi, Zacharoula et al. "Phase Behavior and Self-Assembly of PSn(P2VP-b-PAA)n Multiarmed Multisegmented Star Terpolymers with Ampholytic Arms," Polym. Chem. (2011) DOI:10.1039/c1py00090 —8 pages.
Ishizu, Koji et al. "Synthesis of Amphiphilic Star Block Copolymers Via Diethyldithiocarbamate-Mediated Living Radical Polymerization," J. Polm. Sci. Part A: Polym. Chem. 44 (2006) 3321-3327.
Ishizu, Koji et al. "Synthesis of Star Polymers by Organized Polymerization of Macromonomers," Polymer 36:21 (1995) 4155-4157.

Jankova, K. et al. "Novel Fluorinated Block Copolymer Architectures Fuelled by Atom Transfer Radical Polymerization," Journal of Fluorine Chemistry 126:2 (Dec. 10, 2004) 241-250.
Jones, M.C. et al. "Self-Assembled Nanocages for Hydrophilic Guest Molecules," J. Am. Chem. Soc. 128:45 (Oct. 21, 2006) 14599-14605.
Kafouris, Demetris et al. "Synthesis and Characterization of Star Polymers and Cross-Linked Star Polymer Model Networks with Cores Based on an Asymmetric, Hydrolyzable Dimethacrylate Cross-Linker," Chem. Mater. 18 (2006) 85-93.
Kawakami, Kyoko, et al., "Salt Tolerance of an Aqueous Solution of a Novel Amphiphilic Polysaccharide Derivative," Langmuir, 22 (2006) 3337-3343.
Kelly, Marcus P. et al. "Tumor Targeting by a Multivalent Single-Chain Fv (scFv) Anti-Lewis Y Antibody Construct" Cancer Biother. Radiopharm. 23:4 (2008) 411-424.
Koda, Yuta et al. "Fluorinated Microgel-Core Star Polymers as Fluorous Compartments for Molecular Recognition," Macromolecules 44 (2011) 4574-4578.
Kowalczuk-Bleja, A. et al. "Core-Shell Polyacrylate and Polystyrene-Block-Polyacrylate Stars," Polymer 46:19 (2005) 8555-8564.
Kreutzer, Georg et al. "Water-Soluble, Unimolecular Containers Based on Amphiphilic Multiarm Star Block Copolymers," Macromolecules 39 (2006) 4507-4516.
Lee, Cameron C. et al. "A Single Dose of Doxorubicin-Functionalized Bow-Tie Dendrimer Cures Mice Bearing C-26 Colon Carcinomas" PNAS 103 :45 (2006) 16649-16654.
Lee, Cameron C. et al. "Designing Dendrimers for Biological Applications" Nature Biotech. 23 :12 (2005) 1517-1526.
Lee, Hyung-Jae et al. "Controlled Anionic Synthesis of Star-Shaped Polystyrene by the Incremental Additional of Divinylbenzene," J. Palm. Sci. Part A: Polym. Chem. 43 (2005) 870-878.
Li, Wenwen et al. "Uniform PEO Star Polymers Synthesized in Water via Free Radical Polymerization or Atom Transfer Radical Polymerization," Macromol. Rapid Commun. 31 (2010) 74-81.
Liu, Jun et al. "Reversible Self-Association Increases the Viscosity of a Concentrated Monoclonal Antibody in Aqueous Solution" J Pharm Sci. 94:9 (2005) 1928-1940.
Liu, Pingwei et al. "'Arm-First' Synthesis of Core-Cross-Linked Multiarm Star Polyethylenes by Coupling Palladium-Catalyzed Ethylene 'Living' Polymerization with Atom-Transfer Radical Polymerization," Macromolecules 44 (2011) A-O.
Matyjaszewski, K. et al. "Diminishing Catalyst Concentration in Atom Transfer Radical Polymerization with Reducing Agents" Proc. Nat. Acad. Sci., 103:42 (2006) 15309-15314.
Matyjaszewski, Krzysztof "The Synthesis of Functional Star Copolymers as an Illustration of the Importance of Controlling Polymer Structures in the Design of New Materials," Polym. Int. 52 (2003) 1559-1565.
Matyjaszewski, Krzysztof et al. "Atom transfer Radical Polymerization of Styrene Catalyzed by Copper Carboxylate Complexes", Macromol. Chem. Phys., 199 (1998), pp. 2289-2292.
Matyjaszewski, Krzysztof et al. "Atom Transfer Radical Polymerization" Chem. Rev. 101:9 (2001) 2921-2990.
Matyjaszewski, Krzysztof et al. "Synthesis of Well-Defined Azido and Amino End-Functionalized Polystyrene by Atom Transfer Radical Polymerization" Macromol. Rapid Commun. 18 (1997) 1057-1066.
McCarthy, Patrick et al. "Grafting Chromatographic Stationary Phase Substrates by Atom Transfer Radical Polymerization" Controlled/Living Radical Polymerization, Chapter 18, ACS Symposium Series 944 (2006) 252-268.
McCormick, Charles L. et al. "Synthetic Routes to Stimuli-Responsive Micelles, Vesicles, and Surfaces via Controlled/Living Radical Polymerization" Polymer Reviews 46 (2006) 421-443.
Moad, Graeme et al. "Radical Addition-Fragmentation Chemistry in Polymer Synthesis" Polymer 49 (2008) 1079-1131.
Moad, Graeme et al. "Synthesis of Novel Architectures by Radical Polymerization with Reversible Addition Fragmentation Chain Transfer (RAFT Polymerization)," Macromol. Symp. 192 (2003) 1-12.
Narumi, Atsushi et al. "Glycoconjugated Polymer. 3. Synthesis and Amphiphilic Property of Core-Glycoconjugated Star-Shaped Polystyrene," Macromolecules 35 (2002) 699-705.

(56) References Cited

OTHER PUBLICATIONS

Narumi, Atsushi et al. "Star-Shaped Polystyrenes with Glycoconjugated Periphery and Interior: Synthesis and Entrapment of Hydrophilic Molecule," J. Palm. Sci. Part A: Polym. Chem. 43 (2005) 4373-4381.
Oh, Jung K. et al. "Inverse Miniemulsion ATRP: A New Method for Synthesis and Functionalization of Well-Defined Water-Soluble/ Cross-Linked Polymeric Particles" J. Am. Chem. Soc. 128 (2006) 5578-5584.
Pan, Dipanjan et al "Shell Cross-Linked Nanoparticles Designed to Target Angiogenic Blood Vessels via $\alpha v\beta 3$ Receptor-Ligand Interactions" Macromolecules 37:19 (2004) 7109-7115.
Pang, Xinchang et al. "Novel Amphiphilic Multi-Arm, Star-Like Block Copolymers as Unimolecular Micelles," Macromolecules 44 (2011) 3746-3752.
Pasquale, Anthony J. et al. "Synthesis of Star-Shaped Polystyrenes via Nitroxide-Mediated Stable Free-Radical Polymerization," J. Polm. Sci. Part A: Polym. Chem. 39 (2001) 216-223.
Plitcha, et al., "ICAR ATRP of Styrene and Methyl Methacrylate with Ru(Cp*)Ci(PPh3)3," Macromolecules, 42 (2009), 2330-2332.
Polakis, Paul "Arming Antibodies for Cancer Therapy" Current Opinion in Pharmacology 5 (2005) 382-387.
Rosenberg, Amy S. "Effects of Protein Aggregates: An Immunologic Perspective" AAPS J. 8:3 (2006) E501-E507.
Rosi, Nathaniel L. et al. "Nanostructures in Biodiagnostics" Chem Rev. 105 (2005) 1547-1562.
Sciannamea, Valerie et al. "In-Situ Nitroxide-Mediated Radical Polymerization (NMP) Processes: Their Understanding and Optimization" Chem. Rev. 108:3 (2008) 1104-1126.
Shaver et al. "Organometallic Intermediates in the Controlled Radical Polymerization of Styrene by a-Diimine Iron Catalysts"; Organometallics, 26 (2007) 4725-4730.
Shire, Steven J. et al. "Challenges in the Development of High Protein Concentration Formulations" J. Pharm. Sci. 93:6 (2005) 1390-1402.
Spiniello, Marisa et al. "Synthesis and Characterization of Fluorescently Labeled Core Cross-Linked Star Polymers," J. Polm. Sci. Part A: Polym. Chem. 46 (2008) 2422-2432.
Taton, Daniel et al. "Controlled Polymerizations as Tools for the Design of Star-Like and Dendrimer-Like Polymers," Polym. Int. 55 (2006) 1138-1145.
Terashima, Takaya et al. "In Situ and Time-Resolved Small-Angle Neutron Scattering Observation of Star Polymer Formation via Arm-Linking Reaction in Ruthenium-Catalyzed Living Radical Polymerization," Macromolecules 43 (2010) 8218-8232.
Terashima, Takaya et al. "Polymer Catalysts from Polymerization Catalysts: Direct Encapsulation of Metal Catalyst into Star Polymer Core During Metal-Catalyzed Living Radical Polymerization," J. Am. Chem. Soc. 125 (2003) 5288-5289.
Themistou, Efrosyni et al. "Synthesis and Characterization of Polymer Networks and Star Polymers Containing a Novel, Hydrolyzable Acetal-Based Dimethacrylate Cross-Linker," Macromolecules 39 (2006) 73-80.
Themistou, Efrosyni et al. "Synthesis and Characterization of Star Polymers and Cross-Linked Star Polymer Model Networks Containing a Novel, Silicon-Based, Hydrolyzable Cross-Linker," Macromolecules 37 (2004) 6734-6743.
Tsarevsky, Nicolay V. et al. "Controlled Synthesis of Polymers with Ionic or Ionizable Groups Using Atom Transfer Radical Polymerization" Polyelectrolytes and Polyzwitterions, Chapter 5, ACS Symposium Series 937 (2006) 79-94.
Tsarevsky, Nicolay V. et al. "Deactivation Efficiency and Degree of Control Over Polymerization in ATRP in Protic Solvents " Macromolecules 37 (2004) 9768-9778.
Tsarevsky, Nicolay V. et al. "Graft Copolymers by a Combination of ATRP and Two Different Consecutive Click Reactions" Macromolecules 40:13 (2007) 4439-4445.
Tsarevsky, Nicolay V. et al. "Reversible Redox Cleavage/Coupling of Polystyrene with Disulfide or Thiol Groups Prepared by Atom Transfer Radical Polymerization" Macromolecules 35 (2002) 9009-9014.
Tsoukatos, Thodoris et al. "Star-Branched Polystyrenes by Nitroxide Living Free-Radical Polymerization," J. Palm. Sci. Part A: Polym. Chem. 39 (2001) 320-325.
Van Camp, Wim et al. "Effect of Crosslinker Multiplicity on the Gel Point in ATRP," J. Polym. Sci., Part A: Polymer Chemistry 48 (2010) 2016-2023.
Voulgaris et al., "Aggregation Behavior of Polystyrene/Poly(acrylic acid) Heteroarm Star Copolymers in 1,4-Dioxane and Aqueous Media," Macromol. Chem. Phys., 202 (2001) 3284-3292.
Wang, Fei et al. "Synthesis and Evaluation of a Star Amphiphilic Block Copolymer from Poly($\epsilon$-caprolactone) and Poly(ethylene glycol) as a Potential Drug Delivery Carrier," Bioconjugate Chem. 16 (2005) 397-405.
Wang, Jin-Shan et al. "Controlled/'Living' Radical Polymerization. Atom Transfer Radical Polymerization in the Presence of Transition-Metal Complexes" J. Am. Chem. Soc. 117 (1995) 5614-5615.
Wiltshire, James T. et al. "Selectively Degradable Core Cross-Linked Star Polymers," Macromolecules 39 (2006) 9018-9027.
Xia, Jianhui et al. "Synthesis of Star-Shaped Polystyrene by Atom Transfer Radical Polymerization Using an 'Arm First' Approach," Macromolecules 32 (1999) 4482-4484.
Yoo, Mikyong et al. "Photophysical Characterization of Conformational Rearrangements for Amphiphilic 6-Arm Star Block Copolymers in Selective Solvent Mixtures," Macromolecules 36:1 (2003) 268-271.
York, Adam W. et al. "Advances in the Synthesis of Amphiphilic Block Copolymers via RAFT Polymerization: Stimuli-Responsive Drug and Gene Delivery" Advanced Drug Delivery Reviews 60 (2008) 1018-1036.
Zhang et al. "Effect of Cu(II) on the Kinetics of the Homogeneous Atom Transfer Radical Polymerization of Methyl Methacrylate," Macromolecules, 34 (2001) 6169-6173.
Zhang, Xuan et al. "End-Functional Poly(tert-butyl acrylate) Star Polymers by Controlled Radical Polymerization," Macromolecules 33 (2000) 2340-2345.
Zheng, Genhua et al. "Preparation of Star Polymers Based on Polystyrene or Poly(styrene-b-N-isopropyl acrylamide) and Divinylbenzene Via Reversible Addition-Fragmentation Chain Transfer Polymerization," Polymer 46 (2005) 2802-2810.
Zheng, Yu et al. "Biodegradable Core—Shell Materials via RAFT and ROP: Characterization and Comparison of Hyperbranched and Microgel Particles," Macromolecules 44 (2011) 1347-1354.
Extended European Search Report dated Sep. 14, 2016, for European Patent Application No. 2890760.

\* cited by examiner

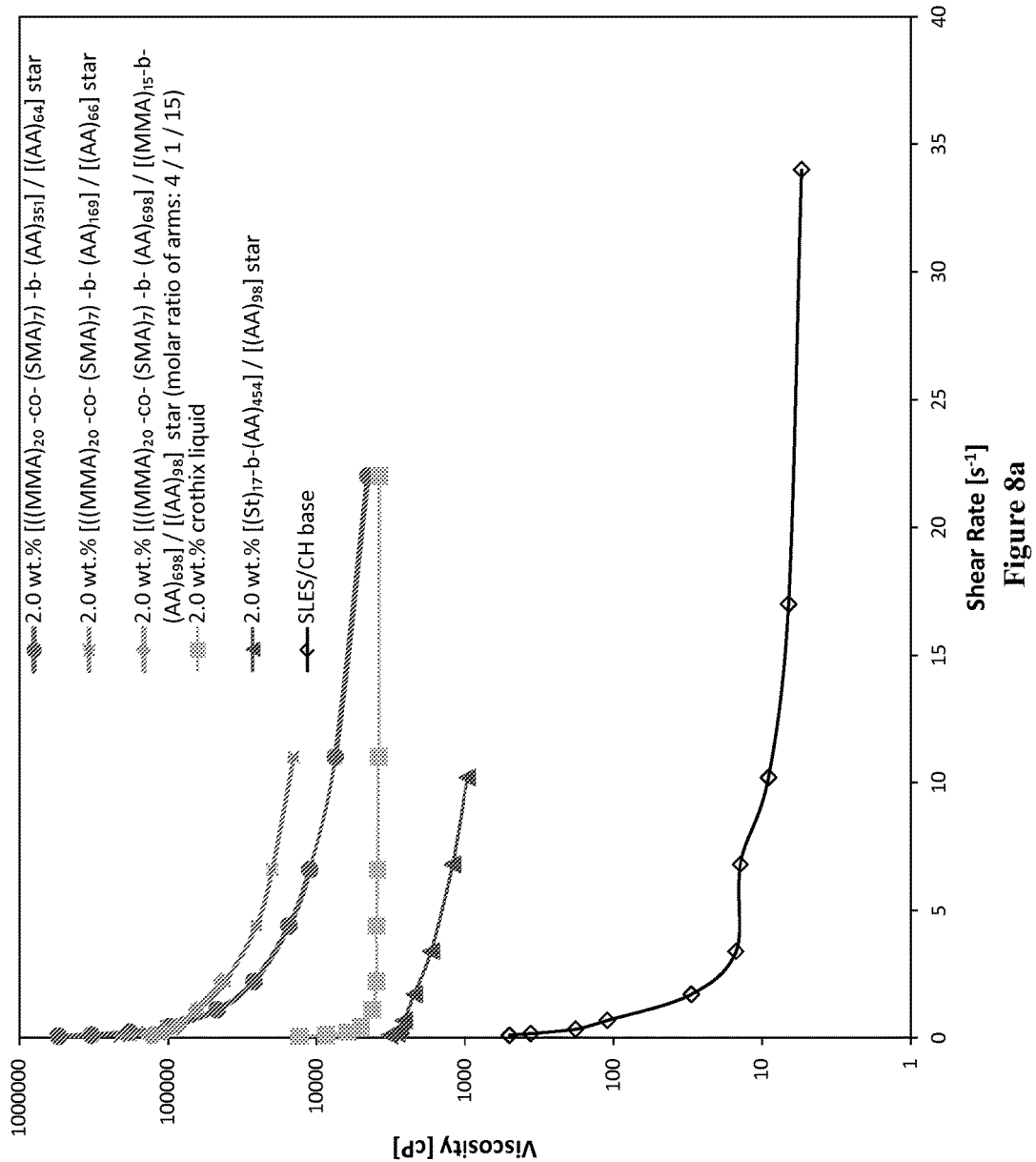

SURFACTANT-COMPATIBLE STAR MACROMOLECULES

CROSS-REFERENCE TO RELATED APPLICATIONS

This application is the National Phase of International Application No. PCT/US2015/039066, filed Jul. 2, 2015, which further claims the benefit of priority from U.S. Provisional Application No. 62/020,736, filed Jul. 3, 2014. The foregoing related applications, in their entirety, are incorporated herein by reference.

This application is further related to U.S. patent application Ser. No. 12/926,143, filed on Oct. 27, 2010, which is now U.S. Pat. No. 8,173,750, which is a continuation-in-part of U.S. patent application Ser. No. 12/799,411, filed on Apr. 23, 2010, which claims priority to U.S. Application No. 61/214,397, filed on Apr. 23, 2009, each of these applications are incorporated herein by reference in their entirety. This application is further related to U.S. patent application Ser. No. 12/926,780, filed on Dec. 8, 2010, which is a continuation-in-part of U.S. patent application Ser. No. 12/653,937, filed on Dec. 18, 2009, which claims priority to U.S. Application No. 61/203,387, filed on Dec. 22, 2008, each of these applications are incorporated herein by reference in their entirety. This application is further related to U.S. Application No. 61/695,103, filed on Aug. 30, 2012, which is incorporated herein by reference in its entirety.

FIELD OF THE INVENTION

The present invention relates to preparation of surfactant-system thickening star macromolecules, and methods of using the same as agents providing surfactant compatibility and temperature stability as surfactant-system thickening agents, or as rheology modifiers.

SUMMARY OF THE INVENTION

An aspect of the invention provides a surfactant-system thickening macromolecule that is suitable for increasing the viscosity of a surfactant-containing system, wherein the surfactant-system thickening macromolecule comprises:
a) a core;
b) at least one first polymeric arm, comprising a hydrophilic polymeric segment covalently attached to the core; and
c) at least one second polymeric arm, comprising:
  i) a hydrophilic polymeric segment covalently attached to the core; and
  ii) a further segment covalently attached to the hydrophilic polymeric segment, wherein the further segment is comprised of at least one monomeric residue of a polymerized surfactant-system thickening monomer comprising a $C_6$ or greater alkyl acrylate; $C_6$ or greater alkenyl acrylate; $C_6$ or greater alkyl alkyl acrylate; $C_6$ or greater alkenyl alkyl acrylate; $C_6$ or greater alkyl acrylamide; $C_6$ or greater alkenyl acrylamide; $C_6$ or greater alkyl alkyl acrylamide; $C_6$ or greater alkenyl alkyl acrylamide; $C_2$ or greater alkyl vinyl ether; $C_2$ or greater alkenyl vinyl ether; $C_1$ or greater alkyl allyl ether; or $C_1$ or greater alkenyl allyl ether.

In another aspect of the invention, the surfactant-system thickening macromolecule may be represented by Formula A:

$$[(P1)_{q1}]_r\text{-Core-}[(P3)_{q3}\text{-}(P2)_{q2}]_s \quad \text{Formula A}$$

wherein:
Core represents a crosslinked polymeric segment;
P1 independently represents a polymeric segment of a first polymeric arm comprised of monomeric residues of polymerized hydrophilic monomers;
P2 independently represents a further segment of a second polymeric arm comprised of at least one monomeric residue of a polymerized surfactant-system thickening monomer;
P3 independently represents a polymeric segment of the second polymeric arm comprised of monomeric residues of polymerized hydrophilic monomers;
q1 independently represents the number of monomeric residues in P1;
q2 independently represents the number of monomeric residues in P2;
q3 independently represents the number of monomeric residues in P3;
r independently represents the number of the first polymeric arms covalently attached to the Core; and
s independently represents the number of the second polymeric arms covalently attached to the Core.

In another aspect of the invention, the surfactant-system thickening macromolecule may be represented by Formula B:

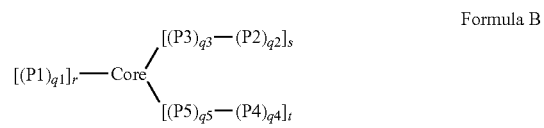

wherein:
Core represents a crosslinked polymeric segment;
P1 independently represents a polymeric segment of a first polymeric arm comprised of monomeric residues of polymerized hydrophilic monomers;
P2 independently represents a further segment of a second polymeric arm comprised of at least one monomeric residue of a polymerized surfactant-system thickening monomer;
P3 independently represents a polymeric segment of the second polymeric arm comprised of monomeric residues of polymerized hydrophilic monomers;
P4 independently represents a polymeric segment of a third polymeric arm comprised of monomeric residues of polymerized hydrophobic monomers;
P5 independently represents a polymeric segment of the third polymeric arm comprised of monomeric residues of polymerized hydrophilic monomers;
q1 independently represents the number of monomeric residues in P1;
q2 independently represents the number of monomeric residues in P2;
q3 independently represents the number of monomeric residues in P3;
q4 independently represents the number of monomeric residues in P4;
q5 independently represents the number of monomeric residues in P5;
r independently represents the number of the first polymeric arms covalently attached to the Core;
s independently represents the number of the second polymeric arms covalently attached to the Core; and t independently represents the number of the third polymeric arms covalently attached to the Core.

In another aspect of the invention, a surfactant-modified star macromolecule is provided that may comprise:
i) a core;
ii) at least one first polymeric arm, comprising a hydrophilic polymeric segment covalently attached to the core; and
iii) at least one second polymeric arm, comprising:
a) a hydrophilic polymeric segment covalently attached to the core; and
b) a further segment comprising at least one pendant moiety represented by $[L^1-G^1-L^2-G^2]$;

wherein:
$G^1$ independently represents a residue of a hydrophilic moiety of the surfactant;
$G^2$ independently represents a residue of a hydrophobic moiety of the surfactant;
$L^1$ independently represents a linking group or a covalent bond, attaching $G^1$ to the further segment; and
$L^2$ independently represents a linking group or a covalent bond, linking $G^1$ and $G^2$.

In another aspect of the invention, a method of increasing the viscosity of a surfactant-containing aqueous system may comprise introducing a surfactant-system thickening macromolecule into the surfactant-containing aqueous system, wherein the surfactant-system thickening macromolecule may be represented by Formula C:

$$[(P1)_{q1}]_r\text{-Core-}[(P3)_{q3}\text{-}(P2)_{q2}]_s \qquad \text{Formula C}$$

wherein:
Core represents a crosslinked polymeric segment;
P1 independently represents a polymeric segment of the at least one first polymeric arm comprised of monomeric residues of polymerized hydrophilic monomers;
P2 independently represents a further segment of the at least one second polymeric arm comprised of:
1) a polymerized backbone comprising at least one pendant micelle-philic moiety, or
2) at least one monomeric residue of a polymerized micelle-philic monomer;
P3 independently represents a polymeric segment of the at least one second polymeric arm comprised of monomeric residues of polymerized hydrophilic monomers;
q1 independently represents the number of monomeric residues in P1;
q2 independently represents the number of monomeric residues in P2;
q3 independently represents the number of monomeric residues in P3;
r independently represents the number of the at least one first polymeric arms covalently attached to the Core; and
s independently represents the number of the at least one second polymeric arms covalently attached to the Core.

In another aspect of the invention, a method of increasing the viscosity of a surfactant-containing aqueous system may comprise introducing a surfactant-system thickening macromolecule into the surfactant-containing aqueous system, wherein the surfactant-system thickening macromolecule may be represented by Formula D:

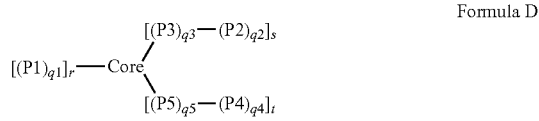

Formula D wherein:
Core represents a crosslinked polymeric segment;
P1 independently represents a polymeric segment of the at least one first polymeric arm comprised of monomeric residues of polymerized hydrophilic monomers;
P2 independently represents a further segment of the at least one second polymeric arm comprised of:
1) a polymerized backbone comprising at least one pendant micelle-philic moiety, or
2) at least one monomeric residue of a polymerized micelle-philic monomer;
P3 independently represents a polymeric segment of the at least one second polymeric arm comprised of monomeric residues of polymerized hydrophilic monomers;
P4 independently represents a polymeric segment of the at least one third polymeric arm comprised of monomeric residues of polymerized hydrophobic monomers;
P5 independently represents a polymeric segment of the at least one third polymeric arm comprised of monomeric residues of polymerized hydrophilic monomers;
q1 independently represents the number of monomeric residues in P1;
q2 independently represents the number of monomeric residues in P2;
q3 independently represents the number of monomeric residues in P3;
q4 independently represents the number of monomeric residues in P4;
q5 independently represents the number of monomeric residues in P5;
r independently represents the number of the at least one first polymeric arms covalently attached to the Core;
s independently represents the number of the at least one second polymeric arms covalently attached to the Core; and
t independently represents the number of the at least one third polymeric arms covalently attached to the Core.

In another aspect of the invention, a method of increasing the viscosity of a surfactant-containing aqueous system may comprise introducing a surfactant-system thickening macromolecule into the surfactant-containing aqueous system, wherein the surfactant-system thickening macromolecule may comprise:
a) a core;
b) at least one first polymeric arm, comprising a hydrophilic polymeric segment covalently attached to the core; and
c) at least one second polymeric arm, comprising:
i) a hydrophilic polymeric segment covalently attached to the core; and
ii) a further segment covalently attached to the hydrophilic polymeric segment, wherein the further segment is comprised of at least one monomeric residue of a polymerized surfactant-system thickening monomer comprising a $C_6$ or greater alkyl acrylate; $C_6$ or greater alkenyl acrylate; $C_6$ or greater alkyl alkyl acrylate; $C_6$ or greater alkenyl alkyl acrylate; $C_6$ or greater alkyl acrylamide; $C_6$ or greater alkenyl acrylamide; $C_6$ or greater alkyl alkyl acrylamide; $C_6$ or greater alkenyl alkyl acrylamide; $C_2$ or greater alkyl vinyl ether; $C_2$ or greater alkenyl vinyl ether; $C_1$ or greater alkyl allyl ether; or $C_1$ or greater alkenyl allyl ether.

In another aspect of the invention, a method of increasing the viscosity of a surfactant-containing aqueous system may comprise introducing a surfactant-modified star macromolecule into the surfactant-containing aqueous system, wherein the surfactant-modified star macromolecule may comprise:
  i) a core;
  ii) at least one first polymeric arm, comprising a hydrophilic polymeric segment covalently attached to the core; and
  iii) at least one second polymeric arm, comprising:
    a) a hydrophilic polymeric segment covalently attached to the core; and
    b) a further segment comprising at least one pendant moiety represented by $[L^1\text{-}G^1\text{-}L^2\text{-}G^2]$;
wherein:
  $G^1$ independently represents a residue of a hydrophilic moiety of the surfactant;
  $G^2$ independently represents a residue of a hydrophobic moiety of the surfactant;
  $L^1$ independently represents a linking group or a covalent bond, attaching $G^1$ to the further segment; and
  $L^2$ independently represents a linking group or a covalent bond, linking $G^1$ and $G^2$.

In another aspect the invention, a polymer composition comprising star macromolecules is provided, each star macromolecule having a core and five or more arms, wherein the number of arms within a star macromolecule varies across the composition of star molecules; and the arms on a star are covalently attached to the core of the star; each arm comprises one or more (co)polymer segments; and at least one arm and/or at least one segment exhibits a different solubility from at least one other arm or one other segment, respectively, in a reference liquid of interest.

In another aspect of the invention, the star macromolecule may be suitable for providing surfactant compatibility, surfactant-system thickening, an increase in viscosity of a surfactant-containing system, such as an increase in viscosity of a surfactant-containing aqueous system, use as thickening agents, use as rheology modifiers, use in hydraulic fracturing fluids, use in oil and gas applications, use in mining applications, use in cosmetic and personal care applications, use in home care applications, use in paint and printing, use in adhesive applications, use in electronic applications, use in medical and pharmaceutical applications, use in paper applications, or use in agricultural applications.

In another aspect of the invention, the star macromolecule may provide, or may be used to provide, a certain level of control over viscosity, an increase in viscosity of a system, and consistency factors in many aqueous and oil based systems, including, for example, hydraulic fracturing fluid additives, gelling agents, gels, proppant stabilizers, breakers, friction reducers, and thickening agents.

In another aspect of the invention, the star macromolecule, including those formed by a one-pot process, ATRP, CRP, and/or combinations of one or more of these processes, may be an emulsifier, may form a gel, may form an emulsifier-free emulsion, may be an emulsion and/or thickening agent.

In another aspect of the invention, the star macromolecules may be suitable in oil and gas applications, including but not limited to, as rheology modifiers for fracturing fluids/drilling well fluids, gelling agents, gels, dispersants, proppant stabilizers and carriers, breakers, friction reducers, lubricants, scale-buildup inhibitors, heat transfer fluids, thickening agents, additives to improve oil extraction from oil sands, emulsion breakers for oil-sand-water emulsions, additives to improve dewatering of oil sands, gasoline additives, gasoline stabilizers, coiled tubing clean out fluids, drilling fluids, completion fluids, stimulation fluids, production fluids, hydraulic fracturing fluids, injection fluids, flooding fluids, flow assurance fluids, hydrate inhibitors, asphaltene inhibitors, asphaltenes inhibitors, scale inhibitors, paraffin inhibitors, friction reducers, corrosion inhibitors, $H_2S$ scavengers, de-emulsifiers, foam controlling agents, de-foaming agents, lubricants, scale removers, asphaltene removers, drag reducers, pour point depressants, cold flow improvers, traceable chemicals, foaming agents, viscoelasctic surfactants, and/or viscoelastic surfactant fluid additives.

In another aspect of the invention, the star macromolecules may be suitable in mining applications, including but not limited to, concentration of grinding circuit; leach; concentrate tailings; Counter Current Decantation (CCD); paste backfill; clarification; dust suppressants; flocculating agents; carbon powder recycling; coal, diamond, gold and precious metal extraction and processing; lubricants and drag reduction agents for pipeline slurry transport; flocculants; scale inhibitors; frothers; defoamers; dewatering agents; crystal growth modifiers; filtration aids; dust control agent; dispersant; depressant; thickener; clarifier; solvent extraction reagent; antiscalant aid; and/or smoothing aid.

In another aspect of the invention, the star macromolecules may be suitable in cosmetic and personal care applications, including but not limited to, cosmetic creams, lotions, gels, sprayable lotion, sprayable cream, sprayable gel, hair styling agents, hair styling sprays and mousses, mouse, hair conditioners, shampoos, bath and shower preparations, shower gel, hair gel, hair care product, ointments, deodorants and antiperspirants, anti-persperant ingredient, deodorant ingredient, mascara, blush, lip stick, eye liner, perfumes, powders, serums, skin sensoric, skin cleansers, skin conditioners, emollient, skin emollients, skin moisturizers, moisturizer, skin wipes, sensory modifier, skin care product, make-up remover, eye cream, leave-on product, wash off product, products for care of the teeth and the mouth, whitening products, mouthwash, products for external intimate hygiene, sunscreens, products for tanning without sun, shaving preparations, shaving cream, depilatories, products removing make-up, products for external intimate hygiene, spermicides, condom lubricant, personal hygiene lubricant, solids, fabric softeners, cleansing product, cleansing spray, emulsifier, wetting agent, foamer, soap, soaps, liquid soap, hand sanitizer, hand gel, conditioner, humectant, foam stabilizer, softener, clarifier, film former, delivery system, oil deliver system, active deliver system, rheology modifier, thickening agent, viscosifier, and lubricant.

In another aspect of the invention, the star macromolecules may be suitable in home care applications, including but not limited to, cleaners for windows and glass, and other household surfaces; cleaners for toilet areas; hard surface cleaners; household cleaners; industrial cleaners; window cleaners; floor cleaners; shower cleaners; drain cleaners; oven cleaners; tub, tile and sink cleaners; bleach; bleach containing cleaners; degreasers; enzyme production; liquid and gelled soaps; polishes and waxes; car wax; floor wax; polishes; polish; detergents; liquid and powdered detergents, including detergents for laundry and in dish washing; laundry detergents; laundry softeners; hard water mineral removers; metal cleaner and polishes; carpet and rug cleaners; dusting products; upholstery cleaners; and floor care products.

In another aspect of the invention, the star macromolecules may be suitable in paint and printing applications, including but not limited to, inkjet printer ink and other inks, 3-D printing fluid, 3-D printing ink, pigments, wetting surfactants, binders, flocculants, dispersants, leveling compounds, antifoam, aerators, surface tension modifiers, film formers, plasticizers, pore formers, water repellents, corrosion inhibitors, bittering agents to deter rodents.

In another aspect of the invention, the star macromolecules may be suitable in adhesive applications, including but not limited to, associative complexes, billboard adhesives, carpet backsizing compounds, hot melt adhesives, labeling adhesives, latex adhesives, leather processing adhesives, plywood laminating adhesives, paper adhesives, 3-D printing adhesive, 3-D printing binder, wallpaper pastes, wood glue.

In another aspect of the invention, the star macromolecules may be suitable in electronic applications, including but not limited to, antistatic film and packaging, conductive inks, rheology control agents used for copper foil production, multilayer ceramic chip capacitors, photoresists, plasma display screens, lubricants for wire, cable, and optical fibers, gel lacquers for coil coating.

In another aspect of the invention, the star macromolecules may be suitable in medical and pharmaceutical applications, including but not limited to, but not limited to, medical device lubrication, antibacterial coatings, pharmaceutical excipients such as binders, creams, ointments, liniments, pastes, diluents, fillers, lubricants, glidants, disintegrants, polish agents, suspending agents, dispersing agents, plasticizers.

In another aspect of the invention, the star macromolecules may be suitable in paper applications, including but not limited to, coatings, dispersion for tissue and thin papers, filler retention and drainage enhancement, flocculation and pitch control, grease-proof coatings, adhesives, release coatings, surface sizing, sizes for gloss and ink holdout, tail tie and pickup adhesives for papermaking, deinking of recycled papers in flotation, washing and enzymatic processes.

In another aspect of the invention, the star macromolecules may be suitable in agricultural applications, including but not limited to, animal feed, dispersing agents, drift control, encapsulation, seed coatings, seed tape, spray adherents, water-based sprays and spray emulsions, water-soluble packaging, herbicides, insecticides.

In another aspect of the invention, the star macromolecules may be suitable in other applications including but not limited to, water- and solvent-based coating compositions, water- and solvent-based lubricants, water- and solvent-based viscosity index modifiers, paints, plasticizers, firefighting, anti-fogs agents, antifoaming agents, antifreeze substances, ski and snowboard waxes, laxatives, corrosion inhibitors, detergents, dental impression materials, dental fillers, ceramic and brick forming, prepolymers such as polyols for use in polyesters, polyurethanes, polycarbonates. For rheology modifier applications, characteristics are high gel strength, stability in the presence of salt and increased temperatures, high shear thinning characteristics, forms versatile low viscosity soluble concentrations, and synergistic interactions with added agents to adjust their rheology profile to optimize properties such as sedimentation, flow and leveling, sagging, spattering, etc.

BRIEF DESCRIPTION OF THE FIGURES

The following figures exemplify aspects of the disclosed process but do not limit the scope of the process to the examples discussed.

FIG. 2b. Expansion view of FIG. 2a.

FIG. 3b. Expansion view of FIG. 3a.

FIG. 6b. Expansion view of FIG. 6a.

FIG. 8a. Comparison of viscosity vs. shear rate of aqueous solution of different polymers in hybrid surfactants system (6.4 wt. % of SLES, 2.5 wt. % of CH).

FIG. 8b. Expansion view of FIG. 8a.

FIG. 11b. Expansion view of FIG. 11a.

FIG. 12b. Expansion view of FIG. 12a.

DETAILED DESCRIPTION OF THE INVENTION

Figure 1:
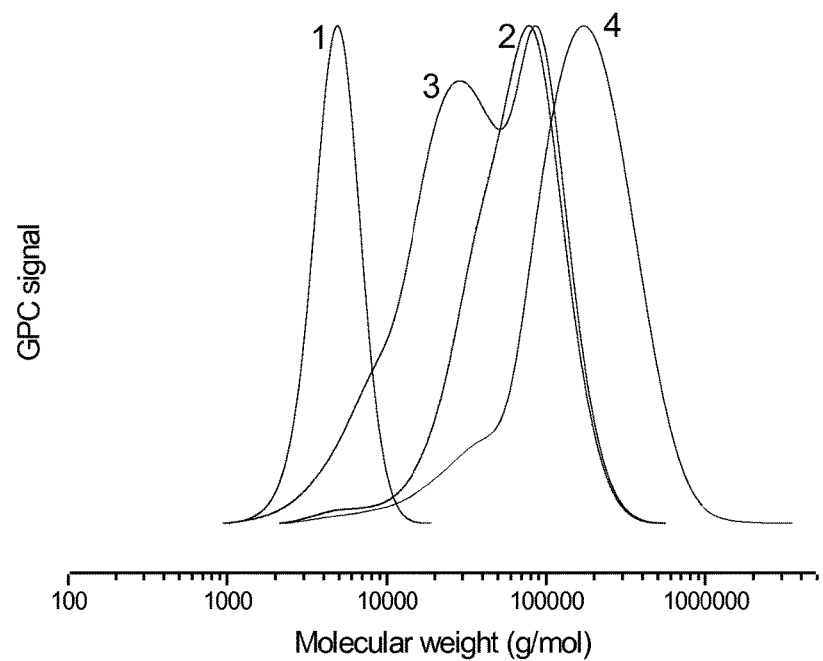
FIG. 1. GPC curves of a macroinitiator, polymeric arms, and star macromolecule from Example 1.

The term "solubility" or "soluble" is understood to mean that when a component is mixed into a solvent and tested, at STP in a 1 cm cuvette, it has a light transmittance value, at a wavelength at or around a UV/Vis minimum wavelength for the mixture, of at least 40%, for example, at least 50%, 70%, 85%, or at least 95%.

The term "clear" as is used to describe a homogenous gel or homogenous solution is understood to mean that when the gel or solution is tested, at STP in a 1 cm cuvette, it has a light transmittance value, at a wavelength at or around a UV/Vis minimum wavelength for the gel or solution, of at least 40%, for example, at least 50%, 70%, 85%, or at least 95%.

The term "water-soluble monomer" is understood to mean a monomer having at least about 10 wt. % solubility in water at STP. For example, a water soluble monomer may have at least 15 wt. %, 20 wt. %, 25 wt. %, or at least 30 wt. % solubility in water at STP.

The term "water-insoluble monomer" is understood to mean a monomer having less water solubility than a water soluble monomer, for example, less that about 5 wt. %, such as less than 1 wt. % or 0.5 wt. % solubility in water at STP.

The term "water-soluble star macromolecule" is understood to mean a star macromolecule that is soluble in water, pH adjusted if necessary to a pH of no greater than 8 with sodium hydroxide, at a concentration of at least 5 g/L, for example, between 8 g/L to 100 g/L, such as, at least 10 g/L, 12 g/L, 15 g/L, or at least 20 g/L. For example, a water-soluble star macromolecule having an aqueous solubility of at least 10 g/L may include the introduction of at least 10 g of the star macromolecule into approximately 1 L of water, neutralizing the mixture, if necessary, by adjusting the pH of the resulting mixture to about pH 8 (e.g., with the addition of base, such as sodium hydroxide), and vigorously stirring at a temperature no greater than 100° C. for no more than about 60 minutes, to achieve dissolution of the star macromolecule, and testing the solubility at STP.

The term "oil-soluble star macromolecule" is understood to mean a star macromolecule that is soluble in mineral oil at a concentration of at least 5 g/L, for example, between 8 g/L to 100 g/L, such as, at least 10 g/L, 12 g/L, 15 g/L, or at least 20 g/L of mineral oil. For example, an oil-soluble star macromolecule having an oil solubility of at least 10 g/L may include the introduction of at least 10 g of the star macromolecule into approximately 1 L of mineral oil, and vigorously stirring at a temperature no greater than 100° C. for no more than about 60 minutes, to achieve dissolution of the star macromolecule, and testing the solubility at STP.

The term "hydrophilic" is understood to mean, in relation to a material, such as a polymeric arm, or a polymeric segment of a polymeric arm, that the material is water soluble and comprises hydrophilic segments having an HLB equal to or greater than 8, for example, an HLB equal to 16-20, or equal to or greater than 18, 19, or 19.5. In certain embodiments, the hydrophilic segment may comprise at least 75 mol % of water-soluble monomer residues, for example, between 80 mol % to 100 mol % or at least 85 mol %, 90 mol %, 95 mol %, or at least 97 mol % water-soluble monomer residues.

The term "hydrophobic" is understood to mean, in relation to a material, such as a polymeric arm, or a polymeric segment of a polymeric arm, that the material is water insoluble and comprises hydrophilic segments having an HLB less than 8, for example, an HLB less than 7. In certain embodiments, the hydrophobic segment may comprise at least 75 mol % of water-insoluble monomer residues, for example, between 80 mol % to 100 mol % or at least 85 mol %, 90 mol %, 95 mol %, or at least 97 mol % water-insoluble monomer residues.

The term "micelle-philic", "micelle-philic moiety", or "micelle-philic polymeric segment" are understood to mean any moiety, monomer, monomeric residue, or polymeric segment, respectively, having sufficient hydrophobic character to cause the star macromolecule (to which the moiety, monomer, monomeric residue, or polymeric segment is contained) to associate with a micelle in an aqueous environment, for example the association may include the moiety incorporating into the micelle, and may increase the viscosity of the mixture, for example, a surfactant-containing system, such as a surfactant-containing aqueous system. Suitable micelle-philic groups may include hydrocarbon groups having $C_6$ or greater tail portion, or fluorine-modified $C_4$ or greater tail portion. For example, the thickening properties of the micelle-philic, micelle-philic moiety, or micelle-philic polymeric segment, contained within a suitable star macromolecule or polymer may be determined according to the Thickening and Shear Thinning in Water Test, the SLES Surfactant Compatibility Test, the Hybrid SLES-CH Surfactant Compatibility Test, the Hybrid CB-SLES Surfactant Compatibility Test, the Hybrid CB-SLES Surfactant with NaCl Compatibility Test, the Ritabate 20 Surfactant Compatibility Test, the APG Surfactant Compatibility Test, the Temperature Stability Test, the pH Efficiency Range in Hybrid CB/SLES Surfactant Test, the pH Efficiency Range Test, or combinations thereof.

The term "surfactant-system thickening monomer", "surfactant-system thickening monomeric residue", or "surfactant-system thickening polymeric segment", are understood to mean any monomer, monomeric residue, or polymeric segment, respectively, comprising side chains that, when contained within a suitable star macromolecule or polymer, may associate, or be modified to associate, with a surfactant in a mixture or solution and provide the suitable star macromolecule or polymer the property to increase the viscosity of the surfactant-containing system, for example, a surfactant-containing aqueous system, such as an aqueous mixture or an aqueous solution, relative to the absence of the suitable star macromolecule or polymer in the surfactant-containing system. For example, not wanting to be held to any particular theory, the influence of the surfactant-system thickening monomer, surfactant-system thickening monomeric residue, or surfactant-system thickening polymeric segment, on the suitable star macromolecules ability to increase the viscosity, or thicken, the surfactant-containing system may result from said the surfactant-system thickening monomer, surfactant-system thickening monomeric residue, or surfactant-system thickening polymeric segment, when contained within the suitable star macromolecule or polymer, to associate with or form micelles when present in the surfactant-containing system. For example, thickening properties of the surfactant-system thickening monomer, surfactant-system thickening monomeric residue, or surfactant-system thickening polymeric segment, contained within a suitable star macromolecule or polymer, may be determined according to the Thickening and Shear Thinning in Water Test, the SLES Surfactant Compatibility Test, the Hybrid SLES-CH Surfactant Compatibility Test, the Hybrid CB-SLES Surfactant Compatibility Test, the Hybrid CB-SLES Surfactant with NaCl Compatibility Test, the Ritabate 20 Surfactant Compatibility Test, the APG Surfactant Compatibility Test, the Temperature Stability Test, the pH Efficiency Range in Hybrid CB/SLES Surfactant Test, the pH Efficiency Range Test, or combinations thereof.

The term "surfactant-system thickening star macromolecule" or "surfactant-modified star macromolecule" are understood to mean any star macromolecule or polymer comprising side chains that may associate, or be modified to associate, with a surfactant in a mixture or solution and provide an increase in viscosity of the surfactant-containing system, for example, a surfactant-containing aqueous system, such as an aqueous mixture or an aqueous solution, relative to the absence of the star macromolecule or polymer in the surfactant-containing system. For example, not wanting to be held to any particular theory, increasing the viscosity, or thickening, of the surfactant-containing system may result from the ability of the star macromolecule or polymer to associate with or form micelles when present in the surfactant-containing system. For example, thickening properties of a star macromolecule or polymer may be determined according to the Thickening and Shear Thinning in Water Test, the SLES Surfactant Compatibility Test, the Hybrid SLES-CH Surfactant Compatibility Test, the Hybrid CB-SLES Surfactant Compatibility Test, the Hybrid CB-SLES Surfactant with NaCl Compatibility Test, the Ritabate 20 Surfactant Compatibility Test, the APG Surfactant Compatibility Test, the Temperature Stability Test, the pH Efficiency Range in Hybrid CB/SLES Surfactant Test, the pH Efficiency Range Test, or combinations thereof.

The term "monomer residue" or "monomeric residue" is understood to mean the residue resulting from the polymerization of the corresponding monomer. For example, a polymer derived from the polymerization of an acrylic acid monomer (or derivatives thereof, such as acid protected derivatives of acrylic acid including but not limited to t-butyl ester of acrylic acid), will provide polymeric segments, identified as PAA, comprising repeat units of monomeric residues of acrylic acid, i.e., "—$CH(CO_2H)CH_2$—". For example, a polymer derived from the polymerization of styrene monomers will provide polymeric segments, identified as PSt, comprising repeat units of monomeric residues of styrene, i.e., "—$CH(C_6H_5)CH_2$—." For example, a polymer derived from the polymerization of monomeric divinylbenzene monomers will provide polymeric segments comprising repeat units of monomeric residues of divinylbenzene, i.e., "—$CH_2CH(C_6H_5)CHCH_2$—."

The term "emulsifier" is understood to mean a component that comprises an appreciable weight percent of an amphiphilic compound having a molecular weight of less than 5,000 MW. Emulsifiers are usually linear organic compounds that contain both hydrophobic portions (tails) and hydrophilic portions (heads), i.e., are amphiphilic. Examples of emulsifiers include but are not limited to: alkyl benzenesulfonates, alkanesulfonates, olefin sulfonates, alkylethersulfonates, glycerol ether sulfonates, α-methyl ester sulfonates, sulfofatty acids, alkyl sulfates, fatty alcohol ether sulfates, glycerol ether sulfates, hydroxy mixed ether sulfates, monoglyceride (ether) sulfates, fatty acid amide (ether) sulfates, mono- and dialkylsulfosuccinates, mono- and dialkylsulfosuccinamates, sulfotriglycerides, ether carboxylic acids and salts thereof, fatty acid isethionates, fatty acid sarcosinates, fatty acid taurides, acyl lactylates, acyl tartrates, acyl glutamates, acyl aspartates, alkyl oligoglucoside sulfates, protein fatty acid condensates (particularly wheat-based vegetable products) and alkyl (ether) phosphates, alkylbetaines, alkylamidobetaines, aminopropionates, aminoglycinates, imidazoliniumbetaines and sulfobetaines.

The term "emulsifier-free" is understood to mean a composition or mixture wherein the formulation is substantially devoid of any emulsifiers, for example less than 0.1 wt. % of emulsifier, relative to the total composition, or less than 0.05 wt. % of emulsifier, relative to the total composition, or less than 0.01 wt. % of emulsifier, relative to the total composition, or a formulation where there is no emulsifier.

The term "degradable unit" is understood to mean one or more chemical bonds within the star macromolecule that breaks when exposed to a breaker or a breaker environment. For example, a degradable unit may include an ester bond, an amide bond, a peptide bond, an ether bond, a disuphide bond, a phosphate ester bond, or a siloxane bond. In certain embodiments, one or more degradable units may be present in the core, in the polymeric arms, in the polymeric segments, at the junctions joining the polymeric arms to the core, in the side chains of the monomeric residues of the polymeric arms or polymeric segments, or combinations thereof.

The term "breaker" is understood to mean an agent or additive, such as a chemical, that breaks one or more chemical bonds within a degradable unit or units. For example, a breaker may include: acids, such as mineral acids, for example hydrochloric acid, acetic acid, phosphoric acid, sulfuric acid, or hydrofluoric acid; bases, such as alkali metal hydroxides, for example sodium hydroxide or potassium hydroxide, alkaline earth metal hydroxides, or ammonium hydroxide; enzymes, such as any enzyme capable of breaking a chemical bond comprised of a degradable unit; oxidizing agents, such as ammonium peroxide, hydrogen peroxide, degradation products of glucose or other sugars, or bleach; salts, such as salts containing alkali metal ions, such as sodium or potassium ions, for example sodium carbonate; alkaline earth metal ions, such as calcium or magnesium ions; ammonium ions; carbonate ions; hydrogen carbonate ions; phosphate ions; silicate ions; halogen ions, such as chloride or fluoride ions, for example sodium chloride, potassium chloride, or magnesium chloride; or minerals.

The term "breaker environment" is understood to mean a stimuli environment that causes a decrease in the viscosity of a mixture or solution either by making the conditions or local environment of the mixture or solution such that the star macromolecule or polymer has a reduced ability or is no longer able to thicken, and/or breaks or facilitates the breaking of chemical bonds, comprised of degradable units, contained within a star macromolecule or polymer, resulting in a decrease in viscosity of the mixture or solution.

The term "stimuli environment" is understood to include temperature (e.g., at high temperatures, for example, temperatures greater than 450° F., such as greater than 600° F., or greater than 800° F.; or at low temperatures, for example, less than −30° F., such as less than −50° F., or less than −50° F.), salinity (e.g., at high salt concentrations, for example, at greater than 3 wt. %, such as greater than 5 wt. %, greater than 10 wt. %, greater than 15 wt. %, greater than 20 wt. %, or greater than 25 wt. %), mechanical (e.g., at high shear rates), photo (either light or dark), or chemical (e.g., at high or low pH, or other chemical trigger).

In certain embodiments, the polymer composition, the number of polymeric arms on any particular star macromolecule varies across the population of star macromolecules in each composition, due to the synthetic process used for the synthesis of the composition. This process is called "arm first" method and is described in details herein below. Due to variation in the number of polymeric arms in star macromolecules, the number of polymeric arms, such as the number of polymeric arms r, s and/or t, are referred as an average number of polymeric arms. Monomer units within the polymeric arms or core of the star macromolecule of the present invention may be connected with C—C covalent bonds. In certain embodiments, the C—C covalent bonds may make it difficult to degrade such that the star macromolecule may perform as efficient thickening agent in a harsh environment, for example, a very high/low pH or in the presence of strong oxidizing agents.

In certain embodiments, a surfactant-system thickening macromolecule is provided that is suitable for increasing the viscosity of a surfactant-containing system, wherein the surfactant-system thickening macromolecule comprises:

a) a core;

b) at least one first polymeric arm, comprising a hydrophilic polymeric segment covalently attached to the core; and
c) at least one second polymeric arm, comprising:
  i) a hydrophilic polymeric segment covalently attached to the core; and
  ii) a further segment covalently attached to the hydrophilic polymeric segment, wherein the further segment is comprised of at least one monomeric residue of a polymerized surfactant-system thickening monomer comprising a $C_6$ or greater alkyl acrylate; $C_6$ or greater alkenyl acrylate; $C_6$ or greater alkyl alkyl acrylate; $C_6$ or greater alkenyl alkyl acrylate; $C_6$ or greater alkyl acrylamide; $C_6$ or greater alkenyl acrylamide; $C_6$ or greater alkyl alkyl acrylamide; $C_6$ or greater alkenyl alkyl acrylamide; $C_2$ or greater alkyl vinyl ether; $C_2$ or greater alkenyl vinyl ether; $C_1$ or greater alkyl allyl ether; or $C_1$ or greater alkenyl allyl ether.

In certain embodiments, the surfactant-system thickening macromolecule may be represented by Formula A:

Formula A wherein:
  Core represents a crosslinked polymeric segment;
  P1 independently represents a polymeric segment of a first polymeric arm comprised of monomeric residues of polymerized hydrophilic monomers;
  P2 independently represents a further segment of a second polymeric arm comprised of at least one monomeric residue of a polymerized surfactant-system thickening monomer;
  P3 independently represents a polymeric segment of the second polymeric arm comprised of monomeric residues of polymerized hydrophilic monomers;
  q1 independently represents the number of monomeric residues in P1;
  q2 independently represents the number of monomeric residues in P2;
  q3 independently represents the number of monomeric residues in P3;
  r independently represents the number of the first polymeric arms covalently attached to the Core; and
  s independently represents the number of the second polymeric arms covalently attached to the Core.

In certain embodiments, the surfactant-system thickening macromolecule may be represented by Formula B:

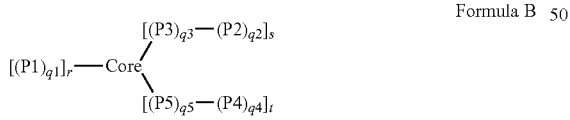
Formula B wherein:
  Core represents a crosslinked polymeric segment;
  P1 independently represents a polymeric segment of a first polymeric arm comprised of monomeric residues of polymerized hydrophilic monomers;
  P2 independently represents a further segment of a second polymeric arm comprised of at least one monomeric residue of a polymerized surfactant-system thickening monomer;
  P3 independently represents a polymeric segment of the second polymeric arm comprised of monomeric residues of polymerized hydrophilic monomers;
  P4 independently represents a polymeric segment of a third polymeric arm comprised of monomeric residues of polymerized hydrophobic monomers;
  P5 independently represents a polymeric segment of the third polymeric arm comprised of monomeric residues of polymerized hydrophilic monomers;
  q1 independently represents the number of monomeric residues in P1;
  q2 independently represents the number of monomeric residues in P2;
  q3 independently represents the number of monomeric residues in P3;
  q4 independently represents the number of monomeric residues in P4;
  q5 independently represents the number of monomeric residues in P5;
  r independently represents the number of the first polymeric arms covalently attached to the Core;
  s independently represents the number of the second polymeric arms covalently attached to the Core; and
  t independently represents the number of the third polymeric arms covalently attached to the Core.

In certain embodiments, a surfactant-modified star macromolecule is provided that may comprise:
  i) a core;
  ii) at least one first polymeric arm, comprising a hydrophilic polymeric segment covalently attached to the core; and
  iii) at least one second polymeric arm, comprising:
    a) a hydrophilic polymeric segment covalently attached to the core; and
    b) a further segment comprising at least one pendant moiety represented by $[L^1\text{-}G^1\text{-}L^2\text{-}G^2]$;
wherein:
  $G^1$ independently represents a residue of a hydrophilic moiety of the surfactant;
  $G^2$ independently represents a residue of a hydrophobic moiety of the surfactant;
  $L^1$ independently represents a linking group or a covalent bond, attaching $G^1$ to the further segment; and
  $L^2$ independently represents a linking group or a covalent bond, linking $G^1$ and $G^2$.

In certain embodiments, a method of increasing the viscosity of a surfactant-containing aqueous system may comprise introducing a surfactant-system thickening macromolecule into the surfactant-containing aqueous system, wherein the surfactant-system thickening macromolecule may be represented by Formula C:

Formula C wherein:
  Core represents a crosslinked polymeric segment;
  P1 independently represents a polymeric segment of the at least one first polymeric arm comprised of monomeric residues of polymerized hydrophilic monomers;
  P2 independently represents a further segment of the at least one second polymeric arm comprised of:
    1) a polymerized backbone comprising at least one pendant micelle-philic moiety, or
    2) at least one monomeric residue of a polymerized micelle-philic monomer;
  P3 independently represents a polymeric segment of the at least one second polymeric arm comprised of monomeric residues of polymerized hydrophilic monomers;
  q1 independently represents the number of monomeric residues in P1;

q2 independently represents the number of monomeric residues in P2;

q3 independently represents the number of monomeric residues in P3;

r independently represents the number of the at least one first polymeric arms covalently attached to the Core; and s independently represents the number of the at least one second polymeric arms covalently attached to the Core.

In certain embodiments, a method of increasing the viscosity of a surfactant-containing aqueous system may comprise introducing a surfactant-system thickening macromolecule into the surfactant-containing aqueous system, wherein the surfactant-system thickening macromolecule may be represented by Formula D:

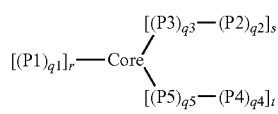

Formula D wherein:

Core represents a crosslinked polymeric segment;

P1 independently represents a polymeric segment of the at least one first polymeric arm comprised of monomeric residues of polymerized hydrophilic monomers;

P2 independently represents a further segment of the at least one second polymeric arm comprised of:
  1) a polymerized backbone comprising at least one pendant micelle-philic moiety, or
  2) at least one monomeric residue of a polymerized micelle-philic monomer;

P3 independently represents a polymeric segment of the at least one second polymeric arm comprised of monomeric residues of polymerized hydrophilic monomers;

P4 independently represents a polymeric segment of the at least one third polymeric arm comprised of monomeric residues of polymerized hydrophobic monomers;

P5 independently represents a polymeric segment of the at least one third polymeric arm comprised of monomeric residues of polymerized hydrophilic monomers;

q1 independently represents the number of monomeric residues in P1;

q2 independently represents the number of monomeric residues in P2;

q3 independently represents the number of monomeric residues in P3;

q4 independently represents the number of monomeric residues in P4;

q5 independently represents the number of monomeric residues in P5;

r independently represents the number of the at least one first polymeric arms covalently attached to the Core;

s independently represents the number of the at least one second polymeric arms covalently attached to the Core; and t independently represents the number of the at least one third polymeric arms covalently attached to the Core.

In certain embodiments, a method of increasing the viscosity of a surfactant-containing aqueous system may comprise introducing a surfactant-system thickening macromolecule into the surfactant-containing aqueous system, wherein the surfactant-system thickening macromolecule may comprise:

a) a core;

b) at least one first polymeric arm, comprising a hydrophilic polymeric segment covalently attached to the core; and c) at least one second polymeric arm, comprising:
  i) a hydrophilic polymeric segment covalently attached to the core; and
  ii) a further segment covalently attached to the hydrophilic polymeric segment, wherein the further segment is comprised of at least one monomeric residue of a polymerized surfactant-system thickening monomer comprising a $C_6$ or greater alkyl acrylate; $C_6$ or greater alkenyl acrylate; $C_6$ or greater alkyl alkyl acrylate; $C_6$ or greater alkenyl alkyl acrylate; $C_6$ or greater alkyl acrylamide; $C_6$ or greater alkenyl acrylamide; $C_6$ or greater alkyl alkyl acrylamide; $C_6$ or greater alkenyl alkyl acrylamide; $C_2$ or greater alkyl vinyl ether; $C_2$ or greater alkenyl vinyl ether; $C_1$ or greater alkyl allyl ether; or $C_1$ or greater alkenyl allyl ether.

In certain embodiments, a method of increasing the viscosity of a surfactant-containing aqueous system may comprise introducing a surfactant-modified star macromolecule into the surfactant-containing aqueous system, wherein the surfactant-modified star macromolecule may comprise:

i) a core;

ii) at least one first polymeric arm, comprising a hydrophilic polymeric segment covalently attached to the core; and iii) at least one second polymeric arm, comprising:
  a) a hydrophilic polymeric segment covalently attached to the core; and
  b) a further segment comprising at least one pendant moiety represented by $[L^1\text{-}G^1\text{-}L^2\text{-}G^2]$;

wherein:

$G^1$ independently represents a residue of a hydrophilic moiety of the surfactant;

$G^2$ independently represents a residue of a hydrophobic moiety of the surfactant;

$L^1$ independently represents a linking group or a covalent bond, attaching $G^1$ to the further segment; and $L^2$ independently represents a linking group or a covalent bond, linking $G^1$ and $G^2$.

In certain embodiments, the core of the star macromolecule may be a crosslinked core, such as a crosslinked polymeric core or a hydrophobic crosslinked polymeric core. Suitable crosslinking monomers for the core encompass all of the compounds which are capable, under the polymerization conditions, of bringing about crosslinking. Suitable crosslinking monomers include, but are not limited to, di- and multi-functional crosslinkers, such as di-, tri-, tetra-, penta-, or hexa-functional crosslinkiers, for example, di-, tri-, tetra-functional (meth)acrylates, di-, tri- and tetra-functional styrenes and other multi- or poly-functional crosslinkers. Suitable crosslinking monomers that may be used to form a core of a star macromolecule may include, but are not limited to, a multifunctional monomer, for example, a hexafunctional monomer, a pentafunctional monomer, a tetrafunctional monomer, a trifunctional monomer, or a difunctional monomer. For example, a crosslinking monomer may be a hydrophobic monomer or a hydrophilic monomer, such as a hydrophobic multifunctional monomer or a hydrophilic multifunctional monomer, for example, a hydrophobic difunctional monomer or a hydrophilic difunctional monomer. For example, the crosslinking monomers may be a hydrophobic crosslinker, including, but not limited to, 1,2-divinylbenzene; 1,3-divinylbenzene; 1,4-divinylbenzene; 1,2-ethanediol di(meth)acrylate; 1,3-propanediol di(meth)acrylate; 1,4-butanediol di(meth)acrylate; 1,5-hexanediol di(meth)acrylate; divinylbenzene; ethyleneglycol di(meth)acrylate; di(ethylene glycol) diacrylate (DEGlyDA); propyleneglycol di(meth)acrylate; butyleneglycol di(meth)acrylate; triethyleneglycol di(meth)acrylate; polyethyleneglycol di(meth)acrylate; polypropyleneglycol di(meth)acrylate; polybutyleneglycol di(meth)acrylate; allyl (meth)acrylate; glycerol di(meth)acrylate; trimethylolpropane tri(meth)acrylate; pentaerythritol tetra(meth)acrylate; allyl methacrylate; or allyl acrylate. For example, the cross-linking monomer may be di(ethylene glycol) diacrylate (DEGlyDA) or divinylbenzene. For example, the crosslinking monomer may be divinylbenzene.

In certain embodiments, the star macromolecule may comprise multiple polymeric arms, for example, star macromolecule may comprise an average number of polymeric arms in the range of between 5 and 5,000 polymeric arms, such as between 10 and 250; between 10 and 500; between 10 and 750; between 500 and 750; between 10 and 1,000; between 10 and 2,500; between 200 and 5,000; between 200 and 4,000; between 200 and 2,000; between 200 and 1,000; between 200 and 750; between 500 and 5,000; between 600 and 1,500; between 600 and 2,000; between 600 and 3,000; between 2,500 and 5,000; between 1,000 and 2,500; between 1,500 and 3,000; between 550 and 1,000; between 550 and 2,000; between 550 and 3,000; between 550 and 4,000; between 550 and 5,000.

In certain embodiments, the polymeric arms of the star macromolecule may comprise a hydrophilic polymeric segment, such as a water soluble polymeric segment, a hydrophobic polymeric segment, or a surfactant-system thickening polymeric segment. The hydrophilic polymeric segment, for example, may be a water soluble polymeric segment, and may comprise a poly(acrylic acid), poly(2-hydroxyethyl acrylate), poly(N-isopropylacrylamide), poly(ethylene glycol) methacrylate, or quaternized poly(dimethylaminoethyl methacrylate), polymeric segments. The hydrophobic polymeric segment, for example, may comprise polystyrene or substituted polystyrenes, poly(alkyl(meth)acrylate) or a hydrocarbon-based polymeric segments. Suitable hydrocarbon-based segments may comprise low molecular weight α-olefin. Lower molecular weight α-olefins are commercially available and higher molecular weight species may be prepared by telomerization of ethylene or ethylene propylene mixtures. [Kaneyoshi, H.; Inoue, Y.; Matyjaszewski, K. *Macromolecules* 2005, 38, 5425-5435.]

Suitable hydrophilic monomers that may be used to form a polymeric arm or a segment of a polymeric arm, for example, a polymeric segment of a polymeric arm, such as for P1, P3, or P5 (or optionally within P2), of a star macromolecule may include, but is not limited to, 2-acrylamido-2-methylpropane sulfonic acid (AMPS), styrene sulphonic acid, protected and unprotected acrylic acids and methacrylic acids including: acrylic acid, methacrylic acid, ethacrylic acid, methyl acrylate, ethyl acrylate, α-butyl acrylate, iso-butyl acrylate, t-butyl acrylate, 2-ethylhexyl acrylate, decyl acrylate, octyl acrylate; methyl methacrylate; ethyl methacrylate; n-butyl methacrylate; iso-butyl methacrylate; t-butyl methacrylate; 2-ethylhexyl methacrylate; decyl methacrylate; methyl ethacrylate; ethyl ethacrylate; n-butyl ethacrylate; iso-butyl ethacrylate; t-butyl ethacrylate; 2-ethylhexyl ethacrylate; decyl ethacrylate; 2,3-dihydroxypropyl acrylate; 2,3-dihydroxypropyl methacrylate; 2-hydroxyethyl acrylate; 2-hydroxypropyl acrylate; hydroxypropyl methacrylate; glyceryl monoacrylate; glyceryl monoethacrylate; glycidyl methacrylate; glycidyl acrylate; acrylamide; methacrylamide; ethacrylamide; N-methyl acrylamide; N,N-dimethyl acrylamide; N,N-dimethyl methacrylamide; N-ethyl acrylamide; N-isopropyl acrylamide; N-butyl acrylamide; N-t-butyl acrylamide; N,N-di-n-butyl acrylamide; N,N-diethylacrylamide; N-octyl acrylamide; N-octadecyl acrylamide; N,N-diethylacrylamide; N-phenyl acrylamide; N-methyl methacrylamide; N-ethyl methacrylamide; N-dodecyl methacrylamide; N,N-dimethylaminoethyl acrylamide; quaternised N,N-dimethylaminoethyl acrylamide; N,N-dimethylaminoethyl methacrylamide; quaternised N,N-dimethylaminoethyl methacrylamide; N,N-dimethylaminoethyl acrylate; N,N-dimethylaminoethyl methacrylate; quaternised N,N-dimethyl-aminoethyl acrylate; quaternised N,N-dimethylaminoethyl methacrylate; 2-hydroxyethyl acrylate; 2-hydroxyethyl methacrylate; 2-hydroxyethyl ethacrylate; glyceryl acrylate; 2-methoxyethyl acrylate; 2-methoxyethyl methacrylate; 2-methoxyethyl ethacrylate; 2-ethoxyethyl acrylate; 2-ethoxyethyl methacrylate; 2-ethoxyethyl ethacrylate; maleic acid; maleic anhydride and its half esters; fumaric acid; itaconic acid; itaconic anhydride and its half esters; crotonic acid; angelic acid; diallyldimethyl ammonium chloride; vinyl pyrrolidone vinyl imidazole; methyl vinyl ether; methyl vinyl ketone; maleimide; vinyl pyridine; vinyl pyridine-N-oxide; vinyl furan; styrene sulphonic acid and its salts; allyl alcohol; allyl citrate; allyl tartrate; vinyl acetate; vinyl alcohol; vinyl caprolactam; vinyl acetamide; or vinyl formamide. For example, the hydrophilic monomer may comprise protected and unprotected acrylic acid, such as methacrylic acid, ethacrylic acid, methyl acrylate, ethyl acrylate, α-butyl acrylate, iso-butyl acrylate, t-butyl acrylate, 2-ethylhexyl acrylate, decyl acrylate, octyl acrylate; methyl acrylate; methyl methacrylate; methyl ethacrylate; ethyl acrylate; ethyl methacrylate; ethyl ethacrylate; n-butyl acrylate; n-butyl methacrylate; n-butyl ethacrylate; 2-ethylhexyl acrylate; 2-ethylhexyl methacrylate; 2-ethylhexyl ethacrylate; N-octyl acrylamide; 2-methoxyethyl acrylate; 2-hydroxyethyl acrylate; N,N-dimethylaminoethyl acrylate; N,N-dimethylaminoethyl methacrylate; acrylic acid; methacrylic acid; N-t-butylacrylamide; N-sec-butylacrylamide; N,N-dimethylacrylamide; N,N-dibutylacrylamide; N,N-dihydroxyethyl-lacrylamide; 2-hydroxyethyl acrylate; 2-hydroxyethyl methacrylate; benzyl acrylate; 4-butoxycarbonylphenyl acrylate; butyl acrylate; 4-cyanobutyl acrylate; cyclohexyl acrylate; dodecyl acrylate; 2-ethylhexyl acrylate; heptyl acrylate; iso-butyl acrylate; 3-methoxybutyl acrylate; 3-methoxypropyl acrylate; methyl acrylate; N-butyl acrylamide; N,N-dibutyl acrylamide; ethyl acrylate; methoxyethyl acrylate; hydroxyethyl acrylate; or diethyleneglycolethyl acrylate. For example, the hydrophilic monomer may comprise protected and unprotected acrylic acid, such as methacrylic acid, ethacrylic acid, methyl acrylate, ethyl acrylate, α-butyl acrylate, iso-butyl acrylate, t-butyl acrylate, 2-ethylhexyl acrylate, decyl acrylate, octyl acrylate; 2-hydroxyethyl acrylate; N-isopropylacrylamide; ethylene glycol methacrylate; (polyethylene glycol) methacrylate; or quaternized dimethylaminoethyl methacrylate. For example, the hydrophilic monomer may comprise acrylic acid, methacrylic acid, 2-hydroxyethyl acrylate, acrylamide, vinyl pyrrolidone, vinyl pyridine, styrene sulphonic acid, PEG-methacrylate, 2-(dimethylamino)ethyl methacrylate, 2-(trimethylamino) ethyl methacrylate, 2-acrylamido-2-methylpropane sulphonic acid, acrylic acid, acrylic anhydride, beta-carboxyethyl acrylate, methacrylic acid, 4-methacryloxyethyl trimellitic anhydride, 3-methacryloyl-(1)-lysine, o-nitrobenzyl methacrylate, 2-propene-1-sulfonic acid, 2-sulfoethyl methacrylate, trichloroacrylic acid, 4-vinylbenzoic acid, acrylamides, 2-(N,N-dimethylamino)-ethyl acrylate, N-[2-N,N-dimethylamino)-ethyl]methacrylamide, 2-(N,N-dimethylamino)-ethyl methacrylate, 3-dimethylaminoneopentylacrylate, N-[3-(N,N-methylamino)-propyl] acrylamide, N-[3-(N,N-Dimethylamino)-propyl] methacrylamide, 2-N-morpholinoethyl acrylate, 2-N-morpholinoethyl methacrylate, 3-methacryloyl-(1)-lysine, N,N-diallylamine, diallyldimethyl, 2-aminoethyl methacrylamide, N-(2-aminoethyl) methacrylamide hydrochloride, N-(3-aminopropyl)-methacrylamide hydrochloride, N-(t-BOC-aminopropyl)-acrylamide, 2-(t-butylamino)ethyl methacrylate, 2-(N,N-diethylamino)-ethyl methacrylate (DEAEMA), 2-diisopropylaminoethyl methacrylate. For example, the hydrophilic monomer may comprise acrylic acid.

Suitable hydrophobic monomers that may be used to form a polymeric arm or a segment of a polymeric arm, for example, a polymeric segment of a polymeric arm, such as for P4 (or optionally within P2), of a star macromolecule may include, but is not limited to styrene, methyl acrylate, ethyl acrylate, n-butyl acrylate, iso-butyl acrylate, t-butyl acrylate, 2-ethylhexyl acrylate, octyl acrylate, decyl acrylate, methyl methacrylate; ethyl methacrylate; n-butyl methacrylate; iso-butyl methacrylate; t-butyl methacrylate; 2-ethylhexyl methacrylate; octyl methacrylate, decyl methacrylate, methyl ethacrylate; ethyl ethacrylate; n-butyl ethacrylate; iso-butyl ethacrylate; t-butyl ethacrylate; 2-ethylhexyl ethacrylate; octyl ethacrylate, decyl ethacrylate, 2,3-dihydroxypropyl acrylate; 2,3-dihydroxypropyl methacrylate; 2-hydroxypropyl acrylate; hydroxypropyl methacrylate; glycidyl methacrylate; glycidyl acrylate, acrylamides, styrene; styrene optionally substituted with one or more $C_1$-$C_{12}$ straight or branched chain alkyl groups; or alkylacrylate. For example, the hydrophobic monomer may comprise styrene; alpha-methylstyrene; t-butylstyrene; p-methylstyrene; methyl methacrylate; or t-butyl-acrylate. For example, the hydrophobic monomer may comprise styrene. In certain embodiments, the hydrophobic monomer may comprise a protected functional group.

In certain embodiments, suitable surfactant-system thickening monomers that may be used to form a surfactant-system thickening polymeric segment, for example, to form polymeric segment P2, may include, but are not limited to, alkyl acrylates, acrylamides, styrenes, vinyl pyridines, vinyl ethers, and allyl ethers. For example, the suitable surfactant-system thickening monomers may be represented by one of the following Formulas (I)-(V):

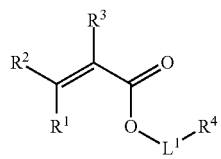

(I)

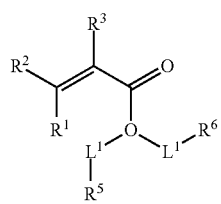

(II)

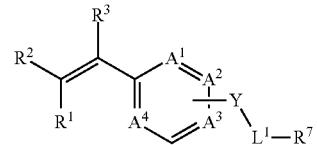

(III)

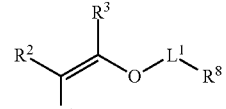

(IV)

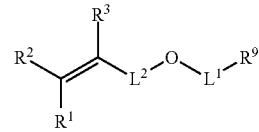

(V)

wherein:
$R^1$, $R^2$, and $R^3$ independently represent hydrogen, methyl, ethyl, or $C_{3-18}$ alkyl, for example $C_{3-6}$ alkyl, $C_{6-12}$ alkyl, or $C_{12-18}$ alkyl; wherein the alkyl may be branched or unbranched, linear or cyclic, and may be optionally substituted with one or more halogens, $C_{1-6}$ alkoxy groups, or poly(ethylene glycol);

$R^4$ and $R^7$ independently represent $C_{13}$ or greater alkyl, —$C_6$ or greater alkyl-(O—$C_{1-6}$ alkyl)$_n$, $C_6$ or greater alkenyl, or $C_6$ or greater alkenyl-(O—$C_{1-6}$ alkyl)$_n$; or when $R^3$ is $C_1$ or greater, then $R^4$ may independently represent $C_{11}$ or greater alkyl, —$C_6$ or greater alkyl —(O—$C_{1-6}$ alkyl)$_n$, $C_6$ or greater alkenyl, or $C_6$ or greater alkenyl-(O—$C_{1-6}$ alkyl)$_n$; wherein each alkyl portion independently may be branched or unbranched, linear or cyclic, saturated or unsaturated, and may be optionally substituted with one or more halogens, $C_{1-6}$ alkoxy groups, or poly(ethylene glycol);

$R^5$ independently represents $C_{19}$ or greater alkyl, —$C_6$ or greater alkyl —(O—$C_{1-6}$ alkyl)$_n$, $C_6$ or greater alkenyl, or $C_6$ or greater alkenyl-(O—$C_{1-6}$ alkyl)$_n$; or when $R^6$ is $C_1$ or greater, then $R^5$ may independently represent $C_{13}$ or greater alkyl, —$C_6$ or greater alkyl —(O—$C_{1-6}$ alkyl)$_n$, $C_6$ or greater alkenyl, or $C_6$ or greater alkenyl-(O—$C_{1-6}$ alkyl)$_n$; wherein each alkyl portion independently may be branched or unbranched, linear or cyclic, saturated or unsaturated, and may be optionally substituted with one or more halogens, $C_{1-6}$ alkoxy groups, or poly(ethylene glycol);

$R^6$ independently represents hydrogen, $C_{1-18}$ alkyl, —$C_{1-18}$ alkyl-(O—$C_{1-6}$ alkyl)$_n$, or is $R^4$, or is $R^5$; wherein each alkyl portion independently may be branched or unbranched, linear or cyclic, saturated or unsaturated, and may be optionally substituted with one or more halogens, $C_{1-6}$ alkoxy groups, or poly(ethylene glycol);

$R^8$ independently represents $C_2$ or greater alkyl, —$C_2$ or greater alkyl-(O—$C_{1-6}$ alkyl)$_n$, $C_3$ or greater alkenyl, —$C_3$ or greater alkenyl-(O—$C_{1-6}$ alkyl)$_n$; wherein each alkyl portion independently may be branched or unbranched, linear or cyclic, saturated or unsaturated, and may be optionally substituted with one or more halogens, $C_{1-6}$ alkoxy groups, or poly(ethylene glycol);

$R^9$ independently represents $C_1$ or greater alkyl, —$C_1$ or greater alkyl-(O—$C_{1-6}$ alkyl)$_n$, $C_3$ or greater alkenyl, —$C_3$ or greater alkenyl-(O—$C_{1-6}$ alkyl)$_n$; wherein each alkyl portion independently may be branched or unbranched, linear or cyclic, saturated or unsaturated, and may be optionally substituted with one or more halogens, $C_{1-6}$ alkoxy groups, or poly(ethylene glycol); or $R^4$, $R^5$, $R^7$, $R^8$, $R^9$ independently represent a hydrophobic portion of a surfactant, a hydrophobic portion of a lipid, or a hydrophobic portion of a fatty alcohol;

$A^1$, $A^2$, $A^3$ and $A^4$ independently represent CH, $CR^{10}$, or N, wherein at least two of $A^1$, $A^2$, $A^3$ and $A^4$ is CH or $CR^{10}$;

$R^{10}$ independently represents hydrogen, $C_{1-10}$ alkyl, halogen, hydroxyl, $C_{1-10}$ alkoxy; wherein the alkyl or alkoxy may be branched or unbranched, linear or cyclic, and may be optionally substituted with one or more halogens, $C_{1-6}$ alkoxy groups, or poly(ethylene glycol);

Y independently represents a covalent bond, —O—, —S—, —N(H)—, —N($R^1$)—, —(CO)—, —S(O)—, —S(O)$_2$—, —S(O)$_2$N($R^1$)—, —(CO)N($R^1$)—, —N($R^1$)—(CO)—, —(CO)O—, or —O—(CO)—;

$L^1$ independently represents a covalent bond, ethylene glycol, poly(ethylene glycol), polyether, polyamide, $C_{1-6}$ alkyl, —(CO)N($R^1$)—, —N($R^1$)—(CO)—, —(CO)O—, —O—(CO)—, or combinations thereof, or is independently absent; or $L^1$ independently represents a hydrophilic portion of a surfactant, a hydrophilic portion of a lipid, or a hydrophilic portion of a fatty alcohol;

$L^2$ independently represents $(CH_2)_{1-40}$, $C_{1-40}$ alkyl, (O—$C_{2-6}$ alkyl)$_n$, or ($C_{2-6}$ alkyl)-(O—$C_{2-6}$ alkyl)$_n$; wherein the alkyl may be branched or unbranched, linear or cyclic, and may be optionally substituted with one or more halogens, $C_{1-6}$ alkoxy groups, or poly(ethylene glycol); and n independently represents a value in the range of 1-1000.

In certain embodiments, $R^1$, $R^2$, and $R^3$ may independently represent hydrogen, methyl, ethyl, or $C_{3-18}$ alkyl, for example $C_{3-6}$ alkyl, $C_{6-12}$ alkyl, or $C_{12-18}$ alkyl; wherein the alkyl may be branched or unbranched, linear or cyclic. In certain embodiments, $R^1$ and $R^2$ may independently represent hydrogen or methyl. In certain embodiments, $R^1$ and $R^2$ may independently represent $C_{3-6}$ alkyl, $C_{6-12}$ alkyl, or $C_{12-18}$ alkyl; wherein the alkyl may be branched or unbranched, linear or cyclic, and may be optionally substituted with one or more halogens, $C_{1-6}$ alkoxy groups, or poly(ethylene glycol).

In certain embodiments, $R^4$ of the acrylate represented by Formula (I) may include, but is not limited to, a $C_{13}$ or greater alkyl acrylate; $C_{13-40}$ alkyl acrylate; $C_{14}$ or greater alkyl acrylate; $C_{16}$ or greater alkyl acrylate; $C_{18}$ or greater alkyl acrylate; $C_{11}$ or greater alkyl alkyl acrylate; $C_{11-40}$ alkyl alkyl acrylate; $C_{14}$ or greater alkyl alkyl acrylate; $C_{16}$ or greater alkyl alkyl acrylate; or $C_{18}$ or greater alkyl alkyl acrylate. For example, the alkyl acrylate represented by Formula (I) may include, but is not limited to, 10-undecenyl acrylate, lauryl acrylate, tridecyl acrylate, hexadecyl acrylate, stearyl acrylate, or behenyl acrylate. For example, an alkyl methacrylate represented by Formula (I) may include, but is not limited to, lauryl methacrylate, tridecyl methacrylate, hexadecyl methacylate, stearyl methacrylate, behenyl methacrylate, or poly(ethylene glycol) behenyl ether methacrylate. For example, an alkyl ethacrylate represented by Formula (I) may include, but is not limited to, lauryl ethacrylate, tridecyl ethacrylate, hexadecyl ethacrylate, or stearyl ethacrylate. In certain embodiments, $R^4$ of an acrylate represented by Formula (I) may include, but is not limited to, a saturated fatty alkyl moiety comprising: tridecyl, isotridecyl, myristyl, pentadecyl, cetyl, palmityl, heptadecyl, stearyl, nonadecyl, arachidyl, heneicosyl, behenyl, lignoceryl, ceryl (heptacosanyl), montanyl, nonacosanyl, myricyl, dotriacontanyl, geddyl, or cetostearyl moiety.

In certain embodiments, $R^4$ of the acrylate represented by Formula (I) may include, but is not limited to, a —$C_6$ or greater alkyl-(O—$C_{1-6}$ alkyl)$_n$, or $C_6$ or greater alkenyl-(O—$C_{1-6}$ alkyl)$_n$; wherein the —$C_6$ or greater alkyl may be $C_{6-12}$ alkyl, $C_{11-20}$ alkyl, $C_{18-30}$ alkyl, or $C_{20-40}$ alkyl; wherein the —$C_6$ or greater alkenyl may be $C_{6-12}$ alkenyl, $C_{11-20}$ alkenyl, $C_{18-30}$ alkenyl, or $C_{20-40}$ alkenyl; wherein each alkyl portion independently may be branched or unbranched, linear or cyclic, saturated or unsaturated, and may be optionally substituted with one or more halogens, $C_{1-6}$ alkoxy groups, or poly(ethylene glycol); wherein each alkenyl portion independently may be branched or unbranched, linear or cyclic, mono- or poly-unsaturated, conjugated or unconjugated, and may be optionally substituted with one or more halogens, $C_{1-6}$ alkoxy groups, or poly(ethylene glycol).

In certain embodiments, $R^4$ of the acrylate represented by Formula (I) may include, but is not limited to, a $C_6$ or greater alkenyl acrylate; $C_{6-40}$ alkenyl acrylate; $C_8$ or greater alkenyl acrylate; $C_{10}$ or greater alkenyl acrylate; $C_{12}$ or greater alkenyl acrylate; $C_{14}$ or greater alkenyl acrylate; $C_{18}$ or greater alkenyl acrylate; $C_6$ or greater alkenyl alkyl acrylate; $C_{6-40}$ alkenyl alkyl acrylate; $C_8$ or greater alkenyl alkyl acrylate; $C_{10}$ or greater alkenyl alkyl acrylate; $C_{12}$ or greater alkenyl alkyl acrylate; $C_{14}$ or greater alkenyl alkyl acrylate; or $C_{18}$ or greater alkenyl alkyl acrylate. For example, $R^4$ of an acrylate represented by Formula (I) may include, but is not limited to, an unsaturated fatty alkyl moiety comprising either a mono- or poly unsaturated fatty alkyl moiety, such as di-, tri, tetra, penta, or hexa-unsaturated fatty alkyl moiety. In certain embodiments, the unsaturated fatty alkyl moiety may comprise: myristoleyl, palmitoleyl, sapienyl, oleyl, elaidyl, vaccenyl, linoleyl, linoelaidyl, α-linolenyl, arachidonyl, eicosapentaenoyl, erucyl, or docosahexaenoyl moiety.

In certain embodiments, $R^5$ of the acrylamide represented by Formula (II) may include, but is not limited to, a $C_{19}$ or greater alkyl acrylamide; $C_{19-40}$ alkyl acrylamide; $C_{19}$ or greater alkyl acrylamide; $C_{19}$ or greater alkyl acrylamide; $C_{19}$ or greater alkyl acrylamide; $C_{13}$ or greater alkyl alkyl acrylamide; $C_{13-40}$ alkyl alkyl acrylamide; $C_{14}$ or greater alkyl alkyl acrylamide; $C_{16}$ or greater alkyl alkyl acrylamide; or $C_{18}$ or greater alkyl alkyl acrylamide. In certain embodiments, $R^5$ of an acrylamide represented by Formula (II) may include, but is not limited to, a saturated fatty alkyl moiety, such as a tridecyl, isotridecyl, myristyl, pentadecyl, cetyl, palmityl, heptadecyl, stearyl, nonadecyl, arachidyl, heneicosyl, behenyl, lignoceryl, ceryl (heptacosanyl), montanyl, nonacosanyl, myricyl, dotriacontanyl, geddyl, or cetostearyl moiety.

In certain embodiments, $R^5$ of an acrylamide represented by Formula (II) may include, but is not limited to, a $C_6$ or greater alkenyl acrylamide; $C_{6-40}$ alkenyl acrylamide; $C_8$ or greater alkenyl acrylamide; $C_{10}$ or greater alkenyl acrylamide; $C_{12}$ or greater alkenyl acrylamide; $C_{14}$ or greater alkenyl acrylamide; $C_{18}$ or greater alkenyl acrylamide; $C_6$ or greater alkenyl alkyl acrylamide; $C_{6-40}$ alkenyl alkyl acrylamide; $C_8$ or greater alkenyl alkyl acrylamide; $C_{10}$ or greater alkenyl alkyl acrylamide; $C_{12}$ or greater alkenyl alkyl acrylamide; $C_{14}$ or greater alkenyl alkyl acrylamide; or $C_{18}$ or greater alkenyl alkyl acrylamide. In certain embodiments, $R^5$ of an acrylamide represented by Formula (II) may include, but is not limited to, an unsaturated fatty alkyl moiety comprising either a mono- or poly unsaturated fatty alkyl moiety, such as di-, tri, tetra, penta, or hexa-unsaturated fatty alkyl moiety. In certain embodiments, the unsaturated fatty alkyl moiety may comprise: myristoleyl, palmitoleyl, sapienyl, oleyl, elaidyl, vaccenyl, linoleyl, linoelaidyl, α-linolenyl, arachidonyl, eicosapentaenoyl, erucyl, or docosahexaenoyl moiety.

In certain embodiments, $R^5$ of the acrylamide represented by Formula (II) may include, but is not limited to, a —$C_6$ or greater alkyl-(O—$C_{1-6}$ alkyl)$_n$, or $C_6$ or greater alkenyl-(O—$C_{1-6}$ alkyl)$_n$; wherein the —$C_6$ or greater alkyl may be $C_{6-12}$ alkyl, $C_{11-20}$ alkyl, $C_{18-30}$ alkyl, or $C_{20-40}$ alkyl; wherein the —$C_6$ or greater alkenyl may be $C_{6-12}$ alkenyl, $C_{11-20}$ alkenyl, $C_{18-30}$ alkenyl, or $C_{20-40}$ alkenyl; wherein each alkyl portion independently may be branched or unbranched, linear or cyclic, saturated or unsaturated, and may be optionally substituted with one or more halogens, $C_{1-6}$ alkoxy groups, or poly(ethylene glycol); wherein each alkenyl portion independently may be branched or unbranched, linear or cyclic, mono- or poly-unsaturated, conjugated or unconjugated, and may be optionally substituted with one or more halogens, $C_{1-6}$ alkoxy groups, or poly(ethylene glycol).

In certain embodiments, $R^6$ may independently represent hydrogen; $C_{1-18}$ alkyl or —$C_{1-18}$ alkyl-(O—$C_{1-6}$ alkyl)$_n$, wherein the $C_{1-18}$ alkyl may be, for example, methyl, ethyl, $C_{1-10}$ alkyl, $C_{3-18}$ alkyl, $C_{3-6}$ alkyl, $C_{6-12}$ alkyl, or $C_{12-18}$ alkyl; and wherein each alkyl portion independently may be branched or unbranched, linear or cyclic, saturated or unsaturated, and may be optionally substituted with one or more halogens, $C_{1-6}$ alkoxy groups, or poly(ethylene glycol); or is $R^4$, or is $R^5$.

In certain embodiments, the $R^7$ moiety of Formula (III) may include, but is not limited to, a $C_{13}$ or greater alkyl moiety, such as a $C_{13-40}$ alkyl; $C_{14}$ or greater alkyl; $C_{16}$ or greater alkyl; $C_{18}$ or greater alkyl; or $C_{20}$ or greater alkyl moiety. For example, the $R^7$ moiety of Formula (III) may include, but is not limited to, a 10-undecenyl, lauryl, tridecyl, hexadecyl, stearyl, behenyl, lignoceryl, ceryl (heptacosanyl), montanyl, nonacosanyl, myricyl, dotriacontanyl, geddyl, or cetostearyl moiety.

In certain embodiments, the $R^7$ moiety of Formula (III) may include, but is not limited to, a $C_6$ or greater alkenyl moiety, such as $C_{6-40}$ alkenyl; $C_8$ or greater alkenyl; $C_{10}$ or greater alkenyl; $C_{12}$ or greater alkenyl; $C_{14}$ or greater alkenyl; $C_{18}$ or greater alkenyl; or $C_{20}$ or greater alkenyl moiety. The $R^7$ moiety of Formula (III) may include an unsaturated fatty alkyl moiety comprising either a mono- or poly unsaturated fatty alkyl moiety, such as di-, tri, tetra, penta, or hexa-unsaturated fatty alkyl moiety. In certain embodiments, the unsaturated fatty alkyl moiety may comprise: myristoleyl, palmitoleyl, sapienyl, oleyl, elaidyl, vaccenyl, linoleyl, linoelaidyl, α-linolenyl, arachidonyl, eicosapentaenoyl, erucyl, or docosahexaenoyl moiety.

In certain embodiments, $R^7$ moiety of Formula (III) may include, but is not limited to, a —$C_6$ or greater alkyl-(O—$C_{1-6}$ alkyl)$_n$, or $C_6$ or greater alkenyl-(O—$C_{1-6}$ alkyl)$_n$; wherein the —$C_6$ or greater alkyl may be $C_{6-12}$ alkyl, $C_{11-20}$ alkyl, $C_{18-30}$ alkyl, or $C_{20-40}$ alkyl; wherein the —$C_6$ or greater alkenyl may be $C_{6-12}$ alkenyl, $C_{11-20}$ alkenyl, $C_{18-30}$ alkenyl, or $C_{20-40}$ alkenyl; wherein each alkyl portion independently may be branched or unbranched, linear or cyclic, saturated or unsaturated, and may be optionally substituted with one or more halogens, $C_{1-6}$ alkoxy groups, or poly (ethylene glycol); wherein each alkenyl portion independently may be branched or unbranched, linear or cyclic, mono- or poly-unsaturated, conjugated or unconjugated, and may be optionally substituted with one or more halogens, $C_{1-6}$ alkoxy groups, or poly(ethylene glycol).

In certain embodiments, the vinyl ether represented by Formula (IV) may include, but is not limited to, a $C_2$ or greater alkyl vinyl ether; $C_{2-40}$ alkyl vinyl ether; $C_6$ or greater alkyl vinyl ether; $C_{12}$ or greater alkyl vinyl ether; $C_{18}$ or greater alkyl vinyl ether; $C_3$ or greater alkenyl vinyl ether; $C_4$ or greater alkenyl vinyl ether; $C_6$ or greater alkenyl vinyl ether; $C_{6-40}$ alkenyl vinyl ether; $C_8$ or greater alkenyl vinyl ether; $C_{10}$ or greater alkenyl vinyl ether; $C_{12}$ or greater alkenyl vinyl ether; $C_{14}$ or greater alkenyl vinyl ether; or $C_{18}$ or greater alkenyl vinyl ether. In certain embodiments, $R^8$ of the vinyl ether represented by Formula (IV) may include, but is not limited to, a saturated fatty alkyl moiety, such as a tridecyl, isotridecyl, myristyl, pentadecyl, cetyl, palmityl, heptadecyl, stearyl, nonadecyl, arachidyl, heneicosyl, behenyl, lignoceryl, ceryl (heptacosanyl), montanyl, nonacosanyl, myricyl, dotriacontanyl, geddyl, or cetostearyl moiety. In certain embodiments, $R^8$ of the vinyl ether represented by Formula (IV) may include, but is not limited to, an unsaturated fatty alkyl moiety comprising either a mono- or poly unsaturated fatty alkyl moiety, such as di-, tri, tetra, penta, or hexa-unsaturated fatty alkyl moiety. In certain embodiments, the unsaturated fatty alkyl moiety may comprise: myristoleyl, palmitoleyl, sapienyl, oleyl, elaidyl, vaccenyl, linoleyl, linoelaidyl, α-linolenyl, arachidonyl, eicosapentaenoyl, erucyl, or docosahexaenoyl moiety.

In certain embodiments, $R^8$ of the vinyl ether represented by Formula (IV) may include, but is not limited to, a —$C_2$ or greater alkyl-(O—$C_{1-6}$ alkyl)$_n$, or $C_3$ or greater alkenyl-(O—$C_{1-6}$ alkyl)$_n$; wherein the —$C_2$ or greater alkyl may be $C_{2-6}$ alkyl, $C_{6-12}$ alkyl, $C_{11-20}$ alkyl, $C_{18-30}$ alkyl, or $C_{20-40}$ alkyl; wherein the —$C_3$ or greater alkenyl may be $C_{3-6}$ alkenyl $C_{6-12}$ alkenyl, $C_{11-20}$ alkenyl, $C_{18-30}$ alkenyl, or $C_{20-40}$ alkenyl; wherein each alkyl portion independently may be branched or unbranched, linear or cyclic, saturated or unsaturated, and may be optionally substituted with one or more halogens, $C_{1-6}$ alkoxy groups, or poly(ethylene glycol); wherein each alkenyl portion independently may be branched or unbranched, linear or cyclic, mono- or poly-unsaturated, conjugated or unconjugated, and may be optionally substituted with one or more halogens, $C_{1-6}$ alkoxy groups, or poly(ethylene glycol).

In certain embodiments, the surfactant-system thickening monomer represented by Formula (V) may include, but is not limited to, $C_1$ or greater alkyl allyl ether; $C_{1-40}$ alkyl allyl ether; $C_4$ or greater alkyl allyl ether; $C_6$ or greater alkyl allyl ether; $C_8$ or greater alkyl allyl ether; $C_{10}$ or greater alkyl allyl ether; $C_{12}$ or greater alkyl allyl ether; $C_{18}$ or greater alkyl allyl ether; $C_3$ or greater alkenyl allyl ether; $C_6$ or greater alkenyl allyl ether; $C_8$ or greater alkenyl allyl ether; $C_{10}$ or greater alkenyl allyl ether; $C_{12}$ or greater alkenyl allyl ether; $C_{14}$ or greater alkenyl allyl ether; or $C_{18}$ or greater alkenyl allyl ether. In certain embodiments, $R^9$ of the surfactant-system thickening monomer represented by Formula (V) may include, but is not limited to, a saturated fatty alkyl moiety, such as a tridecyl, isotridecyl, myristyl, pentadecyl, cetyl, palmityl, heptadecyl, stearyl, nonadecyl, arachidyl, heneicosyl, behenyl, lignoceryl, ceryl (heptacosanyl), montanyl, nonacosanyl, myricyl, dotriacontanyl, geddyl, or cetostearyl moiety. In certain embodiments, $R^9$ of the surfactant-system thickening monomer represented by Formula (V) may include, but is not limited to, an unsaturated fatty alkyl moiety comprising either a mono- or poly unsaturated fatty alkyl moiety, such as di-, tri, tetra, penta, or hexa-unsaturated fatty alkyl moiety. In certain embodiments, the unsaturated fatty alkyl moiety may comprise: myristoleyl, palmitoleyl, sapienyl, oleyl, elaidyl, vaccenyl, linoleyl, linoelaidyl, α-linolenyl, arachidonyl, eicosapentaenoyl, erucyl, or docosahexaenoyl moiety.

In certain embodiments, $R^9$ of the surfactant-system thickening monomer represented by Formula (V) may include, but is not limited to, a —$C_1$ or greater alkyl-(O—$C_{1-6}$ alkyl)$_n$, or $C_3$ or greater alkenyl-(O—$C_{1-6}$ alkyl)$_n$; wherein the —$C_1$ or greater alkyl may be $C_{1-6}$ alkyl, $C_{6-12}$ alkyl, $C_{11-20}$ alkyl, $C_{18-30}$ alkyl, or $C_{20-40}$ alkyl; wherein the —$C_3$ or greater alkenyl may be $C_{3-6}$ alkenyl $C_{6-12}$ alkenyl, $C_{11-20}$ alkenyl, $C_{18-30}$ alkenyl, or $C_{20-40}$ alkenyl; wherein each alkyl portion independently may be branched or unbranched, linear or cyclic, saturated or unsaturated, and may be optionally substituted with one or more halogens, $C_{1-6}$ alkoxy groups, or poly(ethylene glycol); wherein each alkenyl portion independently may be branched or unbranched, linear or cyclic, mono- or poly-unsaturated, conjugated or unconjugated, and may be optionally substituted with one or more halogens, $C_{1-6}$ alkoxy groups, or poly(ethylene glycol).

In certain embodiments, the variable $R^4$, $R^5$, $R^7$, $R^8$, or $R^9$ of the surfactant-system thickening monomer to be employed in the preparation of the surfactant-system thickening polymeric segment P2, optionally with $L^1$, $L^2$, or $L^1$ and $L^2$, may be independently derived or prepared from the hydrophobic portion of a surfactant, the hydrophobic portion of a lipid, or the hydrophobic portion of a fatty alcohol. For example, selection of the variable $R^4$, $R^5$, $R^7$, $R^8$, or $R^9$, optionally with $L^1$, $L^2$, or $L^1$ and $L^2$, may be determined by the particular surfactant mixture, solution, or system to be thickened by the surfactable-compatible star macromolecule or polymer. In certain embodiments, the hydrophobic portion of the surfactant that is included in the particular surfactant mixture, solution, or system to be thickened may be selected as the variable $R^4$, $R^5$, $R^7$, $R^8$, or $R^9$ of Formulas (I)-(V) for the one or more of the surfactant-compatible-enhancing monomers to be employed in preparing the surfactant-compatible-enhancing polymeric segment P2.

In certain embodiments, the variable $L^2$ may independently represent $(CH_2)_{1-40}$, such as $(CH_2)_{1-10}$, $(CH_2)_{10-20}$, $(CH_2)_{18-30}$, $(CH_2)_{20-40}$, $(CH_2)_{1-4}$, $(CH_2)_{3-8}$, or $(CH_2)_{5-10}$; $C_{1-40}$ alkyl, such as $C_{1-10}$ alkyl, $C_{10-20}$ alkyl, $C_{18-30}$ alkyl, $C_{20-40}$ alkyl, $C_{1-4}$ alkyl, $C_{3-8}$ alkyl, or $C_{5-10}$ alkyl; (O—$C_{2-6}$ alkyl)$_n$; or ($C_{2-6}$ alkyl)-(O—$C_{2-6}$ alkyl)$_n$; wherein the alkyl may be branched or unbranched, linear or cyclic, and may be optionally substituted with one or more halogens, $C_{1-6}$ alkoxy groups, or poly(ethylene glycol); and where n independently represents a value in the range of 1-1000, such as a value in the range of 1-100, 20-80, 50-500, 350-750, 200-400, or 600-1000.

In certain embodiments, suitable surfactant-system thickening monomers that may be used to form a surfactant-system thickening polymeric segment, for example, to form polymeric segment P2, may include, but are not limited to, poly(ethylene glycol) behenyl ether methacrylate; 10-undecenyl methacrylate, lauryl acrylate, tridecyl acrylate, hexadecyl acrylate, stearyl acrylate, behenyl acrylate, lauryl methacrylate, tridecyl methacrylate, hexadecyl methacrylate, stearyl methacrylate, behenyl methacrylate, lauryl ethacrylate, tridecyl ethacrylate, hexadecyl ethacrylate, stearyl ethacrylate, poly(propylene glycol) acrylate, poly (ethylene glycol) methyl ether acrylate, poly(propylene glycol) 4-nonylphenyl ether acrylate, poly(ethylene glycol) phenyl ether acrylate, poly(propylene glycol) methyl ether acrylate, poly(ethylene glycol) methacrylate, poly(ethylene glycol) methyl ether methacrylate, poly(ethylene glycol) behenyl ether methacrylate, N-octadecyl acrylamide, N-dodecyl methacrylamide, styrene optionally substituted with one or more $C_1$-$C_{18}$ straight or branched chain alkyl groups; vinyl decanoate, vinyl neodecanoate, vinyl neononanoate, vinyl laurate, vinyl stearate, allyl heptafluorobutyrate, allyl heptafluoroisopropyl ether, allyl 1H,1H-pentadecafluorooctyl ether, allylpentafluorobenzene, allyl perfluoroheptanoate, allyl perfluorononanoate, allyl perfluorooctanoate, allyl tetrafluoroethyl ether, allyl trifluoroacetate, bis(hexafluoroisopropyl) itaconate, bis(hexafluoroisopropyl) maleate, bis(perfluorooctyl)itaconate, bis(perfluorooctyl)maleate, bis (trifluoroethyl) itaconate, bis(2,2,2-trifluoroethyl) maleate, 2-(N-butylperfluorooctanesulfamido) ethyl acrylate, trihydroperfluoroheptyl acrylate, trihydroperfluoroheptyl methacrylate, trihydroperfluoroundecyl acrylate, trihydroperfluoroundecyl methacrylate, 2-(N-ethylperfluorooctane sulfamido) ethyl acrylate, 2-(N-ethylperfluorooctane sulfamido) ethyl methacrylate, 2-fluoroethyl acrylate, 2-fluoroethyl methacrylate, tetrahydroperfluorodecyl acrylate, tetrahydroperfluorodecyl methacrylate, 1H,1H-heptafluorobutylacrylamide, heptafluorobutyl acrylate, 1H,1H-heptafluorobutylmethacrylamide, 1H,1H-heptafluoro-n-butyl methacrylate, 1H,1H,9H-hexadecafluorononyl acrylate, 1H,1H,9H-hexadecafluorononyl methacrylate, 2,2,3,4,4,4-hexafluorobutyl acrylate, 2,2,3,4,4,4-hexafluorobutyl methacrylate, 1H,1H,5H-octafluoropentyl acrylate, 1H,1H,5H-octafluoropentyl methacrylate, pentafluorobenzyl acrylate, pentafluorobenzyl methacrylate, pentafluorophenyl acrylate, pentafluorophenyl methacrylate, 2,2,3,3,3-pentafluoropropyl acrylate, 2,2,3,3,3-pentafluoropropyl methacrylate, 3,3,4,4,5,5,6,6,7,7,8,8,9,9,10,10,10-Heptadecafluorodecyl methacrylate, 3,3,4,4,5,5,6,6,7,7,8,8,9,9,10,10,11,11,12,12,12-Heneicosafluorododecyl methacrylate, perfluorocyclohexyl-1,4-dimethyl dimethacrylate, perfluorocyclohexyl methyl acrylate, perfluorocyclohexylmethyl methacrylate, perfluorocyclopentene, perfluoroheptoxypoly(propyloxy) acrylate, perfluoroheptoxypoly-(propyloxy) methacrylate, perfluorooctoxy-poly(iso-butoxy)-2-chloropropoxy-1,2-propyl diacrylate, mono-perfluorooctyl maleate, mono-perfluorooctyl itaconate, perfluorooctyl acrylate, 1H,1H-perfluorooctyl acrylate, 1H,1H-perfluorooctyl methacrylate, polyperfluoroethylene glycol diacrylate, polyperfluoroethylene glycol dimethacrylate, 2,2,3,3-tetrafluoro-1,4-butanediol diacrylate, 2,2,3,3-tetrafluoro-1,4-butanediol dimethacrylate, 2,2,3,3-tetrafluoropropyl acrylate, 2,2,3,3-tetrafluoropropyl methacrylate, 1,1,5,5-tetrahydroperfluoro-1,5-pentanediol dimethacrylate, trifluoroethyl acid itaconate, mono-trifluoroethyl acid maleate, 2,2,2-trifluoroethyl acrylate, 2,2,2-trifluoroethyl methacrylate, 3-(trifluoromethyl) benzyl acrylate, 3-(trifluoromethyl) benzyl methacrylate, 1-(trifluoromethyl) vinyl acetate, 4-vinylbenzyl hexafluoroisopropyl ether, 4-vinylbenzyl perfluorooctanoate, vinyl heptafluorobutyrate, vinyl perfluoroheptanoate, vinyl perfluorononanoate, vinyl perfluorooctanoate, vinyl trifluoroacetate, hexafluoroisopropyl itaconate, hexafluoroisopropyl methacrylate and mixtures thereof.

In certain embodiments, a suitable surfactant-system thickening polymeric segment, such as P2 or a further segment, may include a portion represented by Formula E:

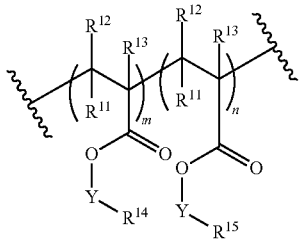

Formula E wherein:
- $R^{11}$, $R^{12}$, $R^{13}$ independently represent hydrogen, methyl, ethyl, or $C_{3-18}$ alkyl, for example $C_{3-6}$ alkyl, $C_{6-12}$ alkyl, or $C_{12-18}$ alkyl; wherein the alkyl may be branched or unbranched, linear or cyclic, and may be optionally substituted with one or more halogens, $C_{1-6}$ alkoxy groups, or poly(ethylene glycol);
- $R^{14}$ independently represents $C_{1-12}$ hydrocarbyl, —$C_{1-12}$ hydrocarbyl-(O—$C_{1-6}$ hydrocarbyl)$_w$, —$C_{1-12}$ hydrocarbyl-((CO)O—$C_{1-6}$ hydrocarbyl)$_w$, —$C_{1-12}$ hydrocarbyl-((CO)NH—$C_{1-6}$ hydrocarbyl)$_w$; wherein each hydrocarbyl portion independently may be branched or unbranched, linear or cyclic, saturated (alkyl) or unsaturated (alkenyl), and may be optionally substituted with one or more halogens, $C_{1-6}$ alkoxy groups, or poly(ethylene glycol);
- $R^5$ independently represents $C_{13-40}$ hydrocarbyl, —$C_{13-40}$ hydrocarbyl-(O—$C_{1-6}$ hydrocarbyl)$_w$, —$C_{13-40}$ hydrocarbyl-((CO)O—$C_{1-6}$ hydrocarbyl)$_w$, $C_{13-40}$ hydrocarbyl-((CO)NH—$C_{1-6}$ alkyl)$_w$; wherein each hydrocarbyl portion independently may be branched or unbranched, linear or cyclic, saturated (alkyl) or unsaturated (alkenyl), and may be optionally substituted with one or more halogens, $C_{1-6}$ alkoxy groups, or poly(ethylene glycol); or a hydrophobic moiety of a surfactant, a hydrophobic moiety of a lipid, or a hydrophobic moiety of a fatty alcohol;
- Y represents a covalent bond, ethylene glycol, poly(ethylene glycol), polyether, polyamide, $C_{1-6}$ alkyl, or combinations thereof, or is independently absent;
- m independently represents a value in the range of 1-500;
- n independently represents a value in the range of 1-500; and
- w independently represents a value in the range of 1-1000.

In certain embodiments, $R^{11}$, $R^{12}$, and $R^{13}$ in the portion represented by Formula E may independently represent hydrogen, methyl, ethyl, or $C_{3-18}$ alkyl, for example $C_{3-6}$ alkyl, $C_{6-12}$ alkyl, or $C_{12-18}$ alkyl; wherein the alkyl may be branched or unbranched, linear or cyclic. In certain embodiments, $R^{11}$, $R^{12}$, and $R^{13}$ may independently represent hydrogen or methyl. In certain embodiments, $R^{11}$, $R^{12}$, and $R^{13}$ may independently represent $C_{3-6}$ alkyl, $C_{6-12}$ alkyl, or $C_{12-18}$ alkyl; wherein the alkyl may be branched or unbranched, linear or cyclic, and may be optionally substituted with one or more halogens, $C_{1-6}$ alkoxy groups, or poly(ethylene glycol).

In certain embodiments, $R^{14}$ in the portion represented by Formula E may independently represent $C_{1-12}$ hydrocarbyl, —$C_{1-12}$ hydrocarbyl-(O—$C_{1-6}$ hydrocarbyl)$_w$, —$C_{1-12}$ hydrocarbyl-((CO)O—$C_{1-6}$ hydrocarbyl)$_w$, —$C_{1-12}$ hydrocarbyl-((CO)NH—$C_{1-6}$ hydrocarbyl)$_w$; wherein the $C_{1-12}$ hydrocarbyl portion may represent $C_{1-12}$ alkyl, for example, methyl, ethyl, $C_{3-12}$ alkyl, $C_{3-6}$ alkyl, $C_{6-12}$ alkyl, or $C_{4-8}$ alkyl, or may represent $C_{3-12}$ alkenyl, for example, $C_{3-6}$ alkenyl, $C_{6-12}$ alkenyl, or $C_{4-8}$ alkenyl; wherein the $C_{1-6}$ hydrocarbyl portion may represent $C_{1-6}$ alkyl, for example, methyl, ethyl, or $C_{3-6}$ alkyl, or may represent $C_{3-6}$ alkenyl, for example, $C_{4-6}$ alkenyl; wherein the alkyl may be branched or unbranched, linear or cyclic, and may be optionally substituted with one or more halogens, $C_{1-6}$ alkoxy groups, or poly(ethylene glycol); wherein the alkenyl portion independently may be branched or unbranched, linear or cyclic, mono- or poly-unsaturated, conjugated or unconjugated, and may be optionally substituted with one or more halogens, $C_{1-6}$ alkoxy groups, or poly(ethylene glycol); and wherein w independently represents a value in the range of 1-1000, such as a value in the range of 1-100, 20-80, 50-500, 350-750, 200-400, or 600-1000.

In certain embodiments, $R^{15}$ in the portion represented by Formula E may independently represent $C_{13-40}$ hydrocarbyl, —$C_{13-40}$ hydrocarbyl-(O—$C_{1-6}$ hydrocarbyl)$_w$, —$C_{13-40}$ hydrocarbyl-((CO)O—$C_{1-6}$ hydrocarbyl)$_w$, $C_{13-40}$ hydrocarbyl-((CO)NH—$C_{1-6}$ alkyl)$_w$; wherein the $C_{13-40}$ hydrocarbyl portion may represent $C_{13-40}$ alkyl, for example, $C_{13-18}$ alkyl, $C_{13-20}$ alkyl, $C_{18-30}$ alkyl, or $C_{30-40}$ alkyl, or may represent $C_{13-40}$ alkenyl, for example, $C_{13-18}$ alkenyl, $C_{13-20}$ alkenyl, $C_{18-30}$ alkenyl, or $C_{30-40}$ alkenyl; wherein the $C_{1-6}$ hydrocarbyl portion may represent $C_{1-6}$ alkyl, for example, methyl, ethyl, or $C_{3-6}$ alkyl, or may represent $C_{3-6}$ alkenyl, for example, $C_{4-6}$ alkenyl; wherein the alkyl may be branched or unbranched, linear or cyclic, and may be optionally substituted with one or more halogens, $C_{1-6}$ alkoxy groups, or poly(ethylene glycol); wherein the alkenyl portion independently may be branched or unbranched, linear or cyclic, mono- or poly-unsaturated, conjugated or unconjugated, and may be optionally substituted with one or more halogens, $C_{1-6}$ alkoxy groups, or poly(ethylene glycol); and wherein w independently represents a value in the range of 1-1000, such as a value in the range of 1-100, 20-80, 50-500, 350-750, 200-400, or 600-1000.

In certain embodiments, the variable m in the portion represented by Formula E independently represents a value in the range of 1-500, such as a value in the range of 1-100, 20-80, 50-500, 350-500, 200-400, or 100-250.

In certain embodiments, the variable n in the portion represented by Formula E independently represents a value in the range of 1-500, such as a value in the range of 1-100, 20-80, 50-500, 350-500, 200-400, or 100-250.

Suitable star macromolecules may comprise polymeric arms that are of the same type or a different type and are homopolymeric, copolymeric, comprise multiple block segments, comprise multiple blocky segments, random segments, gradient segments, or no particular segments. In certain embodiments, the star macromolecule may comprise, for example, one or more arm-types, such as, two or more, three or more, four or more, or five or more arm-types. Suitable arm types may include, but are not limited to, homopolymeric arms, copolymeric arms, such as random copolymeric arms, block copolymeric arms, or blocky copolymeric arms, or combinations thereof. For example, a star macromolecule may comprise homopolymeric arms and copolymeric arms, such as block copolymeric arms. Suitable arm types may also include, but are not limited to, surfactant-system thickening arms, hydrophilic arms, hydrophobic arms, micelle-philic arms, or amphiphilic arms. In certain embodiments, a star macromolecule arm may comprise hydrophilic polymeric segments comprising hydrophilic monomeric residues, surfactant-system thickening segments comprising surfactant-system thickening monomeric residues, micelle-philic segments comprising micelle-philic monomeric residues, hydrophobic polymeric segments comprising hydrophobic monomeric residues, amphiphilic polymeric segments comprising amphiphilic monomeric residues, or combinations thereof. For example, in certain embodiments, a star macromolecule may comprise homopolymeric arms and copolymeric arms, such as hydrophilic homopolymeric arms, copolymeric arms comprising hydrophilic polymeric segments and surfactant-system thickening polymeric segments, and copolymeric arms comprising hydrophilic polymeric segments and hydrophobic polymeric segments.

Suitable star macromolecules may comprise hydrophilic polymeric segments, such as P1, P3, or P5, which may comprise a hydrophilic homopolymeric segment or a hydrophilic copolymeric segment comprising repeat units of monomeric residues of one or more, such as two or more, polymerized hydrophilic monomers, for example, a hydrophilic segment block copolymeric segment, a hydrophilic segment blocky copolymeric segment, a hydrophilic gradient copolymeric segment, or a hydrophilic random copolymeric segment.

Suitable star macromolecules may comprise surfactant-system thickening polymeric segments, such as P2, which may comprise a surfactant-system thickening homopolymerized segment or a surfactant-system thickening copolymerized segment comprising repeat units of monomeric residues of one or more, such as two or more, polymerized surfactant-system thickening monomers, and optionally, monomeric residues of one or more, such as two or more, polymerized hydrophobic or hydrophilic monomers. The surfactant-system thickening copolymerized segment may be a surfactant-system thickening segment block copolymeric segment, a surfactant-system thickening gradient copolymeric segment, or a surfactant-system thickening random copolymeric segment. In certain embodiments, the monomeric residues of the one or more, or two or more, polymerized hydrophobic or hydrophilic monomers are present in the surfactant-system thickening copolymeric segment. For example, the surfactant-system thickening copolymerized segment may be block, blocky, gradient, or random copolymeric segment comprising repeat units of monomeric residues of one or more, such as two or more, polymerized surfactant-system thickening monomers, and monomeric residues of one or more, such as two or more, polymerized hydrophobic monomers. For example, the surfactant-system thickening copolymerized segment may be block, blocky, gradient, or random copolymeric segment comprising repeat units of monomeric residues of one or more, such as two or more, polymerized surfactant-system thickening monomers, and monomeric residues of one or more, such as two or more, polymerized hydrophilic monomers. In certain embodiments, the surfactant-system thickening copolymerized segment may be block, blocky, gradient, or random copolymeric segment comprising repeat units of monomeric residues of one or more, such as two or more, polymerized surfactant-system thickening monomers, and monomeric residues of one or more, such as two or more, polymerized hydrophobic monomers, and monomeric residues of one or more, such as two or more, polymerized hydrophilic monomers.

Suitable star macromolecules may comprise hydrophobic polymeric segments, such as P4, which may comprise a hydrophobic homopolymeric segment or a hydrophobic copolymeric segment comprising repeat units of monomeric residues of one or more, such as two or more, polymerized hydrophobic monomers, for example, a hydrophobic segment block copolymeric segment, a hydrophobic segment blocky copolymeric segment, a hydrophobic gradient copolymeric segment, or a hydrophobic random copolymeric segment.

Suitable star macromolecules may comprise arms, for example, polymeric arms, covalently linked to the core of the star macromolecule. In certain embodiments, the arms of a star macromolecule may be covalently linked to the core of the star macromolecule via crosslinking, such as crosslinking with a crosslinker, for example, a hydrophobic difunctional crosslinker or a hydrophilic difunctional crosslinker. For example, arms of a star macromolecule, such as homopolymeric arms and block or blocky copolymeric arms of a mikto star macromolecule, may be covalently linked together to form a core by crosslinking an end of the arms with a crosslinker, such as with a hydrophobic difunctional crosslinker or a hydrophilic difunctional crosslinker.

Suitable star macromolecules may comprise arms of varying length and/or degree of polymerization. In certain embodiments, for example, a star macromolecule may comprise homopolymeric arms and block or blocky copolymeric arms, wherein the homopolymeric arms of a shorter length and/or a lesser degree of polymerization in relation to the block or blocky copolymeric arms. In certain embodiments, for example, a star macromolecule may comprise homopolymeric arms and block copolymeric arms, wherein the block or blocky copolymeric arms of a longer length and/or a greater degree of polymerization in relation to the homopolymeric arms. In certain embodiments, a star macromolecule may comprise hydrophilic homopolymeric arms and block copolymeric arms, comprising (i) hydrophobic polymeric segments distal to the star core and hydrophilic polymeric segments that are proximal to the core of the star, wherein a distal portion of the hydrophobic polymeric segments of the copolymeric arm extends beyond a distal portion of the hydrophilic homopolymeric arms, and (ii) surfactant-system thickening polymeric segments distal to the star core and hydrophilic polymeric segments that are proximal to the core of the star, wherein a distal portion of the surfactant-system thickening polymeric segments of the copolymeric arm extends beyond a distal portion of the hydrophilic homopolymeric arms. For example, a star macromolecule may comprise hydrophilic homopolymeric arms comprising polymerized hydrophilic monomeric residues and block copolymeric arms comprising (i) hydrophobic polymeric segments distal to the core of the star and hydrophilic polymeric segments that are proximal to the core of the star, wherein the distal hydrophobic polymeric segments extend beyond the most distal portion, in relation to the core, of the hydrophilic homopolymeric arms, and/or wherein a distal portion of the proximal hydrophilic polymeric segments of the copolymeric arm extend beyond the most distal portion, in relation to the core, of the hydrophilic homopolymeric arms, (ii) surfactant-system thickening polymeric segments distal to the core of the star and hydrophilic polymeric segments that are proximal to the core of the star, wherein the distal surfactant-system thickening polymeric segments extend beyond the most distal portion, in relation to the core, of the hydrophilic homopolymeric arms, and/or wherein a distal portion of the proximal hydrophilic polymeric segments of the copolymeric arm extend beyond the most distal portion, in relation to the core, of the hydrophilic homopolymeric arms.

In certain embodiments, a star macromolecule may comprise hydrophilic homopolymeric arms and block or blocky copolymeric arms, comprising (i) hydrophobic polymeric segments distal to the star core and hydrophilic polymeric segments that are proximal to the star core, wherein the degree of polymerization of the hydrophilic polymeric segments of the copolymeric arms are greater than, for example, greater than 20%, such as between 30% to 300%, between 40% to 250%, between 50% to 200%, between 75% to 250%, or between 100% to 500%, the degree of polymerization of the hydrophilic homopolymeric arms, such that a distal portion of the hydrophilic polymeric segments of the copolymeric arm extends beyond the a distal portion of the hydrophilic homopolymeric arms, and (ii) surfactant-system thickening polymeric segments distal to the star core and hydrophilic polymeric segments that are proximal to the star core, wherein the degree of polymerization of the hydrophilic polymeric segments of the copolymeric arms are greater than, for example, greater than 20%, such as between 30% to 300%, between 40% to 250%, between 50% to 200%, between 75% to 250%, or between 100% to 500%, the degree of polymerization of the hydrophilic homopolymeric arms, such that a distal portion of the hydrophilic polymeric segments of the copolymeric arms extends beyond the a distal portion of the hydrophilic homopolymeric arms.

In certain embodiments, a suitable star macromolecules may comprise a core and a plurality of polymeric arms, wherein the plurality of polymeric arms comprises: (i) at least a first polymeric arm comprising a hydrophilic polymeric segment, (ii) at least a second polymeric arm comprising a surfactant-system thickening polymeric segment distal to the core of the star and a hydrophilic polymeric segment proximal to the core of the star, and optionally (iii) at least a third polymeric arm comprising a hydrophobic polymeric segment distal to the core of the star and a hydrophilic polymeric segment proximal to the core of the star. One or more of the plurality of polymeric arms may be homopolymeric, copolymeric, block copolymeric, blocky copolymeric, gradient copolymeric, or random copolymeric polymeric arms, and may have the same or different degrees of polymerization. One or more of the polymeric segments within the plurality of polymeric arms may be homopolymeric, copolymeric, block copolymeric, blocky copolymeric, gradient copolymeric, or random copolymeric polymeric segments, and may have the same or different degrees of polymerization.

In certain embodiments, the hydrophilic polymeric segment of the at least first polymeric arm may be comprised of a plurality of monomeric residues of polymerized hydrophilic monomers, wherein the hydrophilic polymeric segment may have the same or different degree of polymerization and may be comprised of in the range of between 5 to 2000 monomeric residues of polymerized hydrophilic monomers, such as between 10 to 2000; between 50 to 500; between 50 to 400; between 50 to 300; between 50 to 200; between 100 to 250; between 125 to 175; between 150 to 300; between 300 to 800; between 400 to 800; between 500 to 800; between 600 to 800; between 600 to 1000; between 800 to 1500; between 1000 to 2000; between 1500 to 2000; or between 550 to 1000 monomeric residues.

In certain embodiments, the surfactant-system thickening polymeric segment of the at least second polymeric arm may be comprised of a plurality of monomeric residues of polymerized surfactant-system thickening monomers, wherein the surfactant-system thickening polymeric segment may have the same or different degree of polymerization and may be comprised of in the range of between 1 to 500 monomeric residues of polymerized surfactant thickening monomers, such as between 1 to 450; between 1 to 400; between 1 to 350; between 10 to 425; between 10 to 500; between 10 to 400; between 10 to 300; between 10 to 200; between 10 to 100; between 10 to 75; between 10 to 50; between 10 to 40; between 10 to 30; between 10 to 20; between 10 to 15; between 15 to 25; between 20 to 30; between 20 to 40; between 20 to 50; between 20 to 250; between 30 to 200; between 50 to 200; between 50 to 100; between 200 to 400; between 150 to 300; between 300 to 500; between 250 to 450; between 50 to 150; between 1 to 10; between 5 to 15; between 7 to 30; between 1 to 60; between 1 to 50; between 1 to 45; between 5 to 40; between 8 to 35; between 10 to 30; between 12 to 25; between 14 to 22; between 15 to 30; between 17 to 35; or between 5 to 20 monomeric residues. In certain embodiments, the hydrophilic polymeric segment of the at least second polymeric arm may be comprised of a plurality of monomeric residues of polymerized hydrophilic monomers, wherein the hydrophilic polymeric segment may have the same or different degree of polymerization and may be comprised of in the range of between 10 to 5000 monomeric residues of polymerized hydrophilic monomers, such as between 10 to 4000; between 10 to 3000; between 10 to 2000; between 10 to 1000; between 10 to 500; between 50 to 500; between 50 to 400; between 50 to 300; between 50 to 200; between 100 to 250; between 125 to 175; between 150 to 300; between 300 to 800; between 400 to 800; between 500 to 800; between 600 to 800; between 600 to 1000; between 800 to 1500; between 1000 to 2000; between 1500 to 2000; between 2000 to 5000; between 2500 to 4500; between 3000 to 5000; or between 550 to 1000 monomeric residues.

In certain embodiments, the hydrophobic polymeric segment of the at least third polymeric arm may be comprised of a plurality of monomeric residues of polymerized hydrophobic monomers, wherein the surfactant-system thickening polymeric segment may have the same or different degree of polymerization and may be comprised of in the range of between 1 to 500 monomeric residues of polymerized hydrophobic monomers, such as between 1 to 450; between 1 to 400; between 1 to 350; between 10 to 425; between 10 to 500; between 10 to 400; between 10 to 300; between 10 to 200; between 10 to 100; between 10 to 75; between 10 to 50; between 10 to 40; between 10 to 30; between 10 to 20; between 10 to 15; between 15 to 25; between 20 to 30; between 20 to 40; between 20 to 50; between 20 to 250; between 30 to 200; between 50 to 200; between 50 to 100; between 200 to 400; between 150 to 300; between 300 to 500; between 250 to 450; between 50 to 150; between 1 to 10; between 5 to 15; between 7 to 30; between 1 to 60; between 1 to 50; between 1 to 45; between 5 to 40; between 8 to 35; between 10 to 30; between 12 to 25; between 14 to 22; between 15 to 30; between 17 to 35; or between 5 to 20 monomeric residues. In certain embodiments, the hydrophilic polymeric segment of the at least third polymeric arm may be comprised of a plurality of monomeric residues of polymerized hydrophilic monomers, wherein the hydrophilic polymeric segment may have the same or different degree of polymerization and may be comprised of in the range of between 10 to 5000 monomeric residues of polymerized hydrophilic monomers, such as between 10 to 4000; between 10 to 3000; between 10 to 2000; between 10 to 1000; between 10 to 500; between 50 to 500; between 50 to 400; between 50 to 300; between 50 to 200; between 100 to 250; between 125 to 175; between 150 to 300; between 300 to 800; between 400 to 800; between 500 to 800; between 600 to 800; between 600 to 1000; between 800 to 1500; between 1000 to 2000; between 1500 to 2000; between 2000 to 5000; between 2500 to 4500; between 3000 to 5000; or between 550 to 1000 monomeric residues.

In certain embodiments, the polymeric segment may comprise in the range of between 5-100% of the monomeric residues of one or more polymerized monomers, for example, between 5-95%, such as between 5-90%; between 5-80%; between 5-75%; between 5-70%; between 5-60%; between 5-50%; between 5-40%; between 5-35%; between 5-30%; between 5-25%; between 5-20%; between 5-15%; between 5-10%; between 25-75%; between 50-100%; between 35-65%; or between 10-40% of the monomeric residues of one or more polymerized monomers.

In certain embodiments, the number of monomeric residues in P1 of a suitable star macromolecule may be represented by q1, and may have a value in the range of between 5 to 2000 monomeric residues, such as between 10 to 2000; between 50 to 500; between 50 to 400; between 50 to 300; between 50 to 200; between 100 to 250; between 125 to 175; between 150 to 300; between 300 to 800; between 400 to 800; between 500 to 800; between 600 to 800; between 600 to 1000; between 800 to 1500; between 1000 to 2000; between 1500 to 2000; or between 550 to 1000 monomeric residues.

In certain embodiments, the number of monomeric residues in P2 of a suitable star macromolecule may be represented by q2, and may have a value in the range of between 1 to 500 monomeric residues, such as between 1 to 450; between 1 to 400; between 1 to 350; between 10 to 425; between 10 to 500; between 10 to 400; between 10 to 300; between 10 to 200; between 10 to 100; between 10 to 75; between 10 to 50; between 10 to 40; between 10 to 30; between 10 to 20; between 10 to 15; between 15 to 25; between 20 to 30; between 20 to 40; between 20 to 50; between 20 to 250; between 30 to 200; between 50 to 200; between 50 to 100; between 200 to 400; between 150 to 300; between 300 to 500; between 250 to 450; between 50 to 150; between 1 to 10; between 5 to 15; between 7 to 30; between 1 to 60; between 1 to 50; between 1 to 45; between 5 to 40; between 8 to 35; between 10 to 30; between 12 to 25; between 14 to 22; between 15 to 30; between 17 to 35; or between 5 to 20 monomeric residues.

In certain embodiments, the number of monomeric residues in P3 of a suitable star macromolecule may be represented by q3, and may have a value in the range of between 10 to 5000 monomeric residues, such as between 10 to 4000; between 10 to 3000; between 10 to 2000; between 10 to 1000; between 10 to 500; between 50 to 500; between 50 to 400; between 50 to 300; between 50 to 200; between 100 to 250; between 125 to 175; between 150 to 300; between 300 to 800; between 400 to 800; between 500 to 800; between 600 to 800; between 600 to 1000; between 800 to 1500; between 1000 to 2000; between 1500 to 2000; between 2000 to 5000; between 2500 to 4500; between 3000 to 5000; or between 550 to 1000 monomeric residues.

In certain embodiments, the number of monomeric residues in P4 of a suitable star macromolecule may be represented by q4, and may have a value in the range of between 1 to 500 monomeric residues, such as between 1 to 450; between 1 to 400; between 1 to 350; between 5 to 500; between 5 to 300; between 5 to 100; between 10 to 425; between 10 to 500; between 10 to 400; between 10 to 300; between 10 to 200; between 10 to 100; between 10 to 75; between 10 to 50; between 10 to 40; between 10 to 30; between 10 to 20; between 10 to 15; between 15 to 25; between 20 to 30; between 20 to 40; between 20 to 50; between 20 to 250; between 30 to 100; between 30 to 50; between 30 to 200; between 50 to 200; between 50 to 100; between 200 to 400; between 150 to 300; between 300 to 500; between 250 to 450; between 50 to 150; between 1 to 10; between 5 to 15; between 7 to 30; between 1 to 60; between 1 to 50; between 1 to 45; between 5 to 40; between 8 to 35; between 10 to 30; between 12 to 25; between 14 to 22; between 15 to 30; between 17 to 35; or between 5 to 20 monomeric residues.

In certain embodiments, the number of monomeric residues in P5 of a suitable star macromolecule may be represented by q5, and may have a value in the range of between 10 to 5000 monomeric residues, such as between 10 to 4000; between 10 to 3000; between 10 to 2000; between 10 to 1000; between 10 to 500; between 50 to 500; between 50 to 400; between 50 to 300; between 50 to 200; between 100 to 250; between 125 to 175; between 150 to 300; between 300 to 800; between 400 to 800; between 500 to 800; between 600 to 800; between 600 to 1000; between 800 to 1500; between 1000 to 2000; between 1500 to 2000; between 2000 to 5000; between 2500 to 4500; between 3000 to 5000; or between 550 to 1000 monomeric residues.

Suitable star macromolecules may have a wide range of total number of arms, for example, a star macromolecule may comprise 5 arms or more. For example, a suitable star macromolecule may comprise a sum total of polymeric arms in the range of between 5 and 5000, such as between 10 to 5000; between 10 to 4000; between 10 to 3000; between 10 to 2000; between 10 to 1000; between 10 to 500; between 10 and 400; between 12 and 300; between 14 and 200; between 14 and 150; between 15 and 100; between 15 and 90; between 15 and 80; between 15 and 70; between 15 and 60; between 15 and 50; between 20 and 50; between 25 and 45; between 25 and 35; between 30 and 45; between 30 and 50; between 50 to 500; between 50 to 400; between 50 to 300; between 50 to 200; between 100 to 250; between 125 to 175; between 150 to 300; between 300 to 800; between 400 to 800; between 500 to 800; between 600 to 800; between 600 to 1000; between 800 to 1500; between 1000 to 2000; between 1500 to 2000; between 2000 to 5000; between 2500 to 4500; between 3000 to 5000; or between 550 to 1000 polymeric arms.

In certain embodiments, the at least first polymeric arms, for example, as provided in star macromolecules represented by Formulas A, B, C, or D, covalently attached to the core may be independently represented by r, and may have a value in the range of between 1 to 1000, such as between 2 and 1000; between 3 and 1000; between 4 and 1000; between 5 and 1000; between 10 to 1000; between 10 to 500; between 10 and 400; between 2 and 500; between 3 and 300; between 4 and 200; between 5 and 150; between 6 and 100; between 7 and 75; between 8 and 50; between 9 and 40; between 10 and 30; between 20 and 30; between 20 and 40; between 20 and 50; between 25 and 35; between 25 and 45; between 25 and 50; between 75 and 125; between 10 and 75; between 12 and 300; between 14 and 200; between 14 and 150; between 15 and 100; between 15 and 90; between 15 and 80; between 15 and 70; between 15 and 60; between 15 and 50; between 15 and 45; between 15 and 30; between 30 and 45; between 30 and 50; between 50 to 500; between 50 to 400; between 50 to 300; between 50 to 200; between 50 and 100; between 100 to 250; between 125 to 175; between 150 to 300; between 300 to 800; between 400 to 800; between 500 to 800; between 600 to 800; between 600 to 1000.

In certain embodiments, the at least second polymeric arms, for example, as provided in star macromolecules represented by Formulas A, B, C, or D, covalently attached to the core may be independently represented by s, and may have a value in the range of between 1 to 1000, such as between 2 and 1000; between 3 and 1000; between 4 and 1000; between 5 and 1000; between 10 to 1000; between 10 to 500; between 10 and 400; between 2 and 500; between 3 and 300; between 4 and 200; between 5 and 150; between 6 and 100; between 7 and 75; between 8 and 50; between 9 and 40; between 10 and 30; between 20 and 30; between 20 and 40; between 20 and 50; between 25 and 35; between 25 and 45; between 25 and 50; between 75 and 125; between 10 and 75; between 12 and 300; between 14 and 200; between 14 and 150; between 15 and 100; between 15 and 90; between 15 and 80; between 15 and 70; between 15 and 60; between 15 and 50; between 15 and 45; between 15 and 30; between 30 and 45; between 30 and 50; between 50 to 500; between 50 to 400; between 50 to 300; between 50 to 200; between 50 and 100; between 100 to 250; between 125 to 175; between 150 to 300; between 300 to 800; between 400 to 800; between 500 to 800; between 600 to 800; between 600 to 1000.

In certain embodiments, the at least third polymeric arms, for example, as provided in star macromolecules represented by Formulas B or D, covalently attached to the core may be independently represented by t, and may have a value in the range of between 0 to 1000, such as between 1 to 1000, between 2 and 1000; between 3 and 1000; between 4 and 1000; between 5 and 1000; between 10 to 1000; between 10 to 500; between 10 and 400; between 2 and 500; between 3 and 300; between 4 and 200; between 5 and 150; between 6 and 100; between 7 and 75; between 8 and 50; between 9 and 40; between 10 and 30; between 20 and 30; between 20 and 40; between 20 and 50; between 25 and 35; between 25 and 45; between 25 and 50; between 75 and 125; between 10 and 75; between 12 and 300; between 14 and 200; between 14 and 150; between 15 and 100; between 15 and 90; between 15 and 80; between 15 and 70; between 15 and 60; between 15 and 50; between 15 and 45; between 15 and 30; between 30 and 45; between 30 and 50; between 50 to 500; between 50 to 400; between 50 to 300; between 50 to 200; between 50 and 100; between 100 to 250; between 125 to 175; between 150 to 300; between 300 to 800; between 400 to 800; between 500 to 800; between 600 to 800; between 600 to 1000.

Suitable star macromolecules may have more than one arm type, such as two or more different arm types, where in a molar ratio of the different arm types may be between 40:1 and 1:40. In certain embodiments, a star macromolecule may comprise at least two different arm types, for example, at least a first polymeric arm, for example a hydrophilic polymeric arm or a polymeric arm represented by $[(P1)_{q1}]$, and at least a second polymeric arm, for example a polymeric arm comprising a surfactant-system thickening polymeric segment or a micelle-philic polymeric segment or a polymeric arm represented by $-[(P3)_{q3}-(P2)_{q2}]$, such as in star macromolecules represented by Formulas A or C, and the molar ratio of the two different arm types may be in the range of between 40:1 to 1:40; such as between 40:1 to 2:1, between 35:1 to 2:1; between 30:1 to 2:1; between 25:1 to 2:1; between 20:1 to 2:1; between 15:1 to 2:1; between 10:1 to 2:1; between 9:1 to 2:1; between 8:1 to 2:1; between 7:1 to 2:1; between 7:3 to 2:1; between 7:5 to 2:1; between 4:5 to 2:1; between 6:1 to 2:1; between 5:1 to 2:1; between 4:1 to 2:1; between 3:1 to 2:1; between 2:1 to 1:1; between 8:1 to 3:1; between 7:1 to 2:1; between 5:1 to 3:1; between 4:1 to 3:1; between 2:1 to 40:1; between 2:1 to 35:1; between 2:1 to 30:1; between 2:1 to 25:1; between 2:1 to 20:1; between 2:1 to 15:1; between 2:1 to 10:1; between 2:1 to 9:1; between 2:1 to 8:1; between 2:1 to 7:1; between 2:1 to 7:3; between 2:1 to 7:5; between 2:1 to 4:5; between 2:1 to 6:1; between 2:1 to 5:1; between 2:1 to 4:1; between 2:1 to 3:1; between 1:1 to 2:1; between 3:1 to 8:1; between 2:1 to 7:1; between 3:1 to 5:1; or between 3:1 to 4:1.

Suitable star macromolecules may have more than one arm type, such as three or more different arm types, where in a molar ratio of the different arm types may be between 40:1 and 1:40. In certain embodiments, a star macromolecule may comprise at least three different arm types, for example, at least a first polymeric arm, for example a hydrophilic polymeric arm or a polymeric arm represented by $[(P1)_{q1}]$, at least a second polymeric arm, for example a polymeric arm comprising a surfactant-system thickening polymeric segment or a micelle-philic polymeric segment or a polymeric arm represented by $-[(P3)_{q3}-(P2)_{q2}]$, and at least a third polymeric arm, for example a polymeric arm comprising a hydrophobic polymeric segment or a polymeric arm represented by $-[(P5)_{q5}-(P4)_{q4}]$, such as in star macromolecules represented by Formulas B or D, and the molar ratio of the three different arm types may include (i) a molar ratio of the at least first polymeric arms to the at least second polymeric arms; (ii) a molar ratio of the at least first polymeric arms to the at least third polymeric arms; and/or (iii) a molar ratio of the at least first polymeric arms to the sum of the at least second polymeric arms and the at least third polymeric arms, and each of these molar ratios may independently be in the range of between 40:1 and 1:40; such as between 40:1 to 2:1, between 35:1 to 2:1; between 30:1 to 2:1; between 25:1 to 2:1; between 20:1 to 2:1; between 15:1 to 2:1; between 10:1 to 2:1; between 9:1 to 2:1; between 8:1 to 2:1; between 7:1 to 2:1; between 7:3 to 2:1; between 7:5 to 2:1; between 4:5 to 2:1; between 6:1 to 2:1; between 5:1 to 2:1; between 4:1 to 2:1; between 3:1 to 2:1; between 2:1 to 1:1; between 8:1 to 3:1; between 7:1 to 2:1; between 5:1 to 3:1; between 4:1 to 3:1; between 2:1 to 40:1; between 2:1 to 35:1; between 2:1 to 30:1; between 2:1 to 25:1; between 2:1 to 20:1; between 2:1 to 15:1; between 2:1 to 10:1; between 2:1 to 9:1; between 2:1 to 8:1; between 2:1 to 7:1; between 2:1 to 7:3; between 2:1 to 7:5; between 2:1 to 4:5; between 2:1 to 6:1; between 2:1 to 5:1; between 2:1 to 4:1; between 2:1 to 3:1; between 1:1 to 2:1; between 3:1 to 8:1; between 2:1 to 7:1; between 3:1 to 5:1; or between 3:1 to 4:1.

Suitable star macromolecules, such as those represented by Formulas A, B, C, or D, may have one or more different types of surfactant-system thickening polymeric arms covalently attached to the core. In certain embodiments, suitable star macromolecules may have 2 or more different types of surfactant-system thickening polymeric arms covalently attached to the core, such as in the range of between 1 to 500; between 2 to 450; between 2 to 300; between 2 to 200; between 2 to 100; between 2 to 50; between 1 to 100; between 1 to 20; between 1 to 75; between 10 to 400; between 15 to 200; between 100 to 500; between 250 to 500; between 300 to 500; between 40 to 80; between 125 to 325; between 100 to 200; or between 15 to 150 different types of surfactant-system thickening polymeric arms covalently attached to the core; each surfactant-system thickening polymeric arm covalently attached to the core is a different arm type.

Suitable star macromolecules may include, but is not limited to, comprising at least one polymeric arm having a molecular weight of greater than 1,000 g/mol, such as greater than 5,000 g/mol. For example, a star macromolecule may comprise at least one polymeric arm, such as at least two, at least three, or a plurality of polymeric arms, having a molecular weight of between 1,000 g/mol and 400,000 g/mol, such as between 2,000 g/mol and 300,000 g/mol; 5,000 g/mol and 200,000 g/mol; 5,000 g/mol and 100,000 g/mol; 5,000 g/mol and 75,000 g/mol; 5,000 g/mol and 60,000 g/mol; 5,000 g/mol and 50,000 g/mol; 10,000 g/mol and 100,000 g/mol; 10,000 g/mol and 150,000 g/mol; between 10,000 g/mol and 125,000 g/mol; between 10,000 g/mol and 100,000 g/mol; between 10,000 g/mol and 90,000 g/mol; between 10,000 g/mol and 80,000 g/mol; between 10,000 g/mol and 70,000 g/mol; between 50,000 g/mol and 60,000 g/mol; between 50,000 g/mol and 70,000 g/mol; between 10,000 g/mol and 40,000 g/mol; between 10,000 g/mol and 30,000 g/mol; between 10,000 g/mol and 20,000 g/mol; between 20,000 g/mol and 175,000 g/mol; between 20,000 g/mol and 100,000 g/mol; between 20,000 g/mol and 75,000 g/mol; between 20,000 g/mol and 50,000 g/mol; between 15,000 g/mol and 45,000 g/mol; or between 15,000 g/mol and 30,000 g/mol.

In certain embodiments, suitable star macromolecules may have a molecular weight of greater than 5,000 g/mol, such as greater than 25,000 g/mol; greater than 50,000 g/mol; or greater than 100,000 g/mol; for example, between 5,000 g/mol and 10,000,000 g/mol, such as between 25,000 g/mol and 7,000,000 g/mol; between 50,000 g/mol and 5,000,000 g/mol; 20,000 g/mol and 1,000,000 g/mol; between 50,000 g/mol and 1,500,000 g/mol; between 100,000 g/mol and 500,000 g/mol; between 100,000 g/mol and 1,000,000 g/mol; between 100,000 g/mol and 2,000,000 g/mol; between 100,000 g/mol and 2,500,000 g/mol; between 125,000 g/mol and 1,750,000 g/mol; between 150,000 g/mol and 1,750,000 g/mol; between 200,000 g/mol and 1,500,000 g/mol; between 225,000 g/mol and 1,250,000 g/mol; between 125,000 g/mol and 1,000,000 g/mol; between 125,000 g/mol and 900,000 g/mol; between 125,000 g/mol and 800,000 g/mol; between 125,000 g/mol and 700,000 g/mol; between 150,000 g/mol and 650,000 g/mol; between 200,000 g/mol and 500,000 g/mol; between 200,000 g/mol and 600,000 g/mol; between 225,000 g/mol and 650,000 g/mol; between 250,000 g/mol and 550,000 g/mol; between 350,000 g/mol and 500,000 g/mol; between 300,000 g/mol and 500,000 g/mol; between 350,000 g/mol and 750,000 g/mol; 750,000 g/mol and 10,000,000 g/mol; 1,250,000 g/mol and 8,000,000 g/mol; 2,500,000 g/mol and 5,000,000 g/mol; 4,000,000 g/mol and 6,000,000 g/mol; or 5,000,000 g/mol and 10,000,000 g/mol.

Suitable arms of a star macromolecule may include, but is not limited to, arms having an HLB value of at least 17 (wherein the HLB is calculated per the formula set forth in the test procedures). For example, a suitable arm of a star macromolecule may have an HLB value of greater than 17.25, such as greater than 18.5; at least 19; between 17.5 to 20; between 17.5 to 19.5; between 18 to 20; between 18.5 to 20; between 19 to 20; between 19.5 to 20; between 18 to 19.5; between 18.5 to 19.75; between 18.2 to 19.2; or between 18.75 to 19.5.

Suitable hydrophobic polymeric segments of a copolymeric arm of a star macromolecule may include, but is not limited to, hydrophobic polymeric segments having an HLB value of less than 8. For example, a suitable hydrophobic polymeric segment may have an HLB value of less than 7, such as less than 6; less than 5; less than 4; less than 3; less than 2; or about 1.

Suitable arms of a star macromolecule may include, but is not limited to, arms having a polydispersity index (PDI) value of less than 3.0. For example, a suitable arm of a star macromolecule may have PDI value of less than 2.5, such as less than 2.25; less than 2.0; less than 1.7; between 1.0 to 3.0, such as between 1.0 and 2.5; between 1.0 and 2.3; between 1.0 and 2.0; between 1.0 and 1.9; between 1.0 and 1.8; between 1.0 and 1.7; between 1.0 and 1.6; between 1.0 and 1.5; between 1.0 and 1.4; between 1.0 and 1.3; between 1.0 and 1.2; between 1.0 and 1.1; between 1.05 and 1.75; between 1.1 and 1.7; between 1.15 and 1.65; or between 1.15 and 1.55.

Suitable star macromolecules may have a single peak in a GPC curve with a polydispersity index (PDI) above 1.0 and below 3.5. For example, a suitable star macromolecule may have a PDI of less than 3.5, such as less than 3, less than 2.5, less than 2.0, or less than 1.7. For example, a suitable star macromolecule may have a PDI of between 1.0 to 3.5, such as between 1.0 and 3.25; between 1.0 and 3.0; between 1.0 and 2.7; between 1.0 and 2.5; between 1.5 and 2.4; between 1.0 and 1.9; between 1.0 and 1.8; between 1.0 and 1.7; between 1.0 and 1.6; between 1.0 and 1.5; between 1.0 and 1.4; between 1.0 and 1.3; between 1.0 and 1.2; between 1.0 and 1.1; between 1.05 and 1.75; between 1.1 and 1.7; between 1.15 and 1.65; between 1.15 and 1.55; between 1.7 and 2.3.

Suitable cores of a star macromolecule may be formed by, but is not limited to, crosslinking of a plurality of arms and a crosslinker. The core may be a core a hydrophobic core or a hydrophilic core. For example, the core of a star macromolecule may be formed by crosslinking a plurality of polymeric arms with a crosslinker, such as a multifunctional monomer crosslinker, for example, a hydrophobic difunctional monomer crosslinker. In certain embodiments, the core may be formed by crosslinking at least one first polymeric arm and at least one second polymeric arm with a crosslinker, for example crosslinking a plurality of at least one first polymeric arm and a plurality of at least one second polymeric arm with a crosslinker, such as a hydrophobic difunctional monomer crosslinker, for example divinylbenzene, wherein the molar ratio of the at least first polymeric arm to the at least second polymeric arm may be in the range of between 40:1 to 1:40. For example, the core of a star macromolecules may be formed by crosslinking an ATRP-functional terminal group end of the at least first polymeric arm with an ATRP-functional terminal group end of the at least second polymeric arm.

Suitable star macromolecules may comprise a core having a molecular weight of greater than 3,000 g/mol. For example, a star macromolecule may comprise a core having a molecular weight of between 3,000 g/mol and 100,000 g/mol, such as between 3,000 g/mol and 90,000 g/mol; between 3,000 g/mol and 45,000 g/mol; between 3,000 g/mol and 40,000 g/mol; between 3,000 g/mol and 30,000 g/mol; between 3,000 g/mol and 20,000 g/mol; between 3,000 g/mol and 15,000 g/mol; between 5,000 g/mol and 40,000 g/mol; between 6,000 g/mol and 30,000 g/mol; between 7,000 g/mol and 25,000 g/mol; between 8,000 g/mol and 20,000 g/mol; between 5,000 g/mol and 15,000 g/mol; between 7,000 g/mol and 12,000 g/mol; between 5,000 g/mol and 9,000 g/mol; between 8,000 g/mol and 10,000 g/mol; between 9,000 g/mol and 15,000 g/mol; between 40,000 g/mol and 100,000 g/mol; between 50,000 g/mol and 90,000 g/mol; between 60,000 g/mol and 85,000 g/mol; between 30,000 g/mol and 50,000 g/mol; or between 75,000 g/mol and 100,000 g/mol.

Suitable synthetic methods that may be used for the synthesis of the multi-arm star macromolecules, surfactant-system thickening polymeric arms, and/or surfactant-system thickening polymeric segments of the invention includes, but is not limited to, living ionic polymerization, such as living anionic or living cationic polymerization; free radical polymerization, such as living/controlled radical polymerization (CRP), for example, stable free radical polymerization (SFRP), degenerative chain transfer polymerization (DT), or atom transfer radical polymerization (ATRP). In certain embodiments, living/controlled radical polymerization (CRP) is the preferred process.

Suitable initiators that may be used to form the star macromolecules of the present invention, may include, but is not limited to, nitroxide initiators, such as stable nitroxide initiators, for example, 2,2,6,6-Tetramethylpiperidine-1-oxyl, sometimes called TEMPO; transition metal complexes, such cobalt containing complexes; ATRP initiators, comprising halides, such as, bromide, chloride, or iodide, and transition metal sources, such as, copper, iron, ruthenium transition metal sources; iodide with RCTP catalysts, such as germanium or tin catalysts; RAFT initiators, such as dithioesters, dithiocarbamates, or xanthates; ITP catalysts, comprising iodides; tellurium compounds (e.g., TERP); stibine compounds (e.g., SBRP); or bismuth compounds (e.g., BIRP). For example, in certain embodiments, an initiator may further comprise a monomeric residue, a polymeric segment comprising monomeric residues, or a small-molecule, such as diethyl 2-bromo-2-methylmalonate (DEBMM). For example, in certain embodiments, an initiator may comprise an ATRP initiator, wherein the ATRP initiator serves as a terminal functional group. For example, in certain embodiments, an initiator may comprise an ATRP-functional terminal group, comprising an ATRP initiator, such as halides and transition metal sources.

Suitable radical initiators that may be used to form the star macromolecules of the present invention, may include, but is not limited to, azo-containing compounds such as 2,2'-azobis(2-methylpropionitrile) (AIBN); a peroxide, for example, benzoyl peroxide (BPO), lauroyl peroxide, or cyclohexanone peroxide; a peroxy acid, for example, peroxyacetic acid or peroxybenzoic acid; tert-butyl peracetate; 1,1-bis(tert-butylperoxy)-3,3,5-(dibutyl phthalate) trimethylcyclohexane; 2,2'-azobis(4-methoxy-2.4-dimethyl valeronitrile) (V-70); 2,2'-azobis(2,4-dimethyl valeronitrile) (V-65); dimethyl 2,2'-azobis(2-methylpropionate) (V-601); 2,2'-azobis(2-methylbutyronitrile) (V-59); 1,1'-azobis(cyclohexane-1-carbonitrile) (V-40); 2,2'-azobis[N-(2-propenyl)-2-methylpropionamide] (VF-096); or derivatives or combinations thereof. Other suitable radical initiators may include, but are not limited to acetophenone; anisoin; anthraquinone; anthraquinone-2-sulfonic acid sodium salt monohydrate; (benzene) tricarbonylchromium; benzyl; benzoin ethyl ether; 4-benzoylbiphenyl; 2-benzyl-2-(dimethylamino)-4'-morpholinobutyrophenone; 4,4'-bis(diethylamino)benzophenone; camphorquinone; 2-chlorothioxanthen-9-one; (cumene)cyclopentadienyliron(II) hexafluorophosphate; dibenzosuberenone; 2,2-diethoxyacetophenone; 4,4'-dihydroxybenzophenone; 2,2-dimethoxy-2-phenylacetophenone; 4-(dimethylamino)benzophenone; 4,4'-dimethylbenzil; 2,5-dimethylbenzophenone; 3,4-dimethylbenzophenone; 4'-ethoxyacetophenone; 2-ethylanthraquinone; ferrocene; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; methybenzoylformate; 2-methyl-4'-(methylthio)-2-morpholinopropiophenone; phenanthrenequinone; 4'-phenoxyacetophenone; thioxanthen-9-one); or derivatives or combinations thereof.

Suitable star macromolecules may be nano-scale materials with a globular shape, and may be formed by the "arm first" procedure, may have a crosslinked core, may optionally possess multiple segmented arms of similar composition, or combinations thereof. Suitable star macromolecules may be designed as homo-arm star macromolecules or miktoarm star macromolecules.

Synthesis of suitable star macromolecules of the present invention may be accomplished by, for example, "living" polymerization techniques via one of three strategies: 1) core-first" which may be accomplished by growing arms from a multifunctional initiator; 2) "coupling-onto" involving attaching preformed arms onto a multifunctional core, or 3) arm-first" method which involves cross-linking preformed linear arm precursors using, for example, a divinyl compound.

Suitable star macromolecules may be prepared, comprising: preparing a plurality of arms comprising at least two types of arms, wherein a first-arm-type extends beyond a second-arm-type and said first-arm-type has a surfactant-system thickening segment on its distal end, wherein at least a portion of the surfactant-system thickening segment may extend beyond the length of the second-arm-types either by the size of the monomeric segment or segments (which may be varied by length of monomeric residue, degree of polymerization, or both) for which the surfactant-system thickening segment is attached.

Suitable star macromolecules may be prepared, comprising: preparing a plurality of arms comprising at least three types of arms, wherein a first-arm-type extends beyond a second-arm-type and said first-arm-type has a surfactant-system thickening segment (e.g., homopolymeric or copolymeric) on its distal end, wherein at least a portion of the surfactant-system thickening segment may extend beyond the length of the second-arm-types either by the size of the monomeric segment or segments (which may be varied by length of monomeric residue, degree of polymerization, or both) for which the surfactant-system thickening segment is attached; and wherein a third-arm-type extends beyond a second-arm-type and said third-arm-type has a hydrophobic segment (e.g., homopolymeric or copolymeric) on its distal end, wherein at least a portion of the hydrophobic segment (e.g., homopolymeric or copolymeric) may extend beyond the length of the second-arm-types either by the size of the monomeric segment or segments (which may be varied by length of monomeric residue, degree of polymerization, or both) for which the hydrophobic segment (e.g., homopolymeric or copolymeric) is attached.

Suitable star macromolecules may be prepared, comprising: preparing a plurality of arms comprising at least two types of arms, wherein the degree of polymerization of a first-arm-type is greater than the degree of polymerization of a second-arm-type, and wherein said first-arm-type has a distal end portion that is surfactant-system thickening. For example, suitable star macromolecules may be prepared by first forming or obtaining the surfactant-system thickening portion then forming the remaining portion of the first-arm-type from the end of the surfactant-system thickening portion and the second-arm-type, in a one-pot synthesis, wherein the polymerization of the second portion of the first-arm-type is commenced prior to the initialization of the second-arm-type but there is at least some point wherein portions, e.g., substantial portions, of the first-arm-type and second-arm-type are being polymerically extended simultaneously.

Suitable star macromolecules may be prepared, comprising: a plurality of arms comprising at least three types of arms, wherein the degree of polymerization of a first-arm-type and a third-arm-type are greater than the degree of polymerization of a second-arm-type, and wherein said first-arm-type and said third-arm-type have a distal end portion that is hydrophobic and surfactant-system thickening, respectively. For example, suitable star macromolecules may be prepared by first forming or obtaining the hydrophobic portion and the surfactant-system thickening portion then forming the remaining portion of the first-arm-type from the end of the hydrophobic, the third-arm-type from the end of the surfactant-system thickening portion, and the second-arm-type, in a one-pot synthesis, wherein the polymerization of the second portion of the first-arm-type and the second portion of the third-arm-type are commenced prior to the initialization of the second-arm-type but there is at least some point wherein portions, e.g., substantial portions, of the first-arm-type, third-arm-type, and second-arm-type are being polymerically extended simultaneously.

Suitable star macromolecules may be prepared using a one-pot method, comprising: preparing one or more of a first arm, and after achieving a high conversion of the monomer, initiate preparing one or more of a second arm in the same pot, while optionally, extending the prepared one or more first arms, followed by crosslinking the prepared one or more first arms and the prepared one or more second arms, washing the resulting product and isolating the final star macromolecule. The one pot method may further comprise the preparation of more than two arms in the one pot prior to the crosslinking step, such as preparing one or more of at least 3 arm types, at least 4, at least 5, at least 10, at least 15, at least 20 arm types in the one pot, for example, between 2-30, such as between 2-25, between 2-20, between 2-15, between 2-10, between 2-8, between 2-6, between 3-30, between 3-25, between 3-20, between 3-15, between 3-10, between 3-7, between 3-5, between 4-15, between 5-20, between 5-10, between 10-20, or between 20-30, arm types in the one pot.

In certain embodiments, the one pot method may comprise preparing one or more of a first arm of a star macromolecule by feeding a first amount of a radical initiator in a controlled manner to a reaction vessel containing a first group of monomers at a pre-determined temperature, followed by polymerizing the first group of monomers to greater than 10% monomer conversion, for example polymerizing the first group of monomers to greater than 15% monomer conversion, such as greater than 20%; greater than 25%; greater than 30%; greater than 35%; greater than 40%; greater than 45%; or greater than 50% monomer conversion; for example between 10 and 97% monomer conversion, such as between 15 and 97%; between 15 and 95%; between 15 and 90%; between 15 and 85%; between 15 and 80%; between 15 and 75%; between 15 and 70%; between 15 and 65%; between 15 and 50%; between 15 and 45%; between 15 and 40%; between 15 and 35%; between 25 and 97%; between 25 and 75%; between 35 and 80%; or between 50 and 97% monomer conversion. Upon achieving greater than 10% monomer conversion in preparing the one or more first arms, one or more of a second arm of the star macromolecule, and optionally, extending the prepared one or more first arms, may begin, comprising: adding a second arm initiator to the reaction vessel, adding a second group of monomers to the reaction vessel, and feeding (at a pre-determined temperature) a second amount of the radical initiator in a controlled manner to the reaction vessel containing the second arm initiator, the second group of monomers, and optionally the prepared one or more first arms, followed by polymerizing the second group of monomers to greater than 10% monomer conversion. For example polymerizing the second group of monomers to greater than 15% monomer conversion, such as greater than 20%; greater than 25%; greater than 30%; greater than 35%; greater than 40%; greater than 45%; or greater than 50% monomer conversion; for example between 10 and 97% monomer conversion, such as between 15 and 97%; between 15 and 95%; between 15 and 90%; between 15 and 85%; between 15 and 80%; between 15 and 75%; between 15 and 70%; between 15 and 65%; between 15 and 50%; between 15 and 45%; between 15 and 40%; between 15 and 35%; between 25 and 97%; between 25 and 75%; between 35 and 80%; or between 50 and 97% monomer conversion. Upon achieving greater than 10% monomer conversion in preparing the one or more second arms, and optionally, extending the prepared one or more first arms, further arm types may be initiated in the one pot, such as a third arm type, or more than 3 arm types, following similar steps in preparing the first and second arm types, or the total group of arms may be crosslinked to form the eventual star macromolecule. If the total range of arm types has been achieved, then the monomer conversion may be driven to a certain amount, for example, at least 70%, prior to beginning the crosslinking. For example after initiating the preparation of the last arm type to be incorporated into the desired star macromolecule, and prior to beginning the crosslinking step, the polymerization of the monomers in the reaction vessel may be driven to greater than 70%, such as greater than 75%; greater than 80%; greater than 85%; greater than 90%; greater than 95%; or greater than 97% monomer conversion, prior to beginning the crosslinking step; for example between 70 and 97% monomer conversion, such as between 75 and 97%; between 80 and 97%; between 85 and 95%; between 70 and 90%; between 85 and 97%; or between 90 and 97% monomer conversion prior to beginning the crosslinking step. The crosslinking of the total group of arms types prepared in the one method may comprise adding the crosslinking agent, and continuing the polymerization in the one pot. The resulting product may then be washed and isolated.

In certain embodiments, the one pot method of preparing star macromolecules may reduce the total preparation time of the star macromolecule by at least 50%, relative to multi-pot preparations, for example, by at least 55%, such as at least 60%; at least 65%; at least 70%; at least 75%; at least 80%; at least 85%; at least 90%; or at least 95%, relative to multi-pot preparations. In certain embodiments, the one pot method of preparing star macromolecules may be exclusive of intermediate purification steps, or may one require one intermediate washing step or one washing step after crosslinking.

In certain embodiments, suitable star macromolecules may be prepared with composition and molecular weight of each segment predetermined to perform as rheology modifiers in aqueous based solutions. For example, the first formed segmented linear polymer chains may be chain extended with a crosslinker forming a crosslinked core.

In certain embodiments, an industrially scalable process for the preparation of star macromolecules may be provided, wherein the polymeric arms may comprise segments selected to induce self assembly and wherein the self assemblable star macromolecules may be suitable for use as rheology control agents in waterborne and solvent-borne coatings, adhesives, and fracturing fluid compositions.

In certain embodiments, polymeric segments of the polymeric arms in the star macromolecule may be selected to induce self assembly when the star macromolecule is dispersed in a liquid. The self assembling star macromolecules may be suitable for use as thickening agents or rheology modifiers in cosmetic and personal care compositions at low concentrations of the solid in the thickened solution, for example, present at a concentration of less than 5 wt. %, such as less than 1 wt. %, or present at a concentration of at least 0.0001 wt. %, such as at least 0.001 wt. %, at least 0.01 wt. %, at least 0.02 wt. %, or at least 0.05 wt. %. The dispersion medium may comprise aqueous based systems or oil based systems.

In certain embodiments, suitable surfactants may be modified or incorporated into the star macromolecules of the present invention, for example, modified to become a polymerizable monomer, such as a surfactant-system thickening monomer or a micelle-philic monomer. In certain embodiments, suitable surfactants may be modified to attach or bind, such as covalently bond to, a reactive site on a polymeric arm of a star macromolecule, to become a pendant moiety of the polymeric arm, such as a surfactant-system thickening pendant moiety or a micelle-philic pendant moiety. In certain embodiments, suitable surfactants may be included in the system, such as an aqueous system, into which a star macromolecule of the present invention may be introduced to influence the rheological properties of the system, for example, thicken or increase the viscosity of the system, provide shear thinning properties, provide temperature stability, provide pH efficiency within a pH range, or combinations thereof.

In certain embodiments, suitable nonionic surfactants may include, but are not limited to: fatty alcohol, for example, cetyl alcohol, stearyl alcohol, cetostearyl alcohol, oleyl alcohol, or a residue of a fatty alcohol; surfactants having one or more poly(oxyethylene) chains as their hydrophilic part; an amine oxide, for example, dodecyldimethylamine oxide; an ethoxylated or propoxylated alkyl phenol, for example, an ethoxylated or propoxylated $C_{4-40}$ alkyl phenol, such as, an ethoxylated or propoxylated octyl phenol, an ethoxylated or propoxylated nonyl phenol, an ethoxylated or propoxylated decyl phenol, or an ethoxylated or propoxylated dodecyl phenol; an ethoxylated or propoxylated fatty alcohol, for example, an ethoxylated or propoxylated linear or branched $C_{4-40}$ alkyl alcohol, such as ethoxylated or propoxylated decyl alcohol, ethoxylated or propoxylated isodecyl alcohol, ethoxylated or propoxylated lauryl alcohol, ethoxylated or propoxylated tridecyl alcohol, ethoxylated or propoxylated isotridecyl alcohol, ethoxylated or propoxylated cetyl alcohol, ethoxylated or propoxylated stearyl alcohol, ethoxylated or propoxylated cetostearyl alcohol, ethoxylated or propoxylated arachidyl alcohol, ethoxylated or propoxylated behenyl alcohol, ethoxylated or propoxylated lignoceryl alcohol, or ethoxylated or propoxylated ceryl alcohol; a polyethylene glycol (of all molecular weights and reactions); a polypropylene glycol (of all molecular weights and reactions); saturated or unsaturated fatty acid amides, for example, capra/caprylamide diethanolamide, coconut fatty acid monoethanolamide (cocamide MEA), or coconut fatty acid diethanolamide (cocamide DEA); glucoside $C_{6-40}$ alkyl ethers, for example, octyl glucoside, N-octyl beta-D-thioglucopyranoside, decyl glucoside, lauryl glucoside, stearyl glucoside, or behenyl glucoside; Cetomacrogol 1000; glycerol alkyl esters, for example glyceryl laurate (monolaurin); polyglycerol alkyl esters; polyglycerol polyricinoleate; polyoxyethylene glycol alkyl ethers (BRIJ®), for example, $C_{8-40}$ alkyl-(O—$C_2H_4$)$_{1-25}$ OH, such as pentaethylene glycol monododecyl ether, octaethylene glycol monododecyl ether, or Isoceteth-20; polyoxypropylene glycol alkyl ethers, for example, $C_{8-40}$ alkyl-(O—$C_3H_6$)$_{1-25}$ OH; polyoxyethylene glycol alkylphenol ethers, for example $C_{6-40}$ alkyl-($C_6H_4$)—(O—$C_3H_6$)$_{1-25}$ OH, such as polyoxyethylene glycol octylphenol ethers: $C_8$ alkyl-($C_6H_4$)—(O—$C_3H_6$)$_{1-25}$ OH, such as octylphenoxy-polyethoxyethanol (nonidet P-40), or nonyl phenoxypoly-ethoxylethanol, such as NP-40, polyoxyethylene glycol sorbitan alkyl esters (Polysorbate), for example, Polysorbate 20 or Polysorbate 80; sorbitan alkyl esters (Spans); sorbitan fatty alkyl esters, for example, sorbitan monostearate, or sorbitan tristearate; block copolymers of polyethylene glycol and polypropylene glycol (Poloxamers), for example, Poloxamer 407; polyethoxylated tallow amine (POEA) salt; nonoxynols, for example, Nonoxynol-9; Triton X-100; or Tween 80.

In certain embodiments, suitable anionic surfactants, may include, but are not limited to compounds having carboxylate, sulfate, sulfonate, and/or phosphate polar groups, in combination with counterions, for example, alkali metal cations, such as sodium or potassium, alkaline earth metal cations, such as calcium or magnesium, or ammonium cations, such as tetraalkyl ammonium cations. Suitable anionic surfactants may generally include salts (including, for example, sodium, potassium, ammonium, and substituted ammonium salts such as mono-, di-, and triethanolamine salts) of the anionic sulfate, sulfonate, carboxylate and sarcosinate surfactants. In certain embodiments, suitable anionic surfactants may include isethionates, such as the acyl isethionates, N-acyl taurates, fatty acid amides of methyl tauride, alkyl succinates, sulfoacetates, and sulfosuccinates, monoesters of sulfosuccinate, such as saturated and unsaturated $C_{12}$-$C_{18}$ monoesters of sulfosuccinate, diesters of sulfosuccinate, such as saturated and unsaturated $C_6$-$C_{14}$ diesters of sulfosuccinate, and N-acyl sarcosinates. Resin acids and hydrogenated resin acids may also be suitable as anionic surfactants, such as rosin, hydrogenated rosin, and resin acids and hydrogenated resin acids present in or derived from tallow oil.

In certain embodiments, suitable anionic surfactants may be selected from alkyl sulfates, such as sodium lauryl sulfate, alkyl ether sulfates, such as sodium lauryl ether sulfate (SLES), alkyl ester sulfonates, alpha olefin sulfonates, linear alkyl benzene sulfonates, branched alkyl benzene sulfonates, linear dodecylbenzene sulfonates, branched dodecylbenzene sulfonates, alkyl benzene sulfonic acids, such as dodecylbenzene sulfonic acid, sulfosuccinates, such as or sodium dioctyl sulfosuccinate, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated and propoxylated sulfated dodecyl phenols. In certain embodiments, suitable anionic surfactants may also include dicarboxylic acids, phosphate esters, sodium xylene sulfonate, and sodium dodecyl diphenyl ether disulfonate. In certain embodiments, suitable anionic sulfate surfactants may include, for example, linear and branched primary and secondary alkyl sulfates, alkyl ethoxysulfates, fatty oleyl glycerol sulfates, alkyl phenol ethoxylate sulfates, alkyl phenol ethylene oxide ether sulfates, $C_5$-$C_{17}$ acyl-N—($C_1$-$C_4$ alkyl) and —N—($C_1$-$C_2$ hydroxyalkyl) glucamine sulfates, and sulfates of alkylpolysaccharides, such as sulfates of alkylpolyglucoside. In certain embodiments, suitable anionic surfactants may also include anionic polymers, for example, a hydratable polysaccharide, such as hydroxypropyl guar, carboxymethyl guar, and carboxymethyl hydroxylpropyl guar.

In certain embodiments, suitable cationic surfactants may have a charge carried on a nitrogen atom, such as with amine and quaternary ammonium surfactants. Generally, the quaternary ammonium compounds retain this charge over the whole pH range, whereas amine-based compounds may only function as surfactants in the protonated state. Suitable cationic surfactants may include, but are not limited to octenidine dihydrochloride; permanently charged quaternary ammonium cation compounds, such as alkyltrimethylammonium salts: cetyl trimethylammonium bromide (CTAB), i.e., hexadecyl trimethyl ammonium bromide, cetyl trimethylammonium chloride (CTAC), Cetylpyridinium chloride (CPC), Benzalkonium chloride (BAC), Benzethonium chloride (BZT), 5-Bromo-5-nitro-1,3-dioxane, Dimethyldioctadecylammonium chloride, Cetrimonium bromide, and Dioctadecyldimethylammonium bromide (DODAB).

In certain embodiments, suitable amphoteric surfactants (zwitterionic surfactants) possess polar head groups, which on ionization, may impart both positive and negative charges. For example, the positive charge may be carried by an ammonium group, such as a primary, secondary, or tertiary amines or quaternary ammonium cations, and the negative charge may be a carboxylate, a sulfonates, such as in CHAPS (3-[(3-Cholamidopropyl)-dimethylammonio]-1-propanesulfonate). Other suitable anionic groups may be sultaines, such as cocamidopropyl hydroxysultaine. In certain embodiments, suitable amphoteric surfactants may include, but are not limited to, N-alkyl derivatives of simple amino acids, such as glycine ($NH_2CH_2COOH$), aminopropionic acid ($NH_2CH_2CH_2COOH$) and alkyl betaines, N-coco 3-aminopropionic acid/sodium salt, N-tallow 3-iminodipropionate, disodium salt, N-carboxymethyl N dimethyl N-9 octadecenyl ammonium hydroxide, N-cocoamidethyl N hydroxyethylglycine, sodium salt, betaines, such as cocamidopropyl betaine, capryl/capramidopropil betaine, and coco betaine; phosphates, and lecithin.

In certain embodiments, suitable star macromolecules, or a method of making or using the same, may form an aqueous gel (e.g., a clear, homogeneous aqueous gel) when prepared according to the Sample Preparation Procedure at a concentration of at least 0.0001 wt. % at a pH of about 7.5 at STP, such as at least 0.001 wt. %; at least 0.01 wt. %, at least 0.02 wt. %, or at least 0.05 wt. % at a pH of about 7.5 at STP. For example, an aqueous gel of a suitable star macromolecule may form when prepared according to the Sample Preparation Procedure at a concentration of between 0.05 wt. % to 3 wt. %, such as between 0.1 wt. % to 2.5 wt. %; between 0.1 wt. % to 2 wt. %; between 0.2 wt. % to 2.0 wt. %; between 0.2 wt. % to 1.5 wt. %; between 0.2 wt. % to 1.0 wt. %; between 0.2 wt. % to 2.5 wt. %; between 0.3 wt. % to 2.5 wt. %; between 0.4 wt. % to 2.0 wt. %; between 0.5 wt. % to 2.0 wt. %; between 0.6 wt. % to 2.0 wt. %; between 0.7 wt. % to 1.5 wt. %; between 0.8 wt. % to 1.2 wt. %; between 0.9 wt. % to 1.1 wt. %; between 0.5 wt. % to 2.5 wt. %; between 0.75 wt. % to 1.5 wt. %; or between 0.8 wt. % to 1.6 wt. %.

In certain embodiments, suitable star macromolecules, or a method of making or using the same, may form an aqueous gel (e.g., a clear, homogeneous aqueous gel) at a concentration of 0.4 wt. % and has a dynamic viscosity of at least 5,000 cP at a shear rate of 2.2 $s^{-1}$ at 25° C., according to the Thickening and Shear Thinning in Water Test, for example, has a dynamic viscosity of at least 5,500 cP, such as at least 6,000 cP; at least 7,000 cP; at least 8,500 cP; at least 10,000 cP; at least 12,500 cP; at least 15,000 cP; at least 20,000 cP; or at least 20,000 cP, according to the Thickening and Shear Thinning in Water Test. In certain embodiments, aqueous gels formed from suitable star macromolecules may further have a shear thinning value of at least 60%, for example, at least 70%; at least 75%; at least 80%; at least 85%; or at least 90%, according to the Thickening and Shear Thinning in Water Test.

In certain embodiments, suitable star macromolecules, or a method of making or using the same, may form an aqueous gel (e.g., a clear, homogeneous aqueous gel) at a concentration of 2.0 wt. % and has a dynamic viscosity of at least 500 cP at a shear rate of 2.2 $s^{-1}$ at 25° C., according to the SLES Surfactant Compatibility Test, for example, has a dynamic viscosity of at least 600 cP, such as at least 800 cP; at least 1,000 cP; at least 1,500 cP; at least 2,000 cP; at least 2,500 cP; at least 3,000 cP; at least 4,000 cP; at least 5,000 cP; at least 8,000 cP; at least 10,000 cP; according to the SLES Surfactant Compatibility Test. In certain embodiments, aqueous gels formed from suitable star macromolecules may further have a shear thinning value of at least 60%, for example, at least 70%; at least 75%; at least 80%; at least 85%; or at least 90%, according to the SLES Surfactant Compatibility Test.

In certain embodiments, suitable star macromolecules, or a method of making or using the same, may form an aqueous gel (e.g., a clear, homogeneous aqueous gel) at a concentration of 2.0 wt. % and has a dynamic viscosity of at least 5,000 cP at a shear rate of 2.2 $s^{-1}$ at 25° C., according to the Hybrid SLES-CH Surfactant Compatibility Test, for example, has a dynamic viscosity of at least 6,000 cP, such as at least 7,000 cP; at least 8,500 cP; at least 10,000 cP; at least 12,500 cP; at least 15,000 cP; at least 18,000 cP; at least 20,000 cP; at least 25,000 cP; at least 30,000 cP; at least 35,000 cP; at least 40,000 cP; at least 45,000 cP; or at least 50,000 cP, according to the Hybrid SLES-CH Surfactant Compatibility Test. In certain embodiments, aqueous gels formed from suitable star macromolecules may further have a shear thinning value of at least 35%, for example, at least 40%; at least 45%; at least 50%; at least 60%; at least 70%; at least 75%; at least 80%; at least 85%; or at least 90%, according to the Hybrid SLES-CH Surfactant Compatibility Test.

In certain embodiments, suitable star macromolecules, or a method of making or using the same, may form an aqueous gel (e.g., a clear, homogeneous aqueous gel) at a concentration of 1.5 wt. % and has a dynamic viscosity of at least 1,500 cP at a shear rate of 2.2 $s^{-1}$ at 25° C., according to the Hybrid CB-SLES Surfactant Compatibility Test, for example, has a dynamic viscosity of at least 2,000 cP, such as at least 2,500 cP; at least 3,000 cP; at least 4,000 cP; at least 5,000 cP; at least 7,000 cP; at least 10,000 cP; at least 15,000 cP; at least 18,000 cP; or at least 20,000 cP, according to the Hybrid CB-SLES Surfactant Compatibility Test. In certain embodiments, aqueous gels formed from suitable star macromolecules may further have a shear thinning value of at least 15%, for example, at least 20%; at least 25%; at least 30%; at least 40%; at least 50%; at least 60%; at least 70%; at least 75%; at least 80%; at least 85%; or at least 90%, according to the Hybrid CB-SLES Surfactant Compatibility Test.

In certain embodiments, suitable star macromolecules, or a method of making or using the same, may form an aqueous gel (e.g., a clear, homogeneous aqueous gel) at a concentration of 1.5 wt. % and has a dynamic viscosity of at least 1,500 cP at a shear rate of 0.22 $s^{-1}$ at 25° C., according to the Hybrid CB-SLES Surfactant with NaCl Compatibility Test, for example, has a dynamic viscosity of at least 1,500 cP, such as at least 2,000 cP; at least 2,500 cP; at least 3,000 cP; at least 4,000 cP; at least 5,000 cP; at least 7,000 cP; at least 10,000 cP; at least 15,000 cP; at least 20,000 cP; at least 30,000 cP; at least 40,000 cP; at least 50,000 cP; or at least 60,000 cP, according to the Hybrid CB-SLES Surfactant with NaCl Compatibility Test. In certain embodiments, aqueous gels formed from suitable star macromolecules may further have a shear thinning value of at least 15%, for example, at least 20%; at least 25%; at least 30%; at least 40%; at least 50%; at least 60%; at least 70%; at least 75%; at least 80%; at least 85%; or at least 90%, according to the Hybrid CB-SLES Surfactant with NaCl Compatibility Test. In certain embodiments, the aqueous gels formed from suitable star macromolecules may have 10 wt. % NaCl, and the resulting gel may have a dynamic viscosity of at least 2.500 cP at a shear rate of 0.22 $s^{-1}$ at 25° C., according to the Hybrid CB-SLES Surfactant with NaCl Compatibility Test, for example, have a dynamic viscosity of at least 5,000 cP, such as at least 7,000 cP; at least 10,000 cP; at least 15,000 cP; at least 20,000 cP; at least 30,000 cP; at least 40,000 cP; at least 50,000 cP; at least 60,000 cP; at least 70,000 cP; at least 80,000 cP; at least 90,000 cP; or at least 100,000 cP, according to the Hybrid CB-SLES Surfactant with NaCl Compatibility Test.

In certain embodiments, suitable star macromolecules, or a method of making or using the same, may form an aqueous gel (e.g., a clear, homogeneous aqueous gel) at a concentration of 2.0 wt. % and has a dynamic viscosity of at least 15,000 cP at a shear rate of 2.2 $s^{-1}$ at 25° C., according to the Ritabate 20 Surfactant Compatibility Test, for example, has a dynamic viscosity of at least 18,000 cP, such as at least 20.00 cP; at least 25,000 cP; at least 30,000 cP; or at least 35,000 cP, according to the Ritabate 20 Surfactant Compatibility Test.

In certain embodiments, suitable star macromolecules, or a method of making or using the same, may form an aqueous gel (e.g., a clear, homogeneous aqueous gel) at a concentration of 2.0 wt. % and has a dynamic viscosity of at least 1,500 cP at a shear rate of 2.2 $s^{-1}$ at 25° C., according to the APG Surfactant Compatibility Test, for example, has a dynamic viscosity of at least 2,000 cP, such as at least 2,500 cP; at least 2,750 cP; at least 3,000 cP; or at least 3,500 cP, according to the APG Surfactant Compatibility Test.

In certain embodiments, suitable star macromolecules, or a method of making or using the same, may form an aqueous gel (e.g., a clear, homogeneous aqueous gel) at a concentration of 0.4 wt. %, when prepared according to the Sample Preparation Procedure, and has a dynamic viscosity of at least 100,000 cP at a shear rate of 0.22 $s^{-1}$ at 25° C., and has a Dynamic Viscosity at 80° C. that is at least 50% relative to the viscosity of the gel at 25° C., according to the Temperature Stability Test, for example, a dynamic viscosity at 80° C. that is at least 60% relative to the viscosity of the gel at 25° C., such as at least 70%; at least 75%; at least 80%; at least 85%; or at least 90%, relative to the viscosity of the gel at 25° C., according to the Temperature Stability Test; or is greater than the viscosity of the gel at 25° C., according to the Temperature Stability Test.

In certain embodiments, suitable star macromolecules, or a method of making or using the same, may form an aqueous gel (e.g., a clear, homogeneous aqueous gel) at a concentration of 1.5 wt. % and has a dynamic viscosity of at least 7,000 cP at a shear rate of 0.22 $s^{-1}$ at 25° C., according to the pH Efficiency Range in Hybrid CB/SLES Surfactant Test, for example, has a dynamic viscosity of at least 8,000 cP, such as at least 10.00 cP; at least 15,000 cP; at least 20,000 cP; at least 25,000 cP; at least 30,000 cP; at least 50,000 cP; at least 75,000 cP; at least 80,000 cP; or at least 90,000 cP, according to the pH Efficiency Range in Hybrid CB/SLES Surfactant Test.

In certain embodiments, suitable star macromolecules, or a method of making or using the same, may form an aqueous gel (e.g., a clear, homogeneous aqueous gel) at a concentration of 0.4 wt. % and has a dynamic viscosity of at least 4,000 cP at an adjusted pH in the range of between 5 to 12 at a shear rate of 0.22 $s^{-1}$ at 25° C., according to the pH Efficiency Range Test, for example, has a dynamic viscosity of at least 8,000 cP, such as at least 10.00 cP; at least 15,000 cP; at least 20,000 cP; at least 25,000 cP; at least 30,000 cP; at least 50,000 cP; at least 75,000 cP; at least 80,000 cP; at least 90,000 cP; or at least 95,000 cP, according to the pH Efficiency Range Test. In certain embodiments, suitable star macromolecules, or a method of making or using the same, may form an aqueous gel (e.g., a clear, homogeneous aqueous gel) at a concentration of 0.4 wt. % and has a dynamic viscosity of at least 40,000 cP at an adjusted pH in the range of between 6 to 10 at a shear rate of 0.22 $s^{-1}$ at 25° C., according to the pH Efficiency Range Test, for example, has a dynamic viscosity of at least 45,000 cP, such as at least 50,000 cP; at least 75,000 cP; at least 80,000 cP; at least 90,000 cP; or at least 100,000 cP, according to the pH Efficiency Range Test. In certain embodiments, suitable star macromolecules, or a method of making or using the same, may form an aqueous gel (e.g., a clear, homogeneous aqueous gel) at a concentration of 0.4 wt. % and has a dynamic viscosity of at least 80,000 cP at an adjusted pH in the range of between 8 to 10 at a shear rate of 0.22 $s^{-1}$ at 25° C., according to the pH Efficiency Range Test, for example, has a dynamic viscosity of at least 85,000 cP, such as at least 90,000 cP; or at least 100,000 cP, according to the pH Efficiency Range Test. In certain embodiments, suitable star macromolecules, or a method of making or using the same, may form an aqueous gel (e.g., a clear, homogeneous aqueous gel) at a concentration of 0.4 wt. % and has a dynamic viscosity of at least 60,000 cP at an adjusted pH in the range of between 5.5 to 6.5 at a shear rate of 0.22 $s^{-1}$ at 25° C., according to the pH Efficiency Range Test, for example, has a dynamic viscosity of at least 65,000 cP, such as at least 70,000 cP; or at least 75,000 cP, according to the pH Efficiency Range Test.

In certain embodiments, suitable star macromolecules may provide surfactant compatibility, surfactant-system thickening, an increase in viscosity of a surfactant-containing system, such as an increase in viscosity of a surfactant-containing aqueous system, use as thickening agents, use as rheology modifiers, use in hydraulic fracturing fluids, use in oil and gas applications, use in mining applications, use in cosmetic and personal care applications, use in home care applications, use in paint and printing, use in adhesive applications, use in electronic applications, use in medical and pharmaceutical applications, use in paper applications, or use in agricultural applications.

In certain embodiments, suitable star macromolecules may provide, or may be used to provide, a certain level of control over viscosity, an increase in viscosity of a system, and consistency factors in many aqueous and oil based systems, including, for example, hydraulic fracturing fluid additives, gelling agents, gels, proppant stabilizers, breakers, friction reducers, and thickening agents.

In an embodiment, the polymer compositions having star macromolecules of the present invention, the star macromolecule, emulsifier, gel, emulsifier-free emulsion, emulsion and/or thickening agent, including those formed by a one-pot process, living ionic polymerization, such as living anionic or living cationic polymerization; free radical polymerization, such as living/controlled radical polymerization (CRP), for example, stable free radical polymerization (SFRP), degenerative chain transfer polymerization (DT), or atom transfer radical polymerization (ATRP), and/or combinations of one or more of these processes, may be used to provide a certain level of control over viscosity and consistency factors in many aqueous and oil based systems including, for example, fracking fluid additives, gelling agents, gels, proppant stabilizers, breakers, friction reducers, thickening agents.

In certain embodiments, the star macromolecule may be suitable in oil and gas applications, including but not limited to, as rheology modifiers for fracturing fluids/drilling well fluids, gelling agents, gels, dispersants, proppant stabilizers and carriers, breakers, friction reducers, lubricants, scale-buildup inhibitors, heat transfer fluids, thickening agents, additives to improve oil extraction from oil sands, emulsion breakers for oil-sand-water emulsions, additives to improve dewatering of oil sands, gasoline additives, gasoline stabilizers, coiled tubing clean out fluids, drilling fluids, completion fluids, stimulation fluids, production fluids, hydraulic fracturing fluids, injection fluids, flooding fluids, flow assurance fluids, hydrate inhibitors, asphaltene inhibitors, asphaltenes inhibitors, scale inhibitors, paraffin inhibitors, friction reducers, corrosion inhibitors, H2S scavengers, de-emulsifiers, foam controlling agents, de-foaming agents, lubricants, scale removers, asphaltene removers, drag reducers, pour point depressants, cold flow improvers, traceable chemicals, foaming agents, viscoelasctic surfactants, and/or viscoelastic surfactant fluid additives.

In certain embodiments, the star macromolecule may be suitable in mining applications, including but not limited to, concentration of grinding circuit; leach; concentrate tailings; Counter Current Decantation (CCD); paste backfill; clarification; dust suppressants; flocculating agents; carbon powder recycling; coal, diamond, gold and precious metal extraction and processing; lubricants and drag reduction agents for pipeline slurry transport; flocculants; scale inhibitors; frothers; defoamers; dewatering agents; crystal growth modifiers; filtration aids; dust control agent; dispersant; depressant; thickener; clarifier; solvent extraction reagent; antiscalant aid; and/or smoothing aid.

In certain embodiments, the star macromolecule may be suitable in cosmetic and personal care applications, including but not limited to, cosmetic creams, lotions, gels, sprayable lotion, sprayable cream, sprayable gel, hair styling agents, hair styling sprays and mousses, mouse, hair conditioners, shampoos, bath and shower preparations, shower gel, hair gel, hair care product, ointments, deodorants and antiperspirants, anti-persperant ingredient, deodorant ingredient, mascara, blush, lip stick, eye liner, perfumes, powders, serums, skin sensoric, skin cleansers, skin conditioners, emollient, skin emollients, skin moisturizers, moisturizer, skin wipes, sensory modifier, skin care product, make-up remover, eye cream, leave-on product, wash off product, products for care of the teeth and the mouth, whitening products, mouthwash, products for external intimate hygiene, sunscreens, products for tanning without sun, shaving preparations, shaving cream, depilatories, products removing make-up, products for external intimate hygiene, spermicides, condom lubricant, personal hygiene lubricant, solids, fabric softeners, cleansing product, cleansing spray, emulsifier, wetting agent, foamer, soap, soaps, liquid soap, hand sanitizer, hand gel, conditioner, humectant, foam stabilizer, softener, clarifier, film former, delivery system, oil deliver system, active deliver system, rheology modifier, thickening agent, viscosifier, and lubricant.

In certain embodiments, the star macromolecule may be suitable in home care applications, including but not limited to, cleaners for windows and glass, and other household surfaces; cleaners for toilet areas; hard surface cleaners; household cleaners; industrial cleaners; window cleaners; floor cleaners; shower cleaners; drain cleaners; oven cleaners; tub, tile and sink cleaners; bleach; bleach containing cleaners; degreasers; enzyme production; liquid and gelled soaps; polishes and waxes; car wax; floor wax; polishes; polish; detergents; liquid and powdered detergents, including detergents for laundry and in dish washing; laundry detergents; laundry softeners; hard water mineral removers; metal cleaner and polishes; carpet and rug cleaners; dusting products; upholstery cleaners; and floor care products.

In certain embodiments, the star macromolecule may be suitable in paint and printing applications, including but not limited to, inkjet printer ink and other inks, 3-D printing fluid, 3-D printing ink, pigments, wetting surfactants, binders, flocculants, dispersants, leveling compounds, antifoam, aerators, surface tension modifiers, film formers, plasticizers, pore formers, water repellents, corrosion inhibitors, bittering agents to deter rodents.

In certain embodiments, the star macromolecule may be suitable in adhesive applications, including but not limited to, associative complexes, billboard adhesives, carpet back-sizing compounds, hot melt adhesives, labeling adhesives, latex adhesives, leather processing adhesives, plywood laminating adhesives, paper adhesives, 3-D printing adhesive, 3-D printing binder, wallpaper pastes, wood glue.

In certain embodiments, the star macromolecule may be suitable in electronic applications, including but not limited to, antistatic film and packaging, conductive inks, rheology control agents used for copper foil production, multilayer ceramic chip capacitors, photoresists, plasma display screens, lubricants for wire, cable, and optical fibers, gel lacquers for coil coating.

In certain embodiments, the star macromolecule may be suitable in medical and pharmaceutical applications, including but not limited to, but not limited to, medical device lubrication, antibacterial coatings, pharmaceutical excipients such as binders, creams, ointments, liniments, pastes, diluents, fillers, lubricants, glidants, disintegrants, polish agents, suspending agents, dispersing agents, plasticizers.

In certain embodiments, the star macromolecule may be suitable in paper applications, including but not limited to, coatings, dispersion for tissue and thin papers, filler retention and drainage enhancement, flocculation and pitch control, grease-proof coatings, adhesives, release coatings, surface sizing, sizes for gloss and ink holdout, tail tie and pickup adhesives for papermaking, deinking of recycled papers in flotation, washing and enzymatic processes.

In certain embodiments, the star macromolecule may be suitable in agricultural applications, including but not limited to, animal feed, dispersing agents, drift control, encapsulation, seed coatings, seed tape, spray adherents, water-based sprays and spray emulsions, water-soluble packaging, herbicides, insecticides.

In certain embodiments, the star macromolecule may be suitable in other applications including but not limited to, water- and solvent-based coating compositions, water- and solvent-based lubricants, water- and solvent-based viscosity index modifiers, paints, plasticizers, firefighting, anti-fogs agents, antifoaming agents, antifreeze substances, ski and snowboard waxes, laxatives, corrosion inhibitors, detergents, dental impression materials, dental fillers, ceramic and brick forming, prepolymers such as polyols for use in polyesters, polyurethanes, polycarbonates. For rheology modifier applications, characteristics are high gel strength, stability in the presence of salt and increased temperatures, high shear thinning characteristics, forms versatile low viscosity soluble concentrations, and synergistic interactions with added agents to adjust their rheology profile to optimize properties such as sedimentation, flow and leveling, sagging, spattering, etc.

In certain embodiments, the star macromolecule may be suitable to store and/or release in controlled rate small molecules. "Small molecules" may include UV absorbers, minerals, dyes, pigments, solvents, surfactants, metal ions, salts, or oils. These small molecules may be stored, for example, inside the core of the star macromolecule or among the plurality of polymeric arms, and then released. For example, a small molecule may have some affinity to the core or may be soluble in the core environment. Higher affinity of a small molecule to the core (or polymeric arms) may result in a lower rate of release from the star macromolecule. The affinity may be increased or decreased through non-covalent forces, such as ionic, H-bonding, electrostatic, hydrophobic, coordination and metal chelating interactions.

Embodiment A1

A surfactant-system thickening macromolecule for increasing the viscosity of a surfactant-containing system, comprising:
a) a core;
b) at least one first polymeric arm, comprising a hydrophilic polymeric segment covalently attached to the core; and
c) at least one second polymeric arm, comprising:
  i) a hydrophilic polymeric segment covalently attached to the core; and
  ii) a further segment covalently attached to the hydrophilic polymeric segment, wherein the further segment is comprised of at least one monomeric residue of a polymerized surfactant-system thickening monomer comprising a $C_6$ or greater alkyl acrylate; $C_6$ or greater alkenyl acrylate; $C_6$ or greater alkyl alkyl acrylate; $C_6$ or greater alkenyl alkyl acrylate; $C_6$ or greater alkyl acrylamide; $C_6$ or greater alkenyl acrylamide; $C_6$ or greater alkyl alkyl acrylamide; $C_6$ or greater alkenyl alkyl acrylamide; $C_2$ or greater alkyl vinyl ether; $C_2$ or greater alkenyl vinyl ether; $C_1$ or greater alkyl allyl ether; or $C_1$ or greater alkenyl allyl ether.

Embodiment A2

The macromolecule of Embodiment A1, wherein the at least one polymerized surfactant-system thickening monomeric residue comprises a $C_6$ or greater alkyl acrylate; $C_6$ or greater alkyl alkyl acrylate; $C_6$ or greater alkyl acrylamide; $C_6$ or greater alkyl alkyl acrylamide; $C_2$ or greater alkyl vinyl ether; or $C_1$ or greater alkyl allyl ether.

Embodiment A3

The macromolecule of Embodiments A1 or A2, wherein the at least one polymerized surfactant-system thickening monomeric residue comprises a $C_{6-40}$ alkyl acrylate; $C_{6-40}$ alkyl alkyl acrylate; $C_{6-40}$ alkyl acrylamide; $C_{6-40}$ alkyl alkyl acrylamide; $C_{2-40}$ alkyl vinyl ether; or $C_{1-40}$ alkyl allyl ether.

Embodiment A4

The macromolecule of any one of Embodiments A1-A3, wherein the at least one polymerized surfactant-system thickening monomeric residue comprises a $C_{13}$ or greater alkyl acrylate; $C_{11}$ or greater alkyl alkyl acrylate; $C_{19}$ or greater alkyl acrylamide; $C_{13}$ or greater alkyl alkyl acrylamide; $C_2$ or greater alkyl vinyl ether; or $C_1$ or greater alkyl allyl ether.

Embodiment A5

The macromolecule of any one of Embodiments A1-A4, wherein the at least one polymerized surfactant-system thickening monomeric residue comprises a $C_{13-40}$ alkyl acrylate; $C_{11-40}$ alkyl alkyl acrylate; $C_{19-40}$ alkyl acrylamide; $C_{13-40}$ alkyl alkyl acrylamide; $C_{2-40}$ alkyl vinyl ether; or $C_{1-40}$ alkyl allyl ether.

Embodiment A6

The macromolecule of any one of Embodiments A1-A5, wherein the at least one polymerized surfactant-system thickening monomeric residue comprises a $C_{14}$ or greater alkyl acrylate; $C_{14}$ or greater alkyl alkyl acrylate; $C_{19}$ or greater alkyl acrylamide; $C_{14}$ or greater alkyl alkyl acrylamide; $C_6$ or greater alkyl vinyl ether; or $C_6$ or greater alkyl allyl ether.

Embodiment A7

The macromolecule of any one of Embodiments A1-A6, wherein the at least one polymerized surfactant-system thickening monomeric residue comprises a $C_{16}$ or greater alkyl acrylate; $C_{16}$ or greater alkyl alkyl acrylate; $C_{19}$ or greater alkyl acrylamide; $C_{16}$ or greater alkyl alkyl acrylamide; $C_{12}$ or greater alkyl vinyl ether; or $C_{12}$ or greater alkyl allyl ether.

Embodiment A8

The macromolecule of any one of Embodiments A1-A7, wherein the at least one polymerized surfactant-system thickening monomeric residue comprises a $C_{18}$ or greater alkyl acrylate; $C_{18}$ or greater alkyl alkyl acrylate; $C_{19}$ or greater alkyl acrylamide; $C_{18}$ or greater alkyl alkyl acrylamide; $C_{18}$ or greater alkyl vinyl ether; or $C_{18}$ or greater alkyl allyl ether.

Embodiment A9

The macromolecule of any one of Embodiments A1-A8, wherein the at least one polymerized surfactant-system thickening monomeric residue comprises a saturated fatty alkyl pendant moiety.

Embodiment A10

The macromolecule of Embodiment A9, wherein the saturated fatty alkyl pendant moiety is: tridecyl, isotridecyl, myristyl, pentadecyl, cetyl, palmityl, heptadecyl, stearyl, nonadecyl, arachidyl, heneicosyl, behenyl, lignoceryl, ceryl (heptacosanyl), montanyl, nonacosanyl, myricyl, dotriacontanyl, geddyl, or cetostearyl pendant moiety.

Embodiment A11

The macromolecule of Embodiments A9 or A10, wherein the saturated fatty alkyl pendant moiety is a stearyl pendant moiety.

Embodiment A12

The macromolecule of any one of Embodiments A1-A11, wherein the at least one polymerized surfactant-system thickening monomeric residue comprises a $C_6$ or greater alkenyl acrylate; $C_6$ or greater alkenyl alkyl acrylate; $C_6$ or greater alkenyl acrylamide; $C_6$ or greater alkenyl alkyl acrylamide; $C_6$ or greater alkenyl vinyl ether; or $C_6$ or greater alkenyl allyl ether.

Embodiment A13

The macromolecule of any one of Embodiments A1-A12, wherein the at least one polymerized surfactant-system thickening monomeric residue comprises a $C_{6-40}$ alkenyl acrylate; $C_{6-40}$ alkenyl alkyl acrylate; $C_{6-40}$ alkenyl acrylamide; $C_{6-40}$ alkenyl alkyl acrylamide; $C_{6-40}$ alkenyl vinyl ether; or $C_{6-40}$ alkenyl allyl ether.

Embodiment A14

The macromolecule of any one of Embodiments A1-A13, wherein the at least one polymerized surfactant-system thickening monomeric residue comprises a $C_8$ or greater alkenyl acrylate; $C_8$ or greater alkenyl alkyl acrylate; $C_8$ or greater alkenyl acrylamide; $C_8$ or greater alkenyl alkyl acrylamide; $C_8$ or greater alkenyl vinyl ether; or $C_8$ or greater alkenyl allyl ether.

Embodiment A15

The macromolecule of any one of Embodiments A1-A14, wherein the at least one polymerized surfactant-system thickening monomeric residue comprises a $C_{10}$ or greater alkenyl acrylate; $C_{10}$ or greater alkenyl alkyl acrylate; $C_{10}$ or greater alkenyl acrylamide; $C_{10}$ or greater alkenyl alkyl acrylamide; $C_{10}$ or greater alkenyl vinyl ether; or $C_{10}$ or greater alkenyl allyl ether.

Embodiment A16

The macromolecule of any one of Embodiments A1-A15, wherein the at least one polymerized surfactant-system thickening monomeric residue comprises a $C_{12}$ or greater alkenyl acrylate; $C_{12}$ or greater alkenyl alkyl acrylate; $C_{12}$ or greater alkenyl acrylamide; $C_{12}$ or greater alkenyl alkyl acrylamide; $C_{12}$ or greater alkenyl vinyl ether; or $C_{12}$ or greater alkenyl allyl ether.

Embodiment A17

The macromolecule of any one of Embodiments A1-A16, wherein the at least one polymerized surfactant-system thickening monomeric residue comprises a $C_{14}$ or greater alkenyl acrylate; $C_{14}$ or greater alkenyl alkyl acrylate; $C_{14}$ or greater alkenyl acrylamide; $C_{14}$ or greater alkenyl alkyl acrylamide; $C_{14}$ or greater alkenyl vinyl ether; or $C_{14}$ or greater alkenyl allyl ether.

Embodiment A18

The macromolecule of any one of Embodiments A1-A17, wherein the at least one polymerized surfactant-system thickening monomeric residue comprises a $C_{18}$ or greater alkenyl acrylate; $C_{18}$ or greater alkenyl alkyl acrylate; $C_{18}$ or greater alkenyl acrylamide; $C_{18}$ or greater alkenyl alkyl acrylamide; $C_{18}$ or greater alkenyl vinyl ether; or $C_{18}$ or greater alkenyl allyl ether.

Embodiment A19

The macromolecule of any one of Embodiments A1-A18, wherein the alkenyl group is a mono-, di-, tri, tetra, penta, or hexa-alkenyl group.

Embodiment A20

The macromolecule of any one of Embodiments A1-A19, wherein the at least one polymerized surfactant-system thickening monomeric residue comprises an unsaturated fatty alkyl pendant moiety.

Embodiment A21

The macromolecule of Embodiment A20, wherein the unsaturated fatty alkyl pendant moiety is mono-unsaturated or poly-unsaturated.

Embodiment A22

The macromolecule of Embodiments A20 or A21, wherein the poly-unsaturated fatty alkyl pendant moiety is a di-, tri, tetra, penta, or hexa-unsaturated fatty alkyl pendant moiety.

Embodiment A23

The macromolecule of any one of Embodiments A20-A22, wherein the unsaturated fatty alkyl pendant moiety is: myristoleyl, palmitoleyl, sapienyl, oleyl, elaidyl, vaccenyl, linoleyl, linoelaidyl, α-linolenyl, arachidonyl, eicosapentaenoyl, erucyl, or docosahexaenoyl pendant moiety.

Embodiment A24

The macromolecule of any one of Embodiments A1-A23, wherein the at least one polymerized surfactant-system thickening monomeric residue is represented by Formula I-V:

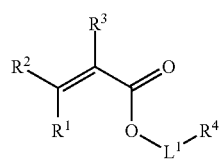

(I)

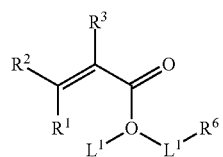

(II)

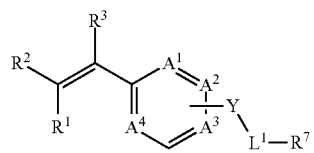

(III)

-continued

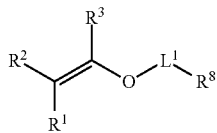

(IV)

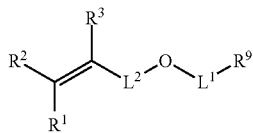

(V)

wherein:
- $R^1$, $R^2$, and $R^3$ independently represent hydrogen, methyl, ethyl, or $C_{3-18}$ alkyl, for example $C_{3-6}$ alkyl, $C_{6-12}$ alkyl, or $C_{12-18}$ alkyl; wherein the alkyl may be branched or unbranched, linear or cyclic, and may be optionally substituted with one or more halogens, $C_{1-6}$ alkoxy groups, or poly(ethylene glycol);
- $R^4$ and $R^7$ independently represent $C_{13}$ or greater alkyl, —$C_6$ or greater alkyl-(O—$C_{1-6}$ alkyl)$_n$, $C_6$ or greater alkenyl, or $C_6$ or greater alkenyl-(O—$C_{1-6}$ alkyl)$_n$; or when $R^3$ is $C_1$ or greater, then $R^4$ may independently represent $C_{11}$ or greater alkyl, —$C_6$ or greater alkyl —(O—$C_{1-6}$ alkyl)$_n$, $C_6$ or greater alkenyl, or $C_6$ or greater alkenyl-(O—$C_{1-6}$ alkyl)$_n$; wherein each alkyl portion independently may be branched or unbranched, linear or cyclic, saturated or unsaturated, and may be optionally substituted with one or more halogens, $C_{1-6}$ alkoxy groups, or poly(ethylene glycol);
- $R^5$ independently represents $C_{19}$ or greater alkyl, —$C_6$ or greater alkyl —(O—$C_{1-6}$ alkyl)$_n$, $C_6$ or greater alkenyl, or $C_6$ or greater alkenyl-(O—$C_{1-6}$ alkyl)$_n$; or when $R^6$ is $C_1$ or greater, then $R^5$ may independently represent $C_{13}$ or greater alkyl, —$C_6$ or greater alkyl —(O—$C_{1-6}$ alkyl)$_n$, $C_6$ or greater alkenyl, or $C_6$ or greater alkenyl-(O—$C_{1-6}$ alkyl)$_n$; wherein each alkyl portion independently may be branched or unbranched, linear or cyclic, saturated or unsaturated, and may be optionally substituted with one or more halogens, $C_{1-6}$ alkoxy groups, or poly(ethylene glycol);
- $R^6$ independently represents hydrogen, $C_{1-18}$ alkyl, —$C_{1-18}$ alkyl-(O—$C_{1-6}$ alkyl)$_n$, or is $R^4$, or is $R^5$; wherein each alkyl portion independently may be branched or unbranched, linear or cyclic, saturated or unsaturated, and may be optionally substituted with one or more halogens, $C_{1-6}$ alkoxy groups, or poly(ethylene glycol);
- $R^8$ independently represents $C_2$ or greater alkyl, —$C_2$ or greater alkyl-(O—$C_{1-6}$ alkyl)$_n$, $C_3$ or greater alkenyl, —$C_3$ or greater alkenyl-(O—$C_{1-6}$ alkyl)$_n$; wherein each alkyl portion independently may be branched or unbranched, linear or cyclic, saturated or unsaturated, and may be optionally substituted with one or more halogens, $C_{1-6}$ alkoxy groups, or poly(ethylene glycol);
- $R^9$ independently represents $C_1$ or greater alkyl, —$C_1$ or greater alkyl-(O—$C_{1-6}$ alkyl)$_n$, $C_3$ or greater alkenyl, —$C_3$ or greater alkenyl-(O—$C_{1-6}$ alkyl)$_n$; wherein each alkyl portion independently may be branched or unbranched, linear or cyclic, saturated or unsaturated, and may be optionally substituted with one or more halogens, $C_{1-6}$ alkoxy groups, or poly(ethylene glycol); or
- $R^4$, $R^5$, $R^7$, $R^8$, $R^9$ independently represent a hydrophobic portion of a surfactant, a hydrophobic portion of a lipid, or a hydrophobic portion of a fatty alcohol;
- $A^1$, $A^2$, $A^3$ and $A^4$ independently represent CH, $CR^{10}$, or N, wherein at least two of $A^1$, $A^2$, $A^3$ and $A^4$ is CH or $CR^{10}$;
- $R^{10}$ independently represents hydrogen, $C_{1-10}$ alkyl, halogen, hydroxyl, $C_{1-10}$ alkoxy; wherein the alkyl or alkoxy may be branched or unbranched, linear or cyclic, and may be optionally substituted with one or more halogens, $C_{1-6}$ alkoxy groups, or poly(ethylene glycol);
- Y independently represents a covalent bond, —O—, —S—, —N(H)—, —N($R^1$)—, —(CO)—, —S(O)—, —S(O)$_2$—, —S(O)$_2$N($R^1$)—, —(CO)N($R^1$)—, —N($R^1$)—(CO)—, —(CO)O—, or —O—(CO)—;
- $L^1$ independently represents a covalent bond, ethylene glycol, poly(ethylene glycol), polyether, polyamide, $C_{1-6}$ alkyl, —(CO)N($R^1$)—, —N($R^1$)—(CO)—, —(CO)O—, —O—(CO)—, or combinations thereof, or is independently absent; or
- $L^1$ independently represents a hydrophilic portion of a surfactant, a hydrophilic portion of a lipid, or a hydrophilic portion of a fatty alcohol;
- $L^2$ independently represents $(CH_2)_{1-40}$, $C_{1-40}$ alkyl, (O—$C_{2-6}$ alkyl)$_n$, or ($C_{2-6}$ alkyl)-(O—$C_{2-6}$ alkyl)$_n$; wherein the alkyl may be branched or unbranched, linear or cyclic, and may be optionally substituted with one or more halogens, $C_{1-6}$ alkoxy groups, or poly(ethylene glycol); and
- n independently represents a value in the range of 1-1000.

Embodiment A25

The macromolecule of any one of Embodiments A1-A24, wherein the surfactant-system thickening macromolecule comprises a plurality of the at least first polymeric arm.

Embodiment A26

The macromolecule of any one of Embodiments A1-A25, wherein the surfactant-system thickening macromolecule comprises a plurality of the at least second polymeric arm.

Embodiment A27

The macromolecule of any one of Embodiments A1-A26, wherein the surfactant-system thickening macromolecule comprises a plurality of the at least first polymeric arm and a plurality of the at least second polymeric arm.

Embodiment A28

The macromolecule of any one of Embodiments A1-A27, wherein the at least one second polymeric arm has a molecular weight of greater than 5,000 g/mol.

Embodiment A29

The macromolecule of any one of Embodiments A1-A28, wherein the core is a crosslinked polymeric core.

Embodiment A30

The macromolecule of any one of Embodiments A1-A29, wherein the core is a hydrophobic crosslinked polymeric core.

Embodiment A31

The macromolecule of any one of Embodiments A1-A30, wherein the hydrophilic polymeric segment of the at least one first polymeric arm is comprised of a plurality of polymerized hydrophilic monomers.

Embodiment A32

The macromolecule of any one of Embodiments A1-A31, wherein the hydrophilic polymeric segment of the at least one first polymeric arm is comprised of between 5 and 2000 monomeric residues of polymerized hydrophilic monomers.

Embodiment A33

The macromolecule of any one of Embodiments A1-A32, wherein the further segment is comprised of a plurality of the at least one polymerized surfactant-system thickening monomeric residues.

Embodiment A34

The macromolecule of any one of Embodiments A1-A33, wherein the further segment of the at least one second polymeric arm is comprised of between 1 and 500 monomeric residues of polymerized surfactant-system thickening monomers.

Embodiment A35

The macromolecule of any one of Embodiments A1-A34, wherein the hydrophilic polymeric segment of the at least one second polymeric arm is comprised of between 10 and 5000 monomeric residues of polymerized hydrophilic monomers.

Embodiment A36

The macromolecule of any one of Embodiments A1-A35, wherein the further segment is the distal segment of the at least second polymeric arm.

Embodiment A37

The macromolecule of any one of Embodiments A1-A36, wherein the at least second polymeric arm consists of the hydrophilic polymeric segment and the further segment.

Embodiment A38

The macromolecule of any one of Embodiments A1-A37, wherein the monomeric residues of polymerized hydrophilic monomers of said at least one second polymeric arm are proximal to the core.

Embodiment A39

The macromolecule of any one of Embodiments A1-A38, wherein the at least one second polymeric arm comprises more of the monomeric residues of polymerized hydrophilic monomers than the monomeric residues of polymerized surfactant-system thickening monomers.

Embodiment A40

The macromolecule of any one of Embodiments A1-A39, wherein the at least one second polymeric arm comprises in the range of between 2 and 1000 times more of the monomeric residues of polymerized hydrophilic monomers than the monomeric residues of polymerized surfactant-system thickening monomers.

Embodiment A41

The macromolecule of any one of Embodiments A1-A40, wherein the at least one second polymeric arm comprises 2 times, 3 times, 4 times, 5 times, 10 times, 50 times, 100 times, or greater than 100 times, more of the monomeric residues of polymerized hydrophilic monomers than the monomeric residues of polymerized surfactant-system thickening monomers.

Embodiment A42

The macromolecule of any one of Embodiments A1-A41, wherein the surfactant-system thickening macromolecule, optionally, further comprises at least one third polymeric arm, comprising a polymeric segment comprised of monomeric residues of polymerized hydrophobic monomers, a polymeric segment comprised of monomeric residues of polymerized hydrophilic monomers, or both.

Embodiment A43

The macromolecule of Embodiment A42, wherein the surfactant-system thickening macromolecule further comprises the at least one third polymeric arm.

Embodiment A44

The macromolecule of Embodiments A42 or A43, wherein the at least one third polymeric arm comprises the polymeric segment comprised of monomeric residues of polymerized hydrophobic monomers.

Embodiment A45

The macromolecule of Embodiment A45, wherein the polymeric segment comprised of monomeric residues of polymerized hydrophobic monomers of the at least one third polymeric arm is a hydrophobic polymeric segment.

Embodiment A46

The macromolecule of any one of Embodiments A43-A45, wherein the at least one third polymeric arm comprises the polymeric segment comprised of monomeric residues of polymerized hydrophilic monomers.

Embodiment A47

The macromolecule of Embodiment A46, wherein the polymeric segment comprised of monomeric residues of polymerized hydrophilic monomers of the at least one third polymeric arm is a hydrophilic polymeric segment.

Embodiment A48

The macromolecule of any one of Embodiments A43-A47, wherein the surfactant-system thickening macromolecule comprises a plurality of the at least one third polymeric arm.

Embodiment A49

The macromolecule of any one of Embodiments A43-A48, wherein the hydrophobic polymeric segment of the at least one third polymeric arm is comprised of a plurality of the monomeric residues of polymerized hydrophobic monomers.

Embodiment A50

The macromolecule of any one of Embodiments A43-A49, wherein the hydrophobic polymeric segment of the at least one third polymeric arm is comprised of between 1 and 500 monomeric residues of polymerized hydrophobic monomers.

Embodiment A51

The macromolecule of any one of Embodiments A43-A50, wherein the monomeric residues of polymerized hydrophobic monomers of said at least one third polymeric arm are distal to the core.

Embodiment A52

The macromolecule of any one of Embodiments A43-A51, wherein the hydrophilic polymeric segment of the at least one third polymeric arm is comprised of a plurality of the monomeric residues of polymerized hydrophilic monomers.

Embodiment A53

The macromolecule of any one of Embodiments A43-A52, wherein the hydrophilic polymeric segment of the at least one third polymeric arm is comprised of between 1 and 5,000 monomeric residues of polymerized hydrophilic monomers.

Embodiment A54

The macromolecule of any one of Embodiments A43-A53, wherein the monomeric residues of polymerized hydrophilic monomers of said at least one third polymeric arm are proximal to the core.

Embodiment A55

The macromolecule of any one of Embodiments A43-A54, wherein the hydrophilic polymeric segment of the at least one third polymeric arm is covalently attached to the core.

Embodiment A56

The macromolecule of any one of Embodiments A43-A55, wherein the at least one third polymeric arm consists of the hydrophilic polymeric segment and the hydrophobic polymeric segment.

Embodiment A57

The macromolecule of any one of Embodiments A43-A56, wherein the at least one third polymeric arm comprises more of the monomeric residues of polymerized hydrophilic monomers than the monomeric residues of polymerized hydrophobic monomers.

Embodiment A58

The macromolecule of any one of Embodiments A43-A57, wherein the at least one third polymeric arm comprises in the range of between 2 and 1000 times more of the monomeric residues of polymerized hydrophilic monomers than the monomeric residues of polymerized hydrophobic monomers.

Embodiment A59

The macromolecule of any one of Embodiments A43-A58, wherein the at least one third polymeric arm comprises 2 times, 3 times, 4 times, 5 times, 10 times, 50 times, 100 times, or greater than 100 times, more of the monomeric residues of polymerized hydrophilic monomers than the monomeric residues of polymerized hydrophobic monomers.

Embodiment A60

The macromolecule of any one of Embodiments A1-A59, wherein the ratio of the at least first polymeric arms to the at least second polymeric arms is in the range of between 40:1 and 1:40.

Embodiment A61

The macromolecule of any one of Embodiments A1-A60, wherein the ratio of the at least first polymeric arms to the at least third polymeric arms, the at least third polymeric arms to the at least second polymeric arms, and the at least first polymeric arms to the sum of the at least second polymeric arms and the at least third polymeric arms, are independently in the range of between 40:1 and 1:40.

Embodiment A62

The macromolecule of any one of Embodiments A1-A61, wherein the surfactant-system thickening macromolecule is represented by Formula A:

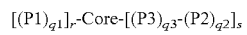  Formula A $$[(P1)_{q1}]_r\text{-Core-}[(P3)_{q3}\text{-}(P2)_{q2}]_s$$

wherein:
Core represents a crosslinked polymeric segment;
P1 independently represents the hydrophilic polymeric segment of the at least first polymeric arm comprised of monomeric residues of polymerized hydrophilic monomers;
P2 independently represents the further segment of the at least second polymeric arm comprised of at least one monomeric residue of a polymerized surfactant-system thickening monomer;
P3 independently represents the hydrophilic polymeric segment of the at least second polymeric arm comprised of monomeric residues of polymerized hydrophilic monomers;
q1 independently represents the number of monomeric residues in P1;
q2 independently represents the number of monomeric residues in P2;
q3 independently represents the number of monomeric residues in P3;
r independently represents the number of the at least first polymeric arms covalently attached to the Core; and s independently represents the number of the at least second polymeric arms covalently attached to the Core.

Embodiment A63

The macromolecule of Embodiment A62, wherein the ratio of r:s is in the range of between 40:1 and 1:40.

Embodiment A64

The macromolecule of any one of Embodiments A1-A63, wherein the surfactant-system thickening macromolecule is represented by Formula B:

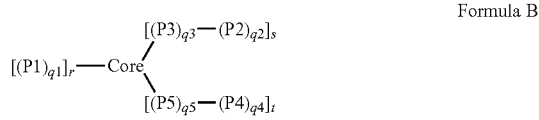

Formula B wherein:
- Core represents a crosslinked polymeric segment;
- P1 independently represents the hydrophilic polymeric segment of the at least first polymeric arm comprised of monomeric residues of polymerized hydrophilic monomers;
- P2 independently represents the further segment of the at least second polymeric arm comprised of at least one monomeric residue of a polymerized surfactant-system thickening monomer;
- P3 independently represents the hydrophilic polymeric segment of the at least second polymeric arm comprised of monomeric residues of polymerized hydrophilic monomers;
- P4 independently represents the hydrophobic polymeric segment of the at least third polymeric arm comprised of monomeric residues of polymerized hydrophobic monomers;
- P5 independently represents the hydrophilic polymeric segment of the at least third polymeric arm comprised of monomeric residues of polymerized hydrophilic monomers;
- $q1$ independently represents the number of monomeric residues in P1;
- $q2$ independently represents the number of monomeric residues in P2;
- $q3$ independently represents the number of monomeric residues in P3;
- $q4$ independently represents the number of monomeric residues in P4;
- $q5$ independently represents the number of monomeric residues in P5;
- r independently represents the number of the at least first polymeric arms covalently attached to the Core;
- s independently represents the number of the at least second polymeric arms covalently attached to the Core; and
- t independently represents the number of the at least third polymeric arms covalently attached to the Core.

Embodiment A65

The macromolecule of Embodiment A64, wherein the ratio of r:s, and, if t is not zero, the ratio of r:t, t:s, and r:(s+t), are independently in the range of between 40:1 and 1:40.

Embodiment A66

The macromolecule of any one of Embodiments A62-A65, wherein q1 has a value between 5 and 2000.

Embodiment A67

The macromolecule of any one of Embodiments A62-A66, wherein q2 has a value between 1 and 500.

Embodiment A68

The macromolecule of any one of Embodiments A62-A67, wherein q3 has a value between 10 and 5000.

Embodiment A69

The macromolecule of any one of Embodiments A62-A68, wherein q4 has a value between 1 and 500.

Embodiment A70

The macromolecule of any one of Embodiments A62-A69, wherein q5 has a value between 10 and 5000.

Embodiment A71

The macromolecule of any one of Embodiments A62-A70, wherein r has a value in the range of from 1 to 1000.

Embodiment A72

The macromolecule of any one of Embodiments A62-A71, wherein s has a value in the range of from 1 to 1000.

Embodiment A73

The macromolecule of any one of Embodiments A62-A72, wherein t has a value in the range of from 0 to 1000.

Embodiment A74

The macromolecule of any one of Embodiments A62-A73, wherein q3 is greater than q2.

Embodiment A75

The macromolecule of any one of Embodiments A62-A74, wherein q3 is in the range of between 2 and 1000 times greater than q2.

Embodiment A76

The macromolecule of any one of Embodiments A62-A75, wherein q3 is 2 times, 3 times, 4 times, 5 times, 10 times, 50 times, 100 times, or greater than 100 times, greater than q2.

Embodiment A77

The macromolecule of any one of Embodiments A62-A76, wherein q5 is greater than q4.

Embodiment A78

The macromolecule of any one of Embodiments A62-A77, wherein q5 is in the range of between 2 and 1000 times greater than q4.

Embodiment A79

The macromolecule of any one of Embodiments A62-A78, wherein q5 is 2 times, 3 times, 4 times, 5 times, 10 times, 50 times, 100 times, or greater than 100 times, greater than q4.

Embodiment A80

The macromolecule of any one of Embodiments A62-A79, wherein the polymeric segment P1, P3, or P5 is a homopolymeric segment, a copolymeric segment, a block copolymeric segment, a blocky copolymeric segment, a gradient copolymeric segment, or a random copolymeric segment.

Embodiment A81

The macromolecule of any one of Embodiments A62-A80, wherein the polymeric segment P2 or P4 is a homopolymeric segment, a copolymeric segment, a block copolymeric segment, a blocky copolymeric segment, a gradient copolymeric segment, or a random copolymeric segment.

Embodiment A82

The macromolecule of any one of Embodiments A1-A81, wherein a portion of the further segment is represented by Formula E:

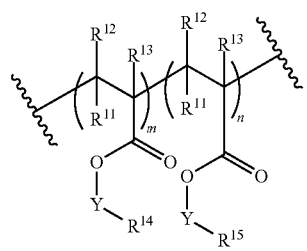

Formula E wherein:
- $R^{11}$, $R^{12}$, $R^{13}$ independently represent hydrogen, methyl, ethyl, or $C_{3-18}$ alkyl, for example $C_{3-6}$ alkyl, $C_{6-12}$ alkyl, or $C_{12-18}$ alkyl; wherein the alkyl may be branched or unbranched, linear or cyclic, and may be optionally substituted with one or more halogens, $C_{1-6}$ alkoxy groups, or poly(ethylene glycol);
- $R^{14}$ independently represents $C_{1-12}$ hydrocarbyl, —$C_{1-12}$ hydrocarbyl-(O—$C_{1-6}$ hydrocarbyl)$_w$, —$C_{1-12}$ hydrocarbyl-((CO)O—$C_{1-6}$ hydrocarbyl)$_w$, —$C_{1-12}$ hydrocarbyl-((CO)NH—$C_{1-6}$ hydrocarbyl)$_w$; wherein each hydrocarbyl portion independently may be branched or unbranched, linear or cyclic, saturated (alkyl) or unsaturated (alkenyl), and may be optionally substituted with one or more halogens, $C_{1-6}$ alkoxy groups, or poly(ethylene glycol);
- $R^{15}$ independently represents $C_{13-40}$ hydrocarbyl, —$C_{13-40}$ hydrocarbyl-(O—$C_{1-6}$ hydrocarbyl)$_w$, —$C_{13-40}$ hydrocarbyl-((CO)O—$C_{1-6}$ hydrocarbyl)$_w$, $C_{13-40}$ hydrocarbyl-((CO)NH—$C_{1-6}$ alkyl)$_w$; wherein each hydrocarbyl portion independently may be branched or unbranched, linear or cyclic, saturated (alkyl) or unsaturated (alkenyl), and may be optionally substituted with one or more halogens, $C_{1-6}$ alkoxy groups, or poly(ethylene glycol); or a hydrophobic moiety of a surfactant, a hydrophobic moiety of a lipid, or a hydrophobic moiety of a fatty alcohol;
- Y represents a covalent bond, ethylene glycol, poly(ethylene glycol), polyether, polyamide, $C_{1-6}$ alkyl, or combinations thereof, or is independently absent;
- m independently represents a value in the range of 1-500;
- n independently represents a value in the range of 1-500; and
- w independently represents a value in the range of 1-1000.

Embodiment A83

The macromolecule of Embodiment A82, wherein the portion of the at least one second polymeric arm represented by Formula E is a copolymeric segment, a block copolymeric segment, a blocky copolymeric segment, a gradient copolymeric segment, or a random copolymeric segment.

Embodiment A84

The macromolecule of any one of Embodiments A1-A83, wherein the further segment is a polymeric segment.

Embodiment A85

The macromolecule of Embodiment A84, wherein the further segment is a homopolymeric segment, a copolymeric segment, a block copolymeric segment, a blocky copolymeric segment, a gradient copolymeric segment, or a random copolymeric segment.

Embodiment A86

The macromolecule of any one of Embodiments A1-A85, wherein the further segment is a surfactant-system thickening polymeric segment.

Embodiment A87

The macromolecule of Embodiment A86, wherein the surfactant-system thickening polymeric segment is a homopolymeric segment, a copolymeric segment, a block copolymeric segment, a blocky copolymeric segment, a gradient copolymeric segment, or a random copolymeric segment.

Embodiment A88

The macromolecule of any one of Embodiments A1-A87, wherein the surfactant-system thickening macromolecule has a molecular weight (Mn) in the range of between 5,000 g/mol and 10,000,000 g/mol.

Embodiment A89

The macromolecule of any one of Embodiments A1-A88, wherein the surfactant-system thickening macromolecule has a molecular weight (Mn) of greater than 100,000 g/mol.

Embodiment A90

The macromolecule of any one of Embodiments A1-A89, wherein the surfactant-system thickening macromolecule has a molecular weight (Mn) in the range of between 100,000 g/mol and 2,000,000 g/mol.

Embodiment A91

The macromolecule of any one of Embodiments A1-A90, wherein the molecular weight (Mn) of the at least one polymeric arm is between 1,000 g/mol to 250,000 g/mol.

Embodiment A92

The macromolecule of any one of Embodiments A1-A91, wherein the molecular weight (Mn) of the at least one polymeric arm is between 10,000 g/mol and 200,000 g/mol.

Embodiment A93

The macromolecule of any one of Embodiments A1-A92, wherein the surfactant-system thickening macromolecule is a water soluble mikto star macromolecule.

Embodiment A94

The macromolecule of any one of Embodiments A1-A93, wherein when 0.4 wt. % of the macromolecule forms a homogeneous gel, the gel has a dynamic viscosity of at least 5,000 cP at a shear rate of 2.2 $s^{-1}$ at 25° C., according to the Thickening and Shear Thinning in Water Test.

Embodiment A95

The macromolecule of Embodiment A94, wherein the dynamic viscosity is at least 10,000 cP at a shear rate of 2.2 $s^{-1}$ at 25° C., according to the Thickening and Shear Thinning in Water Test.

Embodiment A96

The macromolecule of Embodiments A94 or A95, wherein the macromolecule further has a shear thinning value of at least 80%, according to the Thickening and Shear Thinning in Water Test.

Embodiment A97

The macromolecule of any one of Embodiments A1-A96, wherein when 2.0 wt. % of the macromolecule forms a homogeneous gel, the gel has a dynamic viscosity of at least 500 cP at a shear rate of 2.2 $s^{-1}$ at 25° C., according to the SLES Surfactant Compatibility Test.

Embodiment A98

The macromolecule of Embodiment A97, wherein the dynamic viscosity is at least 1,000 cP at a shear rate of 2.2 $s^{-1}$ at 25° C., according to the SLES Surfactant Compatibility Test.

Embodiment A99

The macromolecule of Embodiment A98, wherein the dynamic viscosity is at least 2,000 cP at a shear rate of 2.2 $s^{-1}$ at 25° C., according to the SLES Surfactant Compatibility Test.

Embodiment A100

The macromolecule of Embodiment A99, wherein the dynamic viscosity is at least 3,000 cP at a shear rate of 2.2 $s^{-1}$ at 25° C., according to the SLES Surfactant Compatibility Test.

Embodiment A101

The macromolecule of Embodiment A100, wherein the dynamic viscosity is at least 4,000 cP at a shear rate of 2.2 $s^{-1}$ at 25° C., according to the SLES Surfactant Compatibility Test.

Embodiment A102

The macromolecule of any one of Embodiments A97-A101, wherein the macromolecule further has a shear thinning value of at least 75%, according to the SLES Surfactant Compatibility Test.

Embodiment A103

The macromolecule of any one of Embodiments A1-A102, wherein when 2.0 wt. % of the macromolecule forms a homogeneous gel, the gel has a dynamic viscosity of at least 5,000 cP at a shear rate of 2.2 $s^{-1}$ at 25° C., according to the Hybrid SLES-CH Surfactant Compatibility Test.

Embodiment A104

The macromolecule of Embodiment A103, wherein the dynamic viscosity is at least 10,000 cP at a shear rate of 2.2 $s^{-1}$ at 25° C., according to the Hybrid SLES-CH Surfactant Compatibility Test.

Embodiment A105

The macromolecule of Embodiment A104, wherein the dynamic viscosity is at least 15,000 cP at a shear rate of 2.2 $s^{-1}$ at 25° C., according to the Hybrid SLES-CH Surfactant Compatibility Test.

Embodiment A106

The macromolecule of Embodiment A105, wherein the dynamic viscosity is at least 18,000 cP at a shear rate of 2.2 $s^{-1}$ at 25° C., according to the Hybrid SLES-CH Surfactant Compatibility Test.

Embodiment A107

The macromolecule of Embodiment A106, wherein the dynamic viscosity is at least 20,000 cP at a shear rate of 2.2 $s^{-1}$ at 25° C., according to the Hybrid SLES-CH Surfactant Compatibility Test.

Embodiment A108

The macromolecule of any one of Embodiments A103-A107, wherein the macromolecule further has a shear thinning value of at least 35%, according to the Hybrid SLES-CH Surfactant Compatibility Test.

Embodiment A109

The macromolecule of any one of Embodiments A103-A107, wherein the macromolecule further has a shear thinning value of at least 40%, according to the Hybrid SLES-CH Surfactant Compatibility Test.

Embodiment A110

The macromolecule of any one of Embodiments A103-A107, wherein the macromolecule further has a shear thinning value of at least 50%, according to the Hybrid SLES-CH Surfactant Compatibility Test.

Embodiment A111

The macromolecule of any one of Embodiments A103-A107, wherein the macromolecule further has a shear thinning value of at least 70%, according to the Hybrid SLES-CH Surfactant Compatibility Test.

Embodiment A112

The macromolecule of any one of Embodiments A103-A107, wherein the macromolecule further has a shear thinning value of at least 80%, according to the Hybrid SLES-CH Surfactant Compatibility Test.

Embodiment A113

The macromolecule of any one of Embodiments A1-A112, wherein when 1.5 wt. % of the macromolecule forms a homogeneous gel, the gel has a dynamic viscosity of at least 2,000 cP at a shear rate of 2.2 $s^{-1}$ at 25° C., according to the Hybrid CB-SLES Surfactant Compatibility Test.

Embodiment A114

The macromolecule of Embodiment A113, wherein the dynamic viscosity is at least 3,000 cP at a shear rate of 2.2 $s^{-1}$ at 25° C., according to the Hybrid CB-SLES Surfactant Compatibility Test.

Embodiment A115

The macromolecule of Embodiment A113, wherein the dynamic viscosity is at least 5,000 cP at a shear rate of 2.2 $s^{-1}$ at 25° C., according to the Hybrid CB-SLES Surfactant Compatibility Test.

Embodiment A116

The macromolecule of Embodiment A113, wherein the dynamic viscosity is at least 7,000 cP at a shear rate of 2.2 $s^{-1}$ at 25° C., according to the Hybrid CB-SLES Surfactant Compatibility Test.

Embodiment A117

The macromolecule of Embodiment A113, wherein the dynamic viscosity is at least 10,000 cP at a shear rate of 2.2 $s^{-1}$ at 25° C., according to the Hybrid CB-SLES Surfactant Compatibility Test.

Embodiment A118

The macromolecule of Embodiment A113, wherein the dynamic viscosity is at least 15,000 cP at a shear rate of 2.2 $s^{-1}$ at 25° C., according to the Hybrid CB-SLES Surfactant Compatibility Test.

Embodiment A119

The macromolecule of any one of Embodiments A1-A118, wherein when 1.5 wt. % of the macromolecule forms a homogeneous gel, the gel has a dynamic viscosity of at least 2,000 cP at a shear rate of 0.22 $s^{-1}$ at 25° C., according to the Hybrid CB-SLES Surfactant with NaCl Compatibility Test.

Embodiment A120

The macromolecule of Embodiment A119, wherein the dynamic viscosity is at least 4,000 cP at a shear rate of 0.22 $s^{-1}$ at 25° C., according to the Hybrid CB-SLES Surfactant with NaCl Compatibility Test.

Embodiment A121

The macromolecule of Embodiment A119, wherein the dynamic viscosity is at least 6,000 cP at a shear rate of 0.22 $s^{-1}$ at 25° C., according to the Hybrid CB-SLES Surfactant with NaCl Compatibility Test.

Embodiment A122

The macromolecule of Embodiment A119, wherein the dynamic viscosity is at least 8,000 cP at a shear rate of 0.22 $s^{-1}$ at 25° C., according to the Hybrid CB-SLES Surfactant with NaCl Compatibility Test.

Embodiment A123

The macromolecule of Embodiment A119, wherein the dynamic viscosity is at least 10,000 cP at a shear rate of 0.22 $s^{-1}$ at 25° C., according to the Hybrid CB-SLES Surfactant with NaCl Compatibility Test.

Embodiment A124

The macromolecule of Embodiment A119, wherein the dynamic viscosity is at least 15,000 cP at a shear rate of 0.22 $s^{-1}$ at 25° C., according to the Hybrid CB-SLES Surfactant with NaCl Compatibility Test.

Embodiment A125

The macromolecule of Embodiment A119, wherein the mixture is treated with 10 wt. % NaCl, and the formed homogeneous gel has a dynamic viscosity of at least 2,500 cP at a shear rate of 0.22 $s^{-1}$ at 25° C., according to the Hybrid CB-SLES Surfactant with NaCl Compatibility Test.

Embodiment A126

The macromolecule of Embodiment A119, wherein the mixture is treated with 10 wt. % NaCl, and the formed homogeneous gel has a dynamic viscosity of at least 5,000 cP at a shear rate of 0.22 $s^{-1}$ at 25° C., according to the Hybrid CB-SLES Surfactant with NaCl Compatibility Test.

Embodiment A127

The macromolecule of Embodiment A119, wherein the mixture is treated with 10 wt. % NaCl, and the formed homogeneous gel has a dynamic viscosity of at least 10,000 cP at a shear rate of 0.22 s$^{-1}$ at 25° C., according to the Hybrid CB-SLES Surfactant with NaCl Compatibility Test.

Embodiment A128

The macromolecule of any one of Embodiments A1-A127, wherein when 2.0 wt. % of the macromolecule forms a homogeneous gel, the gel has a dynamic viscosity of at least 15,000 cP at a shear rate of 2.2 s$^{-1}$ at 25° C., according to the Ritabate 20 Surfactant Compatibility Test.

Embodiment A129

The macromolecule of Embodiment A128, wherein the dynamic viscosity is at least 20,000 cP at a shear rate of 2.2 s$^{-1}$ at 25° C., according to the Ritabate 20 Surfactant Compatibility Test.

Embodiment A130

The macromolecule of Embodiment A128, wherein the dynamic viscosity is at least 25,000 cP at a shear rate of 2.2 s$^{-1}$ at 25° C., according to the Ritabate 20 Surfactant Compatibility Test.

Embodiment A131

The macromolecule of Embodiment A128, wherein the dynamic viscosity is at least 30,000 cP at a shear rate of 2.2 s$^{-1}$ at 25° C., according to the Ritabate 20 Surfactant Compatibility Test.

Embodiment A132

The macromolecule of any one of Embodiments A1-A131, wherein when 2.0 wt. % of the macromolecule forms a homogeneous gel, the gel has a dynamic viscosity of at least 1,500 cP at a shear rate of 2.2 s$^{-1}$ at 25° C., according to the APG Surfactant Compatibility Test.

Embodiment A133

The macromolecule of Embodiment A132, wherein the dynamic viscosity is at least 2,000 cP at a shear rate of 2.2 s$^{-1}$ at 25° C., according to the APG Surfactant Compatibility Test.

Embodiment A134

The macromolecule of Embodiment A132, wherein the dynamic viscosity is at least 2,500 cP at a shear rate of 2.2 s$^{-1}$ at 25° C., according to the APG Surfactant Compatibility Test.

Embodiment A135

The macromolecule of Embodiment A132, wherein the dynamic viscosity is at least 2,750 cP at a shear rate of 2.2 s$^{-1}$ at 25° C., according to the APG Surfactant Compatibility Test.

Embodiment A136

The macromolecule of Embodiment A132, wherein the dynamic viscosity is at least 3,000 cP at a shear rate of 2.2 s$^{-1}$ at 25° C., according to the APG Surfactant Compatibility Test.

Embodiment A137

The macromolecule of any one of Embodiments A1-A136, wherein when 0.4 wt. % of the macromolecule forms a homogeneous gel, the gel has a dynamic viscosity of at least 100,000 cP at a shear rate of 0.22 s$^{-1}$ at 25° C., and has a Dynamic Viscosity at 80° C. that is at least 50% relative to the viscosity of the gel at 25° C., according to the Temperature Stability Test.

Embodiment A138

The macromolecule of Embodiment A137, wherein the dynamic viscosity at 80° C. that is at least 60% relative to the viscosity of the gel at 25° C., according to the Temperature Stability Test.

Embodiment A139

The macromolecule of Embodiment A137, wherein the dynamic viscosity at 80° C. that is at least 80% relative to the viscosity of the gel at 25° C., according to the Temperature Stability Test.

Embodiment A140

The macromolecule of Embodiment A137, wherein the dynamic viscosity at 80° C. that is greater than the viscosity of the gel at 25° C., according to the Temperature Stability Test.

Embodiment A141

The macromolecule of any one of Embodiments A1-A140, wherein when 1.5 wt. % of the macromolecule forms a homogeneous gel, the gel has a dynamic viscosity of at least 8,000 cP at an adjusted pH in the range of between 4.5 to 6.5 at a shear rate of 0.22 s$^{-1}$ at 25° C., according to the pH Efficiency Range in Hybrid CB/SLES Surfactant Test.

Embodiment A142

The macromolecule of Embodiment A141, wherein the dynamic viscosity is at least 15,000 cP at an adjusted pH in the range of between 4.5 to 6.5 at a shear rate of 0.22 s$^{-1}$ at 25° C., according to the pH Efficiency Range in Hybrid CB/SLES Surfactant Test.

Embodiment A143

The macromolecule of Embodiment A141, wherein the dynamic viscosity is at least 25,000 cP at an adjusted pH in the range of between 4.5 to 6.5 at a shear rate of 0.22 s$^{-1}$ at 25° C., according to the pH Efficiency Range in Hybrid CB/SLES Surfactant Test.

Embodiment A144

The macromolecule of Embodiment A141, wherein the dynamic viscosity is at least 50,000 cP at an adjusted pH in the range of between 4.5 to 6.5 at a shear rate of 0.22 s$^{-1}$ at 25° C., according to the pH Efficiency Range in Hybrid CB/SLES Surfactant Test.

Embodiment A145

The macromolecule of Embodiment A141, wherein the dynamic viscosity is at least 75,000 cP at an adjusted pH in

Embodiment A146

The macromolecule of any one of Embodiments A141-A145, wherein the adjusted pH is in the range of between 5 to 6 at a shear rate of 0.22 $s^{-1}$ at 25° C., according to the pH Efficiency Range in Hybrid CB/SLES Surfactant Test.

Embodiment A147

The macromolecule of any one of Embodiments A1-A146, wherein when 0.4 wt. % of the macromolecule forms a homogeneous gel, the gel has a dynamic viscosity of at least 5,000 cP at an adjusted pH in the range of between 5 to 12 at a shear rate of 0.22 $s^{-1}$ at 25° C., according to the pH Efficiency Range Test.

Embodiment A148

The macromolecule of Embodiment A147, wherein the dynamic viscosity is at least 25,000 cP at an adjusted pH in the range of between 5 to 12 at a shear rate of 0.22 $s^{-1}$ at 25° C., according to the pH Efficiency Range Test.

Embodiment A149

The macromolecule of Embodiment A147, wherein the dynamic viscosity is at least 50,000 cP at an adjusted pH in the range of between 5 to 12 at a shear rate of 0.22 $s^{-1}$ at 25° C., according to the pH Efficiency Range Test.

Embodiment A150

The macromolecule of Embodiment A147, wherein the dynamic viscosity is at least 75,000 cP at an adjusted pH in the range of between 5 to 12 at a shear rate of 0.22 $s^{-1}$ at 25° C., according to the pH Efficiency Range Test.

Embodiment A151

The macromolecule of Embodiment A147, wherein the dynamic viscosity is at least 95,000 cP at an adjusted pH in the range of between 5 to 12 at a shear rate of 0.22 $s^{-1}$ at 25° C., according to the pH Efficiency Range Test.

Embodiment A152

The macromolecule of any one of Embodiments A147-151, wherein the adjusted pH is in the range of between 6 to 7.

Embodiment A153

The macromolecule of any one of Embodiments A147-151, wherein the adjusted pH is in the range of between 7 to 8.

Embodiment A154

The macromolecule of any one of Embodiments A147-151, wherein the adjusted pH is in the range of between 8 to 10.

Embodiment A155

The macromolecule of any one of Embodiments A147-151, wherein the adjusted pH is in the range of between 8 to 9.

Embodiment A156

The macromolecule of any one of Embodiments A1-155, wherein the surfactant is a nonionic surfactant, an anionic surfactant, an amphoteric surfactant, or a cationic surfactant.

Embodiment A157

The macromolecule of Embodiment A156, wherein the surfactant is a nonionic surfactant.

Embodiment A158

The macromolecule of Embodiment A156, wherein the surfactant is a an anionic surfactant.

Embodiment A159

The macromolecule of Embodiment A156, wherein the surfactant is an amphoteric surfactant.

Embodiment A160

The macromolecule of Embodiment A156, wherein the surfactant is a cationic surfactant.

Embodiment B1. A surfactant-modified star macromolecule, comprising:
i) a core;
ii) at least one first polymeric arm, comprising a hydrophilic polymeric segment covalently attached to the core; and
iii) at least one second polymeric arm, comprising:
   a) a hydrophilic polymeric segment covalently attached to the core; and
   b) a further segment comprising at least one pendant moiety represented by $[L^1\text{-}G^1\text{-}L^2\text{-}G^2]$;
   wherein:
     $G^1$ independently represents a residue of a hydrophilic moiety of the surfactant;
     $G^2$ independently represents a residue of a hydrophobic moiety of the surfactant;
     $L^1$ independently represents a linking group or a covalent bond, attaching $G^1$ to the further segment; and
     $L^2$ independently represents a linking group or a covalent bond, linking $G^1$ and $G^2$.

Embodiment B2

The surfactant-modified star macromolecule of Embodiment B1, wherein the further segment is the distal segment of the at least one second polymeric arm.

Embodiment B3

The surfactant-modified star macromolecule of Embodiments B1 or B2, wherein the at least one second polymeric arm extends beyond the at least one first polymeric arm.

Embodiment B4

The surfactant-modified star macromolecule of any one of Embodiments B1-B3, wherein at least a portion of the hydrophilic polymeric segment of the at least one second polymeric arm extends beyond the distal portion of the at least one first polymeric arm.

Embodiment B5

The surfactant-modified star macromolecule of any one of Embodiments B1-B4, wherein the proximal portion of the further segment extends beyond the distal portion of the at least one first polymeric arm.

Embodiment B6

The surfactant-modified star macromolecule of any one of Embodiments B1-B5, wherein the further segment comprises a plurality of the at least one pendant moieties.

Embodiment B7

The surfactant-modified star macromolecule of any one of Embodiments B1-B6, wherein the further segment comprises in the range of between 1 and 500 of the at least one pendant moieties.

Embodiment B8

The surfactant-modified star macromolecule of any one of Embodiments B1-B7, wherein $G^2$ comprises a $C_6$ or greater alkyl moiety, a fluorine-modified $C_4$ or greater alkyl moiety, or a $C_6$ or greater alkenyl moiety.

Embodiment B9

The surfactant-modified star macromolecule of any one of Embodiments B1-B8, wherein $G^2$ comprises a $C_{13}$ or greater saturated fatty alkyl moiety, a $C_{12}$ or greater mono-unsaturated fatty alkyl moiety, or a $C_{12}$ or greater poly-unsaturated fatty alkyl moiety.

Embodiment B10

The surfactant-modified star macromolecule of any one of Embodiments B1-B9, wherein $G^2$ comprises a $C_{14}$ or greater saturated fatty alkyl moiety.

Embodiment B11

The surfactant-modified star macromolecule of any one of Embodiments B1-B10, wherein $G^2$ comprises a $C_{16}$ or greater saturated fatty alkyl moiety.

Embodiment B12

The surfactant-modified star macromolecule of any one of Embodiments B1-B11, wherein $G^2$ comprises a $C_{18}$ or greater saturated fatty alkyl moiety.

Embodiment B13

The surfactant-modified star macromolecule of any one of Embodiments B1-B12, wherein $G^2$ comprises the hydrophobic moiety of a commercially suitable surfactant and/or registered in Toxic Substances Control Act (TSCA).

Embodiment B14

The surfactant-modified star macromolecule of any one of Embodiments B1-B13, wherein $L^1$ is a covalent bond, $G^1$ is an ester moiety, and $G^2$ comprises a $C_{18}$ or greater saturated fatty alkyl moiety.

Embodiment B15

The surfactant-modified star macromolecule of any one of Embodiments B1-B14, wherein the $G^2$ further comprises an aryl moiety, an ether moiety, a carbonyl moiety, or an unsaturated alkyl moiety.

Embodiment B16

The surfactant-modified star macromolecule of any one of Embodiments B1-B15, wherein the surfactant-modified star macromolecule comprises a plurality of the at least one first polymeric arm and a plurality of the at least one second polymeric arm.

Embodiment B17

The surfactant-modified star macromolecule of any one of Embodiments B1-B16, wherein each of the at least one second polymeric arms comprise in the range of between 1 and 500 of the at least one pendant moieties.

Embodiment B18

The surfactant-modified star macromolecule of any one of Embodiments B1-B17, wherein the surfactant-modified star macromolecule comprises a 40:1 to 1:40 ratio of the at least one first polymeric arm to the at least one second polymeric arm.

Embodiment B19

The surfactant-modified star macromolecule of any one of Embodiments B1-B18, wherein the surfactant-modified star macromolecule comprises a 4:1 ratio of the at least one first polymeric arm to the at least on second polymeric arm.

Embodiment B20

The surfactant-modified star macromolecule of any one of Embodiments B1-B19, wherein $L^1$ is a covalent bond.

Embodiment B21

The surfactant-modified star macromolecule of any one of Embodiments B1-B20, wherein $G^1$ is an ester moiety.

Embodiment B22

The surfactant-modified star macromolecule of any one of Embodiments B1-B21, wherein $G^1$ is an amide moiety.

Embodiment B23

The surfactant-modified star macromolecule of Embodiments B21 or B22, wherein $L^1$ bonds to the carbonyl moiety of $G^1$.

Embodiment B24

The surfactant-modified star macromolecule of any one of Embodiments B1-B23, wherein $G^1$ is a sulfonate moiety.

Embodiment B25

The surfactant-modified star macromolecule of any one of Embodiments B1-B24, wherein $G^1$ is a sulfonamide moiety.

Embodiment B26

The surfactant-modified star macromolecule of Embodiments B24 or B25, wherein $L^1$ bonds to the sulfonyl moiety of $G^1$.

Embodiment B27

The surfactant-modified star macromolecule of any one of Embodiments B1-B26, wherein $L^2$ is a covalent bond.

Embodiment B28

The surfactant-modified star macromolecule of any one of Embodiments B1-B27, wherein $L^2$ comprises an aryl moiety, an ether moiety, a carbonyl moiety, or an unsaturated alkyl moiety.

Embodiment B29

The surfactant-modified star macromolecule of any one of Embodiments B1-B28, wherein the surfactant-modified star macromolecule further comprises at least one third polymeric arm.

Embodiment B30

The surfactant-modified star macromolecule of Embodiment B29, wherein the at least one third polymeric arm comprises a polymeric segment comprised of monomeric residues of polymerized hydrophilic monomer.

Embodiment B31

The surfactant-modified star macromolecule of Embodiment B30, wherein the polymeric segment is a hydrophilic polymeric segment.

Embodiment B32

The surfactant-modified star macromolecule of any one of Embodiments B29-B31, wherein the at least one third polymeric arm comprises a polymeric segment comprised of monomeric residues of polymerized hydrophobic monomer.

Embodiment B33

The surfactant-modified star macromolecule of Embodiment B32, wherein the polymeric segment is a hydrophobic polymeric segment.

Embodiment B34

The surfactant-modified star macromolecule of any one of Embodiments B31-B33, wherein the hydrophilic polymeric segment of the at least one third polymeric arm is proximal to the core.

Embodiment B35

The surfactant-modified star macromolecule of any one of Embodiments B31-B34, wherein the hydrophilic polymeric segment of the at least one third polymeric arm is covalently attached to the core.

Embodiment B36

The surfactant-modified star macromolecule of any one of Embodiments B33-B35, wherein the hydrophobic polymeric segment is the distal segment of the at least one third polymeric arm.

Embodiment B37

The surfactant-modified star macromolecule of any one of Embodiments B33-B36, wherein the at least one third polymeric arm consists of the hydrophilic polymeric segment and the hydrophobic polymeric segment.

Embodiment B38

The surfactant-modified star macromolecule of any one of Embodiments B33-B37, wherein a portion of the hydrophobic polymeric segment of the at least one third polymeric arm extends beyond the distal portion of the at least one first polymeric arm.

Embodiment B39

The surfactant-modified star macromolecule of any one of Embodiments B29-B38, wherein the surfactant-modified star macromolecule comprises a plurality of the at least one third polymeric arm.

Embodiment B40

The surfactant-modified star macromolecule of any one of Embodiments B1-B39, wherein the further segment comprises one or more monomeric residues of polymerized hydrophobic monomers.

Embodiment B41

The surfactant-modified star macromolecule of any one of Embodiments B1-B40, wherein the further segment comprises a plurality of monomeric residues of polymerized hydrophobic monomers.

Embodiment B42

The surfactant-modified star macromolecule of any one of Embodiments B1-B41, wherein the further segment comprises one or more monomeric residues of polymerized hydrophilic monomers.

Embodiment B43

The surfactant-modified star macromolecule of any one of Embodiments B1-B42, wherein the further segment comprises a plurality of monomeric residues of polymerized hydrophilic monomers.

Embodiment B44

The surfactant-modified star macromolecule of any one of Embodiments B1-B43, wherein the hydrophilic polymeric segment of the at least one first polymeric arm is a homopolymeric segment, a copolymeric segment, a block copolymeric segment, a blocky copolymeric segment, a gradient copolymeric segment, or a random copolymeric segment.

Embodiment B45

The surfactant-modified star macromolecule of any one of Embodiments B1-B44, wherein the hydrophilic polymeric segment of the at least one second polymeric arm is a homopolymeric segment, a copolymeric segment, a block copolymeric segment, a blocky copolymeric segment, a gradient copolymeric segment, or a random copolymeric segment.

Embodiment B46

The surfactant-modified star macromolecule of any one of Embodiments B1-B45, wherein the further segment is a polymeric segment.

Embodiment B47

The surfactant-modified star macromolecule of any one of Embodiments B1-B46, wherein the further segment of the at least one second polymeric arm is a homopolymeric segment, a copolymeric segment, a block copolymeric segment, a blocky copolymeric segment, a gradient copolymeric segment, or a random copolymeric segment.

Embodiment B48

The surfactant-modified star macromolecule of any one of Embodiments B31-B47, wherein the hydrophilic polymeric segment of the at least one third polymeric arm is a homopolymeric segment, a copolymeric segment, a block copolymeric segment, a blocky copolymeric segment, a gradient copolymeric segment, or a random copolymeric segment.

Embodiment B49

The surfactant-modified star macromolecule of any one of Embodiments B33-B48, wherein the hydrophobic polymeric segment of the at least one third polymeric arm is a homopolymeric segment, a copolymeric segment, a block copolymeric segment, a blocky copolymeric segment, a gradient copolymeric segment, or a random copolymeric segment.

Embodiment B50

The surfactant-modified star macromolecule of any one of Embodiments B1-B49, wherein the further segment is a surfactant-system thickening polymeric segment.

Embodiment B51

The surfactant-modified star macromolecule of any one of Embodiments B1-B50, wherein the surfactant-modified star macromolecule increases the viscosity of a surfactant-containing system.

Embodiment B52

The surfactant-modified star macromolecule of Embodiment B51, wherein the surfactant-containing system is an aqueous system.

Embodiment B53

The macromolecule of any one of Embodiments B1-52, wherein the surfactant is a nonionic surfactant, an anionic surfactant, an amphoteric surfactant, or a cationic surfactant.

Embodiment B54

The macromolecule of Embodiment B53, wherein the surfactant is a nonionic surfactant.

Embodiment B55

The macromolecule of Embodiment B53, wherein the surfactant is a an anionic surfactant.

Embodiment B56

The macromolecule of Embodiment B53, wherein the surfactant is an amphoteric surfactant.

Embodiment B57

The macromolecule of Embodiment B53, wherein the surfactant is a cationic surfactant.

Embodiment C1

A method of increasing the viscosity of a surfactant-containing aqueous system, comprising:
introducing a surfactant-system thickening macromolecule into the surfactant-containing aqueous system, wherein the surfactant-system thickening macromolecule comprises:
i) a core;
ii) at least one first polymeric arm, comprising a polymeric segment comprised of monomeric residues of polymerized hydrophilic monomers; and
iii) at least one second polymeric arm, comprises:
1) at least one pendant micelle-philic moiety; or
2) a polymeric segment comprised of at least one monomeric residue of a polymerized micelle-philic monomer.

Embodiment C2

The method of Embodiment C1, wherein the core is a crosslinked polymeric core.

Embodiment C3

The method of Embodiments C1 or C2, wherein the core is a hydrophobic crosslinked polymeric core.

Embodiment C4

The method of any one of Embodiments C1-C3, wherein the polymeric segment of the at least one first polymeric arm is comprised of between 5 and 2000 monomeric residues of polymerized hydrophilic monomers.

Embodiment C5

The method of any one of Embodiments C1-C4, wherein the at least one second polymeric arm comprises the at least one pendant micelle-philic moiety.

Embodiment C6

The method of any one of Embodiments C1-C5, wherein the at least one second polymeric arm comprises a plurality of the at least one pendant micelle-philic moieties.

Embodiment C7

The method of any one of Embodiments C1-C6, wherein the at least one second polymeric arm comprises the polymeric segment comprised of the at least one monomeric residue of polymerized micelle-philic monomer.

Embodiment C8

The method of any one of Embodiments C1-C7, wherein the polymeric segment of the at least one second polymeric arm comprised of the at least one monomeric residue of polymerized micelle-philic monomer is a micelle-philic polymeric segment.

Embodiment C9

The method of any one of Embodiments C1-C8, wherein the polymeric segment of the at least one second polymeric arm is comprised of a plurality of the at least one monomeric residue of polymerized micelle-philic monomers.

Embodiment C10

The method of any one of Embodiments C1-C9, wherein the polymeric segment of the at least one second polymeric arm is comprised of between 1 and 500 monomeric residues of polymerized micelle-philic monomers or pendant micelle-philic moieties.

Embodiment C11

The method of any one of Embodiments C1-C10, wherein a portion of the at least one second polymeric arm comprising the at least one pendant micelle-philic moiety or the at least one monomeric residue of a polymerized micelle-philic monomer is further comprised of at least one monomeric residue of a polymerized hydrophobic monomer.

Embodiment C12

The method of any one of Embodiments C1-C11, wherein a portion of the at least one second polymeric arm comprising the at least one pendant micelle-philic moiety or the at least one monomeric residue of a polymerized micelle-philic monomer is further comprised of a plurality of monomeric residues of a polymerized hydrophobic monomer.

Embodiment C13

The method of any one of Embodiments C1-C12, wherein a portion of the at least one second polymeric arm comprising the at least one pendant micelle-philic moiety or the at least one monomeric residue of a polymerized micelle-philic monomer is further comprised of in the range of between 1 and 500 monomeric residues of a polymerized hydrophobic monomer.

Embodiment C14

The method of any one of Embodiments C1-C13, wherein the at least one second polymeric arm further comprises a polymeric segment comprised of monomeric residues of polymerized hydrophilic monomers.

Embodiment C15

The method of any one of Embodiments C1-C14, wherein the polymeric segment of the at least one second polymeric arm comprised of the monomeric residues of polymerized hydrophilic monomers is a hydrophilic polymeric segment.

Embodiment C16

The method of Embodiment C15, wherein the hydrophilic polymeric segment of the at least one second polymeric arm is comprised of a plurality of the monomeric residues of polymerized hydrophilic monomers.

Embodiment C17

The method of Embodiments C15 or C16, wherein the hydrophilic polymeric segment of the at least one second polymeric arm is comprised of between 10 and 5000 monomeric residues of the polymerized hydrophilic monomers.

Embodiment C18

The method of any one of Embodiments C1-C17, wherein the pendant micelle-philic moieties or the monomeric residues of polymerized micelle-philic monomers are distal to the core.

Embodiment C19

The method of any one of Embodiments C15-C18, wherein at least a portion of the hydrophilic polymeric segment of the at least one second polymeric arm extends beyond the distal portion of the at least one first polymeric arm.

Embodiment C20

The method of any one of Embodiments C15-C19, wherein the hydrophilic polymeric segment of said at least one second polymeric arm is proximal to the core.

Embodiment C21

The method of any one of Embodiments C1-C20, wherein the at least one first polymeric arm and the at least one second polymeric arm are covalently attached to the core.

Embodiment C22

The method of any one of Embodiments C14-C21, wherein the at least one second polymeric arm comprises more of the monomeric residues of polymerized hydrophilic monomers than the pendant micelle-philic moieties or the monomeric residues of polymerized micelle-philic monomers.

Embodiment C23

The method of any one of Embodiments C14-C22, wherein the at least one second polymeric arm comprises in the range of between 2 and 1000 times more of the monomeric residues of polymerized hydrophilic monomers than the at least one pendant micelle-philic moiety or the at least one monomeric residue of polymerized micelle-philic monomer.

Embodiment C24

The method of any one of Embodiments C14-C23, wherein the at least one second polymeric arm comprises 2 times, 3 times, 4 times, 5 times, 10 times, 50 times, 100 times, or greater than 100 times, more of the monomeric residues of polymerized hydrophilic monomers than the at least one pendant micelle-philic moiety or the at least one monomeric residues of polymerized micelle-philic monomer.

Embodiment C25

The method of any one of Embodiments C1-C24, wherein the at least one second polymeric arm has a molecular weight of greater than 5,000 g/mol.

Embodiment C26

The method of any one of Embodiments C1-C25, wherein the surfactant-system thickening macromolecule comprises a plurality of the at least one first polymeric arm.

Embodiment C27

The method of any one of Embodiments C1-C26, wherein the surfactant-system thickening macromolecule comprises a plurality of the at least one second polymeric arm.

Embodiment C28

The method of any one of Embodiments C1-C27, wherein the surfactant-system thickening macromolecule comprises a plurality of the at least one first polymeric arm and a plurality of the at least one second polymeric arm.

Embodiment C29

The method of any one of Embodiments C1-C28, wherein the ratio of the at least one first polymeric arm to the at least one second polymeric arm is in the range of between 40:1 and 1:40.

Embodiment C30

The method of any one of Embodiments C1-C29, wherein the surfactant-system thickening macromolecule, optionally, further comprises at least one third polymeric arm, comprising a polymeric segment comprised of monomeric residues of polymerized hydrophobic monomers, a polymeric segment comprised of monomeric residues of polymerized hydrophilic monomers, or both.

Embodiment C31

The method of Embodiment C30, wherein the surfactant-system thickening macromolecule further comprises the at least one third polymeric arm.

Embodiment C33

The method of Embodiments C30 or C31, wherein the at least one third polymeric arm comprises a polymeric segment comprised of monomeric residues of polymerized hydrophilic monomers.

Embodiment C34

The method of any one of Embodiments C30-C33, wherein the polymeric segment of the at least one third polymeric arm comprised of the monomeric residues of polymerized hydrophilic monomers is a hydrophilic polymeric segment.

Embodiment C35

The method of Embodiment C34, wherein the hydrophilic polymeric segment of the at least one third polymeric arm is comprised of a plurality of the monomeric residues of polymerized hydrophilic monomers.

Embodiment C36

The method of Embodiments C34 or C35, wherein the hydrophilic polymeric segment of the at least one third polymeric arm is comprised of between 1 and 500 monomeric residues of polymerized hydrophilic monomers.

Embodiment C37

The method of any one of Embodiments C30-C36, wherein the at least one third polymeric arm comprises a polymeric segment comprised of monomeric residues of polymerized hydrophobic monomers.

Embodiment C38

The method of Embodiment C37, wherein the polymeric segment of the at least one third polymeric arm comprised of the monomeric residues of polymerized hydrophobic monomers is a hydrophobic polymeric segment.

Embodiment C39

The method of Embodiments C37 or C38, wherein the hydrophobic polymeric segment of the at least one third polymeric arm is comprised of a plurality of the monomeric residues of polymerized hydrophobic monomers.

Embodiment C40

The method of any one of Embodiments C38-C39, wherein the hydrophobic polymeric segment of the at least one third polymeric arm is comprised of between 1 and 500 monomeric residues of polymerized hydrophobic monomers.

Embodiment C41

The method of any one of Embodiments C34-C40, wherein the hydrophilic polymeric segment of the at least one third polymeric arm is proximal to the core.

Embodiment C42

The method of any one of Embodiments C34-C41, wherein the hydrophilic polymeric segment of the at least one third polymeric arm is covalently attached to the core.

Embodiment C43

The method of any one of Embodiments C38-C42, wherein the hydrophobic polymeric segment of the at least one third polymeric arm is distal to the core.

Embodiment C44

The method of any one of Embodiments C38-C43, wherein a portion of the hydrophobic polymeric segment of the at least one third polymeric arm extends beyond the distal portion of the at least one first polymeric arm.

Embodiment C45

The method of any one of Embodiments C30-C44, wherein the surfactant-system thickening macromolecule comprises a plurality of the at least third polymeric arm.

Embodiment C46

The method of any one of Embodiments C30-C45, wherein the at least one third polymeric arm comprises more of the monomeric residues of polymerized hydrophilic monomers than the monomeric residues of polymerized hydrophobic monomers.

Embodiment C47

The method of any one of Embodiments C30-C46, wherein the at least one third polymeric arm comprises in the range of between 2 and 1000 times more of the monomeric residues of polymerized hydrophilic monomers than the monomeric residues of polymerized hydrophobic monomers.

Embodiment C48

The method of any one of Embodiments C30-C47, wherein the at least one third polymeric arm comprises 2 times, 3 times, 4 times, 5 times, 10 times, 50 times, 100 times, or greater than 100 times, more of the monomeric residues of polymerized hydrophilic monomers than the monomeric residues of polymerized hydrophobic monomers.

Embodiment C49

The method of any one of Embodiments C30-C48, wherein the ratio of the at least one first polymeric arms to the at least one third polymeric arms, the at least one third polymeric arms to the at least one second polymeric arms, and the at least one first polymeric arms to the sum of the at least one second polymeric arms and the at least one third polymeric arms, are independently in the range of between 40:1 and 1:40.

Embodiment C50

The method of any one of Embodiments C1-C49, wherein the surfactant-system thickening macromolecule is represented by Formula C:

$$[(P1)_{q1}]_r\text{-Core-}[(P3)_{q3}\text{-}(P2)_{q2}]_s \qquad \text{Formula C}$$

wherein:
Core represents a crosslinked polymeric segment;
P1 independently represents the hydrophilic polymeric segment of the at least one first polymeric arm comprised of monomeric residues of polymerized hydrophilic monomers;
P2 independently represents the polymeric segment of the at least one second polymeric arm comprised of:
  1) a polymerized backbone comprising at least one pendant micelle-philic moiety, or
  2) at least one monomeric residue of a polymerized micelle-philic monomer;
P3 independently represents the hydrophilic polymeric segment of the at least one second polymeric arm comprised of monomeric residues of polymerized hydrophilic monomers;
$q1$ independently represents the number of monomeric residues in P1;
$q2$ independently represents the number of monomeric residues in P2;
$q3$ independently represents the number of monomeric residues in P3;
$r$ independently represents the number of the at least one first polymeric arms covalently attached to the Core; and
$s$ independently represents the number of the at least one second polymeric arms covalently attached to the Core.

Embodiment C51

The method of Embodiment C50, wherein the ratio of r:s is in the range of between 40:1 and 1:40.

Embodiment C52

The method of Embodiments C50 or C51, wherein the ratio of r:s is 4:1.

Embodiment C53

The method of any one of Embodiments C1-C52, wherein the surfactant-system thickening macromolecule is represented by Formula D:

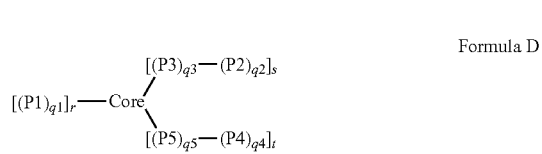

wherein:
Core represents a crosslinked polymeric segment;
P1 independently represents the hydrophilic polymeric segment of the at least one first polymeric arm comprised of monomeric residues of polymerized hydrophilic monomers;

P2 independently represents the polymeric segment of the at least one second polymeric arm comprised of:
1) a polymerized backbone comprising at least one pendant micelle-philic moiety, or
2) at least one monomeric residue of a polymerized micelle-philic monomer;
P3 independently represents the hydrophilic polymeric segment of the at least one second polymeric arm comprised of monomeric residues of polymerized hydrophilic monomers;
P4 independently represents the hydrophobic polymeric segment of the at least one third polymeric arm comprised of monomeric residues of polymerized hydrophobic monomers;
P5 independently represents the hydrophilic polymeric segment of the at least one third polymeric arm comprised of monomeric residues of polymerized hydrophilic monomers;
q1 independently represents the number of monomeric residues in P1;
q2 independently represents the number of monomeric residues in P2;
q3 independently represents the number of monomeric residues in P3;
q4 independently represents the number of monomeric residues in P4;
q5 independently represents the number of monomeric residues in P5;
r independently represents the number of the at least one first polymeric arms covalently attached to the Core;
s independently represents the number of the at least one second polymeric arms covalently attached to the Core; and
t independently represents the number of the at least one third polymeric arms covalently attached to the Core.

Embodiment C54

The method of Embodiment C53, wherein the ratio of r:s, and, if t is not zero, the ratio of r:t, t:s, and r:(s+t), are independently in the range of between 40:1 and 1:40.

Embodiment C55

The method of Embodiments C53 or C54, wherein the ratio of r:s is 4:1.

Embodiment C56

The method of any one of Embodiments C50-C55, wherein q1 has a value between 5 and 2000.

Embodiment C57

The method of any one of Embodiments C50-C56, wherein q2 has a value between 1 and 500.

Embodiment C58

The method of any one of Embodiments C50-C57, wherein q3 has a value between 10 and 5000.

Embodiment C59

The method of any one of Embodiments C53-C58, wherein q4 has a value between 1 and 500.

Embodiment C60

The method of any one of Embodiments C53-C59, wherein q5 has a value between 10 and 5000.

Embodiment C61

The method of any one of Embodiments C50-C60, wherein r has a value in the range of from 1 to 1000.

Embodiment C62

The method of any one of Embodiments C50-C61, wherein s has a value in the range of from 1 to 1000.

Embodiment C63

The method of any one of Embodiments C53-C62, wherein t has a value in the range of from 0 to 1000.

Embodiment C64

The method of any one of Embodiments C50-C63, wherein q3 is greater than q2.

Embodiment C65

The method of any one of Embodiments C50-C64, wherein q3 is in the range of between 2 and 1000 times greater than q2.

Embodiment C66

The method of any one of Embodiments C50-C65, wherein q3 is 2 times, 3 times, 4 times, 5 times, 10 times, 50 times, 100 times, or greater than 100 times, greater than q2.

Embodiment C67

The method of any one of Embodiments C53-C66, wherein q5 is greater than q4.

Embodiment C68

The method of any one of Embodiments C53-C67, wherein q5 is in the range of between 2 and 1000 times greater than q4.

Embodiment C69

The method of any one of Embodiments C53-C68, wherein q5 is 2 times, 3 times, 4 times, 5 times, 10 times, 50 times, 100 times, or greater than 100 times, greater than q4.

Embodiment C70

The method of any one of Embodiments C50-C69, wherein P2 comprises the at least one pendant micelle-philic moiety.

Embodiment C71

The method of any one of Embodiments C50-C70, wherein P2 comprises a plurality of the at least one pendant micelle-philic moiety.

Embodiment C72

The method of any one of Embodiments C1-C71, wherein each of the at least second polymeric arms comprise in the range of between 1 and 500 pendant micelle-philic moieties.

Embodiment C73

The method of any one of Embodiments C1-C72, wherein the at least one pendant micelle-philic moiety is represented by the formula:

$$[L^1\text{-}G^1\text{-}L^2\text{-}G^2]$$

wherein:
- $G^1$ independently represents a residue of a hydrophilic moiety of the surfactant;
- $G^2$ independently represents a residue of a hydrophobic moiety of the surfactant;
- $L^1$ independently represents a linking group or a covalent bond, attaching $G^1$ to the at least one second polymeric arm; and
- $L^2$ independently represents a linking group or a covalent bond, linking $G^1$ and $G^2$.

Embodiment C74

The method of Embodiment C73, wherein $G^2$ comprises a $C_6$ or greater alkyl moiety, a fluorine-modified $C_4$ or greater alkyl moiety, or a $C_6$ or greater alkenyl moiety.

Embodiment C75

The method of Embodiments C73 or C74, wherein $G^2$ comprises a $C_{13}$ or greater saturated fatty alkyl moiety, a $C_{12}$ or greater mono-unsaturated fatty alkyl moiety, or a $C_{12}$ or greater poly-unsaturated fatty alkyl moiety.

Embodiment C76

The method of any one of Embodiments C73-C75, wherein $G^2$ comprises a $C_{14}$ or greater saturated fatty alkyl moiety.

Embodiment C77

The method of any one of Embodiments C73-C76, wherein $G^2$ comprises a $C_{16}$ or greater saturated fatty alkyl moiety.

Embodiment C78

The method of any one of Embodiments C73-C77, wherein $G^2$ comprises a $C_{18}$ or greater saturated fatty alkyl moiety.

Embodiment C79

The method of any one of Embodiments C73-C78, wherein $L^1$ is a covalent bond, $G^1$ is an ester moiety, and $G^2$ comprises a $C_{18}$ or greater saturated fatty alkyl moiety.

Embodiment C80

The method of any one of Embodiments C73-C79, wherein $G^2$ comprises the hydrophobic moiety of a commercially suitable surfactant and/or registered in TSCA.

Embodiment C81

The method of any one of Embodiments C73-C80, wherein $G^2$ comprises a $C_{19}$ or greater saturated fatty alkyl moiety.

Embodiment C82

The method of any one of Embodiments C73-C81, wherein the $G^2$ further comprises an aryl moiety, an ether moiety, a carbonyl moiety, or an unsaturated alkyl moiety.

Embodiment C83

The method of any one of Embodiments C73-C82, wherein $L^1$ is a covalent bond.

Embodiment C84

The method of any one of Embodiments C73-C83, wherein $G^1$ is an ester moiety.

Embodiment C85

The method of any one of Embodiments C73-C84, wherein $G^1$ is an amide moiety.

Embodiment C86

The method of Embodiments C84 or C85, wherein $L^1$ bonds to the carbonyl moiety of $G^1$.

Embodiment C87

The method of any one of Embodiments C73-C86, wherein $G^1$ is a sulfonate moiety.

Embodiment C88

The method of any one of Embodiments C73-C87, wherein $G^1$ is a sulfonamide moiety.

Embodiment C89

The method of Embodiments C87 or C88, wherein $L^1$ bonds to the sulfonyl moiety of $G^1$.

Embodiment C90

The method of any one of Embodiments C73-C89, wherein $L^2$ is a covalent bond.

Embodiment C91

The method of any one of Embodiments C73-C90, wherein $L^2$ comprises an aryl moiety, an ether moiety, a carbonyl moiety, or an unsaturated alkyl moiety.

Embodiment C92

The method of any one of Embodiments C1-C91, wherein a portion of the at least one second polymeric arm is represented by Formula E:

Formula E

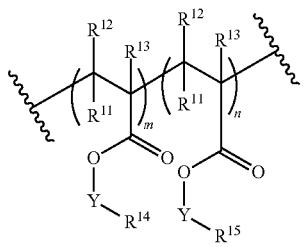

wherein:
- $R^{11}$, $R^{12}$, $R^{13}$ independently represent hydrogen, methyl, ethyl, or $C_{3-18}$ alkyl, for example $C_{3-6}$ alkyl, $C_{6-12}$ alkyl, or $C_{12-18}$ alkyl; wherein the alkyl may be branched or unbranched, linear or cyclic, and may be optionally substituted with one or more halogens, $C_{1-6}$ alkoxy groups, or poly(ethylene glycol);
- $R^{14}$ independently represents $C_{1-12}$ hydrocarbyl, $-C_{1-12}$ hydrocarbyl-(O—$C_{1-6}$ hydrocarbyl)$_w$, $-C_{1-12}$ hydrocarbyl-((CO)O—$C_{1-6}$ hydrocarbyl)$_w$, $-C_{1-12}$ hydrocarbyl-((CO)NH—$C_{1-6}$ hydrocarbyl)$_w$; wherein each hydrocarbyl portion independently may be branched or unbranched, linear or cyclic, saturated (alkyl) or unsaturated (alkenyl), and may be optionally substituted with one or more halogens, $C_{1-6}$ alkoxy groups, or poly(ethylene glycol);
- $R^{15}$ independently represents $C_{13-40}$ hydrocarbyl, $-C_{13-40}$ hydrocarbyl-(O—$C_{1-6}$ hydrocarbyl)$_w$, $-C_{13-40}$ hydrocarbyl-((CO)O—$C_{1-6}$ hydrocarbyl)$_w$, $C_{13-40}$ hydrocarbyl-((CO)NH—$C_{1-6}$ alkyl)$_w$; wherein each hydrocarbyl portion independently may be branched or unbranched, linear or cyclic, saturated (alkyl) or unsaturated (alkenyl), and may be optionally substituted with one or more halogens, $C_{1-6}$ alkoxy groups, or poly(ethylene glycol); or a hydrophobic moiety of a surfactant, a hydrophobic moiety of a lipid, or a hydrophobic moiety of a fatty alcohol;
- Y represents a covalent bond, ethylene glycol, poly(ethylene glycol), polyether, polyamide, $C_{1-6}$ alkyl, or combinations thereof, or is independently absent;
- m independently represents a value in the range of 1-500;
- n independently represents a value in the range of 1-500; and
- w independently represents a value in the range of 1-1000.

Embodiment C93

The method of Embodiment C92, wherein the portion of the at least one second polymeric arm represented by Formula E is a copolymeric segment, a block copolymeric segment, a blocky copolymeric segment, a gradient copolymeric segment, or a random copolymeric segment.

Embodiment C94

The method of any one of Embodiments C50-C93, wherein P2 comprises the at least one monomeric residue of a polymerized micelle-philic monomer.

Embodiment C95

The method of any one of Embodiments C50-C94, wherein P2 comprises a plurality of the at least one monomeric residue of a polymerized micelle-philic monomer.

Embodiment C96

The method of any one of Embodiments C1-C95, wherein the portion of the at least one second polymeric arm comprising the at least one monomeric residue of a polymerized micelle-philic monomer is a micelle-philic polymeric segment.

Embodiment C97

The method of Embodiment C96, wherein the micelle-philic polymeric segment is further comprised of at least one monomeric residue of a polymerized hydrophobic monomer.

Embodiment C98

The method of Embodiment C96, wherein the micelle-philic polymeric segment is further comprised of a plurality of monomeric residues of a polymerized hydrophobic monomer.

Embodiment C99

The method of any one of Embodiments C50-C98, wherein P2 is further comprised of at least one monomeric residue of a polymerized hydrophobic monomer.

Embodiment C100

The method of any one of Embodiments C50-C99, wherein P2 is further comprised of a plurality of monomeric residues of a polymerized hydrophobic monomer.

Embodiment C101

The method of any one of Embodiments C96-C100, wherein the micelle-philic polymeric segment is further comprised of at least one monomeric residue of a polymerized hydrophilic monomer.

Embodiment C102

The method of any one of Embodiments C96-C100, wherein the micelle-philic polymeric segment is further comprised of a plurality of monomeric residues of a polymerized hydrophilic monomer.

Embodiment C103

The method of any one of Embodiments C50-C102, wherein P2 is further comprised of at least one monomeric residue of a polymerized hydrophilic monomer.

Embodiment C104

The method of any one of Embodiments C50-C102, wherein P2 is further comprised of a plurality of monomeric residues of a polymerized hydrophilic monomer.

Embodiment C105

The method of any one of Embodiments C1-C104, wherein each of the at least second polymeric arms comprise in the range of between 1 and 500 monomeric residues of a polymerized micelle-philic monomer.

Embodiment C106

The method of any one of Embodiments C1-C105, wherein the at least one second polymeric arm comprises the at least one pendant micelle-philic moiety and the at least one monomeric residue of a polymerized micelle-philic monomer.

Embodiment C107

The method of any one of Embodiments C1-C106, wherein the at least one pendant micelle-philic moiety or the at least one monomeric residue of a polymerized micelle-philic monomer comprises a $C_6$ or greater alkyl moiety, a fluorine-modified $C_4$ or greater alkyl moiety, or a $C_6$ or greater alkenyl moiety.

Embodiment C108

The method of any one of Embodiments C1-C107, wherein the at least one pendant micelle-philic moiety or the at least one monomeric residue of a polymerized micelle-philic monomer comprises a $C_{13}$ or greater saturated fatty alkyl moiety, a $C_{12}$ or greater mono-unsaturated fatty alkyl moiety, or a $C_{12}$ or greater poly-unsaturated fatty alkyl moiety.

Embodiment C109

The method of any one of Embodiments C1-C108, wherein the at least one pendant micelle-philic moiety or the at least one monomeric residue of a polymerized micelle-philic monomer comprises a $C_{13}$ or greater pendant moiety.

Embodiment C110

The method of any one of Embodiments C1-C109, wherein the at least one pendant micelle-philic moiety or the at least one monomeric residue of a polymerized micelle-philic monomer comprises a $C_{13}$-$C_{40}$ pendant moiety.

Embodiment C111

The method of any one of Embodiments C1-C110, wherein the at least one pendant micelle-philic moiety or the at least one monomeric residue of a polymerized micelle-philic monomer comprises a $C_{13}$-$C_{30}$ pendant moiety.

Embodiment C112

The method of any one of Embodiments C1-C111, wherein the at least one pendant micelle-philic moiety or the at least one monomeric residue of a polymerized micelle-philic monomer comprises a $C_{13}$-$C_{20}$ pendant moiety.

Embodiment C113

The method of any one of Embodiments C1-C112, wherein the at least one pendant micelle-philic moiety or the at least one monomeric residue of a polymerized micelle-philic monomer comprises a $C_{14}$ or greater saturated fatty alkyl moiety.

Embodiment C114

The method of any one of Embodiments C1-C113, wherein the at least one pendant micelle-philic moiety or the at least one monomeric residue of a polymerized micelle-philic monomer comprises a $C_{16}$ or greater saturated fatty alkyl moiety.

Embodiment C115

The method of any one of Embodiments C1-C114, wherein the at least one pendant micelle-philic moiety or the at least one monomeric residue of a polymerized micelle-philic monomer comprises a $C_{18}$ or greater saturated fatty alkyl moiety.

Embodiment C116

The method of any one of Embodiments C1-C115, wherein the at least one pendant micelle-philic moiety or the at least one monomeric residue of a polymerized micelle-philic monomer comprises a $C_{19}$ or greater saturated fatty alkyl moiety.

Embodiment C117

The method of any one of Embodiments C1-C116, wherein the at least one pendant micelle-philic moiety or the at least one monomeric residue of a polymerized micelle-philic monomer comprises a $C_{19}$-$C_{40}$ pendant moiety.

Embodiment C118

The method of any one of Embodiments C1-C117, wherein the at least one pendant micelle-philic moiety or the at least one monomeric residue of a polymerized micelle-philic monomer comprises the hydrophobic moiety of a commercially suitable surfactant and/or registered in TSCA.

Embodiment C119

The method of any one of Embodiments C1-C118, wherein the at least one pendant micelle-philic moiety or the at least one monomeric residue of a polymerized micelle-philic monomer further comprises an aryl moiety, an ether moiety, a carbonyl moiety, or an unsaturated alkyl moiety.

Embodiment C120

The method of any one of Embodiments C1-C119, wherein the micelle-philic monomer comprises $C_{6-40}$ alkyl acrylate; $C_{6-40}$ alkyl alkyl acrylate; $C_{6-40}$ alkyl acrylamide; $C_{6-40}$ alkyl alkyl acrylamide; $C_{6-40}$ alkyl vinyl ether; or $C_{6-40}$ alkyl allyl ether.

Embodiment C121

The method of any one of Embodiments C1-C120, wherein the micelle-philic monomer comprises $C_{13}$ or greater alkyl acrylate; $C_1$ or greater alkyl alkyl acrylate; $C_{19}$ or greater alkyl acrylamide; $C_{13}$ or greater alkyl alkyl acrylamide; $C_2$ or greater alkyl vinyl ether; or $C_1$ or greater alkyl allyl ether.

Embodiment C122

The method of any one of Embodiments C1-C121, wherein the micelle-philic monomer comprises $C_{13-40}$ alkyl acrylate; $C_{11-40}$ alkyl alkyl acrylate; $C_{19-40}$ alkyl acrylamide; $C_{13-40}$ alkyl alkyl acrylamide; $C_{2-40}$ alkyl vinyl ether; or $C_{1-40}$ alkyl allyl ether.

Embodiment C123

The method of any one of Embodiments C108-C122, wherein the saturated fatty alkyl pendant moiety is: tridecyl, isotridecyl, myristyl, pentadecyl, cetyl, palmityl, heptadecyl, stearyl, nonadecyl, arachidyl, heneicosyl, behenyl, lignoceryl, ceryl (heptacosanyl), montanyl, nonacosanyl, myricyl, dotriacontanyl, geddyl, or cetostearyl pendant moiety.

Embodiment C124

The method of Embodiment C123, wherein the saturated fatty alkyl pendant moiety is a stearyl pendant moiety.

Embodiment C125

The method of any one of Embodiments C1-C124, wherein the at least one pendant micelle-philic moiety or the at least one monomeric residue of a polymerized micelle-philic monomer comprises an unsaturated fatty alkyl pendant moiety.

Embodiment C126

The method of Embodiment C125, wherein the unsaturated fatty alkyl pendant moiety is mono-unsaturated or poly-unsaturated.

Embodiment C127

The method of Embodiment C126, wherein the poly-unsaturated fatty alkyl pendant moiety is a di-, tri, tetra, penta, or hexa-unsaturated fatty alkyl pendant moiety.

Embodiment C128

The method of any one of Embodiments C1-C127, wherein the micelle-philic monomer comprises $C_{13}$ or greater alkenyl acrylate; $C_1$ or greater alkenyl alkyl acrylate; $C_{19}$ or greater alkenyl acrylamide; $C_{13}$ or greater alkenyl alkyl acrylamide; $C_2$ or greater alkenyl vinyl ether; or $C_1$ or greater alkenyl allyl ether.

Embodiment C129

The method of any one of Embodiments C1-C128, wherein the micelle-philic monomer comprises $C_{13-40}$ alkenyl acrylate; $C_{11-40}$ alkenyl alkyl acrylate; $C_{19-40}$ alkenyl acrylamide; $C_{13-40}$ alkenyl alkyl acrylamide; $C_{2-40}$ alkenyl vinyl ether; or $C_{1-40}$ alkenyl allyl ether.

Embodiment C130

The method of Embodiments C128 or C129, wherein the alkenyl group is a mono-, di-, tri, tetra, penta, or hexa-alkenyl group.

Embodiment C131

The method of any one of Embodiments C125-C130, wherein the unsaturated fatty alkyl pendant moiety is: myristoleyl, palmitoleyl, sapienyl, oleyl, elaidyl, vaccenyl, linoleyl, linoelaidyl, α-linolenyl, arachidonyl, eicosapentaenoyl, erucyl, or docosahexaenoyl pendant moiety.

Embodiment C132

The method of any one of Embodiments C1-C131, wherein the micelle-philic monomer is represented by Formula I-V:

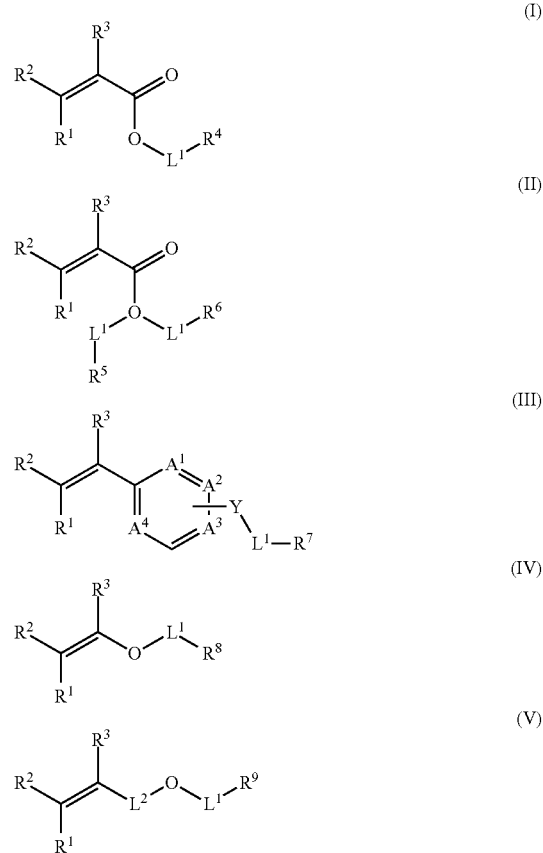

wherein:
$R^1$, $R^2$, and $R^3$ independently represent hydrogen, methyl, ethyl, or $C_{3-18}$ alkyl, for example $C_{3-6}$ alkyl, $C_{6-12}$ alkyl, or $C_{12-18}$ alkyl; wherein the alkyl may be branched or unbranched, linear or cyclic, and may be optionally substituted with one or more halogens, $C_{1-6}$ alkoxy groups, or poly(ethylene glycol);
$R^4$ and $R^7$ independently represent $C_{13}$ or greater alkyl, —$C_6$ or greater alkyl-(O—$C_{1-6}$ alkyl)$_n$, $C_6$ or greater alkenyl, or $C_6$ or greater alkenyl-(O—$C_{1-6}$ alkyl)$_n$; or when $R^3$ is $C_1$ or greater, then $R^4$ may independently represent $C_{11}$ or greater alkyl, —$C_6$ or greater alkyl —(O—$C_{1-6}$ alkyl)$_n$, $C_6$ or greater alkenyl, or $C_6$ or greater alkenyl-(O—$C_{1-6}$ alkyl)$_n$; wherein each alkyl portion independently may be branched or unbranched, linear or cyclic, saturated or unsaturated, and may be optionally substituted with one or more halogens, $C_{1-6}$ alkoxy groups, or poly(ethylene glycol);
$R^5$ independently represents $C_{19}$ or greater alkyl, —$C_6$ or greater alkyl —(O—$C_{1-6}$ alkyl)$_n$, $C_6$ or greater alkenyl, or $C_6$ or greater alkenyl-(O—$C_{1-6}$ alkyl)$_n$; or when $R^6$ is $C_1$ or greater, then $R^5$ may independently represent $C_{13}$ or greater alkyl, —$C_6$ or greater alkyl —(O—$C_{1-6}$ alkyl)$_n$, $C_6$ or greater alkenyl, or $C_6$ or greater alkenyl-(O—$C_{1-6}$ alkyl)$_n$; wherein each alkyl portion independently may be branched or unbranched, linear or cyclic, saturated or unsaturated, and may be optionally substituted with one or more halogens, $C_{1-6}$ alkoxy groups, or poly(ethylene glycol);
$R^6$ independently represents hydrogen, $C_{1-18}$ alkyl, —$C_{1-18}$ alkyl-(O—$C_{1-6}$ alkyl)$_n$, or is $R^4$, or is $R^5$; wherein each alkyl portion independently may be branched or unbranched, linear or cyclic, saturated or unsaturated, and may be optionally substituted with one or more halogens, $C_{1-6}$ alkoxy groups, or poly(ethylene glycol);

$R^8$ independently represents $C_2$ or greater alkyl, —$C_2$ or greater alkyl-(O—$C_{1-6}$ alkyl)$_n$, $C_3$ or greater alkenyl, —$C_3$ or greater alkenyl-(O—$C_{1-6}$ alkyl)$_n$; wherein each alkyl portion independently may be branched or unbranched, linear or cyclic, saturated or unsaturated, and may be optionally substituted with one or more halogens, $C_{1-6}$ alkoxy groups, or poly(ethylene glycol);

$R^9$ independently represents $C_1$ or greater alkyl, —$C_1$ or greater alkyl-(O—$C_{1-6}$ alkyl)$_n$, $C_3$ or greater alkenyl, —$C_3$ or greater alkenyl-(O—$C_{1-6}$ alkyl)$_n$; wherein each alkyl portion independently may be branched or unbranched, linear or cyclic, saturated or unsaturated, and may be optionally substituted with one or more halogens, $C_{1-6}$ alkoxy groups, or poly(ethylene glycol); or $R^4$, $R^5$, $R^7$, $R^8$, $R^9$ independently represent a hydrophobic portion of a surfactant, a hydrophobic portion of a lipid, or a hydrophobic portion of a fatty alcohol;

$A^1$, $A^2$, $A^3$ and $A^4$ independently represent CH, $CR^{10}$, or N, wherein at least two of $A^1$, $A^2$, $A^3$ and $A^4$ is CH or $CR^{10}$;

$R^{10}$ independently represents hydrogen, $C_{1-10}$ alkyl, halogen, hydroxyl, $C_{1-10}$ alkoxy; wherein the alkyl or alkoxy may be branched or unbranched, linear or cyclic, and may be optionally substituted with one or more halogens, $C_{1-6}$ alkoxy groups, or poly(ethylene glycol);

Y independently represents a covalent bond, —O—, —S—, —N(H)—, —N($R^1$)—, —(CO)—, —S(O)—, —S(O)$_2$—, —S(O)$_2$N($R^1$)—, —(CO)N($R^1$)—, —N($R^1$)—(CO)—, —(CO)O—, or —O—(CO)—;

$L^1$ independently represents a covalent bond, ethylene glycol, poly(ethylene glycol), polyether, polyamide, $C_{1-6}$ alkyl, —(CO)N($R^1$)—, —N($R^1$)—(CO)—, —(CO)O—, —O—(CO)—, or combinations thereof, or is independently absent; or $L^1$ independently represents a hydrophilic portion of a surfactant, a hydrophilic portion of a lipid, or a hydrophilic portion of a fatty alcohol;

$L^2$ independently represents $(CH_2)_{1-40}$, $C_{1-40}$ alkyl, (O—$C_{2-6}$ alkyl)$_n$, or $(C_{2-6}$ alkyl)-(O—$C_{2-6}$ alkyl)$_n$; wherein the alkyl may be branched or unbranched, linear or cyclic, and may be optionally substituted with one or more halogens, $C_{1-6}$ alkoxy groups, or poly(ethylene glycol); and n independently represents a value in the range of 1-1000.

Embodiment C133

The method of any one of Embodiments C50-C132, wherein the polymeric segment P1, P2, or P3 is a homopolymeric segment, a copolymeric segment, a block copolymeric segment, a blocky copolymeric segment, a gradient copolymeric segment, or a random copolymeric segment.

Embodiment C134

The method of any one of Embodiments C53-C133, wherein the polymeric segment P4 or P5 is a homopolymeric segment, a copolymeric segment, a block copolymeric segment, a blocky copolymeric segment, a gradient copolymeric segment, or a random copolymeric segment.

Embodiment C135

The method of any one of Embodiments C1-C134, wherein the surfactant-system thickening macromolecule has a molecular weight (Mn) in the range of between 5,000 g/mol and 10,000,000 g/mol.

Embodiment C136

The method of any one of Embodiments C1-C135, wherein the surfactant-system thickening macromolecule has a molecular weight (Mn) of greater than 100,000 g/mol.

Embodiment C137

The method of any one of Embodiments C1-C136, wherein the surfactant-system thickening macromolecule has a molecular weight (Mn) in the range of between 100,000 g/mol and 2,000,000 g/mol.

Embodiment C138

The method of any one of Embodiments C1-C137, wherein the molecular weight (Mn) of the at least one polymeric arm is between 1,000 g/mol to 250,000 g/mol.

Embodiment C139

The method of any one of Embodiments C1-C138, wherein the molecular weight (Mn) of the at least one polymeric arm is between 10,000 g/mol and 200,000 g/mol.

Embodiment C140

The method of any one of Embodiments C1-C139, wherein the surfactant-system thickening macromolecule is a water soluble mikto star macromolecule.

Embodiment C141

The macromolecule of any one of Embodiments C1-C140, wherein the surfactant is a nonionic surfactant, an anionic surfactant, an amphoteric surfactant, or a cationic surfactant.

Embodiment C142

The macromolecule of Embodiment C141, wherein the surfactant is a nonionic surfactant.

Embodiment C143

The macromolecule of Embodiment C141, wherein the surfactant is a an anionic surfactant.

Embodiment C144

The macromolecule of Embodiment C141, wherein the surfactant is an amphoteric surfactant.

Embodiment C145

The macromolecule of Embodiment C141, wherein the surfactant is a cationic surfactant.

Embodiment D1

A method of increasing the viscosity of a surfactant-containing aqueous system, comprising: introducing the surfactant-system thickening macromolecule of any one of Embodiments A1-A160 into the surfactant-containing aqueous system.

Embodiment D2

A method of increasing the viscosity of a surfactant-containing aqueous system, comprising: introducing the surfactant-modified star macromolecule of any one of Embodiments B1-B57 into the surfactant-containing aqueous system.

EXAMPLES

TABLE 1

| Abbreviation | Name | Form | Purity | Commercial Source |
|---|---|---|---|---|
| St | styrene | liquid | 99% | Sigma Aldrich |
| MMA | methyl methacrylate | liquid | 99% | Sigma Aldrich |
| tBA | tert-butyl acrylate | liquid | 98% | Sigma Aldrich |
| tBMA | tert-butyl methacrylate | liquid | 98% | Sigma Aldrich |
| AA | acrylic acid (formed by deprotection) | NA | NA | NA |
| Me6TREN | tris[2-(dimethylamino)ethyl]amine | liquid | 95% | ATRP Solutions |
| TPMA | tris(2-pyridylmethyl)amine | solid | 95% | ATRP Solutions |
| $Sn(EH)_2$ | tin(II) 2-ethylhexanoate | liquid | 95% | Sigma Aldrich |
| DVB | divinylbenzene | liquid | 80% | Sigma Aldrich |
| FA | formic acid | liquid | 99% | Sigma Aldrich |
| THF | tetrahydrofuran | liquid | 99.9% | Sigma Aldrich |
| NaOH | sodium hydroxide | solid | 98% | Sigma Aldrich |
| EBiB | ethyl α-bromoisobutyrate | liquid | 98% | Sigma Aldrich |
| DEBMM | diethyl 2-bromo-2-methylmalonate | liquid | 98% | Sigma Aldrich |
| DMF | diethylformamide | liquid | 98% | Sigma Aldrich |
|  | anisole | liquid | 99% | Sigma Aldrich |
| MeCN | acetonitrile | liquid | 99.8% | Sigma Aldrich |
| NaCl | sodium chloride | solid | 99.7% | Fisher Chemical |
| V-70 | 2,2'-azobis(4-methoxy-2,4-dimethyl valeronitrile) | solid | 99% | Wako |
| HCl | hydrochloric acid | liquid | 37% | Sigma Aldrich |
| SMA | Stearyl methacrylate | Solid | 80% | Sigma Aldrich |
| SLES | Sodium lauryl ether sulfate | liquid | 25.5% active | BASF |
| CB | Cocamidopropyl Betaine | liquid | 30% active | Croda |
| CH | Cocamidopropyl hydroxysultaine | liquid | 50% active | Croda |

Equipment:

The viscosity measurements reported in the examples detailed below were determined utilizing a BROOKFIELD® LVDV-E Viscometer, which utilized one of the following spindles:

LVDVE SC4-31—providing a shear rate ($sec^{-1}$) of 0.34 N per rpm; can be used in samples having a viscosity range of 30-100K cP;

LVDVE SC4-34—providing a shear rate ($sec^{-1}$) of 0.28 N per rpm; can be used in samples having a viscosity range of 60-200K cP; and LVDVE SC4-25—providing a shear rate ($sec^{-1}$) of 0.22 N per rpm; can be used in samples having a viscosity range of 800-1.6M cP.

Synthesis of Star Copolymers (Example 1-4)

Figure 17:
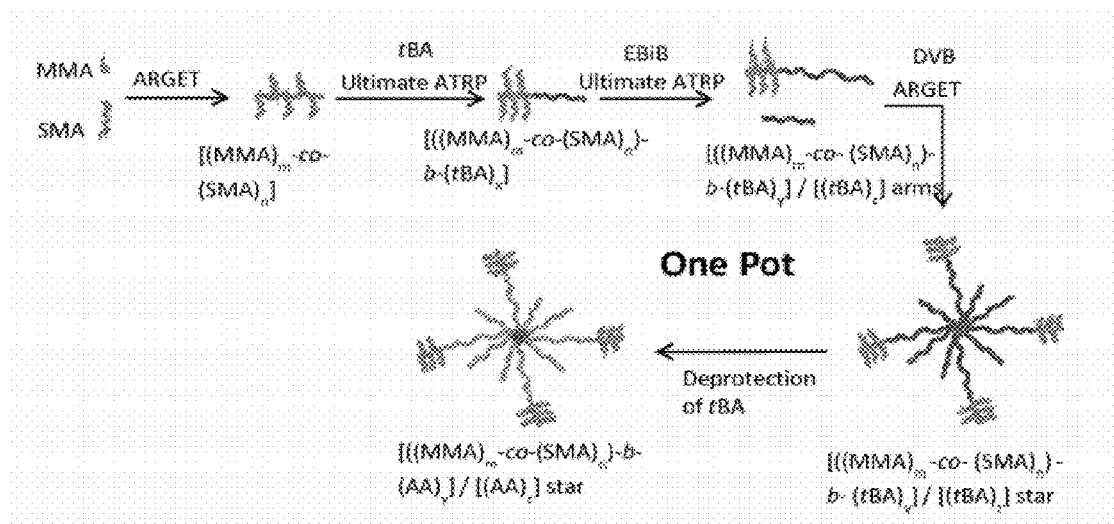
FIG. 17. A "one pot" scheme used for the synthesis of $[((MMA)_m\text{-co-}(SMA)_n)\text{-b-}(AA)_y]/[(AA)_z]$ miktoarm star copolymers.

Example 1: Synthesis of $[((MMA)_{20}$-co-$(SMA)_7)$-b-$(AA)_{351}]/[(AA)_{64}]$ Star A "one-pot" procedure was used for the preparation of a poly(acrylic acid) based miktoarm star macromolecule similar to that described in Scheme 1. The miktoarm star macromolecule with $R(MMA)_{20}$-co-$(SMA)_7)$-b-$(AA)_{351}]$ and $[(AA)_{64}]$ arms (molar ratio of arms: 1/4) was prepared as depicted in FIG. 17.

Step 1: Synthesis of a Poly(methyl methacrylate)-co-Poly(stearyl methacrylate) Macroinitiator $[(MMA)_{20}$-co-$(SMA)_7]$ Macroinitiator $[(MMA)_{20}$-co-$(SMA)_7]$ was synthesized by using Activators ReGenerated by Electron Transfer (ARGET) ATRP. The molar ratio of reagents used was: MMA/SMA/DEBMM/$CuBr_2$/TPMA/$Sn(EH)_2$=40/10/1/0.005/0.0175/0.05 in anisole (20% v/v). In a 250 mL round bottom flask, MMA (48 mL), SMA (38 g), and DEBMM (2.14 mL), were added to anisole (12 mL). A pre-mixed solution of $CuBr_2$/TPMA (13.3 mg CuBr2/57 mg TPMA) in DMF (1.5 mL) was added to the flask, which was then sealed with a rubber septum, and purged with nitrogen for 1.0 hour. The flask was then placed in a 75° C. oil bath, and injected with $Sn(EH)_2$ (0.193 mL) to start the reaction. Samples were taken to monitor the monomer conversion. After 23 hours, the flask was opened to air and the reaction was stopped. The polymer was purified by precipitation into methanol. The molecular weight measured by GPC was 4461 g/mol and PDI was 1.12. Yield: 22 grams of polymer was obtained after purification.

Steps 2-4: Synthesis of $[((MMA)_{20}$-co-$(SMA)_7)$-b-$(tBA)_{351}]/[(tBA)_{64}]$ Arms, Crosslinking and Deprotection to Produce $[((MMA)_{20}$-co-$(SMA)_7)$-b-$(AA)_{351}]/[(AA)_{64}]$ Star Copolymer in "One Pot"

The synthesis includes 3 steps: the synthesis of arms, the cross-linking of arms and the deprotection of star polymers. For the synthesis of arms, the molar ratio of reagents is: tBA/$[(MMA)_{20}$-co-$(SMA)_7]$ (from Example 1, Step 1)/EBiB/$CuBr_2$/$Me_6TREN$/V-70=160/0.2/0.8/0.01/0.05/

0.025. Anisole (33%, v/v) was used as solvent. The synthesis of arms was conducted as follows. In a 22 mL vial, $CuBr_2$ (19.05 mg) was dissolved in DMF (6.6 mL) with $Me_6TREN$ (0.1 mL) to make a stock solution. A 250 mL round bottom flask was charged with $[(MMA)_{20}\text{-co-}(SMA)_7]$ (1.52 g) from step 1, tBA (40 mL), and anisole (20 mL). The DMF solution of $CuBr_2/Me_6TREN$ (1.32 mL) was added, and the resulting polymer solution was stirred for 10 min in order to dissolve the macroinitiator. The flask was sealed with a rubber septum and the solution was purged with nitrogen for 40 minutes. In a 22 mL vial, V-70 (13.2 mg) was dissolved in acetone (1 mL) and purged with $N_2$, and the resulting solution was transferred into 1 mL syringe under $N_2$. The reaction flask was heated up to 65° C., and the reaction was injected with 0.1 mL of the V-70/acetone solution every 20 minutes. Sample was taken for analysis and as the conversion of monomer reached 44%, 0.2 mL of EBiB was injected. After that, 0.1 mL of the V-70/acetone solution was injected every 30 minutes. As the monomer conversion reached 85%, the reaction flask was open to air. The cross-linking of arms was continued in the same flask with the molar ratio of reagents as: $[((MMA)_{20}\text{-co-}(SMA)_7)\text{-b-}(tBA)_{351}]/[(tBA)_{64}]$ arms/DVB/$CuBr_2$/TPMA/$Sn(EH)_2$=1/25/0.02/0.2/0.2 in anisole. A solution of $CuBr_2$/TPMA (3.74 mg $CuBr_2$/30 mg TPMA) in DMF (2.0 mL), DVB (4.28 mL), and anisole (28 mL) were added to the reaction flask, and the resulting polymer solution was purged with $N_2$ for 1 h, and then heated up to 95° C. To the reaction flask was injected $Sn(EH)_2$ (0.08 mL), to start the reaction. Sample was taken for analysis and 16 hours later as the conversion of DVB reached 77%, the heating was stopped and the flask was opened to air. Molecular weight of $[((MMA)_{20}\text{-co-}(SMA)_7)\text{-b-}(tBA)_{351}]/[(tBA)_{64}]$ star molecule was determined by GPC. Mn=78817 g/mol, Mp=205801 g/mol, PDI=2.47. The GPC results were present in FIG. 1. The deprotection was then conducted by adding formic acid (20 mL) and sulfuric acid (0.1 mL) to the reaction flask. The reaction mixture was heated up to 75° C. After 6 hours, the reaction was finished. The liquid was decanted and the solid polymer was washed with acetonitrile and acetone in the flask for 3 times. The solid polymer was recovered from the flask and dried in vacuum oven at 40° C. for 1 day. Yield: the mass of $[((MMA)_{20}\text{-co-}(SMA)_7)\text{-b-}(AA)_{351}]/[(AA)_{64}]$ star was 18 gram.

Example 2: Synthesis of $[((MMA)_{20}\text{-co-}(SMA)_7)\text{-b-}(AA)_{169}]/[(AA)_{66}]$ Star The "one-pot" procedure was used for the preparation of a poly(acrylic acid) based miktoarm star macromolecule similar to that described in Scheme 1. The miktoarm star macromolecule with $[((MMA)_{20}\text{-co-}(SMA)_7)\text{-b-}(AA)_{169}]$ and $[(AA)_{66}]$ arms (molar ratio of arms: 1/4) was prepared as follows.

Step 1: Synthesis of a Poly(methyl methacrylate)-co-Poly(stearyl methacrylate) Macroinitiator $[(MMA)_{20}\text{-co-}(SMA)_7]$ Macroinitiator $[(MMA)_{20}\text{-co-}(SMA)_7]$ was synthesized as described in Example 1, Step 1.

Steps 2-4: Synthesis of $[((MMA)_{20}\text{-co-}(SMA)_7)\text{-b-}(tBA)_{169}]/[(tBA)_{66}]$ Arms, Crosslinking and Deprotection to Produce $[((MMA)_{20}\text{-co-}(SMA)_7)\text{-b-}(AA)_{169}]/[(AA)_{66}]$ Star Copolymer in "One Pot"

The synthesis includes 3 steps: the synthesis of arms, the cross-linking of arms and the deprotection of star polymers.

For the synthesis of arms, the molar ratio of reagents is: tBA/$[(MMA)_{20}\text{-co-}(SMA)_7]$ (from Example 1, Step 1)/EBiB/$CuBr_2$/$Me_6TREN$/V-70=160/0.2/0.8/0.01/0.05/0.025. Anisole (33%, v/v) was used as solvent. The synthesis of arms was conducted as follows. In a 22 mL vial, $CuBr_2$ (33.3 mg) was dissolved in DMF (12 mL) with $Me_6TREN$ (0.175 mL) to make a catalyst solution. An Ace Glass reactor (1 L) was charged with $[(MMA)_{20}\text{-co-}(SMA)_7]$ (13.3 g), tBA (350 mL), and anisole (155 mL). The DMF solution of $CuBr_2/Me_6TREN$ (12 mL) was added to the reactor. The resulting polymer solution was stirred for 10 min in order to dissolve the macroinitiator, then the reactor was sealed with a rubber septum and the solution was purged with nitrogen for 40 minutes. In a 100 mL round bottom flask was dissolved V-70 (115.5 mg) in acetone (30 mL) and purged with $N_2$, and the resulting solution was transferred into a 60 mL syringe under $N_2$. The reactor was then heated up to 65° C. and the acetone V-70 solution was fed into the reactor at the rate of 5 mL/h. The rate of addition was adjusted during the polymerization process in order to control the kinetics and exothermic effects of the reaction. Sample was taken for analysis and as the conversion of monomer reached 42%, EBiB (1.75 mL) was then injected. The acetone V-70 solution was then fed at 5 mL/h rate. As the monomer conversion reached 83%, the reactor was opened to air. The cross-linking of arms was continued in the same reactor with the molar ratio of reagents as: $[((MMA)_{20}\text{-co-}(SMA)_7)\text{-b-}(tBA)_{169}]/[(tBA)_{66}]$ arms/DVB/$CuBr_2$/TPMA/$Sn(EH)_2$=1/20/0.012/0.072/0.14 in anisole. A solution of $CuBr_2$/TPMA (36.2 mg $CuBr_2$/290 mg TPMA) in DMF (13.2 mL), DVB (39.4 mL), and anisole (200 mL) were added to the reactor, and the resulting polymer solution was purged with $N_2$ for 1 h. Then the reactor was heated up to 95° C., and $Sn(EH)_2$ (0.63 mL) was injected to start the reaction. Sample was taken for analysis and 19 hours later as the conversion of DVB reached 64%, the heating was stopped and the reactor was opened to air. Molecular weight of $[((MMA)_{20}\text{-co-}(SMA)_7)\text{-b-}(tBA)_{169}]/[(tBA)_{66}]$ star molecule was determined by GPC. Mn=49983 g/mol, Mp=108460 g/mol, PDI=2.49. The deprotection was then conducted by adding formic acid (150 mL) and sulfuric acid (0.3 mL) to the reactor. The reaction mixture was heated up to 75° C. After 6 hours, the reaction was finished. The liquid was decanted and the solid polymer was washed with acetonitrile and acetone in the flask for 3 times. The solid polymer was recovered from the flask and dried in vacuum oven at 40° C. for 1 day. Yield: the mass of $[((MMA)_{20}\text{-co-}(SMA)_7)\text{-b-}(AA)_{169}]/[(AA)_{66}]$ star was 175 gram.

Example 3: Synthesis of $[((MMA)_{20}\text{-co-}(SMA)_7)\text{-b-}(AA)_{698}]/[(MMA)_{15}\text{-b-}(AA)_{698}]/[(AA)_{98}]$ Star (Molar Ratio of Arms: 0.8/0.2/3, i.e., 4/1/15)

The "one-pot" procedure was used for the preparation of a poly(acrylic acid) based miktoarm star macromolecule similar to that described in Scheme 1. The miktoarm star macromolecule with $[((MMA)_{20}\text{-co-}(SMA)_7)\text{-b-}(AA)_{698}]$, $[(MMA)_{15}\text{-b-}(AA)_{698}]$, and $[(AA)_{98}]$ arms (molar ratio of arms: 0.8/0.2/3) was prepared as follows.

Step 1: Synthesis of a Poly(methyl methacrylate)-co-Poly(stearyl methacrylate) Macroinitiator $[(MMA)_{20}\text{-co-}(SMA)_7]$ having 27 DP (#12-027-90) and Poly(methyl methacrylate) Macroinitiator $[(MMA)_{15}]$ Macroinitiator $[(MMA)_{20}\text{-co-}(SMA)_7]$ was synthesized as described in Example 1, Step 1.

Macroinitiator [(MMA)$_{15}$] was synthesized by using Atom Transfer Radical Polymerization (ATRP). The molar ratio of reagents is: MMA/DEBMM/CuBr/CuBr$_2$/bpy=22/1/0.2/0.02/0.44 in DMF (50% v/v). To a 500 mL round bottom flask was added MMA (150 mL), DEBMM (12 m), CuBr$_2$ (0.31 g), bpy (4.37 g), and DMF (150 mL), which was then sealed with a rubber septum and the resulting solution was purged with nitrogen for 1 hour. Under nitrogen flow, the flask was opened and CuBr (1.8 g) was quickly added, the flask was then sealed and heated up to 50° C. After 2.5 hours, the reaction was stopped, the polymer was precipitated with methanol, and the molecular weight was measured by GPC. The Mn is 1525 g/mol and PDI is 1.06. Yield: 80 grams of polymer was obtained after purification.

Steps 2-4: Synthesis of [((MMA)$_{20}$-co-(SMA)$_7$)-b-(tBA)$_{698}$]/[(MMA)$_{15}$-b-(tBA)$_{698}$]/[(tBA)$_{98}$] Arms, Crosslinking and Deprotection to Produce [((MMA)$_{20}$-co-(SMA)$_7$)-b-(AA)$_{698}$]/[(MMA)$_{15}$-b-(AA)$_{698}$]/[(AA)$_{98}$] Star Copolymer in "One Pot"

The synthesis includes 3 steps: the synthesis of arms, the cross-linking of arms and the deprotection of star polymers. For the synthesis of arms, the molar ratio of reagents is: tBA/[(MMA)$_{20}$-co-(SMA)$_7$] (from Example 1, Step 1)/[(MMA)$_{15}$]/EBiB/CuBr$_2$/Me$_6$TREN/V-70=200/0.2/0.05/0.75/0.0125/0.625/0.025. Anisole (33%, v/v) was used as solvent. The synthesis of arms was conducted as follows. In a 22 mL vial, CuBr$_2$ (17.2 mg) was dissolved in DMF (5.94 mL) with Me$_6$TREN (0.1 mL) to make a stock solution. A 250 mL round bottom flask was charged with [(MMA)$_{20}$-co-(SMA)$_7$] (1.83 g), [(MMA)$_{15}$] (0.17 g), tBA (60 mL) and anisole (30 mL). The DMF solution of CuBr$_2$/Me$_6$TREN (1.98 mL) was added to the flask, the resulting polymer solution was stirred for 10 min in order to dissolve the macroinitiator, the flask was sealed with a rubber septum, and the solution was purged with nitrogen for 40 minutes. In a 22 mL vial, V-70 (19.7 mg) was dissolved in acetone (1 mL) and purged with N$_2$, and then transferred into 1 mL syringe under N$_2$. The reaction flask was heated up to 65° C., and then 0.1 mL of the V-70 actone solution was injected every 20 minutes. Sample was taken for analysis and as the conversion of monomer reached 26%, EBiB (0.2 mL) was injected. After that, 0.1 mL of the V-70 actone solution was injected every 30 minutes. As the monomer conversion reached 85%, the reaction flask was opened to air. The cross-linking of arms was continued in the same flask with the molar ratio of reagents as: [((MMA)$_{20}$-co-(SMA)$_7$)-b-(tBA)$_{698}$]/[(MMA)$_{15}$-b-(tBA)$_{698}$]/[(tBA)$_{98}$] arms/DVB/CuBr$_2$/TPMA/Sn(EH)$_2$=1/20/0.012/0.08/0.26 in anisole. A solution of CuBr$_2$/TPMA (4.27 mg CuBr$_2$/40 mg TPMA) in DMF (2.4 mL), DVB (4.54 mL), and anisole (60 mL), were added to the flask. The polymer solution was purged with N$_2$ for 1 h, then heated up to 95° C., and injected with Sn(EH)$_2$ (0.08 mL), and the reaction started. Sample was taken for analysis and 16 hours later as the conversion of DVB reached 64%, the heating was stopped and the flask was opened to air. Molecular weight of [((MMA)$_{20}$-co-(SMA)$_7$)-b-(tBA)$_{698}$]/[(MMA)$_{15}$-b-(tBA)$_{698}$]/[(tBA)$_{98}$] star molecule was determined by GPC. Mn=92248 g/mol, Mp=167538 g/mol, PDI=2.38. The deprotection was then conducted by adding formic acid (20 mL) and sulfuric acid (0.1 mL) to the flask. The reaction mixture was heated up to 75° C. After 6 hours, the reaction was finished. The liquid was decanted and the solid polymer was washed with acetonitrile and acetone in the flask for 3 times. The solid polymer was recovered from the flask and dried in vacuum oven at 40° C. for 1 day. Yield: the mass of [((MMA)$_{20}$-co-(SMA)$_7$)-b-(AA)$_{698}$]/[(MMA)$_{15}$-b-(AA)$_{698}$]/[(AA)$_{98}$] star was 18 gram.

Example 4: Synthesis of [((MMA)$_{20}$-co-(SMA)$_7$)-b-(AA)$_{461}$]/[(AA)$_{82}$] Star The "one-pot" procedure was used for the preparation of a poly(acrylic acid) based miktoarm star macromolecule similar to that described in Scheme 1. The miktoarm star macromolecule with [((MMA)$_{20}$-co-(SMA)$_7$)-b-(AA)$_{461}$] and [(AA)$_{82}$] arms (molar ratio of arms: 1/4) was prepared as follows.

Step 1: Synthesis of a Poly(methyl methacrylate)-co-Poly(stearyl methacrylate) Macroinitiator [(MMA)$_{20}$-co-(SMA)$_7$]

Macroinitiator [(MMA)$_{20}$-co-(SMA)$_7$] was synthesized as described in Example 1, Step 1.

Steps 2-4: Synthesis of [((MMA)$_{20}$-co-(SMA)$_7$)-b-(tBA)$_{461}$]/[(tBA)$_{82}$] Arms, Crosslinking and Deprotection to Produce [((MMA)$_{20}$-co-(SMA)$_7$)-b-(AA)$_{461}$]/[(AA)$_{82}$] Star Copolymer in "One Pot"

The synthesis includes 3 steps: the synthesis of arms, the cross-linking of arms and the deprotection of star polymers. For the synthesis of arms, the molar ratio of reagents is: tBA/[(MMA)$_{20}$-co-(SMA)$_7$] (from Example 1, Step 1)/EBiB/CuBr$_2$/Me$_6$TREN/V-70=200/0.2/0.8/0.0125/0.0625/0.03. Anisole (26%, v/v) was used as solvent. The synthesis of arms was conducted as follows. In a 22 mL vial, CuBr$_2$ (33.4 mg) was dissolved in DMF (12 mL) with Me$_6$TREN (0.20 mL) to make a catalyst solution. An Ace Glass reactor (1 L) was charged with [(MMA)$_{20}$-co-(SMA)$_7$] (10.99 g), tBA (350 mL), and anisole (120 mL). The DMF solution of CuBr$_2$/Me$_6$TREN (12 mL) was added to the reactor, and the resulting polymer solution was stirred for 10 min in order to dissolve the macroinitiator. The reactor was sealed with a rubber septum and the solution was purged with nitrogen for 40 minutes. In a 100 mL round bottom flask V-70 (115.5 mg) was dissolved in acetone (30 mL) and purged with N$_2$ and then transferred into 60 mL syringe under N$_2$. The 1 L reactor was then heated up to 65° C. and the acetone solution of V-70 was fed at the rate of 5 mL/h. This rate was adjusted during the polymerization process in order to control the kinetics and exothermic effects of the reaction. Sample was taken for analysis and as the conversion of monomer reached 41%, EBiB (1.75 mL) was injected. Then the acetone solution of V-70 was fed at 5 mL/h rate. As the monomer conversion reached 82%, the flask was opened to air. The cross-linking of arms was continued in the same flask with the molar ratio of reagents as: [((MMA)$_{20}$-co-(SMA)$_7$)-b-(tBA)$_{461}$]/[(tBA)$_{82}$] arms/DVB/CuBr$_2$/TPMA/Sn(EH)$_2$=1/20/0.012/0.072/0.14 in anisole. A solution of CuBr$_2$/TPMA (36.2 mg CuBr$_2$/330 mg TPMA) in DMF (13.2 mL), DVB (39.4 mL), and anisole (600 mL), were added to the reactor, and the resulting polymer solution was purged with N$_2$ for 1 h. The reactor was then heated up to 95° C., and Sn(EH)$_2$ (1.05 mL) was injected, the reaction started. Sample was taken for analysis and 19 hours later as the conversion of DVB reached 82%, the heating was stopped and the reactor was opened to air. Molecular weight of [((MMA)$_{20}$-co-(SMA)$_7$)-b-(tBA)$_{461}$]/[(tBA)$_{82}$] star molecule was determined by GPC. Mn=94705 g/mol, Mp=254651 g/mol, PDI=2.87. The deprotection was then conducted by adding formic acid (150 mL) and sulfuric acid (0.3 mL) to the reactor. The reaction mixture was heated up to 75° C. After 6 hours, the reaction was finished. The liquid was decanted and the solid polymer was washed with acetonitrile and acetone in the reactor for 3 times. The solid polymer was recovered from the flask and dried in vacuum oven at 40° C. for 1 day. Yield: the mass of [((MMA)$_{20}$-co-(SMA)$_7$)-b-(AA)$_{461}$]/[(AA)$_{82}$] star was 175 gram.

Properties of Star Copolymer (Examples 5-20)

The thickening property (influence on viscosity) and shear thinning property of aqueous solutions (water or surfactant-containing solutions) containing star macromolecules was investigated.

The viscosity of the aqueous solutions of the star macromolecules vs. shear rate was measured using a BROOKFIELD® LVDV-E Viscometer equipped with a Spindle LVDVE SC4-31 at T=25° C. (shear rate=rpm×0.34), or if the viscosity it too great for that spindle, then a Spindle LVDVE SC4-25 at T=25° C. (shear rate=rpm×0.22). The viscosity of the samples were measured at 25° C., unless otherwise specified. In general, the viscosity ranges (cP) suitable for the Spindle LVDVE SC4-31 is 3 cP to 100,000 cP, and the viscosity ranges (cP) suitable for the Spindle LVDVE SC4-25 is 800 cP to 1,600,000 cP. For samples with viscosities within the test range having a viscosity below 100, Spindle SC4-31 should be selected.

Sample Preparation Procedure:

Aqueous gels at various concentrations (e.g., 0.2 wt. %, 0.25 wt %, 0.3 wt. %, 0.4 wt. % 0.6 wt. %, 0.7 wt. % and 1.0 wt. %) of polymers were prepared as follows: Deionized (DI) water (400 mL) was transferred to 600 mL beaker, which was assembled below overhead stirrer IKA with mount stirring shaft with 3-blade marine impeller. The water was stirred at 600 rpm to generate vortex, and to this was slowly sprinkled in a certain amount of the specified solid polymer. The resulting aqueous polymer solution was then heated to 30° C., and if necessary, adjusted to a pH of 7 (e.g., add solid NaOH), and the stirring rate was then increased to 800 rpm, and then to 1600 rpm. The aqueous polymer solution was stirred for 15-20 min until the temperature reached 80-90° C. The resulting mixture was then homogenized with a Silverson homogenizer equipped with a Square Hole workhead and Axial Flow workhead. The homogenizer stirring speed was gradually increased to 4800±200 rpm and mixed for 35 min. until a thick homogeneous gel was obtained. The pH of the resulting gel was analyzed with pH meter and, if necessary, adjusted to pH=7.0 (e.g., add solid NaOH).

Example 5: Thickening and Shear Thinning in Water

A gel from an aqueous solution containing 0.4 wt. % of a star macromolecule (e.g., star macromolecule synthesized in Example 1, 2, 3 or 4), was formed according to the Sample Preparation Procedure, using 1.2 g of the specified solid polymer, 0.408 g solid NaOH, and the pH of the resulting gel was analyzed with pH meter and adjusted to pH=7.0.

Figure 2A:
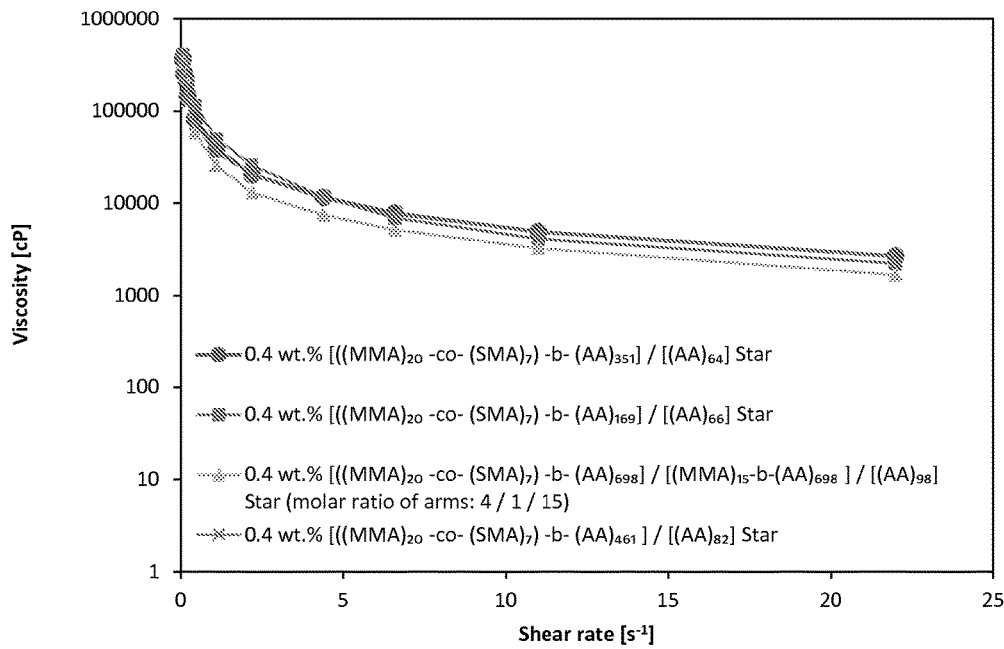
FIG. 2a. Viscosity vs. shear rate of aqueous solution of star macromolecules prepared in Examples 1-4.
Figure 2B:
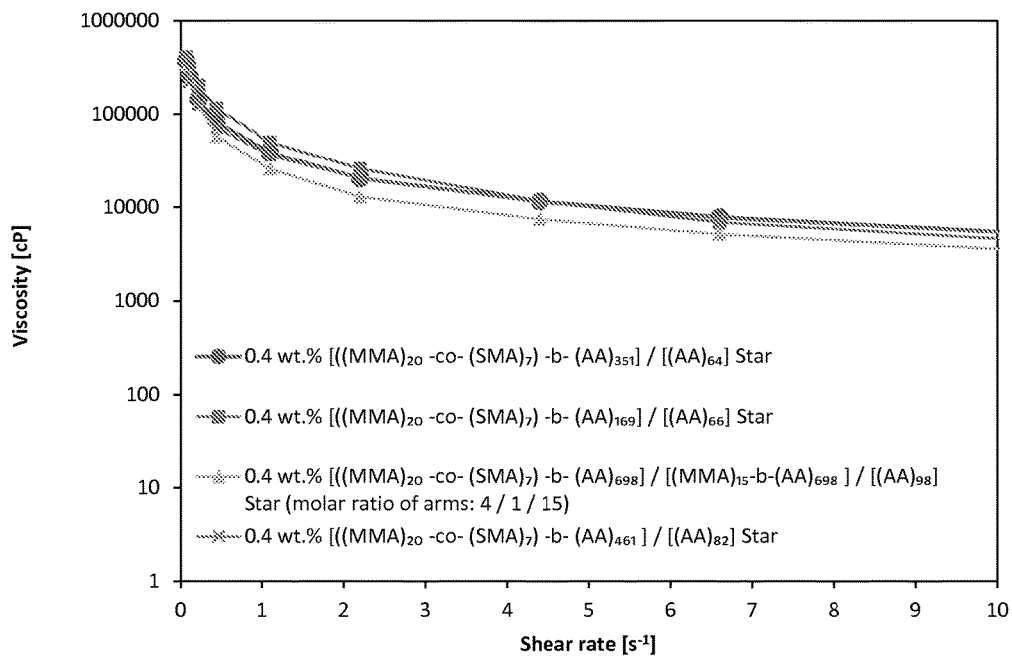

The viscosity of the aqueous solution of the star macromolecule vs. shear rate was measured using the Spindle LVDVE SC4-25 at spindle rates of 0.3, 0.5, 1.0, 2.0, 5.0, 10, 20, 30, 50, and 100 rpm. The results are presented in FIGS. 2a and 2b.

Example 6: SLES Surfactant Compatibility

A gel from an aqueous 6.4 wt. % SLES solution containing 2 wt. % of a thickening agent (e.g., star macromolecule synthesized in Example 1, [(MMA)$_{15}$-b-(AA)$_{367}$]/[(AA)$_{82}$] star, [(St)$_{17}$-b-(AA)$_{454}$]/[(AA)$_{98}$] star, or Crothix Liquid), was formed according to the SLES Surfactant Compatibility Procedure:

For each sample, a 20 mL vial was charged with 25.5% active SLES aqueous solution (5.0 g), thickening agent (0.4 g), NaOH (0.108 g; used only for Example 1, [(MMA)$_{15}$-b-(AA)$_{367}$]/[(AA)$_{82}$] star, [(St)$_{17}$-b-(AA)$_{454}$]/[(AA)$_{98}$] star, not for Crothix Liquid), and then a certain amount of deionized water to reach a total sample weight of 20 g. The sample mixtures were then stirred at 70° C. for 2-4 hours until all solids were dissolved, and then cooled at room temperature for 3 hours.

Figure 3A:
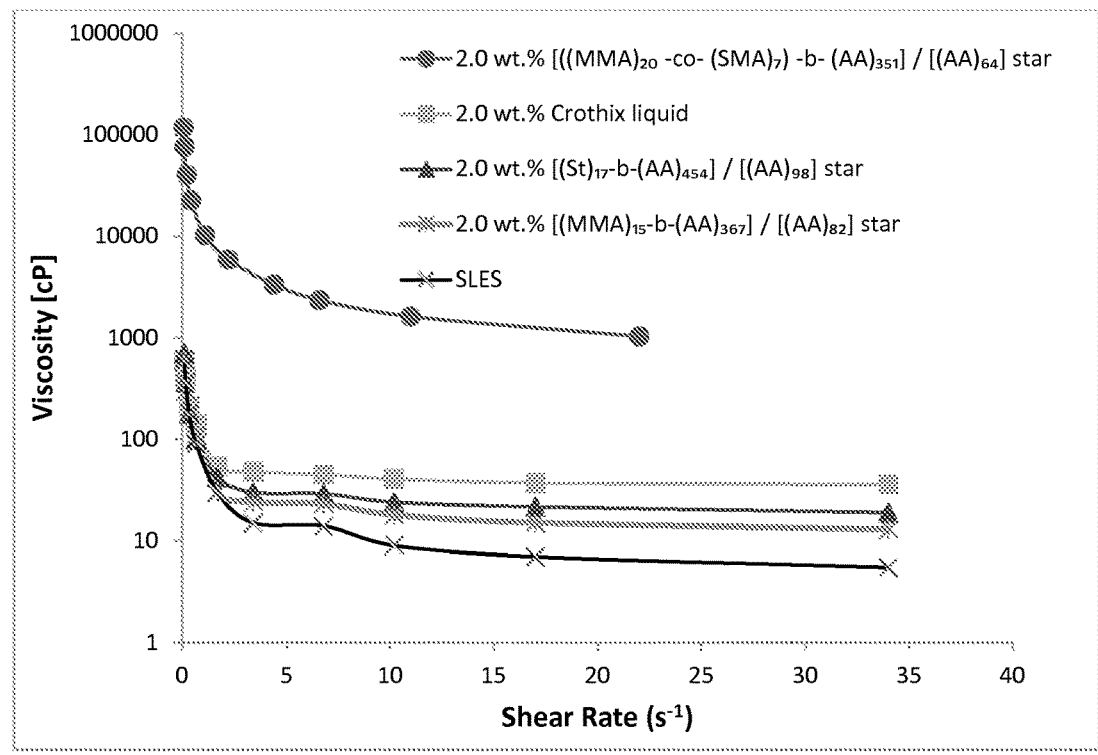
FIG. 3a. Comparison of viscosity vs. shear rate of aqueous solution of different polymers in surfactant system (6.4 wt. % of SLES).
Figure 3B:
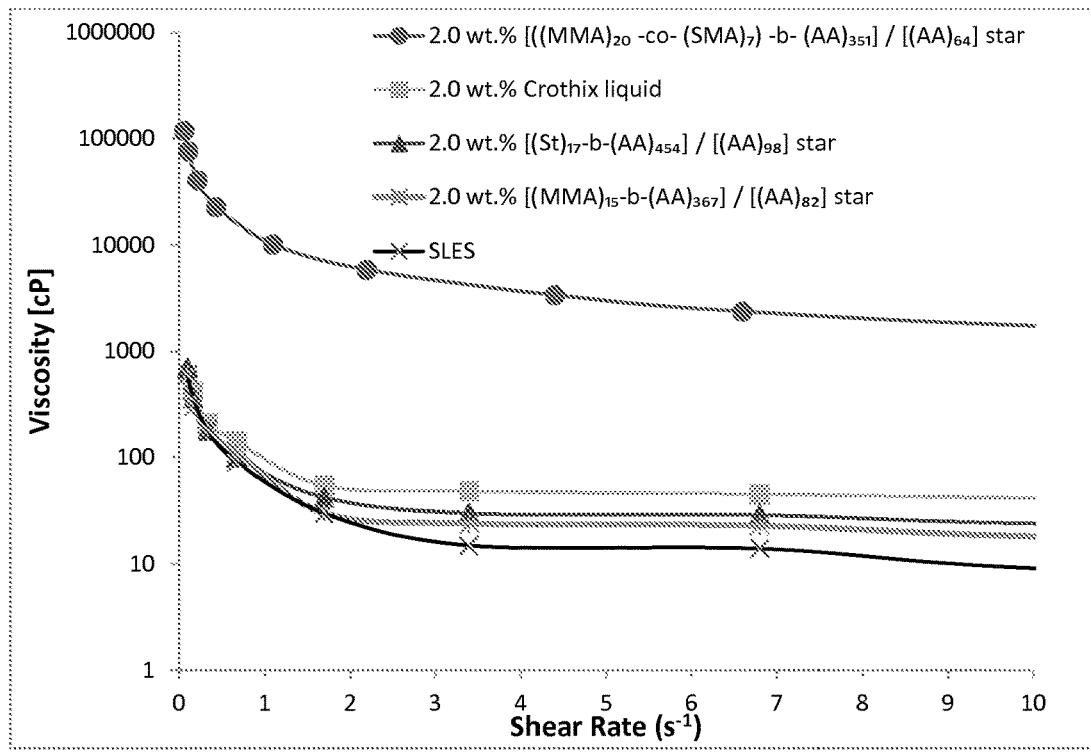

The viscosity of the sample gels formed in the 6.4 wt. % SLES aqueous system vs. shear rate were measured (and comparator 6.4 wt. % SLES aqueous solution without any thickening agent): the sample containing Example 1 utilized Spindle LVDVE SC4-25, the samples containing [(MMA)$_{15}$-b-(AA)$_{367}$]/[(AA)$_{82}$] star, [(St)$_{17}$-b-(AA)$_{454}$]/[(AA)$_{98}$] star, Crothix Liquid, and SLES control, utilized Spindle LVDVE SC4-31, at spindle rates of 0.3, 0.5, 1.0, 2.0, 5.0, 10, 20, 30, 50, and 100 rpm. The results are presented in FIGS. 3a and 3b.

Example 7

The influence of different thickening agent concentrations of star macromolecule from Example 1 in 6.4 wt. % SLES aqueous system was examined using the SLES Surfactant Compatibility Procedure, using the following specified amounts of thickening agent (0.3 g corresponded to 1.5 wt. %, 0.4 g corresponded to 2.0 wt. %, or 0.5 g corresponded to 2.5 wt. %), and NaOH (0.081 g for 1.5 wt. %, 0.108 g for 2 wt. %, or 0.135 g for 2.5 wt. %).

Figure 4:
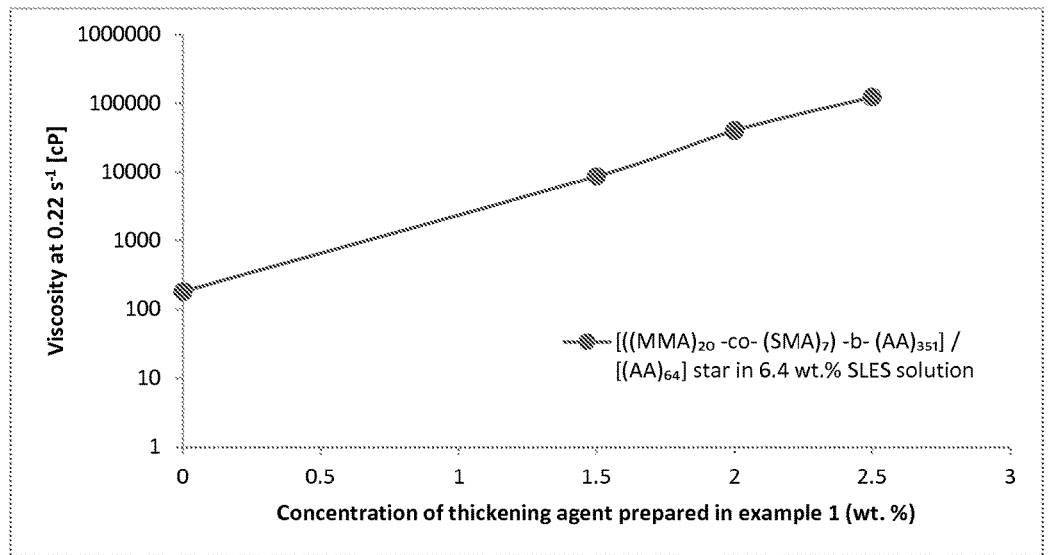
FIG. 4. Dependence of the dynamic viscosity on the concentration of star macromolecule (from Example 1) in surfactant system (6.4 wt. % of SLES).

The viscosity of the sample gels formed in the 6.4 wt. % SLES aqueous system were measured: the samples containing Example 1 at 0.0 wt. % and 1.5 wt % utilized Spindle LVDVE SC4-31, and the samples containing Example 1 at 2.0 wt. % and 2.5 wt % utilized Spindle LVDVE SC4-25, at spindle rate of 1 rpm. The results are presented in FIG. 4.

Example 8

The influence of different surfactant SLES concentrations with 2 wt. % concentration of star macromolecule from Example 1 was examined using the SLES Surfactant Compatibility Procedure, using the following specified amounts of 25.5% active SLES aqueous solution (2.5 g corresponded to 3.2 wt. %, 5.0 g corresponded to 6.4 wt. %, or 8.0 g for 10.2 wt. %), thickening agent from Example 1 (0.4 g), and NaOH (0.081 g).

Figure 5:
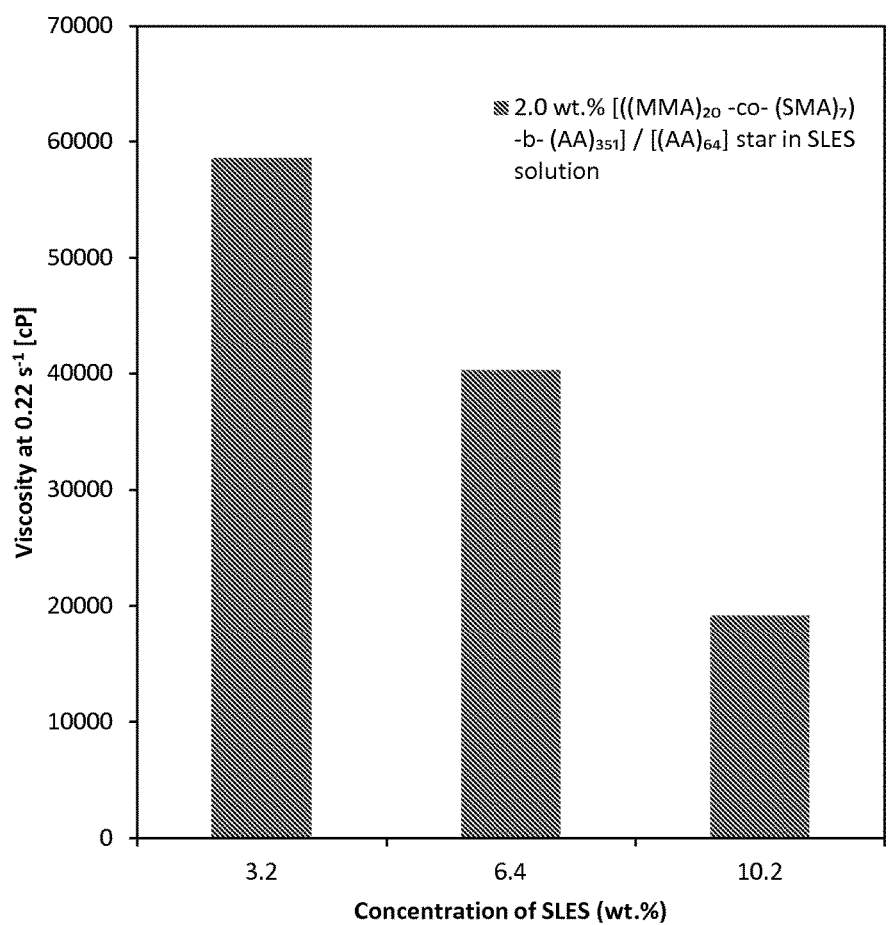
FIG. 5. Dependence of the dynamic viscosity on the concentration of surfactant (SLES) for aqueous solution of star macromolecule (from Example 1).

The viscosity of the sample gels formed in the three different concentrations of SLES with 0.4 wt. % thickening agent from Example 1 were measured using Spindle LVDVE SC4-25, at spindle rate of 1 rpm, and the results are presented in FIG. 5.

Example 9: Shear Thinning in SLES Aqueous System

Four gels were prepared in a 6.4 wt. % SLES aqueous system (three gels were formed using different amounts of star macromolecule from Example 1, and one gel was formed using 2.5 wt. % of star macromolecule from Example 2), using the SLES Surfactant Compatibility Procedure, using the following specified amounts of thickening agent from Example 1 or 2 (0.3 g corresponded to 1.5 wt. %, 0.4 g corresponded to 2.0 wt. %, or 0.5 g corresponded to 2.5 wt. %), and NaOH (0.081 g for 1.5 wt. %, 0.108 g for 2 wt. %, or 0.135 g for 2.5 wt. %).

Figure 6A:
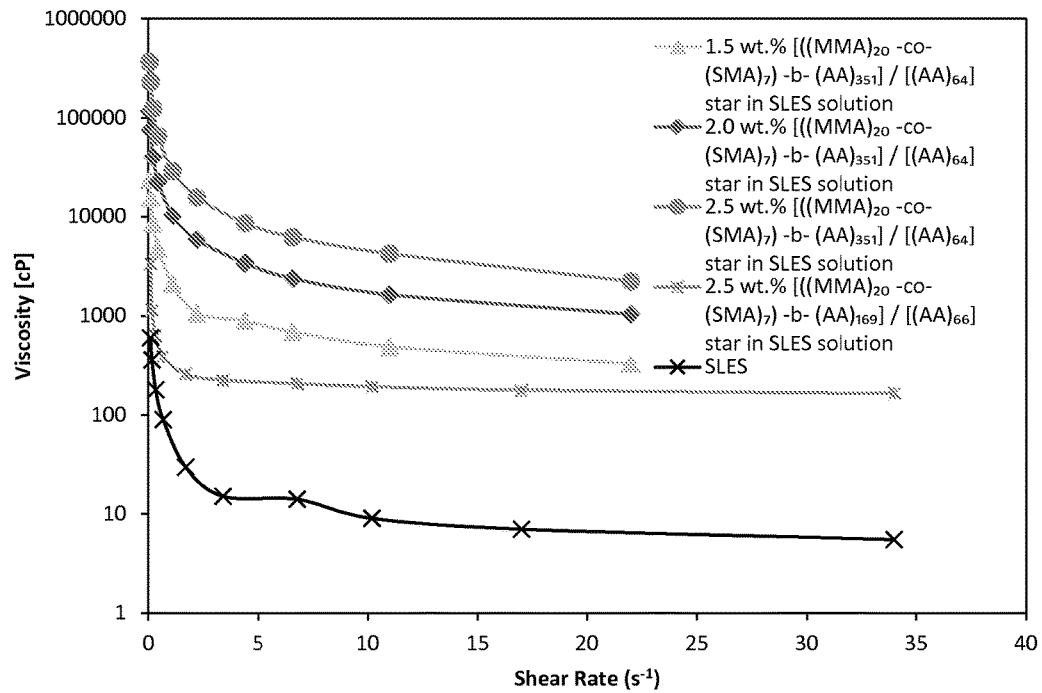
FIG. 6a. Viscosity vs. shear rate of aqueous solution with varying amounts of star macromolecules in hybrid surfactants system (6.4 wt. % of SLES).
Figure 6B:
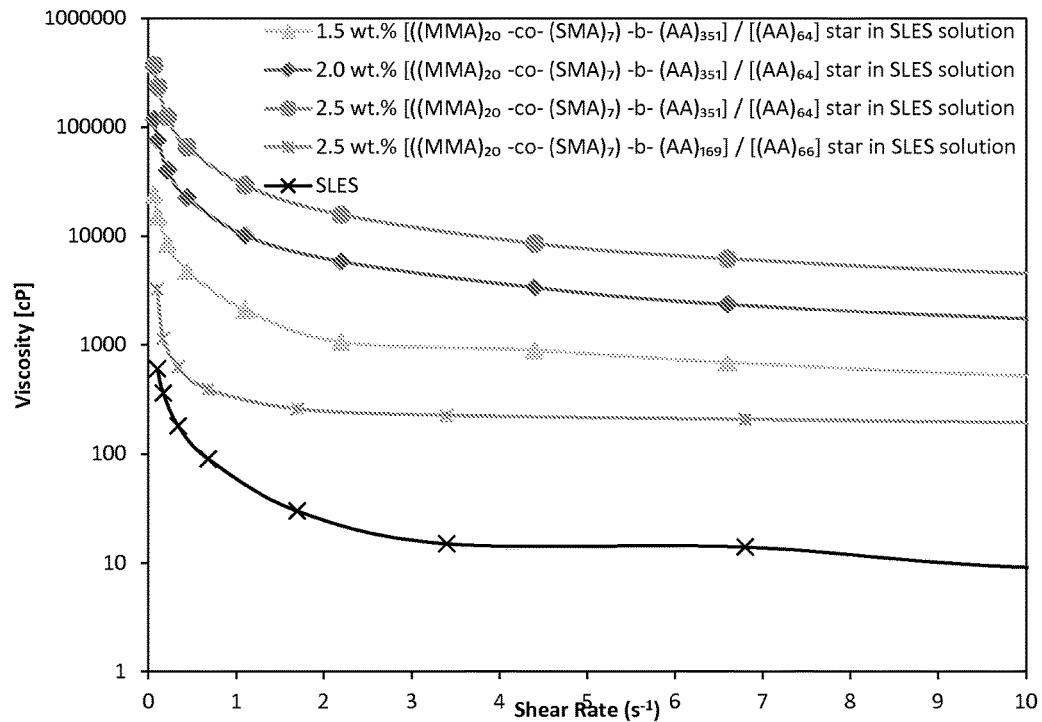

The viscosity of the resulting sample gels formed in the 6.4 wt. % SLES aqueous system were measured: the samples containing Example 1 at 1.5 wt. %, 2.0 wt. %, and 2.5 wt %, utilized Spindle LVDVE SC4-25, and the samples containing Example 2 at 2.5 wt % and the SLES control, utilized Spindle LVDVE SC4-31, at spindle rates of 0.3, 0.5, 1.0, 2.0, 5.0, 10, 20, 30, 50, and 100 rpm. The results are presented in FIGS. 6a and 6b.

Example 10: Temperature Stability

Gels were formed with 0.4 wt. % star macromolecules from Example 1-4 according to the Sample Preparation Procedure, using 1.2 g of the specified solid polymer, 0.408 g solid NaOH, and the pH of the resulting gel was analyzed with pH meter and adjusted to pH=7.0.

Figure 7:
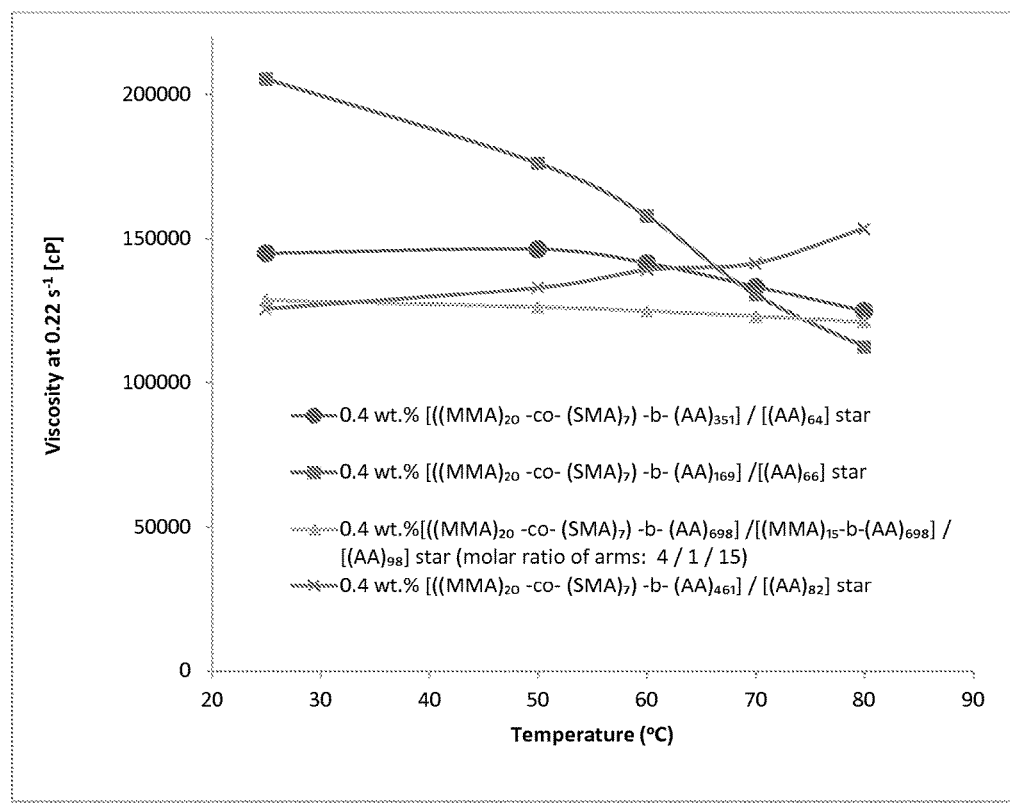
FIG. 7. Dependence of viscosity on temperature of aqueous solution of star macromolecules.

The viscosity of the aqueous solution of the star macromolecule was measured using Spindle LVDVE SC4-25, at different temperatures (measurement taken after temperature of water bath and polymer solution equilibrated for at least 15 min), at spindle rate of 1 rpm, and the results are presented in FIG. 7.

Example 11: Hybrid SLES-CH Surfactant Compatibility

Gels from an aqueous 6.4 wt. % SLES/2.5 wt. % Cocamidopropyl Hydroxysultaine (CH) solution containing 2 wt. % of a thickening agent (e.g., star macromolecules synthesized in Examples 1-3, $[(St)_{17}\text{-b-}(AA)_{454}]/[(AA)_{98}]$ star, or Crothix Liquid), were formed using the Hybrid SLES-CH Surfactant Compatibility Procedure:

For each sample, a 20 mL vial was charged with 25.5% active SLES aqueous solution (5.0 g), 50% active CH aqueous solution (1.0 g), thickening agent (0.4 g), NaOH (0.108 g; used only for Examples 1-3 and $[(St)_{17}\text{-b-}(AA)_{454}]/[(AA)_{98}]$ star, not for Crothix Liquid), and then a certain amount of deionized water to reach a total sample weight of 20 g. The sample mixtures were then stirred at 70° C. for 2-4 hours until all solids were dissolved, and then cooled at room temperature for 3 hours.

Figure 8B:
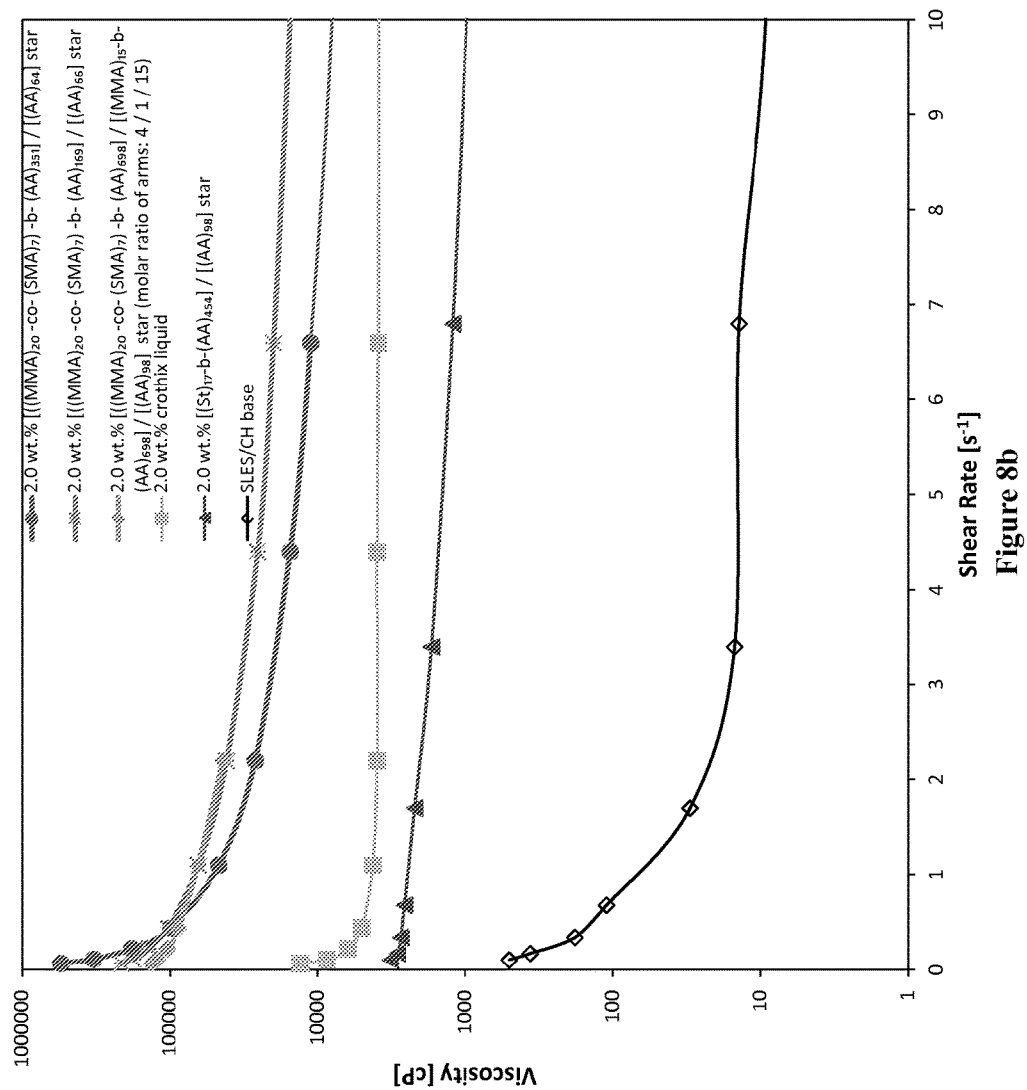

The viscosity of the sample gels formed in the mixture 6.4 wt. % SLES/2.5 wt. % CH aqueous system vs. shear rate were measured (and comparator mixture 6.4 wt. % SLES/2.5 wt. % CH aqueous system without any thickening agent): the samples containing Examples 1-3 and Crothix liquid utilized Spindle LVDVE SC4-25, and the samples containing $[(St)_{17}\text{-b-}(AA)_{454}]/[(AA)_{98}]$ star and the SLES/CH control utilized Spindle LVDVE SC4-31, at spindle rates of 0.3, 0.5, 1.0, 2.0, 5.0, 10, 20, 30, 50, and 100 rpm. The results are presented in FIGS. 8a and 8b.

Example 12

The influence of different thickening agent concentrations of star macromolecule from Example 1 in 6.4 wt. % SLES/2.5 wt. % CH aqueous system was examined using the Hybrid SLES-CH Surfactant Compatibility Procedure, using the following specified amounts of thickening agent from Example 1 (0.2 g corresponded to 1 wt. %, 0.3 g corresponded to 1.5 wt. %, or 0.4 g corresponded to 2 wt. %), and NaOH (0.054 g for 1 wt. %, 0.081 g for 1.5 wt. %, or 0.108 g for 2 wt. %).

Figure 9:
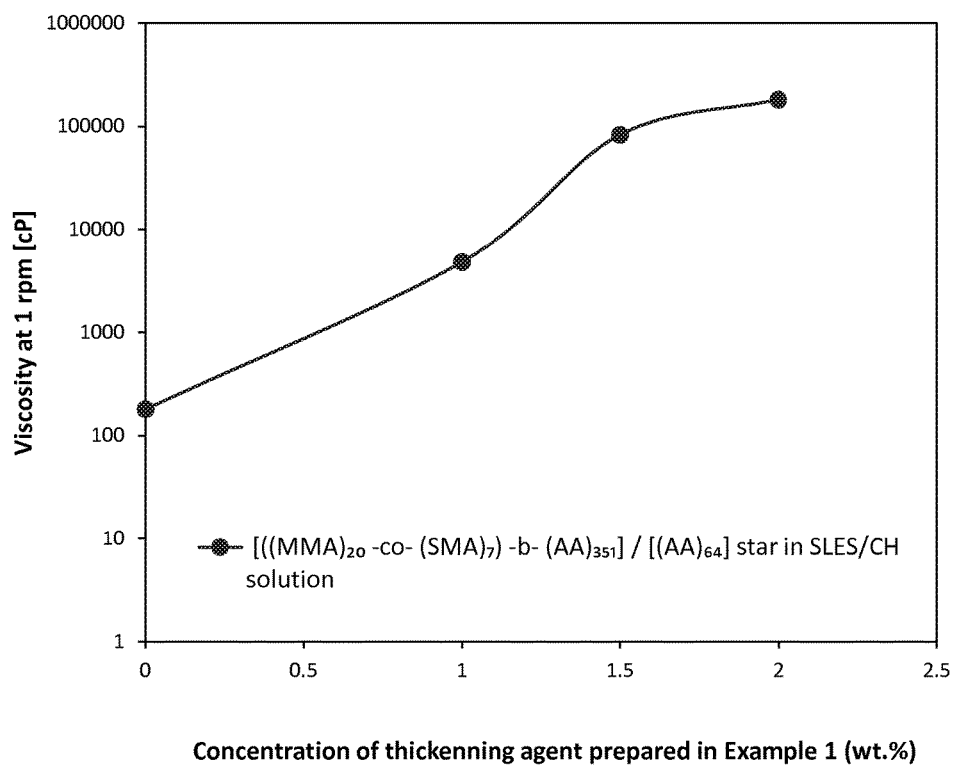
FIG. 9. Dependence of the dynamic viscosity on the concentration of star macromolecule (from Example 1) in surfactant system (6.4 wt. % of SLES, 2.5 wt. % of CH).

The viscosity of the sample gels formed were measured: the samples containing Example 1 at 0.0 wt. % and 1.0 wt % utilized Spindle LVDVE SC4-25, and the samples containing Example 1 at 1.5 wt. % and 2.0 wt % utilized Spindle LVDVE SC4-31, at spindle rate of 1 rpm. The results are presented in FIG. 9.

Example 13

The influence of different surfactant SLES/CH concentrations with 2 wt. % concentration of star macromolecule from Example 1 was examined using the Hybrid SLES-CH Surfactant Compatibility Procedure, using the following specified amounts of 25.5% active SLES aqueous solution (2.5 g corresponded to 3.2 wt. %, 5.0 g corresponded to 6.4 wt. %, or 8.0 g for 10.2 wt. %), 50% active CH aqueous solution (0.5 g of 1.3 wt. %, 1.0 g of 2.5 wt. %, or 1.6 g of 4.0 wt. %), thickening agent from Example 1 (0.4 g), and NaOH (0.081 g).

Figure 10:
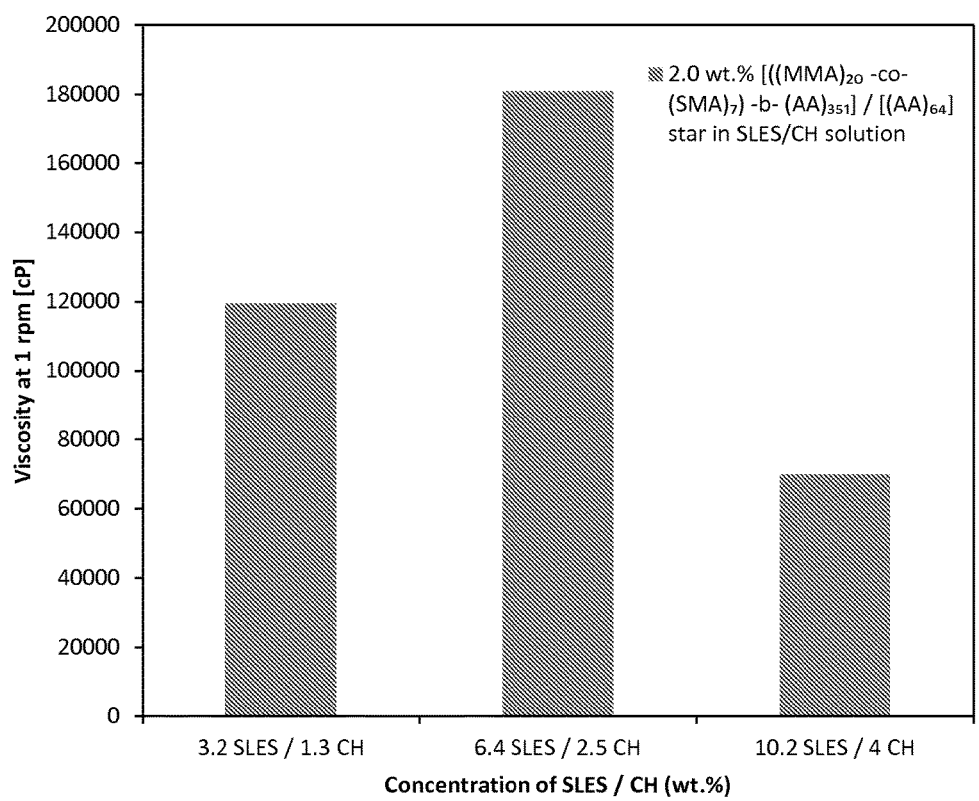
FIG. 10. Dependence of the dynamic viscosity on the concentration of surfactant (SLES) for aqueous solution of star macromolecule (from Example 1).

The viscosity of the sample gels formed were measured using Spindle LVDVE SC4-25 at spindle rate of 1 rpm, and the results are presented in FIG. 10.

Example 14: Hybrid CB-SLES Surfactant Compatibility

Gels from an aqueous 6.4 wt. % Cocamidopropyl Betaine (CB)/2.5 wt. % SLES solution containing 1.5 wt. % of a thickening agent (e.g., star macromolecules synthesized in Examples 1-2 or Crothix Liquid), were formed using the Hybrid CB-SLES Surfactant Compatibility Procedure:

For each sample, a 20 mL vial was charged with 30% active CB aqueous solution (4.27 g), 25.5% active SLES aqueous solution (1.96 g), thickening agent (0.3 g for Examples 1-2; or 0.66 g for Crothix Liquid), NaOH (0.082 g; used only for Examples 1-2, not for Crothix Liquid), and then a certain amount of deionized water to reach a total sample weight of 20 g. The sample mixtures were then stirred at 70° C. for 2-4 hours until all solids were dissolved, and then cooled at room temperature for 3 hours.

Figure 11A:
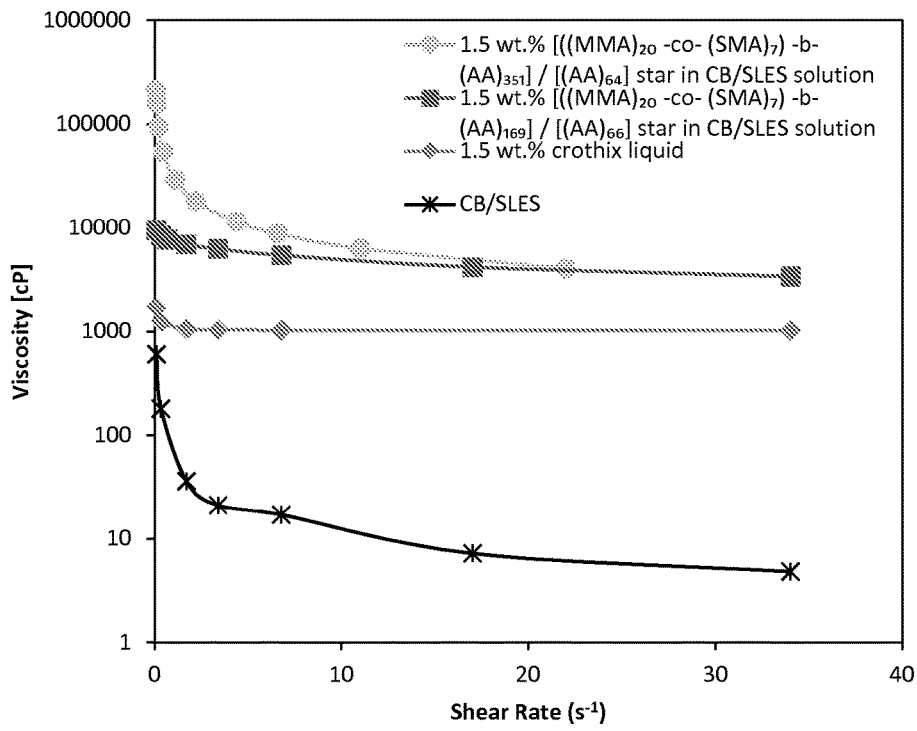
FIG. 11a. Comparison of viscosity vs. shear rate of aqueous solutions of different polymers in hybrid surfactants system (6.4 wt. % of CB, 2.5 wt. % of SLES).
Figure 11B:
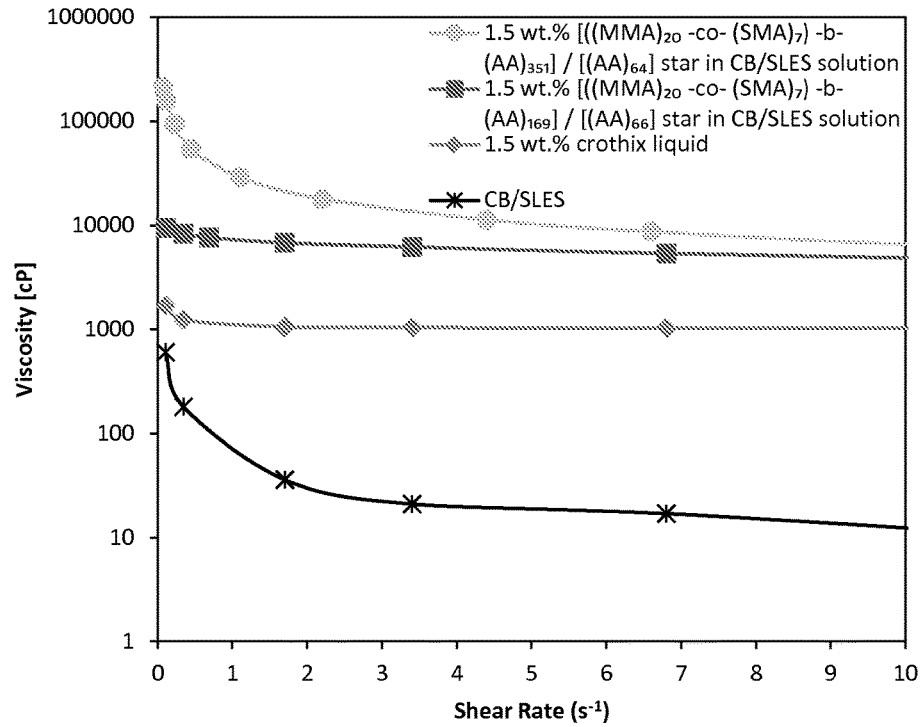

The viscosity of the sample gels formed in the mixture 6.4 wt. % CB/2.5 wt. % SLES aqueous system vs. shear rate were measured (and comparator mixture 6.4 wt. % CB/2.5 wt. % SLES aqueous system without any thickening agent): the samples containing Examples 1-2 utilized Spindle LVDVE SC4-25, and the samples containing Crothix liquid and the CB/SLES control utilized Spindle LVDVE SC4-31, at spindle rates of 0.3, 0.5, 1.0, 2.0, 5.0, 10, 20, 30, 50, and 100 rpm. The results are presented in FIGS. 11a and 11b.

Example 15: Shear Thinning in Hybrid SLES/CH Aqueous System

Three gels were prepared in a hybrid 6.4 wt. % SLES/2.5 wt. % CH aqueous system (three gels were formed using different amounts of star macromolecule from Example 1), using the Hybrid SLES/CH Surfactant Compatibility Procedure, using the following amounts of thickening agent from Example 1 (0.2 g for 1 wt. %, 0.3 g for 1.5 wt. %, or 0.4 g for 2 wt. %), and NaOH (0.054 g for 1 wt. %, 0.081 g for 1.5 wt. %, or 0.108 g for 2 wt. %). The viscosity vs. shear rate for each of the resulting sample gels formed was then examined.

Figure 12A:
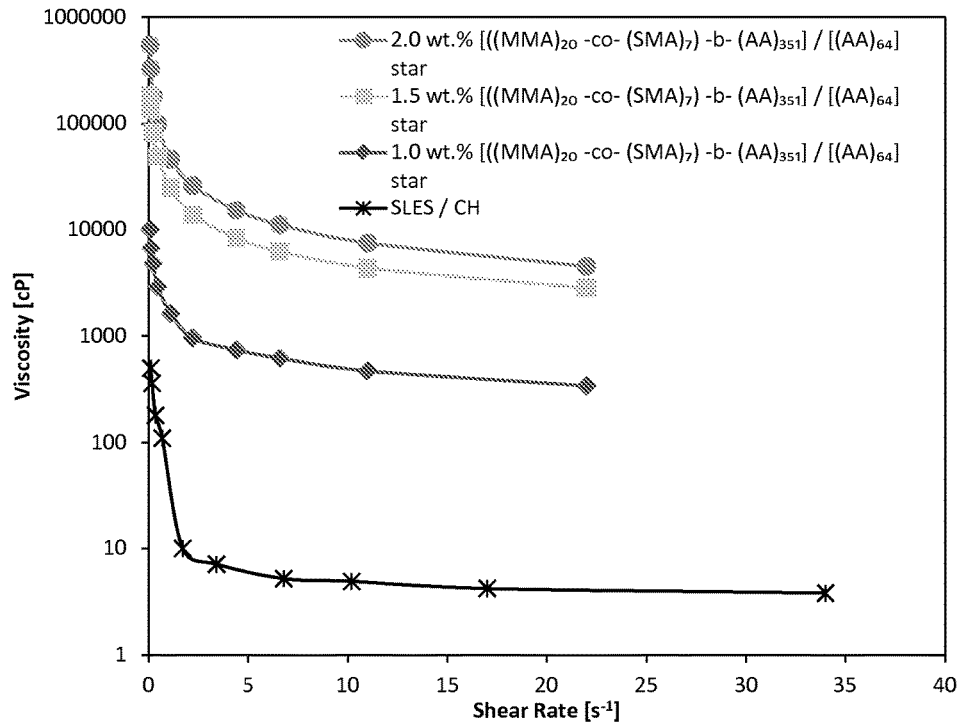
FIG. 12a. Viscosity vs. shear rate of aqueous solution of star macromolecule (from Example 1) in hybrid surfactants system (6.4 wt. % of CB, 2.5 wt. % of SLES).
Figure 12B:
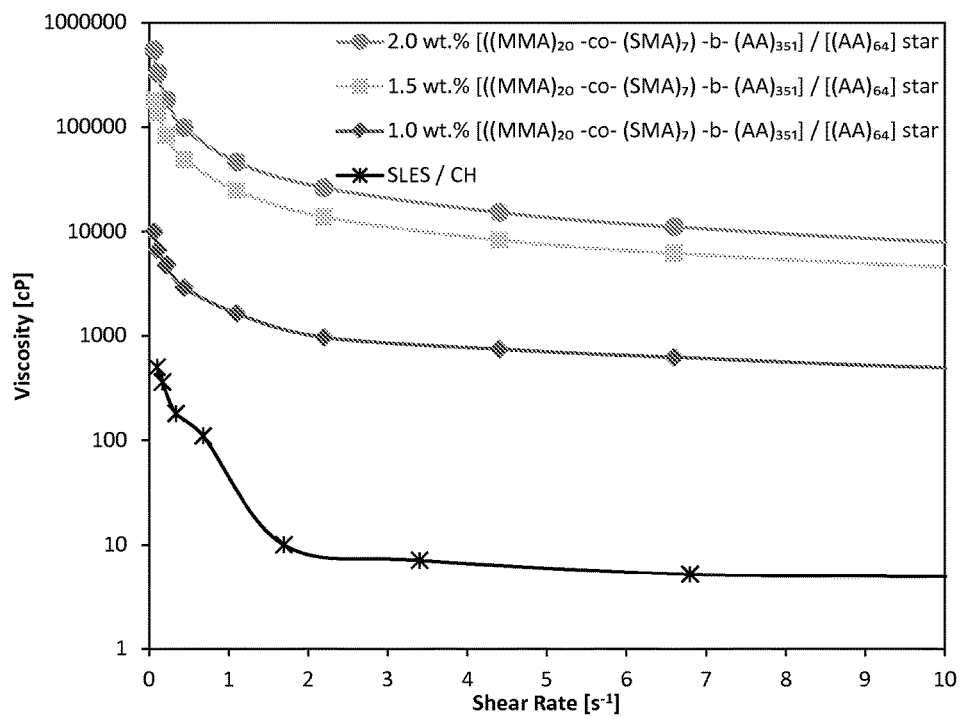

The viscosity of the sample gels formed in the 6.4 wt. % SLES/2.5 wt. % CH aqueous system were measured: the samples containing Example 1 at 1.0 wt. %, 1.5 wt. %, and 2.0 wt. %, utilized Spindle LVDVE SC4-25, and the sample containing the SLES/CH control utilized Spindle LVDVE SC4-31, at spindle rates of 0.3, 0.5, 1.0, 2.0, 5.0, 10, 20, 30, 50, and 100 rpm. The results are presented in FIGS. 12a and 12b.

Example 16: pH Efficiency Range in Hybrid CB/SLES Aqueous System

Gels were formed in a hybrid 6.4 wt. % CB/2.5 wt. % SLES aqueous system using 1.5 wt. % star macromolecules from Examples 1-2 using the Hybrid CB-SLES Surfactant Compatibility Procedure. The pH of each solution prepared was about 6. Each prepared solution was then cooled at room temperature for 3 hours.

Figure 13:
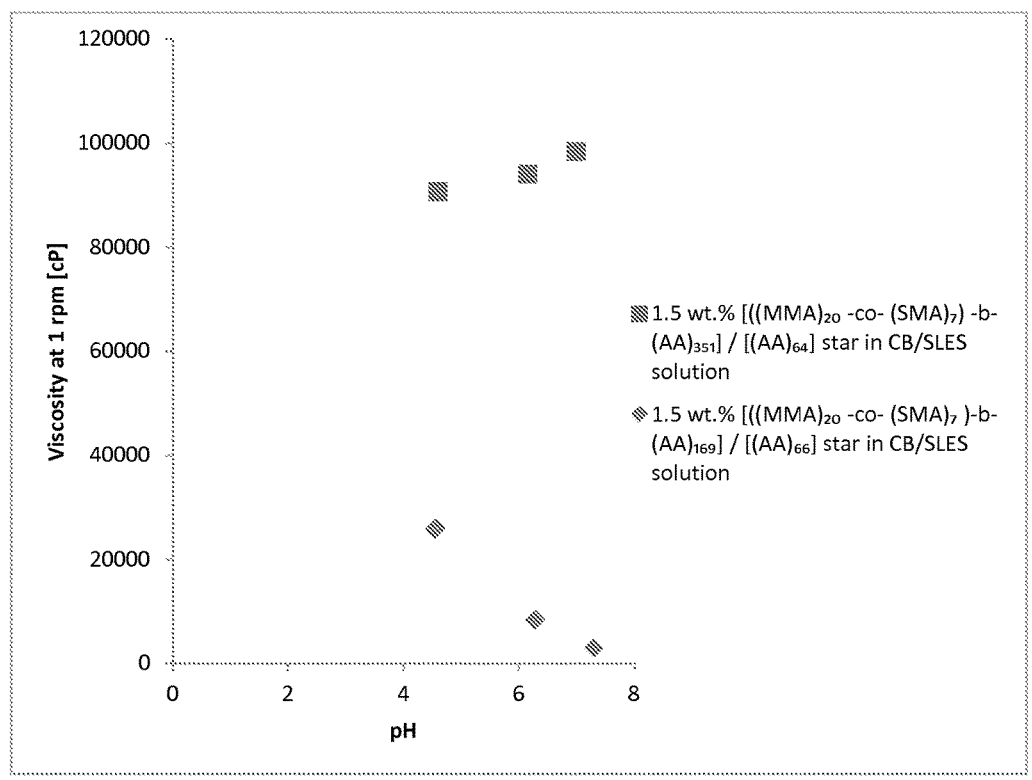
FIG. 13. Dependence of the dynamic viscosity on pH for aqueous solutions of star macromolecules in hybrid surfactants system (6.4 wt. % of CB, 2.5 wt. % of SLES).

The viscosity of the sample gels formed in the mixture 6.4 wt. % CB/2.5 wt. % SLES aqueous system vs. shear rate were measured in accordance to the Dynamic Viscosity Test Procedure at 1 rpm. This procedure was repeated for differing pH values, which was adjusted by the addition of sodium hydroxide (or hydrochloric acid). The samples containing Example 1 utilized Spindle LVDVE SC4-25, and the samples containing Example 2 utilized Spindle LVDVE SC4-31. The results are presented in FIG. 13.

Example 17: pH Efficiency Range

An aqueous gel composition containing 0.4 wt. % of the star macromolecule synthesized in Example 1 was prepared according to the procedure of Example 5, in which the pH of the resulting gel was analyzed with pH meter and adjusted to pH=7.0.

Figure 14:
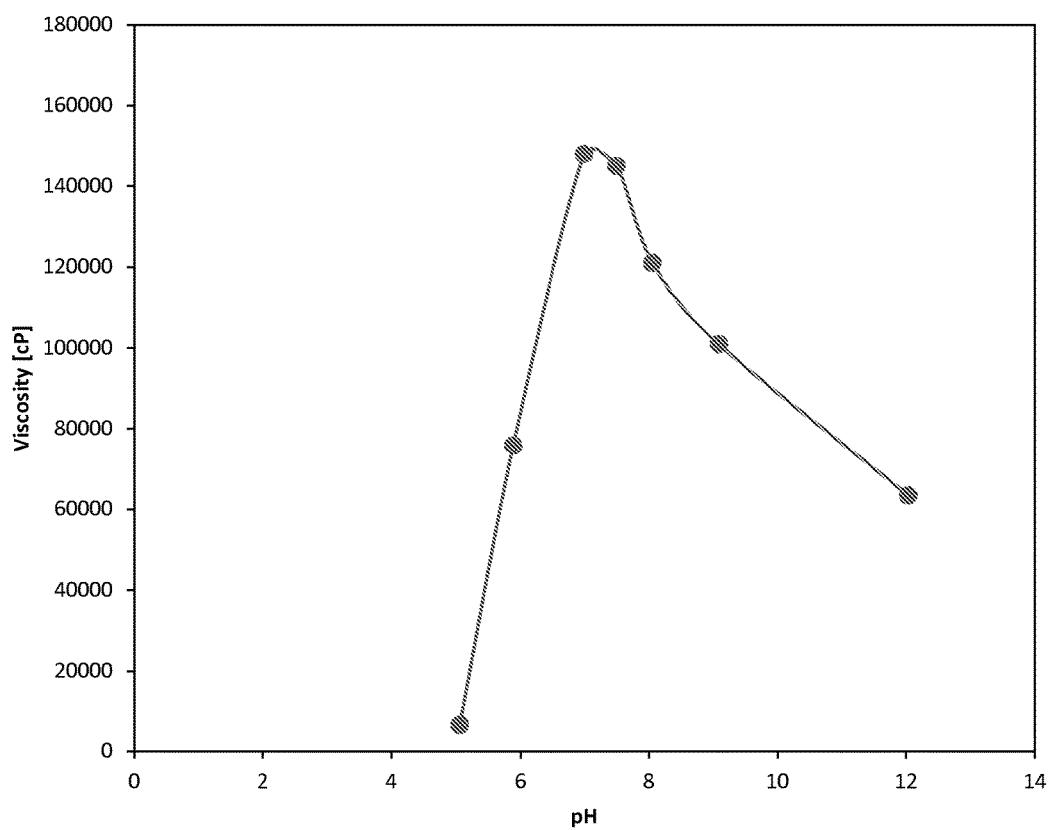
FIG. 14. Dependence of the dynamic viscosity on pH for aqueous solutions of star macromolecule (from Example 1).

The viscosity of the sample was measured using a Spindle LVDVE SC4-25, in accordance to the Dynamic Viscosity Test Procedure at 1 rpm. This procedure was repeated for differing pH values, which was adjusted by the addition of sodium hydroxide (or hydrochloric acid). The results are presented in FIG. 14.

Example 18: Hybrid CB-SLES Surfactant with NaCl Compatibility

Gels from an aqueous 6.4 wt. % CB/2.5 wt. % SLES solution containing 1.5 wt. % of a thickening agent (e.g., star macromolecules synthesized in Examples 1-2 or Crothix Liquid), were formed using the Hybrid CB-SLES Surfactant with NaCl Compatibility Procedure:

For each sample, a 20 mL vial was charged with 30% active CB aqueous solution (4.27 g), 25.5% active SLES aqueous solution (1.96 g), a certain amount of thickening agent (0.3 g for Examples 1-2; 0.66 g for Crothix Liquid), NaOH (0.082 g; used only for Examples 1-2, not for Crothix Liquid), a certain amount of NaCl (1.0 g corresponded to 5 wt. % of salt, 2.0 g corresponded to 10 wt. % of salt), and then a certain amount of deionized water to reach a total sample weight of 20 g. The sample mixtures were then stirred at 70° C. for 2-4 hours until all solids were dissolved. The pH of each solution prepared was about 6. Each prepared solution was then cooled at room temperature for 3 hours.

Figure 15:
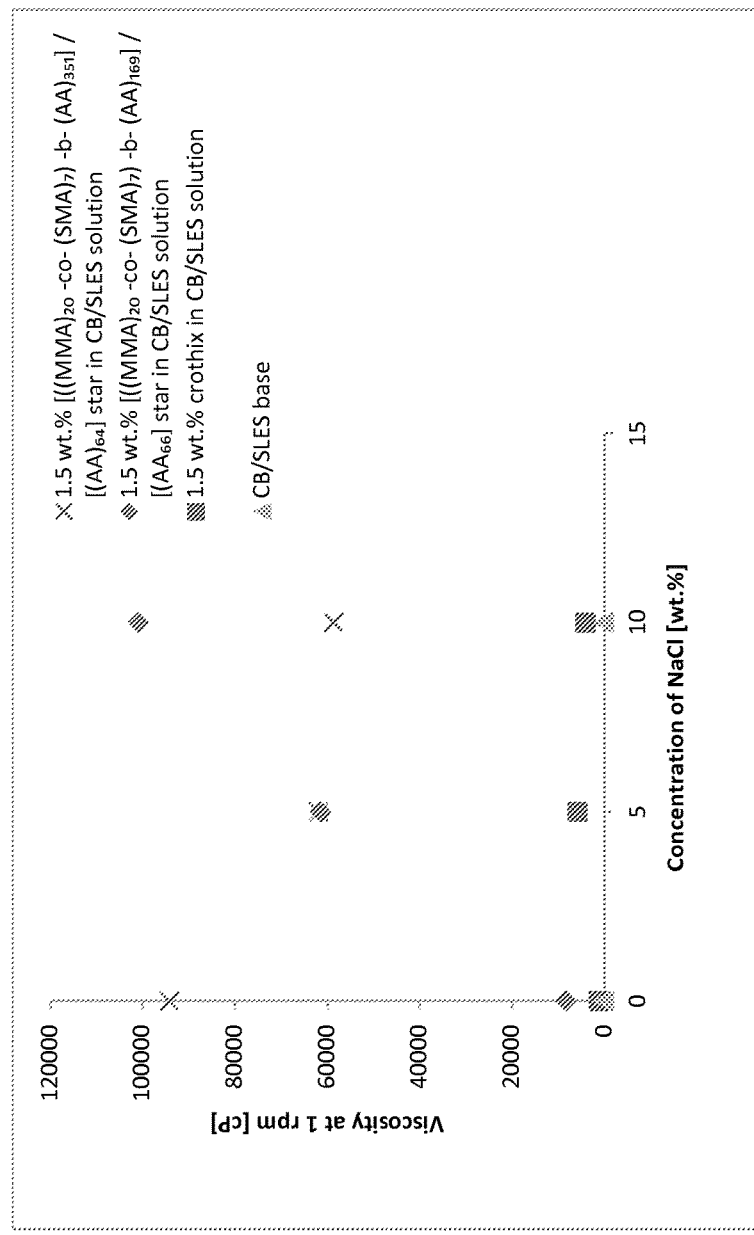
FIG. 15. Dependence of the dynamic viscosity on concentration of NaCl for aqueous solutions of star macromolecules in hybrid surfactants system (6.4 wt. % of CB, 2.5 wt. % of SLES).

The viscosity of the sample gels were measured in accordance to the Dynamic Viscosity Test Procedure at 1 rpm. The samples containing Example 1, Example 2 (at 5 wt. % and 10 wt. % NaCl), and Crothix liquid (at 5 wt. % NaCl) utilized Spindle LVDVE SC4-25, and the samples containing Example 2 (at 0 wt. % NaCl), Crothix liquid (at 0 wt. % and 10 wt. % NaCl), and CB/SLES control, utilized Spindle LVDVE SC4-31. The results are presented in FIG. 15.

Example 19

Surfactant compatibility test of a star macromolecule as thickening agents in an aqueous system containing difficult-to-thicken surfactant systems (e.g., 5 wt. % Ritabate 20; and 5 wt. % APG ($C_{8-16}$ fatty alcohol glycoside (PLANTAREN® 2000 N UP))).

Ritabate 20 Surfactant Compatibility:

A gel was formed with 2 wt. % of a thickening agent (e.g., star macromolecule synthesized in Example 2) in an aqueous system containing 5 wt. % Ritabate 20 and investigated using the Ritabate 20 Surfactant Compatibility Procedure:

For each sample, a 20 mL vial was charged with Ritabate 20 (1 g), thickening agent (0.4 g), NaOH (0.108 g), and then a certain amount of deionized water to reach a total sample weight of 20 g. The sample mixtures were then stirred at 70° C. for 2-4 hours until all solids were dissolved, cooled at room temperature for 3 hours, and then the viscosity of the gels in surfactant system vs. shear rate was examined.

APG Surfactant Compatibility:

A gel was formed with 2 wt. % of a thickening agent (e.g., star macromolecule synthesized in Example 2) in an aqueous system containing 5 wt. % APG ($C_{8-16}$ fatty alcohol glycoside (PLANTAREN® 2000 N UP)) and investigated using the APG Surfactant Compatibility Procedure:

For each sample, a 20 mL vial was charged with $C_{8-16}$ fatty alcohol glycoside (PLANTAREN® 2000 N UP; 50% active) (2 g), thickening agent (0.4 g), NaOH (0.108 g), and then a certain amount of deionized water to reach a total sample weight of 20 g. The sample mixtures were then stirred at 70° C. for 2-4 hours until all solids were dissolved, cooled at room temperature for 3 hours, and then the viscosity of the gels in surfactant system vs. shear rate was examined.

The viscosity of the resulting sample gels was measured using a Spindle LVDVE SC4-25, and the results are presented in Table 2.

TABLE 2

| Shear rate [sec$^{-1}$] | 2 wt. % Example 2 in 5 wt. % Ritabate 20 Viscosity [cP] | 2 wt. % Example 2 in 5 wt. % in APG Viscosity [cP] |
| --- | --- | --- |
| 0.066 | 224000 | 11000 |
| 0.11 | NA | 8600 |
| 0.22 | 172300 | 5800 |
| 0.44 | NA | 4300 |
| 1.1 | 55100 | 3460 |
| 2.2 | 31200 | 3120 |
| 4.4 | 17020 | 3100 |
| 6.6 | NA | 2960 |
| 11 | 7594 | 2832 |
| 22 | 4728 | 2578 |

Example 20: Star Macromolecules as Thickening and Emulsifying Agents

Figure 16:
FIG. 16. An images demonstrating phase separated water and sunflower oil (left) and the emulsifying properties of starmacromolecule (from Example 1) (right).

The structure of the star macromolecules of the present invention, such as the star macromolecule prepared in Example 1, may act not only as thickening agents but also as efficient emulsifying agents. The photographic image shown in FIG. 16 demonstrates the emulsifying properties of the star macromolecule of Example 1. The photograph presents water with 30 vol. % of sunflower oil (left vial) and water with 30 vol. % of sunflower oil and 0.3 wt. % of star macromolecule of Example 1 (right vial). After vigorous mixing (as described in the Emulsion Test Procedure), phase separation occurred in the left vial while no phase separation was detected in the right vial upon visual inspection. The photograph of FIG. 16 was taken 2 days after the emulsion was prepared, indicating the thickening stability properties of the resulting gel.

Test Procedures:

Dynamic Viscosity Test Procedure

A portion of the gel prepared according to the Sample Preparation Procedure was transferred to the BROOKFIELD® LVDV-E Viscometer equipped with a Spindle LVDVE SC4-31 (shear rate=rpm×0.34), or if the viscosity it too great for that spindle, then a Spindle LVDVE SC4-25 (shear rate=rpm×0.22), for mixing at 25° C. and at standard pressure (i.e., at STP) over a wide range of rates (e.g., 0.3-100 rpm) and the shear rate and viscosity was recorded. Viscosity measurements were taken in the following sequence, stopping the instrument after each measurement for 5 minutes, 0.3, 0.5, 1, 2, 5, 10, 20, 30, 50, and 100 rpm. Dynamic viscosity was determined as the viscosity in centipoise (cP) at 1 rpm.

Shear-Thinning Value

A shear-thinning value was determined using values measured during the Dynamic Viscosity Test Procedure, according to the following equation:

$$[(\text{Viscosity (at } 0.2s^{-1}) - \text{Viscosity (at } 2.2s^{-1}))/\text{Viscosity (at } 0.2s^{-1})] \times 100\%.$$

Thickening and Shear Thinning in Water Test

An aqueous solution of a macromolecule, when prepared according to the Sample Preparation Procedure at a concentration of 0.4 wt. %, using a Spindle LVDVE SC4-25 for mixing at 25° C. and at standard pressure (i.e., at STP), forms a homogeneous gel at an adjusted pH of 7.0 and has a Dynamic Viscosity of at least 5,000 cP at a shear rate of 2.2 $s^{-1}$ at 25° C. and a Shear Thinning Value of at least 75%.

SLES Surfactant Compatibility Test

An aqueous solution of a macromolecule, when prepared according to the SLES Surfactant Compatibility Procedure at a concentration of 2.0 wt. %, using a Spindle LVDVE SC4-25 for mixing at 25° C. and at standard pressure (i.e., at STP), forms a homogeneous gel, the gel has a Dynamic Viscosity of at least 1,000 cP at a shear rate of 2.2 $s^{-1}$ at 25° C. and has a Shear Thinning Value of at least 75%.

Hybrid SLES-CH Surfactant Compatibility Test

An aqueous solution of a macromolecule, when prepared according to the Hybrid SLES-CH Surfactant Compatibility Procedure at a concentration of 2.0 wt. %, using a Spindle LVDVE SC4-25 for mixing at 25° C. and at standard pressure (i.e., at STP), forms a homogeneous gel, the gel has a Dynamic Viscosity of at least 5,000 cP at a shear rate of 2.2 $s^{-1}$ at 25° C. and has a Shear Thinning Value of at least 35%.

Hybrid CB-SLES Surfactant Compatibility Test

An aqueous solution of a macromolecule, when prepared according to the Hybrid CB-SLES Surfactant Compatibility Procedure at a concentration of 1.5 wt. %, using a Spindle LVDVE SC4-25 for mixing at 25° C. and at standard pressure (i.e., at STP), forms a homogeneous gel, the gel has a Dynamic Viscosity of at least 2,000 cP at a shear rate of 2.2 $s^{-1}$ at 25° C. and has a Shear Thinning Value of at least 35%.

Hybrid CB-SLES Surfactant with NaCl Compatibility Test

An aqueous solution of a macromolecule, when prepared according to the Hybrid CB-SLES Surfactant with NaCl Compatibility Procedure at a concentration of 1.5 wt. %, and 5 wt. % NaCl, using a Spindle LVDVE SC4-25 for mixing at 25° C. and at standard pressure (i.e., at STP), forms a homogeneous gel, the gel has a Dynamic Viscosity of at least 5,000 cP at a shear rate of 0.22 $s^{-1}$ at 25° C.

Ritabate 20 Surfactant Compatibility Test

An aqueous solution of a macromolecule, when prepared according to the Ritabate 20 Surfactant Compatibility Procedure at a concentration of 2.0 wt. %, using a Spindle LVDVE SC4-25 for mixing at 25° C. and at standard pressure (i.e., at STP), forms a homogeneous gel, the gel has a Dynamic Viscosity of at least 15,000 cP at a shear rate of 2.2 $s^{-1}$ at 25° C.

APG Surfactant Compatibility Test

An aqueous solution of a macromolecule, when prepared according to the APG Surfactant Compatibility Procedure at a concentration of 2.0 wt. %, using a Spindle LVDVE SC4-25 for mixing at 25° C. and at standard pressure (i.e., at STP), forms a homogeneous gel, the gel has a Dynamic Viscosity of at least 2,500 cP at a shear rate of 2.2 $s^{-1}$ at 25° C.

Temperature Stability Test

An aqueous solution of a macromolecule, when prepared according to the Sample Preparation Procedure at a concentration of 0.4 wt. %, using a Spindle LVDVE SC4-25 for mixing at 25° C. and at standard pressure (i.e., at STP), forms a homogeneous gel at an adjusted pH of 7.0, has a Dynamic Viscosity of at least 100,000 cP at a shear rate of 0.22 $s^{-1}$ at 25° C., and has a Dynamic Viscosity at 80° C. that is at least 50% relative to the viscosity of the gel at 25° C. Temperature Stability Values can be calculated using the following equation:

$$[\text{Dynamic Viscosity (at } 80° \text{C.)/Dynamic Viscosity (at } 25° \text{C.)}] \times 100\%.$$

pH Efficiency Range in Hybrid CB/SLES Surfactant Test

An aqueous solution of a macromolecule, when prepared according to the Hybrid CB-SLES Surfactant Compatibility Procedure at a concentration of 1.5 wt. %, using a Spindle LVDVE SC4-25 for mixing at 25° C. and at standard pressure (i.e., at STP), forms a homogeneous gel, the gel has a Dynamic Viscosity of at least 8,000 cP at an adjusted pH in the range of between 4.5 to 6.5 (e.g., by addition of NaOH or HCl), at a shear rate of 0.22 $s^{-1}$ at 25° C.

pH Efficiency Range Test

An aqueous solution of a macromolecule, when prepared according to the Sample Preparation Procedure at a concentration of 0.4 wt. %, using a Spindle LVDVE SC4-25 for mixing at 25° C. and at standard pressure (i.e., at STP), forms a homogeneous gel, the gel has a Dynamic Viscosity of at least 5,000 cP at an adjusted pH in the range of between 5 to 12 (e.g., by addition of NaOH or HCl), at a shear rate of 0.22 $s^{-1}$ at 25° C.

Hydrophilic-Lipophilic (HLB) Arm/Segment Calculation $$HLB = 20*Mh/M$$

where Mh is the molecular mass of the hydrophilic portion of the polymeric arm or segment, and M is the molecular mass of the whole polymeric arm or segment.

Hydrophilic-Lipophilic Macromolecule Calculation $$HLM = \sum_{n=1}^{n=m} MW_n \times HLB_n / 20 \text{ divided by } 0.3MW_{core} + \sum_{n=1}^{n=m} MW_n$$

where $MW_n$ is the molecular weight for the respective arm, $HLB_n$ is the HLB, as calculated from the HLB arm calculation, for the respective arm, and $MW_{core}$ is the molecular weight for the core, and M is the total number of arms.

What is claimed is:

1. A surfactant-system thickening macromolecule is represented by Formula B:

$$[(P1)_{q1}]_r\text{—Core}\begin{matrix}[(P3)_{q3}\text{—}(P2)_{q2}]_s\\ \\ [(P5)_{q5}\text{—}(P4)_{q4}]_t\end{matrix} \qquad \text{Formula B}$$

wherein:

Core represents a crosslinked polymeric segment;

P1 independently represents the hydrophilic polymeric segment of the at least first polymeric arm comprised of monomeric residues of polymerized hydrophilic monomers;

P2 independently represents the further segment of the at least second polymeric arm comprised of at least one monomeric residue of a polymerized surfactant-system thickening monomer comprising a $C_6$ or greater alkyl acrylate; $C_6$ or greater alkenyl acrylate; $C_6$ or greater alkyl alkyl acrylate; $C_6$ or greater alkenyl alkyl acrylate; $C_6$ or greater alkyl acrylamide; $C_6$ or greater alkenyl acrylamide; $C_6$ or greater alkyl alkyl acrylamide; $C_6$ or greater alkenyl alkyl acrylamide; $C_2$ or greater alkyl vinyl ether; $C_2$ or greater alkenyl vinyl ether; $C_1$ or greater alkyl allyl ether; or $C_1$ or greater alkenyl allyl ether;

P3 independently represents the hydrophilic polymeric segment of the at least second polymeric arm comprised of monomeric residues of polymerized hydrophilic monomers;

P4 independently represents the hydrophobic polymeric segment of the at least third polymeric arm comprised of monomeric residues of polymerized hydrophobic monomers;

P5 independently represents the hydrophilic polymeric segment of the at least third polymeric arm comprised of monomeric residues of polymerized hydrophilic monomers;

q1 independently represents the number of monomeric residues in P1 and has a value in the range of between 5 to 2000;

q2 independently represents the number of monomeric residues in P2 and has a value in the range of between 1 to 500;

q3 independently represents the number of monomeric residues in P3 and has a value in the range of between 10 to 5000;

q4 independently represents the number of monomeric residues in P4 and has a value in the range of between 1 to 500;

q5 independently represents the number of monomeric residues in P5 and has a value in the range of between 10 to 5000;

r independently represents the number of the at least first polymeric arms covalently attached to the Core and has a value in the range of between 1 to 1000;

s independently represents the number of the at least second polymeric arms covalently attached to the Core and has a value in the range of between 1 to 1000; and t independently represents the number of the at least third polymeric arms covalently attached to the Core and has a value in the range of between 1 to 1000.

2. The macromolecule of claim 1, wherein a portion of the further segment is represented by Formula E:

Formula E

[structure showing repeating units with $R^{11}$, $R^{12}$, $R^{13}$ substituents, indices m and n, and ester linkages to $Y-R^{14}$ and $Y-R^{15}$]

wherein:

$R^{11}$, $R^{12}$, $R^{13}$ independently represent hydrogen, methyl, ethyl, or $C_{3-18}$ alkyl; wherein the alkyl may be branched or unbranched, linear or cyclic, and may be optionally substituted with one or more halogens, $C_{1-6}$ alkoxy groups, or poly(ethylene glycol);

$R^{14}$ independently represents $C_{1-12}$ hydrocarbyl, —$C_{1-12}$ hydrocarbyl-(O—$C_{1-6}$ hydrocarbyl)$_w$, —$C_{1-12}$ hydrocarbyl-((CO)O—$C_{1-6}$ hydrocarbyl)$_w$, —$C_{1-12}$ hydrocarbyl-((CO)NH—$C_{1-6}$ hydrocarbyl)$_w$; wherein each hydrocarbyl portion independently may be branched or unbranched, linear or cyclic, saturated (alkyl) or unsaturated (alkenyl), and may be optionally substituted with one or more halogens, $C_{1-6}$ alkoxy groups, or poly(ethylene glycol);

$R^{15}$ independently represents $C_{13-40}$ hydrocarbyl, —$C_{13-40}$ hydrocarbyl-(O—$C_{1-6}$ hydrocarbyl)$_w$, —$C_{13-40}$ hydrocarbyl-((CO)O—$C_{1-6}$ hydrocarbyl)$_w$, $C_{13-40}$ hydrocarbyl-((CO)NH—$C_{1-6}$ alkyl)$_w$; wherein each hydrocarbyl portion independently may be branched or unbranched, linear or cyclic, saturated (alkyl) or unsaturated (alkenyl), and may be optionally substituted with one or more halogens, $C_{1-6}$ alkoxy groups, or poly(ethylene glycol); or a hydrophobic moiety of a surfactant, a hydrophobic moiety of a lipid, or a hydrophobic moiety of a fatty alcohol;

Y represents a covalent bond, ethylene glycol, poly(ethylene glycol), polyether, polyamide, $C_{1-6}$ alkyl, or combinations thereof, or is independently absent;

m independently represents a value in the range of 1-500;

n independently represents a value in the range of 1-500; and w independently represents a value in the range of 1-1000.

3. The macromolecule of claim 1, wherein the surfactant-system thickening macromolecule has a molecular weight (Mn) in the range of between 5,000 g/mol and 10,000,000 g/mol.

4. The macromolecule of claim 1, wherein the molecular weight (Mn) of the at least one polymeric arm is between 1,000 g/mol to 250,000 g/mol.

5. The macromolecule of claim 1, wherein when 0.4 wt.% of the macromolecule forms a homogeneous gel, the gel has a dynamic viscosity of at least 5,000 cP at a shear rate of 2.2 $s^{-1}$ at 25° C., according to the Thickening and Shear Thinning in Water Test.

6. The macromolecule of claim 1, wherein when 2.0 wt.% of the macromolecule forms a homogeneous gel, the gel has a dynamic viscosity of at least 500 cP at a shear rate of 2.2 $s^{-1}$ at 25° C., according to the SLES Surfactant Compatibility Test.

7. The macromolecule of claim 1, wherein when 2.0 wt.% of the macromolecule forms a homogeneous gel, the gel has a dynamic viscosity of at least 5,000 cP at a shear rate of 2.2 $s^{-1}$ at 25° C., according to the Hybrid SLES-CH Surfactant Compatibility Test.

8. The macromolecule of claim 1, wherein when 1.5 wt.% of the macromolecule forms a homogeneous gel, the gel has a dynamic viscosity of at least 2,000 cP at a shear rate of 2.2 $s^{-1}$ at 25° C., according to the Hybrid CB-SLES Surfactant Compatibility Test.

9. The macromolecule of claim 1, wherein when 1.5 wt.% of the macromolecule forms a homogeneous gel, the gel has a dynamic viscosity of at least 2,000 cP at a shear rate of 0.22 $s^{-1}$ at 25° C., according to the Hybrid CB-SLES Surfactant with NaCl Compatibility Test.

10. The macromolecule of claim 1, wherein when 2.0 wt.% of the macromolecule forms a homogeneous gel, the gel has a dynamic viscosity of at least 15,000 cP at a shear rate of 2.2 $s^{-1}$ at 25° C., according to the Ritabate 20 Surfactant Compatibility Test.

11. The macromolecule of claim 1, wherein when 2.0 wt.% of the macromolecule forms a homogeneous gel, the gel has a dynamic viscosity of at least 1,500 cP at a shear rate of 2.2 $s^{-1}$ at 25° C., according to the APG Surfactant Compatibility Test.

12. The macromolecule of claim 1, wherein when 0.4 wt.% of the macromolecule forms a homogeneous gel, the gel has a dynamic viscosity of at least 100,000 cP at a shear rate of 0.22 $s^{-1}$ at 25° C., and has a Dynamic Viscosity at 80° C. that is at least 50% relative to the viscosity of the gel at 25° C., according to the Temperature Stability Test.

13. The macromolecule of claim 1, wherein when 1.5 wt.% of the macromolecule forms a homogeneous gel, the gel has a dynamic viscosity of at least 8,000 cP at an adjusted pH in the range of between 4.5 to 6.5 at a shear rate of 0.22 $s^{-1}$ at 25° C., according to the pH Efficiency Range in Hybrid CB/SLES Surfactant Test.

14. The macromolecule of claim 1, wherein when 0.4 wt.% of the macromolecule forms a homogeneous gel, the gel has a dynamic viscosity of at least 5,000 cP at an adjusted pH in the range of between 5 to 12 at a shear rate of 0.22 $s^{-1}$ at 25° C., according to the pH Efficiency Range Test.

15. A surfactant-modified star macromolecule, comprising:
  i) a core;
  ii) at least one first polymeric arm, comprising a hydrophilic polymeric segment covalently attached to the core; and
  iii) at least one second polymeric arm, comprising:
    a) a hydrophilic polymeric segment covalently attached to the core; and
    b) a further segment comprising at least one pendant moiety represented by $[L^1—G^1—L^2—G^2]$;

wherein:
  G1 independently represents a residue of a hydrophilic moiety of the surfactant;
  G2 independently represents a residue of a hydrophobic moiety of the surfactant;
  L1 independently represents a linking group or a covalent bond, attaching G1 to the further segment; and
  L2 independently represents a linking group or a covalent bond, linking G1 and G2.

16. A method of increasing the viscosity of a surfactant-containing aqueous system, comprising: introducing the surfactant-system thickening macromolecule of claim 1 into the surfactant-containing aqueous system.

17. A method of increasing the viscosity of a surfactant-containing aqueous system, comprising: introducing the surfactant-modified star macromolecule of claim 15 into the surfactant-containing aqueous system.

18. A method of increasing the viscosity of a surfactant-containing aqueous system, comprising:
  introducing a surfactant-system thickening macromolecule into the surfactant-containing aqueous system, wherein the surfactant-system thickening macromolecule comprises:
  i) a core;
  ii) at least one first polymeric arm, comprising a polymeric segment comprised of monomeric residues of polymerized hydrophilic monomers; and
  iii) at least one second polymeric arm, comprises:
    1) at least one pendant micelle-philic moiety; or
    2) a polymeric segment comprised of at least one monomeric residue of a polymerized micelle-philic monomer.

19. The method of claim 18, wherein the at least one pendant micelle-philic moiety is represented by the formula:

$[L^1—G^1—L^2—G^2]$ wherein:
  $G^1$ independently represents a residue of a hydrophilic moiety of the surfactant;
  $G^2$ independently represents a residue of a hydrophobic moiety of the surfactant;
  $L^1$ independently represents a linking group or a covalent bond, attaching $G^1$ to the at least one second polymeric arm; and
  $L^2$ independently represents a linking group or a covalent bond, linking $G^1$ and $G^2$.

20. The method of claim 18, wherein the at least one pendant micelle-philic moiety or the at least one monomeric residue of a polymerized micelle-philic monomer comprises a C6 or greater alkyl moiety, a fluorine-modified C4 or greater alkyl moiety, or a C6 or greater alkenyl moiety.

21. The method of claim 18, wherein the micelle-philic monomer is represented by Formula I-V:

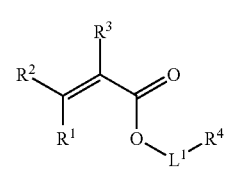

(I)

-continued

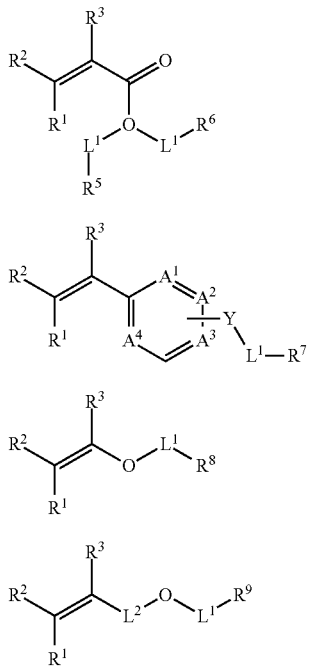

wherein:
R$^1$, R$^2$, and R$^3$ independently represent hydrogen, methyl, ethyl, or C$_{3-18}$ alkyl; wherein the alkyl may be branched or unbranched, linear or cyclic, and may be optionally substituted with one or more halogens, C$_{1-6}$ alkoxy groups, or poly(ethylene glycol);

R$^4$ and R$^7$ independently represent C$_{13}$ or greater alkyl, —C$_6$ or greater alkyl-(O—C$_{1-6}$ alkyl)$_n$, C$_6$ or greater alkenyl, or C$_6$ or greater alkenyl-(O—C$_{1-6}$ alkyl)$_n$; or when R$^3$ is C$_1$ or greater, then R$^4$ may independently represent C$_{11}$ or greater alkyl, —C$_6$ or greater alkyl —(O—C$_{1-6}$ alkyl)$_n$, C$_6$ or greater alkenyl, or C$_6$ or greater alkenyl-(O—C$_{1-6}$ alkyl)$_n$; wherein each alkyl portion independently may be branched or unbranched, linear or cyclic, saturated or unsaturated, and may be optionally substituted with one or more halogens, C$_{1-6}$ alkoxy groups, or poly(ethylene glycol);

R$^5$ independently represents C$_{19}$ or greater alkyl, —C$_6$ or greater alkyl —(O—C$_{1-6}$ alkyl)$_n$, C$_6$ or greater alkenyl, or C$_6$ or greater alkenyl-(O—C$_{1-6}$ alkyl)$_n$; or when R$^6$ is C$_1$ or greater, then R$^5$ may independently represent C$_{13}$ or greater alkyl, —C$_6$ or greater alkyl —(O—C$_{1-6}$ alkyl)$_n$, C$_6$ or greater alkenyl, or C$_6$ or greater alkenyl-(O—C$_{1-6}$ alkyl)$_n$; wherein each alkyl portion independently may be branched or unbranched, linear or cyclic, saturated or unsaturated, and may be optionally substituted with one or more halogens, C$_{1-6}$ alkoxy groups, or poly(ethylene glycol);

R$^6$ independently represents hydrogen, C$_{1-18}$ alkyl, —C$_{1-18}$ alkyl-(O—C$_{1-6}$ alkyl)$_n$, or is R$^4$, or is R$^5$; wherein each alkyl portion independently may be branched or unbranched, linear or cyclic, saturated or unsaturated, and may be optionally substituted with one or more halogens, C$_{1-6}$ alkoxy groups, or poly(ethylene glycol);

R$^8$ independently represents C$_2$ or greater alkyl, —C$_2$ or greater alkyl-(O—C$_{1-6}$ alkyl)$_n$, C$_3$ or greater alkenyl, —C$_3$ or greater alkenyl-(O—C$_{1-6}$ alkyl)$_n$; wherein each alkyl portion independently may be branched or unbranched, linear or cyclic, saturated or unsaturated, and may be optionally substituted with one or more halogens, C$_{1-6}$ alkoxy groups, or poly(ethylene glycol);

R$^9$ independently represents C$_1$ or greater alkyl, —C$_1$ or greater alkyl-(O—C$_{1-6}$ alkyl)$_n$, C$_3$ or greater alkenyl, —C$_3$ or greater alkenyl-(O—C$_{1-6}$ alkyl)$_n$; wherein each alkyl portion independently may be branched or unbranched, linear or cyclic, saturated or unsaturated, and may be optionally substituted with one or more halogens, C$_{1-6}$ alkoxy groups, or poly(ethylene glycol); or R$^4$, R$^5$, R$^7$, R$^8$, R$^9$ independently represent a hydrophobic portion of a surfactant, a hydrophobic portion of a lipid, or a hydrophobic portion of a fatty alcohol;

A$^1$, A$^2$, A$^3$ and A$^4$ independently represent CH, CR$^{10}$, or N, wherein at least two of A$^1$, A$^2$, A$^3$ and A$^4$ is CH or CR$^{10}$;

R$^{10}$ independently represents hydrogen, C$_{1-10}$ alkyl, halogen, hydroxyl, C$_{1-10}$ alkoxy; wherein the alkyl or alkoxy may be branched or unbranched, linear or cyclic, and may be optionally substituted with one or more halogens, C$_{1-6}$ alkoxy groups, or poly(ethylene glycol);

Y independently represents a covalent bond, —O—, —S—, —N(H)—, —N(R$^1$)—, —(CO)—, —S(O)—, —S(O)$_2$—, —S(O)$_2$N(R$^1$)—, —(CO)N(R$^1$)—, —N(R$^1$)—(CO)—, —(CO)O—, or —O—(CO)—;

L$^1$ independently represents a covalent bond, ethylene glycol, poly(ethylene glycol), polyether, polyamide, C$_{1-6}$ alkyl, —(CO)N(R$^1$)—, —N(R$^1$)—(CO)—, —(CO)O—, —O—(CO)—, or combinations thereof, or is independently absent; or L$^1$ independently represents a hydrophilic portion of a surfactant, a hydrophilic portion of a lipid, or a hydrophilic portion of a fatty alcohol;

L$^2$ independently represents (CH$_2$)$_{1-40}$, C$_{1-40}$ alkyl, (O—C$_{2-6}$ alkyl)$_n$, or (C$_{2-6}$ alkyl)-(O—C$_{2-6}$ alkyl)$_n$; wherein the alkyl may be branched or unbranched, linear or cyclic, and may be optionally substituted with one or more halogens, C$_{1-6}$ alkoxy groups, or poly(ethylene glycol); and n independently represents a value in the range of 1-1000.

22. The method of claim 18, wherein the surfactant is a nonionic surfactant, an anionic surfactant, an amphoteric surfactant, or a cationic surfactant.

23. The macromolecule of claim 1, wherein the further segment of P2 comprises polymerized methacrylate monomers.

24. The macromolecule of claim 23, wherein the polymerized methacrylate monomers comprise a polymerized mixture of stearyl methacrylate and methyl methacrylate.

25. The macromolecule of claim 1, wherein:
the crosslinked polymeric segment of the Core comprises polymerized trimethylolpropane triacrylate;
the hydrophilic polymeric segments of P1, P3, and P5 each independently comprise polymerized acrylic acid;
the further segment of P2 comprises a polymerized mixture of stearyl methacrylate and methyl methacrylate; and the hydrophobic polymeric segment of P4 comprises polymerized methyl methacrylate.

26. The macromolecule of claim 25, wherein:
q1 is about 50 to about 250;
q2 is about 20 to about 30;
q3 is about 200 to about 400;
q4 is about 10 to about 30;
r is about 2 to about 8;
s is about 1 to about 6; and
t is about 1 to about 6.

* * * * *